US012516089B2

(12) United States Patent
Amstutz et al.

(10) Patent No.: US 12,516,089 B2
(45) Date of Patent: Jan. 6, 2026

(54) BACTERIA BASED PROTEIN DELIVERY

(71) Applicant: T3 PHARMACEUTICALS AG, Allschwil (CH)

(72) Inventors: Marlise Amstutz, Basel (CH); Simon Ittig, Bottmingen (CH); Christoph Kasper, Olten (CH); Mathias S. Dick, Basel (CH); Falk Saupe, Basel (CH)

(73) Assignee: T3 PHARMACEUTICALS AG, Allschwil (CH)

( * ) Notice: Subject to any disclaimer, the term of this patent is extended or adjusted under 35 U.S.C. 154(b) by 288 days.

(21) Appl. No.: 18/249,626

(22) PCT Filed: Oct. 26, 2021

(86) PCT No.: PCT/EP2021/079654

§ 371 (c)(1), (2) Date: Apr. 19, 2023

(87) PCT Pub. No.: WO2022/090211

PCT Pub. Date: May 5, 2022

(65) Prior Publication Data

US 2023/0382956 A1 Nov. 30, 2023

(30) Foreign Application Priority Data

Oct. 27, 2020 (EP) .................................... 20204007

(51) Int. Cl.

| | |
|---|---|
| ***C07K 14/24*** | (2006.01) |
| ***A61K 35/74*** | (2015.01) |
| ***A61K 38/00*** | (2006.01) |
| ***C07K 14/47*** | (2006.01) |
| ***C07K 14/705*** | (2006.01) |
| ***C12N 15/62*** | (2006.01) |
| ***C12N 15/74*** | (2006.01) |

(52) U.S. Cl.

CPC .............. *C07K 14/24* (2013.01); *A61K 35/74* (2013.01); *C07K 14/47* (2013.01); *C07K 14/705* (2013.01); *C12N 15/62* (2013.01); *C12N 15/74* (2013.01); *A61K 38/00* (2013.01); *C07K 2319/02* (2013.01); *C07K 2319/036* (2013.01)

(58) Field of Classification Search

CPC .... C12N 15/62; C12N 15/74; C07K 2319/02; C07K 2319/036; A61K 38/00

See application file for complete search history.

(56) References Cited

FOREIGN PATENT DOCUMENTS

| | | | | |
|---|---|---|---|---|
| WO | 2017085233 A1 | | 5/2017 | |
| WO | WO-2017085235 A1 | * | 5/2017 | ............. C12N 15/70 |
| WO | 2018115140 A2 | | 6/2018 | |

* cited by examiner

*Primary Examiner* — Gary B Nickol
*Assistant Examiner* — Bailey M Morgan
(74) *Attorney, Agent, or Firm* — Shweta Chandra; Bozicevic, Field & Francis LLP

(57) ABSTRACT

The present invention relates to recombinant Gram-negative bacterial strains and its use in a method of treating cancer in a subject.

25 Claims, 31 Drawing Sheets

Specification includes a Sequence Listing.

| Strain Name | Back-ground strain | Insert/relevant characteristics | Protein to be delivered by T3SS | Backbone plasmid | Resulting plasmid name | Primer T3T-No.: | Resist-ances | References |
|---|---|---|---|---|---|---|---|---|
| ΔHOPEMT | Y. enterocolitica | MRS40 pIML421 [yopHΔ1–352, yopOΔ65–558, yopP23, yopE21, yopM23, yopT135] | | | | | Nal | Iriarte and Cornelis, 1998 |
| ΔHOPEMT + pBad_Si2 | Y. enterocolitica ΔyopH,O,P,E,M,T | SycE-YopE$_{1-138}$-MycHis fragment | YopE$_{1-138}$-MycHis | pBad-MycHisA (Invitrogen) | pBad_Si_2 | 287/288 (sycE-YopE1-138) | Nal Amp | |
| ΔHOPEMT + pT3P_453 or pT3P-718 or pT3P-719 or pT3P-720 | Y. enterocolitica ΔyopH,O,P,E,M,T | | YopE$_{1-138}$- Y. enterocolitica codon optimized human RIG-1 two CARD domains (Aa. 1-245) | pBad_Si_2 or pT3P-715 or pT3P-716 or pT3P-717 | pT3P_453 or pT3P-718 or pT3P-719 or pT3P-720 | synthetic construct | Nal, Amp or Cm | |
| ΔHOPEMT + pT3P_454 or pT3P-721 or pT3P-722 or pT3P-723 | Y. enterocolitica ΔyopH,O,P,E,M,T | | YopE$_{1-138}$- Y. enterocolitica codon optimized murine RIG-1 two CARD domains (Aa. 1-246) | pBad_Si_2 or pT3P-715 or pT3P-716 or pT3P-717 | pT3P_454 or pT3P-721 or pT3P-722 or pT3P-723 | synthetic construct | Nal, Amp or Cm | |

Figure 27 B

| Strain Name | Background strain | Protein to be delivered by T3SS | Backbone plasmid | Resulting plasmid name | Primer T3T-No.: | Resistances |
|---|---|---|---|---|---|---|
| ΔHOPEMT + pT3P-515 or pT3P-751 or pT3P-731 or pT3P-732 | Y. enterocolitica ΔyopH,O,P,E,M,T | $YopE_{1-138}$- Y. enterocolitica codon optimized human cGAS (Aa. 161-522) | pBad_Si_2 or pT3P-715 or pT3P-716 or pT3P-717 | pT3P-515 or pT3P-751 or pT3P-731 or pT3P-732 | synthetic construct | Nal, Amp or Cm |
| ΔHOPEMT + pT3P_522 | Y. enterocolitica ΔyopH,O,P,E,M,T | $YopE_{1-138}$- Y. enterocolitica codon optimized murine RIG-1 two CARD domains (Aa. 1-218) | pBad_Si_2 | pT3P_522 | 1021/1023 | Nal Amp |
| ΔHOPEMT + pT3P_521 | Y. enterocolitica ΔyopH,O,P,E,M,T | $YopE_{1-138}$- Y. enterocolitica codon optimized murine RIG-1 two CARD domains (Aa. 1-229) | pBad_Si_2 | pT3P_521 | 1021/1022 | Nal Amp |

Figure 27 C

| Strain Name | Background strain | Protein to be delivered by T3SS | Backbone plasmid | Resulting pYV plasmid name | Mutator | Resistances |
|---|---|---|---|---|---|---|
| ΔHOPEMT Y048 | Y. enterocolitica ΔyopH,O,P,E,M,T | $YopE_{1-138}$- Y. enterocolitica codon optimized human cGAS (Aa. 161-522) | pYV | pYV048 | pT3P-697 | Nal |
| ΔHOPEMT Y022 | Y. enterocolitica ΔyopH,O,P,E,M,T | $YopE_{1-138}$- Y. enterocolitica codon optimized murine RIG-1 two CARD domains (Aa. 1-246) | pYV | pYV022 | pT3P-457 | Nal |
| ΔHOPEMT Y022 + pT3P-454 or pT3P-721 | Y. enterocolitica ΔyopH,O,P,E,M,T | $YopE_{1-138}$- Y. enterocolitica codon optimized murine RIG-1 two CARD domains (Aa. 1-246) | | | | Nal, Amp or Cm |
| ΔHOPEMT Y021 | Y. enterocolitica ΔyopH,O,P,E,M,T | $YopE_{1-138}$- Y. enterocolitica codon optimized human RIG-1 two CARD domains (Aa. 1-245) | pYV | pYV021 | pT3P-456 | Nal |
| ΔHOPEMT Y051 | Y. enterocolitica ΔyopH,O,P,E,M,T | $YopE_{1-138}$- Y. enterocolitica codon optimized human RIG-1 two CARD domains (Aa. 1-245) and $YopE_{1-138}$- Y. enterocolitica codon optimized human cGAS (Aa. 161-522) | pYV021 | pYV051 | pT3P-714 | Nal |

Figure 27 D

| Strain Name | Background strain | Protein to be delivered by T3SS | Backbone plasmid | Resulting pYV plasmid name | Mutator | Resistances |
|---|---|---|---|---|---|---|
| ΔHOPEMT Y051 + pT3P-453 or pT3P-718 | Y. enterocolitica ΔyopH,O,P,E,M,T | $YopE_{1-138}$- Y. enterocolitica codon optimized human RIG-1 two CARD domains (Aa. 1-245) and $YopE_{1-138}$- Y. enterocolitica codon optimized human cGAS (Aa. 161-522) | | | | Nal, Amp or Cm |
| ΔHOPEMT Y051 + pT3P-751 | Y. enterocolitica ΔyopH,O,P,E,M,T | $YopE_{1-138}$- Y. enterocolitica codon optimized human RIG-1 two CARD domains (Aa. 1-245) and $YopE_{1-138}$- Y. enterocolitica codon optimized human cGAS (Aa. 161-522) | | | | Nal, Cm |
| ΔHOPEMT Y051 + pT3P-515 or pT3P-745 | Y. enterocolitica ΔyopH,O,P,E,M,T | $YopE_{1-138}$- Y. enterocolitica codon optimized human RIG-1 two CARD domains (Aa. 1-245) and $YopE_{1-138}$- Y. enterocolitica codon optimized human cGAS (Aa. 161-522) | | | | Nal, Amp or Cm |
| ΔHOPEMT Y051 + pT3P-731 | Y. enterocolitica ΔyopH,O,P,E,M,T | $YopE_{1-138}$- Y. enterocolitica codon optimized human RIG-1 two CARD domains (Aa. 1-245) and $YopE_{1-138}$- Y. enterocolitica codon optimized human cGAS (Aa. 161-522) | | | | Nal, Cm |

Figure 27 E

| Strain Name | Background strain | Protein to be delivred by T3SS | Backbone plasmid | Resulting pYV plasmid name | Mutator | Resistances |
|---|---|---|---|---|---|---|
| ΔHOPEMT Y051 + pT3P-732 | Y. enterocolitica ΔyopH,O,P,E,M,T | $YopE_{1-138}$- Y. enterocolitica codon optimized human RIG-1 two CARD domains (Aa. 1-245) and $YopE_{1-138}$- Y. enterocolitica codon optimized human cGAS (Aa. 161-522) | | | | Nal, Cm |
| ΔHOPEMT Y051 + pT3P-719 | Y. enterocolitica ΔyopH,O,P,E,M,T | $YopE_{1-138}$- Y. enterocolitica codon optimized human RIG-1 two CARD domains (Aa. 1-245) and $YopE_{1-138}$- Y. enterocolitica codon optimized human cGAS (Aa. 161-522) | | | | Nal, Cm |
| ΔHOPEMT Y051 + pT3P-720 | Y. enterocolitica ΔyopH,O,P,E,M,T | $YopE_{1-138}$- Y. enterocolitica codon optimized human RIG-1 two CARD domains (Aa. 1-245) and $YopE_{1-138}$- Y. enterocolitica codon optimized human cGAS (Aa. 161-522) | | | | Nal, Cm |

SEQUENCE LISTING

```
<160> NUMBER OF SEQ ID NOS: 52

<210> SEQ ID NO 1
<211> LENGTH: 387
<212> TYPE: PRT
<213> ORGANISM: Artificial Sequence
<220> FEATURE:
<223> OTHER INFORMATION: YopE1-138 - human RIG1 CARD domains1-245

<400> SEQUENCE: 1

Met Lys Ile Ser Ser Phe Ile Ser Thr Ser Leu Pro Leu Pro Ala Ser
1               5                   10                  15

Val Ser Gly Ser Ser Ser Val Gly Glu Met Ser Gly Arg Ser Val Ser
            20                  25                  30

Gln Gln Lys Ser Asp Gln Tyr Ala Asn Asn Leu Ala Gly Arg Thr Glu
        35                  40                  45

Ser Pro Gln Gly Ser Ser Leu Ala Ser Arg Ile Ile Glu Arg Leu Ser
    50                  55                  60

Ser Met Ala His Ser Val Ile Gly Phe Ile Gln Arg Met Phe Ser Glu
65                  70                  75                  80

Gly Ser His Lys Pro Val Val Thr Pro Ala Leu Thr Pro Ala Gln Met
                85                  90                  95

Pro Ser Pro Thr Ser Phe Ser Asp Ser Ile Lys Gln Leu Ala Ala Glu
            100                 105                 110

Thr Leu Pro Lys Tyr Met Gln Gln Leu Ser Ser Leu Asp Ala Glu Thr
        115                 120                 125
```

Leu Gln Lys Asn His Asp Gln Phe Ala Thr Leu Glu Ser Arg Met Thr
    130                 135                 140

Thr Glu Gln Arg Arg Ser Leu Gln Ala Phe Gln Asp Tyr Ile Arg Lys
145                 150                 155                 160

Thr Leu Asp Pro Thr Tyr Ile Leu Ser Tyr Met Ala Pro Trp Phe Arg
                165                 170                 175

Glu Glu Glu Val Gln Tyr Ile Gln Ala Glu Lys Asn Asn Lys Gly Pro
            180                 185                 190

Met Glu Ala Ala Thr Leu Phe Leu Lys Phe Leu Leu Glu Leu Gln Glu
        195                 200                 205

Glu Gly Trp Phe Arg Gly Phe Leu Asp Ala Leu Asp His Ala Gly Tyr
    210                 215                 220

Ser Gly Leu Tyr Glu Ala Ile Glu Ser Trp Asp Phe Lys Lys Ile Glu
225                 230                 235                 240

Lys Leu Glu Glu Tyr Arg Leu Leu Leu Lys Arg Leu Gln Pro Glu Phe
                245                 250                 255

Lys Thr Arg Ile Ile Pro Thr Asp Ile Ile Ser Asp Leu Ser Glu Cys
            260                 265                 270

Leu Ile Asn Gln Glu Cys Glu Glu Ile Leu Gln Ile Cys Ser Thr Lys
        275                 280                 285

Gly Met Met Ala Gly Ala Glu Lys Leu Val Glu Cys Leu Leu Arg Ser
    290                 295                 300

Asp Lys Glu Asn Trp Pro Lys Thr Leu Lys Leu Ala Leu Glu Lys Glu
305                 310                 315                 320

Arg Asn Lys Phe Ser Glu Leu Trp Ile Val Glu Lys Gly Ile Lys Asp
                325                 330                 335

Val Glu Thr Glu Asp Leu Glu Asp Lys Met Glu Thr Ser Asp Ile Gln
            340                 345                 350

Ile Phe Tyr Gln Glu Asp Pro Glu Cys Gln Asn Leu Ser Glu Asn Ser
        355                 360                 365

Cys Pro Pro Ser Glu Val Ser Asp Thr Asn Leu Tyr Ser Pro Phe Lys
    370                 375                 380

Pro Arg Asn
385

<210> SEQ ID NO 2
<211> LENGTH: 370
<212> TYPE: PRT
<213> ORGANISM: Artificial Sequence
<220> FEATURE:
<223> OTHER INFORMATION: YopE1-138 - human RIG1 CARD domains1-228

<400> SEQUENCE: 2

Met Lys Ile Ser Ser Phe Ile Ser Thr Ser Leu Pro Leu Pro Ala Ser
1               5                   10                  15

Val Ser Gly Ser Ser Ser Val Gly Glu Met Ser Gly Arg Ser Val Ser
            20                  25                  30

Gln Gln Lys Ser Asp Gln Tyr Ala Asn Asn Leu Ala Gly Arg Thr Glu
        35                  40                  45

Ser Pro Gln Gly Ser Ser Leu Ala Ser Arg Ile Ile Glu Arg Leu Ser
    50                  55                  60

Ser Met Ala His Ser Val Ile Gly Phe Ile Gln Arg Met Phe Ser Glu
65                  70                  75                  80

Gly Ser His Lys Pro Val Val Thr Pro Ala Leu Thr Pro Ala Gln Met
                85                  90                  95

```
Pro Ser Pro Thr Ser Phe Ser Asp Ser Ile Lys Gln Leu Ala Ala Glu
            100                 105                 110

Thr Leu Pro Lys Tyr Met Gln Gln Leu Ser Ser Leu Asp Ala Glu Thr
        115                 120                 125

Leu Gln Lys Asn His Asp Gln Phe Ala Thr Leu Glu Ser Arg Met Thr
    130                 135                 140

Thr Glu Gln Arg Arg Ser Leu Gln Ala Phe Gln Asp Tyr Ile Arg Lys
145                 150                 155                 160

Thr Leu Asp Pro Thr Tyr Ile Leu Ser Tyr Met Ala Pro Trp Phe Arg
                165                 170                 175

Glu Glu Glu Val Gln Tyr Ile Gln Ala Glu Lys Asn Asn Lys Gly Pro
            180                 185                 190

Met Glu Ala Ala Thr Leu Phe Leu Lys Phe Leu Leu Glu Leu Gln Glu
        195                 200                 205

Glu Gly Trp Phe Arg Gly Phe Leu Asp Ala Leu Asp His Ala Gly Tyr
    210                 215                 220

Ser Gly Leu Tyr Glu Ala Ile Glu Ser Trp Asp Phe Lys Lys Ile Glu
225                 230                 235                 240

Lys Leu Glu Glu Tyr Arg Leu Leu Leu Lys Arg Leu Gln Pro Glu Phe
                245                 250                 255

Lys Thr Arg Ile Ile Pro Thr Asp Ile Ile Ser Asp Leu Ser Glu Cys
            260                 265                 270

Leu Ile Asn Gln Glu Cys Glu Glu Ile Leu Gln Ile Cys Ser Thr Lys
        275                 280                 285

Gly Met Met Ala Gly Ala Glu Lys Leu Val Glu Cys Leu Leu Arg Ser
    290                 295                 300

Asp Lys Glu Asn Trp Pro Lys Thr Leu Lys Leu Ala Leu Glu Lys Glu
305                 310                 315                 320

Arg Asn Lys Phe Ser Glu Leu Trp Ile Val Glu Lys Gly Ile Lys Asp
                325                 330                 335

Val Glu Thr Glu Asp Leu Glu Asp Lys Met Glu Thr Ser Asp Ile Gln
            340                 345                 350

Ile Phe Tyr Gln Glu Asp Pro Glu Cys Gln Asn Leu Ser Glu Asn Ser
        355                 360                 365

Cys Pro
    370


<210> SEQ ID NO 3
<211> LENGTH: 359
<212> TYPE: PRT
<213> ORGANISM: Artificial Sequence
<220> FEATURE:
<223> OTHER INFORMATION: YopE1-138 -  human RIG1 CARD domains1-217

<400> SEQUENCE: 3

Met Lys Ile Ser Ser Phe Ile Ser Thr Ser Leu Pro Leu Pro Ala Ser
1               5                   10                  15

Val Ser Gly Ser Ser Ser Val Gly Glu Met Ser Gly Arg Ser Val Ser
            20                  25                  30

Gln Gln Lys Ser Asp Gln Tyr Ala Asn Asn Leu Ala Gly Arg Thr Glu
        35                  40                  45

Ser Pro Gln Gly Ser Ser Leu Ala Ser Arg Ile Ile Glu Arg Leu Ser
    50                  55                  60

Ser Met Ala His Ser Val Ile Gly Phe Ile Gln Arg Met Phe Ser Glu
65                  70                  75                  80
```

```
Gly Ser His Lys Pro Val Val Thr Pro Ala Leu Thr Pro Ala Gln Met
                85                  90                  95

Pro Ser Pro Thr Ser Phe Ser Asp Ser Ile Lys Gln Leu Ala Ala Glu
            100                 105                 110

Thr Leu Pro Lys Tyr Met Gln Gln Leu Ser Ser Leu Asp Ala Glu Thr
        115                 120                 125

Leu Gln Lys Asn His Asp Gln Phe Ala Thr Leu Glu Ser Arg Met Thr
    130                 135                 140

Thr Glu Gln Arg Arg Ser Leu Gln Ala Phe Gln Asp Tyr Ile Arg Lys
145                 150                 155                 160

Thr Leu Asp Pro Thr Tyr Ile Leu Ser Tyr Met Ala Pro Trp Phe Arg
                165                 170                 175

Glu Glu Glu Val Gln Tyr Ile Gln Ala Glu Lys Asn Asn Lys Gly Pro
            180                 185                 190

Met Glu Ala Ala Thr Leu Phe Leu Lys Phe Leu Leu Glu Leu Gln Glu
        195                 200                 205

Glu Gly Trp Phe Arg Gly Phe Leu Asp Ala Leu Asp His Ala Gly Tyr
    210                 215                 220

Ser Gly Leu Tyr Glu Ala Ile Glu Ser Trp Asp Phe Lys Lys Ile Glu
225                 230                 235                 240

Lys Leu Glu Glu Tyr Arg Leu Leu Leu Lys Arg Leu Gln Pro Glu Phe
                245                 250                 255

Lys Thr Arg Ile Ile Pro Thr Asp Ile Ile Ser Asp Leu Ser Glu Cys
            260                 265                 270

Leu Ile Asn Gln Glu Cys Glu Glu Ile Leu Gln Ile Cys Ser Thr Lys
        275                 280                 285

Gly Met Met Ala Gly Ala Glu Lys Leu Val Glu Cys Leu Leu Arg Ser
    290                 295                 300

Asp Lys Glu Asn Trp Pro Lys Thr Leu Lys Leu Ala Leu Glu Lys Glu
305                 310                 315                 320

Arg Asn Lys Phe Ser Glu Leu Trp Ile Val Glu Lys Gly Ile Lys Asp
                325                 330                 335

Val Glu Thr Glu Asp Leu Glu Asp Lys Met Glu Thr Ser Asp Ile Gln
            340                 345                 350

Ile Phe Tyr Gln Glu Asp Pro
        355
```

<210> SEQ ID NO 4
<211> LENGTH: 388
<212> TYPE: PRT
<213> ORGANISM: Artificial Sequence
<220> FEATURE:
<223> OTHER INFORMATION: YopE1-138 - murine RIG1 CARD domains1-246

<400> SEQUENCE: 4

```
Met Lys Ile Ser Ser Phe Ile Ser Thr Ser Leu Pro Leu Pro Ala Ser
1               5                   10                  15

Val Ser Gly Ser Ser Ser Val Gly Glu Met Ser Gly Arg Ser Val Ser
            20                  25                  30

Gln Gln Lys Ser Asp Gln Tyr Ala Asn Asn Leu Ala Gly Arg Thr Glu
        35                  40                  45

Ser Pro Gln Gly Ser Ser Leu Ala Ser Arg Ile Ile Glu Arg Leu Ser
    50                  55                  60

Ser Met Ala His Ser Val Ile Gly Phe Ile Gln Arg Met Phe Ser Glu
65                  70                  75                  80
```

Gly Ser His Lys Pro Val Val Thr Pro Ala Leu Thr Pro Ala Gln Met
85 90 95

Pro Ser Pro Thr Ser Phe Ser Asp Ser Ile Lys Gln Leu Ala Ala Glu
100 105 110

Thr Leu Pro Lys Tyr Met Gln Gln Leu Ser Ser Leu Asp Ala Glu Thr
115 120 125

Leu Gln Lys Asn His Asp Gln Phe Ala Thr Leu Glu Ser Arg Met Thr
130 135 140

Ala Glu Gln Arg Gln Asn Leu Gln Ala Phe Arg Asp Tyr Ile Lys Lys
145 150 155 160

Ile Leu Asp Pro Thr Tyr Ile Leu Ser Tyr Met Ser Ser Trp Leu Glu
165 170 175

Asp Glu Glu Val Gln Tyr Ile Gln Ala Glu Lys Asn Asn Lys Gly Pro
180 185 190

Met Glu Ala Ala Ser Leu Phe Leu Gln Tyr Leu Leu Lys Leu Gln Ser
195 200 205

Glu Gly Trp Phe Gln Ala Phe Leu Asp Ala Leu Tyr His Ala Gly Tyr
210 215 220

Cys Gly Leu Cys Glu Ala Ile Glu Ser Trp Asp Phe Gln Lys Ile Glu
225 230 235 240

Lys Leu Glu Glu His Arg Leu Leu Leu Arg Arg Leu Glu Pro Glu Phe
245 250 255

Lys Ala Thr Val Asp Pro Asn Asp Ile Leu Ser Glu Leu Ser Glu Cys
260 265 270

Leu Ile Asn Gln Glu Cys Glu Glu Ile Arg Gln Ile Arg Asp Thr Lys
275 280 285

Gly Arg Met Ala Gly Ala Glu Lys Met Ala Glu Cys Leu Ile Arg Ser
290 295 300

Asp Lys Glu Asn Trp Pro Lys Val Leu Gln Leu Ala Leu Glu Lys Asp
305 310 315 320

Asn Ser Lys Phe Ser Glu Leu Trp Ile Val Asp Lys Gly Phe Lys Arg
325 330 335

Ala Glu Ser Lys Ala Asp Glu Asp Asp Gly Ala Glu Ala Ser Ser Ile
340 345 350

Gln Ile Phe Ile Gln Glu Glu Pro Glu Cys Gln Asn Leu Ser Gln Asn
355 360 365

Pro Gly Pro Pro Ser Glu Ala Ser Ser Asn Asn Leu His Ser Pro Leu
370 375 380

Lys Pro Arg Asn
385

<210> SEQ ID NO 5
<211> LENGTH: 371
<212> TYPE: PRT
<213> ORGANISM: Artificial Sequence
<220> FEATURE:
<223> OTHER INFORMATION: YopE1-138 - murine RIG1 CARD domains1-229

<400> SEQUENCE: 5

Met Lys Ile Ser Ser Phe Ile Ser Thr Ser Leu Pro Leu Pro Ala Ser
1 5 10 15

Val Ser Gly Ser Ser Ser Val Gly Glu Met Ser Gly Arg Ser Val Ser
20 25 30

Gln Gln Lys Ser Asp Gln Tyr Ala Asn Asn Leu Ala Gly Arg Thr Glu
35 40 45

```
Ser Pro Gln Gly Ser Ser Leu Ala Ser Arg Ile Ile Glu Arg Leu Ser
    50                  55                  60

Ser Met Ala His Ser Val Ile Gly Phe Ile Gln Arg Met Phe Ser Glu
65                  70                  75                  80

Gly Ser His Lys Pro Val Val Thr Pro Ala Leu Thr Pro Ala Gln Met
                85                  90                  95

Pro Ser Pro Thr Ser Phe Ser Asp Ser Ile Lys Gln Leu Ala Ala Glu
            100                 105                 110

Thr Leu Pro Lys Tyr Met Gln Gln Leu Ser Ser Leu Asp Ala Glu Thr
        115                 120                 125

Leu Gln Lys Asn His Asp Gln Phe Ala Thr Leu Glu Ser Arg Met Thr
    130                 135                 140

Ala Glu Gln Arg Gln Asn Leu Gln Ala Phe Arg Asp Tyr Ile Lys Lys
145                 150                 155                 160

Ile Leu Asp Pro Thr Tyr Ile Leu Ser Tyr Met Ser Ser Trp Leu Glu
                165                 170                 175

Asp Glu Glu Val Gln Tyr Ile Gln Ala Glu Lys Asn Asn Lys Gly Pro
            180                 185                 190

Met Glu Ala Ala Ser Leu Phe Leu Gln Tyr Leu Leu Lys Leu Gln Ser
        195                 200                 205

Glu Gly Trp Phe Gln Ala Phe Leu Asp Ala Leu Tyr His Ala Gly Tyr
    210                 215                 220

Cys Gly Leu Cys Glu Ala Ile Glu Ser Trp Asp Phe Gln Lys Ile Glu
225                 230                 235                 240

Lys Leu Glu Glu His Arg Leu Leu Leu Arg Arg Leu Glu Pro Glu Phe
                245                 250                 255

Lys Ala Thr Val Asp Pro Asn Asp Ile Leu Ser Glu Leu Ser Glu Cys
            260                 265                 270

Leu Ile Asn Gln Glu Cys Glu Glu Ile Arg Gln Ile Arg Asp Thr Lys
        275                 280                 285

Gly Arg Met Ala Gly Ala Glu Lys Met Ala Glu Cys Leu Ile Arg Ser
    290                 295                 300

Asp Lys Glu Asn Trp Pro Lys Val Leu Gln Leu Ala Leu Glu Lys Asp
305                 310                 315                 320

Asn Ser Lys Phe Ser Glu Leu Trp Ile Val Asp Lys Gly Phe Lys Arg
                325                 330                 335

Ala Glu Ser Lys Ala Asp Glu Asp Asp Gly Ala Glu Ala Ser Ser Ile
            340                 345                 350

Gln Ile Phe Ile Gln Glu Glu Pro Glu Cys Gln Asn Leu Ser Gln Asn
        355                 360                 365

Pro Gly Pro
    370
```

<210> SEQ ID NO 6
<211> LENGTH: 360
<212> TYPE: PRT
<213> ORGANISM: Artificial Sequence
<220> FEATURE:
<223> OTHER INFORMATION: YopE1-138 - murine RIG1 CARD domains1-218

<400> SEQUENCE: 6

```
Met Lys Ile Ser Ser Phe Ile Ser Thr Ser Leu Pro Leu Pro Ala Ser
1               5                   10                  15

Val Ser Gly Ser Ser Ser Val Gly Glu Met Ser Gly Arg Ser Val Ser
            20                  25                  30
```

```
Gln Gln Lys Ser Asp Gln Tyr Ala Asn Asn Leu Ala Gly Arg Thr Glu
        35                  40                  45

Ser Pro Gln Gly Ser Ser Leu Ala Ser Arg Ile Ile Glu Arg Leu Ser
    50                  55                  60

Ser Met Ala His Ser Val Ile Gly Phe Ile Gln Arg Met Phe Ser Glu
65                  70                  75                  80

Gly Ser His Lys Pro Val Val Thr Pro Ala Leu Thr Pro Ala Gln Met
                85                  90                  95

Pro Ser Pro Thr Ser Phe Ser Asp Ser Ile Lys Gln Leu Ala Ala Glu
            100                 105                 110

Thr Leu Pro Lys Tyr Met Gln Gln Leu Ser Ser Leu Asp Ala Glu Thr
        115                 120                 125

Leu Gln Lys Asn His Asp Gln Phe Ala Thr Leu Glu Ser Arg Met Thr
    130                 135                 140

Ala Glu Gln Arg Gln Asn Leu Gln Ala Phe Arg Asp Tyr Ile Lys Lys
145                 150                 155                 160

Ile Leu Asp Pro Thr Tyr Ile Leu Ser Tyr Met Ser Ser Trp Leu Glu
                165                 170                 175

Asp Glu Glu Val Gln Tyr Ile Gln Ala Glu Lys Asn Asn Lys Gly Pro
            180                 185                 190

Met Glu Ala Ala Ser Leu Phe Leu Gln Tyr Leu Leu Lys Leu Gln Ser
        195                 200                 205

Glu Gly Trp Phe Gln Ala Phe Leu Asp Ala Leu Tyr His Ala Gly Tyr
    210                 215                 220

Cys Gly Leu Cys Glu Ala Ile Glu Ser Trp Asp Phe Gln Lys Ile Glu
225                 230                 235                 240

Lys Leu Glu Glu His Arg Leu Leu Leu Arg Arg Leu Glu Pro Glu Phe
                245                 250                 255

Lys Ala Thr Val Asp Pro Asn Asp Ile Leu Ser Glu Leu Ser Glu Cys
            260                 265                 270

Leu Ile Asn Gln Glu Cys Glu Glu Ile Arg Gln Ile Arg Asp Thr Lys
        275                 280                 285

Gly Arg Met Ala Gly Ala Glu Lys Met Ala Glu Cys Leu Ile Arg Ser
    290                 295                 300

Asp Lys Glu Asn Trp Pro Lys Val Leu Gln Leu Ala Leu Glu Lys Asp
305                 310                 315                 320

Asn Ser Lys Phe Ser Glu Leu Trp Ile Val Asp Lys Gly Phe Lys Arg
                325                 330                 335

Ala Glu Ser Lys Ala Asp Glu Asp Asp Gly Ala Glu Ala Ser Ser Ile
            340                 345                 350

Gln Ile Phe Ile Gln Glu Glu Pro
        355                 360
```

<210> SEQ ID NO 7
<211> LENGTH: 242
<212> TYPE: PRT
<213> ORGANISM: Artificial Sequence
<220> FEATURE:
<223> OTHER INFORMATION: YopE1-138 - human MAVS CARD domain1-100

<400> SEQUENCE: 7

```
Met Lys Ile Ser Ser Phe Ile Ser Thr Ser Leu Pro Leu Pro Ala Ser
1               5                   10                  15

Val Ser Gly Ser Ser Ser Val Gly Glu Met Ser Gly Arg Ser Val Ser
            20                  25                  30
```

```
Gln Gln Lys Ser Asp Gln Tyr Ala Asn Asn Leu Ala Gly Arg Thr Glu
        35                  40                  45

Ser Pro Gln Gly Ser Ser Leu Ala Ser Arg Ile Ile Glu Arg Leu Ser
    50                  55                  60

Ser Met Ala His Ser Val Ile Gly Phe Ile Gln Arg Met Phe Ser Glu
65                  70                  75                  80

Gly Ser His Lys Pro Val Val Thr Pro Ala Leu Thr Pro Ala Gln Met
                85                  90                  95

Pro Ser Pro Thr Ser Phe Ser Asp Ser Ile Lys Gln Leu Ala Ala Glu
            100                 105                 110

Thr Leu Pro Lys Tyr Met Gln Gln Leu Ser Ser Leu Asp Ala Glu Thr
        115                 120                 125

Leu Gln Lys Asn His Asp Gln Phe Ala Thr Leu Glu Ser Arg Met Pro
    130                 135                 140

Phe Ala Glu Asp Lys Thr Tyr Lys Tyr Ile Cys Arg Asn Phe Ser Asn
145                 150                 155                 160

Phe Cys Asn Val Asp Val Val Glu Ile Leu Pro Tyr Leu Pro Cys Leu
                165                 170                 175

Thr Ala Arg Asp Gln Asp Arg Leu Arg Ala Thr Cys Thr Leu Ser Gly
            180                 185                 190

Asn Arg Asp Thr Leu Trp His Leu Phe Asn Thr Leu Gln Arg Arg Pro
        195                 200                 205

Gly Trp Val Glu Tyr Phe Ile Ala Ala Leu Arg Gly Cys Glu Leu Val
    210                 215                 220

Asp Leu Ala Asp Glu Val Ala Ser Val Tyr Glu Ser Tyr Gln Pro Arg
225                 230                 235                 240

Thr Ser


<210> SEQ ID NO 8
<211> LENGTH: 243
<212> TYPE: PRT
<213> ORGANISM: Artificial Sequence
<220> FEATURE:
<223> OTHER INFORMATION: YopE1-138 - murine MAVS CARD domain1-101

<400> SEQUENCE: 8

Met Lys Ile Ser Ser Phe Ile Ser Thr Ser Leu Pro Leu Pro Ala Ser
1               5                   10                  15

Val Ser Gly Ser Ser Ser Val Gly Glu Met Ser Gly Arg Ser Val Ser
            20                  25                  30

Gln Gln Lys Ser Asp Gln Tyr Ala Asn Asn Leu Ala Gly Arg Thr Glu
        35                  40                  45

Ser Pro Gln Gly Ser Ser Leu Ala Ser Arg Ile Ile Glu Arg Leu Ser
    50                  55                  60

Ser Met Ala His Ser Val Ile Gly Phe Ile Gln Arg Met Phe Ser Glu
65                  70                  75                  80

Gly Ser His Lys Pro Val Val Thr Pro Ala Leu Thr Pro Ala Gln Met
                85                  90                  95

Pro Ser Pro Thr Ser Phe Ser Asp Ser Ile Lys Gln Leu Ala Ala Glu
            100                 105                 110

Thr Leu Pro Lys Tyr Met Gln Gln Leu Ser Ser Leu Asp Ala Glu Thr
        115                 120                 125

Leu Gln Lys Asn His Asp Gln Phe Ala Thr Leu Glu Ser Arg Met Thr
    130                 135                 140
```

```
Phe Ala Glu Asp Lys Thr Tyr Lys Tyr Ile Arg Asp Asn His Ser Lys
145                 150                 155                 160

Phe Cys Cys Val Asp Val Leu Glu Ile Leu Pro Tyr Leu Ser Cys Leu
                165                 170                 175

Thr Ala Ser Asp Gln Asp Arg Leu Arg Ala Ser Tyr Arg Gln Ile Gly
            180                 185                 190

Asn Arg Asp Thr Leu Trp Gly Leu Phe Asn Asn Leu Gln Arg Arg Pro
        195                 200                 205

Gly Trp Val Glu Val Phe Ile Arg Ala Leu Gln Ile Cys Glu Leu Pro
    210                 215                 220

Gly Leu Ala Asp Gln Val Thr Arg Val Tyr Gln Ser Tyr Leu Pro Pro
225                 230                 235                 240

Gly Thr Ser


<210> SEQ ID NO 9
<211> LENGTH: 564
<212> TYPE: PRT
<213> ORGANISM: Artificial Sequence
<220> FEATURE:
<223> OTHER INFORMATION: YopE1-138 - N. vectensis cGAS

<400> SEQUENCE: 9

Met Lys Ile Ser Ser Phe Ile Ser Thr Ser Leu Pro Leu Pro Ala Ser
1               5                   10                  15

Val Ser Gly Ser Ser Ser Val Gly Glu Met Ser Gly Arg Ser Val Ser
            20                  25                  30

Gln Gln Lys Ser Asp Gln Tyr Ala Asn Asn Leu Ala Gly Arg Thr Glu
        35                  40                  45

Ser Pro Gln Gly Ser Ser Leu Ala Ser Arg Ile Ile Glu Arg Leu Ser
    50                  55                  60

Ser Met Ala His Ser Val Ile Gly Phe Ile Gln Arg Met Phe Ser Glu
65                  70                  75                  80

Gly Ser His Lys Pro Val Val Thr Pro Ala Leu Thr Pro Ala Gln Met
                85                  90                  95

Pro Ser Pro Thr Ser Phe Ser Asp Ser Ile Lys Gln Leu Ala Ala Glu
            100                 105                 110

Thr Leu Pro Lys Tyr Met Gln Gln Leu Ser Ser Leu Asp Ala Glu Thr
        115                 120                 125

Leu Gln Lys Asn His Asp Gln Phe Ala Thr Leu Glu Ser Arg Met Ala
    130                 135                 140

Thr Leu Glu Arg Leu Leu Asp Leu Leu Arg Glu Tyr His Leu Asp Asp
145                 150                 155                 160

Val Leu Phe His Asn Ser Thr Pro Glu Leu Gly Ile Gln His Arg Ser
                165                 170                 175

Arg Pro Lys Gln Lys Arg Ile Ile Arg Gly Lys Lys Gln Gln Lys Ser
            180                 185                 190

Lys Lys Leu Lys Arg Asn Glu Gln Gln Gln Pro Phe Pro Lys Gly Asp
        195                 200                 205

Leu Glu Thr Leu Arg Arg Phe Ser Val Thr Asp Val Lys Ile Ser Lys
    210                 215                 220

Gln Ser Thr Lys Trp Ala Lys Lys Met Ala Asp Lys His Leu Glu Ile
225                 230                 235                 240

Ile Arg Lys His Cys Lys Thr Asn Ser Ile Lys Leu Phe Asn His Phe
                245                 250                 255
```

Glu Tyr Thr Gly Ser Phe Tyr Glu His Leu Lys Thr Ile Asp Ala Asp
260 265 270

Glu Leu Asp Ile Met Val Ala Leu Ser Ile Lys Met Asp Glu Leu Glu
275 280 285

Val Glu Gln Val Thr Pro Gly Tyr Ala Gly Leu Lys Leu Arg Asp Thr
290 295 300

Pro Ser Asn Arg Asn Lys Tyr Asn Asp Leu Thr Ile Ala Asp Asn Tyr
305 310 315 320

Gly Arg Tyr Leu Ser Pro Glu Lys Val Ser Arg Trp Phe Phe Ser Leu
325 330 335

Val Gln Lys Ala Val Asn Thr Tyr Lys Asp Glu Ile Pro Gln Thr Glu
340 345 350

Val Lys Leu Thr Asp Asn Gly Pro Ala Thr Thr Leu Val Ile Thr Tyr
355 360 365

Arg Glu Gly Asp Lys Pro Gln Glu Lys Asn Arg Arg Leu Ser Ile Asp
370 375 380

Leu Val Pro Ala Leu Leu Phe Lys Asp Lys Thr Lys Pro Ala Gly Asp
385 390 395 400

Asp Leu Arg Ala Trp His Tyr Val Ala Lys Thr Ile Pro Lys Gly Ala
405 410 415

Arg Leu Lys Glu Pro Leu Pro Phe Arg Ser Glu Leu Leu Trp Arg Gln
420 425 430

Ser Phe Ser Leu Lys Glu Lys His Leu Met Asp Lys Leu Asp Lys Asp
435 440 445

Asp Asn Gly Cys Arg Arg Glu Met Val Arg Ile Val Lys Thr Ile Val
450 455 460

Lys Lys Asp Pro Thr Leu Ala Gln Leu Ser Ser Tyr His Ile Lys Thr
465 470 475 480

Ala Phe Leu Gln Tyr Asn Phe Ser Asp Val Lys Leu Asp Trp Glu Gly
485 490 495

Lys Lys Leu Ala Glu Arg Phe Leu His Phe Leu Glu Phe Leu Arg Asp
500 505 510

Arg Val Lys Asp Lys Thr Leu Asn Asn Tyr Phe Ile Thr Asp Leu Asn
515 520 525

Leu Leu Asp Asp Leu Asn Asp Ser Asn Ile Asp Asn Ile Ala Asn Arg
530 535 540

Leu Asp Lys Ile Ile Gln Asn Glu Thr Glu Arg Ala Lys Ile Phe Thr
545 550 555 560

Thr Gln Arg Gln

<210> SEQ ID NO 10
<211> LENGTH: 504
<212> TYPE: PRT
<213> ORGANISM: Artificial Sequence
<220> FEATURE:
<223> OTHER INFORMATION: YopE1-138 - human cGAS161-522

<400> SEQUENCE: 10

Met Lys Ile Ser Ser Phe Ile Ser Thr Ser Leu Pro Leu Pro Ala Ser
1 5 10 15

Val Ser Gly Ser Ser Ser Val Gly Glu Met Ser Gly Arg Ser Val Ser
20 25 30

Gln Gln Lys Ser Asp Gln Tyr Ala Asn Asn Leu Ala Gly Arg Thr Glu
35 40 45

-continued

```
Ser Pro Gln Gly Ser Ser Leu Ala Ser Arg Ile Ile Glu Arg Leu Ser
    50                  55                  60

Ser Met Ala His Ser Val Ile Gly Phe Ile Gln Arg Met Phe Ser Glu
65                  70                  75                  80

Gly Ser His Lys Pro Val Val Thr Pro Ala Leu Thr Pro Ala Gln Met
                85                  90                  95

Pro Ser Pro Thr Ser Phe Ser Asp Ser Ile Lys Gln Leu Ala Ala Glu
            100                 105                 110

Thr Leu Pro Lys Tyr Met Gln Gln Leu Ser Ser Leu Asp Ala Glu Thr
        115                 120                 125

Leu Gln Lys Asn His Asp Gln Phe Ala Thr Leu Glu Ser Arg Gly Ala
    130                 135                 140

Ser Lys Leu Arg Ala Val Leu Glu Lys Leu Lys Leu Ser Arg Asp Asp
145                 150                 155                 160

Ile Ser Thr Ala Ala Gly Met Val Lys Gly Val Val Asp His Leu Leu
                165                 170                 175

Leu Arg Leu Lys Cys Asp Ser Ala Phe Arg Gly Val Gly Leu Leu Asn
            180                 185                 190

Thr Gly Ser Tyr Tyr Glu His Val Lys Ile Ser Ala Pro Asn Glu Phe
        195                 200                 205

Asp Val Met Phe Lys Leu Glu Val Pro Arg Ile Gln Leu Glu Glu Tyr
    210                 215                 220

Ser Asn Thr Arg Ala Tyr Tyr Phe Val Lys Phe Lys Arg Asn Pro Lys
225                 230                 235                 240

Glu Asn Pro Leu Ser Gln Phe Leu Glu Gly Glu Ile Leu Ser Ala Ser
                245                 250                 255

Lys Met Leu Ser Lys Phe Arg Lys Ile Ile Lys Glu Glu Ile Asn Asp
            260                 265                 270

Ile Lys Asp Thr Asp Val Ile Met Lys Arg Lys Arg Gly Gly Ser Pro
        275                 280                 285

Ala Val Thr Leu Leu Ile Ser Glu Lys Ile Ser Val Asp Ile Thr Leu
    290                 295                 300

Ala Leu Glu Ser Lys Ser Ser Trp Pro Ala Ser Thr Gln Glu Gly Leu
305                 310                 315                 320

Arg Ile Gln Asn Trp Leu Ser Ala Lys Val Arg Lys Gln Leu Arg Leu
                325                 330                 335

Lys Pro Phe Tyr Leu Val Pro Lys His Ala Lys Glu Gly Asn Gly Phe
            340                 345                 350

Gln Glu Glu Thr Trp Arg Leu Ser Phe Ser His Ile Glu Lys Glu Ile
        355                 360                 365

Leu Asn Asn His Gly Lys Ser Lys Thr Cys Cys Glu Asn Lys Glu Glu
    370                 375                 380

Lys Cys Cys Arg Lys Asp Cys Leu Lys Leu Met Lys Tyr Leu Leu Glu
385                 390                 395                 400

Gln Leu Lys Glu Arg Phe Lys Asp Lys Lys His Leu Asp Lys Phe Ser
                405                 410                 415

Ser Tyr His Val Lys Thr Ala Phe Phe His Val Cys Thr Gln Asn Pro
            420                 425                 430

Gln Asp Ser Gln Trp Asp Arg Lys Asp Leu Gly Leu Cys Phe Asp Asn
        435                 440                 445

Cys Val Thr Tyr Phe Leu Gln Cys Leu Arg Thr Glu Lys Leu Glu Asn
    450                 455                 460
```

Tyr Phe Ile Pro Glu Phe Asn Leu Phe Ser Ser Asn Leu Ile Asp Lys
465 470 475 480

Arg Ser Lys Glu Phe Leu Thr Lys Gln Ile Glu Tyr Glu Arg Asn Asn
485 490 495

Glu Phe Pro Val Phe Asp Glu Phe
500

<210> SEQ ID NO 11
<211> LENGTH: 504
<212> TYPE: PRT
<213> ORGANISM: Artificial Sequence
<220> FEATURE:
<223> OTHER INFORMATION: YopE1-138 - murine cGAS146-507

<400> SEQUENCE: 11

Met Lys Ile Ser Ser Phe Ile Ser Thr Ser Leu Pro Leu Pro Ala Ser
1 5 10 15

Val Ser Gly Ser Ser Ser Val Gly Glu Met Ser Gly Arg Ser Val Ser
20 25 30

Gln Gln Lys Ser Asp Gln Tyr Ala Asn Asn Leu Ala Gly Arg Thr Glu
35 40 45

Ser Pro Gln Gly Ser Ser Leu Ala Ser Arg Ile Ile Glu Arg Leu Ser
50 55 60

Ser Met Ala His Ser Val Ile Gly Phe Ile Gln Arg Met Phe Ser Glu
65 70 75 80

Gly Ser His Lys Pro Val Val Thr Pro Ala Leu Thr Pro Ala Gln Met
85 90 95

Pro Ser Pro Thr Ser Phe Ser Asp Ser Ile Lys Gln Leu Ala Ala Glu
100 105 110

Thr Leu Pro Lys Tyr Met Gln Gln Leu Ser Ser Leu Asp Ala Glu Thr
115 120 125

Leu Gln Lys Asn His Asp Gln Phe Ala Thr Leu Glu Ser Arg Glu Pro
130 135 140

Asp Lys Leu Lys Lys Val Leu Asp Lys Leu Arg Leu Lys Arg Lys Asp
145 150 155 160

Ile Ser Glu Ala Ala Glu Thr Val Asn Lys Val Val Glu Arg Leu Leu
165 170 175

Arg Arg Met Gln Lys Arg Glu Ser Glu Phe Lys Gly Val Glu Gln Leu
180 185 190

Asn Thr Gly Ser Tyr Tyr Glu His Val Lys Ile Ser Ala Pro Asn Glu
195 200 205

Phe Asp Val Met Phe Lys Leu Glu Val Pro Arg Ile Glu Leu Gln Glu
210 215 220

Tyr Tyr Glu Thr Gly Ala Phe Tyr Leu Val Lys Phe Lys Arg Ile Pro
225 230 235 240

Arg Gly Asn Pro Leu Ser His Phe Leu Glu Gly Glu Val Leu Ser Ala
245 250 255

Thr Lys Met Leu Ser Lys Phe Arg Lys Ile Ile Lys Glu Glu Val Lys
260 265 270

Glu Ile Lys Asp Ile Asp Val Ser Val Glu Lys Glu Lys Pro Gly Ser
275 280 285

Pro Ala Val Thr Leu Leu Ile Arg Asn Pro Glu Glu Ile Ser Val Asp
290 295 300

Ile Ile Leu Ala Leu Glu Ser Lys Gly Ser Trp Pro Ile Ser Thr Lys
305 310 315 320

Glu Gly Leu Pro Ile Gln Gly Trp Leu Gly Thr Lys Val Arg Thr Asn
325 330 335

Leu Arg Arg Glu Pro Phe Tyr Leu Val Pro Lys Asn Ala Lys Asp Gly
340 345 350

Asn Ser Phe Gln Gly Glu Thr Trp Arg Leu Ser Phe Ser His Thr Glu
355 360 365

Lys Tyr Ile Leu Asn Asn His Gly Ile Glu Lys Thr Cys Cys Glu Ser
370 375 380

Ser Gly Ala Lys Cys Cys Arg Lys Glu Cys Leu Lys Leu Met Lys Tyr
385 390 395 400

Leu Leu Glu Gln Leu Lys Lys Glu Phe Gln Glu Leu Asp Ala Phe Cys
405 410 415

Ser Tyr His Val Lys Thr Ala Ile Phe His Met Trp Thr Gln Asp Pro
420 425 430

Gln Asp Ser Gln Trp Asp Pro Arg Asn Leu Ser Ser Cys Phe Asp Lys
435 440 445

Leu Leu Ala Phe Phe Leu Glu Cys Leu Arg Thr Glu Lys Leu Asp His
450 455 460

Tyr Phe Ile Pro Lys Phe Asn Leu Phe Ser Gln Glu Leu Ile Asp Arg
465 470 475 480

Lys Ser Lys Glu Phe Leu Ser Lys Lys Ile Glu Tyr Glu Arg Asn Asn
485 490 495

Gly Phe Pro Ile Phe Asp Lys Leu
500

<210> SEQ ID NO 12
<211> LENGTH: 505
<212> TYPE: PRT
<213> ORGANISM: Artificial Sequence
<220> FEATURE:
<223> OTHER INFORMATION: YopE1-138 - N. vectensis cGAS60-422

<400> SEQUENCE: 12

Met Lys Ile Ser Ser Phe Ile Ser Thr Ser Leu Pro Leu Pro Ala Ser
1 5 10 15

Val Ser Gly Ser Ser Ser Val Gly Glu Met Ser Gly Arg Ser Val Ser
20 25 30

Gln Gln Lys Ser Asp Gln Tyr Ala Asn Asn Leu Ala Gly Arg Thr Glu
35 40 45

Ser Pro Gln Gly Ser Ser Leu Ala Ser Arg Ile Ile Glu Arg Leu Ser
50 55 60

Ser Met Ala His Ser Val Ile Gly Phe Ile Gln Arg Met Phe Ser Glu
65 70 75 80

Gly Ser His Lys Pro Val Val Thr Pro Ala Leu Thr Pro Ala Gln Met
85 90 95

Pro Ser Pro Thr Ser Phe Ser Asp Ser Ile Lys Gln Leu Ala Ala Glu
100 105 110

Thr Leu Pro Lys Tyr Met Gln Gln Leu Ser Ser Leu Asp Ala Glu Thr
115 120 125

Leu Gln Lys Asn His Asp Gln Phe Ala Thr Leu Glu Ser Arg Gln Pro
130 135 140

Phe Pro Lys Gly Asp Leu Glu Thr Leu Arg Arg Phe Ser Val Thr Asp
145 150 155 160

Val Lys Ile Ser Lys Gln Ser Thr Lys Trp Ala Lys Lys Met Ala Asp
165 170 175

Lys His Leu Glu Ile Ile Arg Lys His Cys Lys Thr Asn Ser Ile Lys
180 185 190

Leu Phe Asn His Phe Glu Tyr Thr Gly Ser Phe Tyr Glu His Leu Lys
195 200 205

Thr Ile Asp Ala Asp Glu Leu Asp Ile Met Val Ala Leu Ser Ile Lys
210 215 220

Met Asp Glu Leu Glu Val Glu Gln Val Thr Pro Gly Tyr Ala Gly Leu
225 230 235 240

Lys Leu Arg Asp Thr Pro Ser Asn Arg Asn Lys Tyr Asn Asp Leu Thr
245 250 255

Ile Ala Asp Asn Tyr Gly Arg Tyr Leu Ser Pro Glu Lys Val Ser Arg
260 265 270

Trp Phe Phe Ser Leu Val Gln Lys Ala Val Asn Thr Tyr Lys Asp Glu
275 280 285

Ile Pro Gln Thr Glu Val Lys Leu Thr Asp Asn Gly Pro Ala Thr Thr
290 295 300

Leu Val Ile Thr Tyr Arg Glu Gly Asp Lys Pro Gln Glu Lys Asn Arg
305 310 315 320

Arg Leu Ser Ile Asp Leu Val Pro Ala Leu Leu Phe Lys Asp Lys Thr
325 330 335

Lys Pro Ala Gly Asp Asp Leu Arg Ala Trp His Tyr Val Ala Lys Thr
340 345 350

Ile Pro Lys Gly Ala Arg Leu Lys Glu Pro Leu Pro Phe Arg Ser Glu
355 360 365

Leu Leu Trp Arg Gln Ser Phe Ser Leu Lys Glu Lys His Leu Met Asp
370 375 380

Lys Leu Asp Lys Asp Asp Asn Gly Cys Arg Arg Glu Met Val Arg Ile
385 390 395 400

Val Lys Thr Ile Val Lys Lys Asp Pro Thr Leu Ala Gln Leu Ser Ser
405 410 415

Tyr His Ile Lys Thr Ala Phe Leu Gln Tyr Asn Phe Ser Asp Val Lys
420 425 430

Leu Asp Trp Glu Gly Lys Lys Leu Ala Glu Arg Phe Leu His Phe Leu
435 440 445

Glu Phe Leu Arg Asp Arg Val Lys Asp Lys Thr Leu Asn Asn Tyr Phe
450 455 460

Ile Thr Asp Leu Asn Leu Leu Asp Asp Leu Asn Asp Ser Asn Ile Asp
465 470 475 480

Asn Ile Ala Asn Arg Leu Asp Lys Ile Ile Gln Asn Glu Thr Glu Arg
485 490 495

Ala Lys Ile Phe Thr Thr Gln Arg Gln
500 505

<210> SEQ ID NO 13
<211> LENGTH: 436
<212> TYPE: PRT
<213> ORGANISM: Artificial Sequence
<220> FEATURE:
<223> OTHER INFORMATION: YopE1-138 - murine MDA51-294

<400> SEQUENCE: 13

Met Lys Ile Ser Ser Phe Ile Ser Thr Ser Leu Pro Leu Pro Ala Ser
1 5 10 15

Val Ser Gly Ser Ser Ser Val Gly Glu Met Ser Gly Arg Ser Val Ser
20 25 30

```
Gln Gln Lys Ser Asp Gln Tyr Ala Asn Asn Leu Ala Gly Arg Thr Glu
        35                  40                  45

Ser Pro Gln Gly Ser Ser Leu Ala Ser Arg Ile Ile Glu Arg Leu Ser
    50                  55                  60

Ser Met Ala His Ser Val Ile Gly Phe Ile Gln Arg Met Phe Ser Glu
65                  70                  75                  80

Gly Ser His Lys Pro Val Val Thr Pro Ala Leu Thr Pro Ala Gln Met
                85                  90                  95

Pro Ser Pro Thr Ser Phe Ser Asp Ser Ile Lys Gln Leu Ala Ala Glu
            100                 105                 110

Thr Leu Pro Lys Tyr Met Gln Gln Leu Ser Ser Leu Asp Ala Glu Thr
        115                 120                 125

Leu Gln Lys Asn His Asp Gln Phe Ala Thr Leu Glu Ser Arg Met Ser
    130                 135                 140

Ile Val Cys Ser Ala Glu Asp Ser Phe Arg Asn Leu Ile Leu Phe Phe
145                 150                 155                 160

Arg Pro Arg Leu Lys Met Tyr Ile Gln Val Glu Pro Val Leu Asp His
                165                 170                 175

Leu Ile Phe Leu Ser Ala Glu Thr Lys Glu Gln Ile Leu Lys Lys Ile
            180                 185                 190

Asn Thr Cys Gly Asn Thr Ser Ala Ala Glu Leu Leu Leu Ser Thr Leu
        195                 200                 205

Glu Gln Gly Gln Trp Pro Leu Gly Trp Thr Gln Met Phe Val Glu Ala
    210                 215                 220

Leu Glu His Ser Gly Asn Pro Leu Ala Ala Arg Tyr Val Lys Pro Thr
225                 230                 235                 240

Leu Thr Asp Leu Pro Ser Pro Ser Ser Glu Thr Ala His Asp Glu Cys
                245                 250                 255

Leu His Leu Leu Thr Leu Leu Gln Pro Thr Leu Val Asp Lys Leu Leu
            260                 265                 270

Ile Asn Asp Val Leu Asp Thr Cys Phe Glu Lys Gly Leu Leu Thr Val
        275                 280                 285

Glu Asp Arg Asn Arg Ile Ser Ala Ala Gly Asn Ser Gly Asn Glu Ser
    290                 295                 300

Gly Val Arg Glu Leu Leu Arg Arg Ile Val Gln Lys Glu Asn Trp Phe
305                 310                 315                 320

Ser Thr Phe Leu Asp Val Leu Arg Gln Thr Gly Asn Asp Ala Leu Phe
                325                 330                 335

Gln Glu Leu Thr Gly Gly Gly Cys Pro Glu Asp Asn Thr Asp Leu Ala
            340                 345                 350

Asn Ser Ser His Arg Asp Gly Pro Ala Ala Asn Glu Cys Leu Leu Pro
        355                 360                 365

Ala Val Asp Glu Ser Ser Leu Glu Thr Glu Ala Trp Asn Val Asp Asp
    370                 375                 380

Ile Leu Pro Glu Ala Ser Cys Thr Asp Ser Ser Val Thr Thr Glu Ser
385                 390                 395                 400

Asp Thr Ser Leu Ala Glu Gly Ser Val Ser Cys Phe Asp Glu Ser Leu
                405                 410                 415

Gly His Asn Ser Asn Met Gly Arg Asp Ser Gly Thr Met Gly Ser Asp
            420                 425                 430

Ser Asp Glu Ser
        435
```

<210> SEQ ID NO 14
<211> LENGTH: 373
<212> TYPE: PRT
<213> ORGANISM: Artificial Sequence
<220> FEATURE:
<223> OTHER INFORMATION: YopE1-138 - murine MDA51-231

<400> SEQUENCE: 14

```
Met Lys Ile Ser Ser Phe Ile Ser Thr Ser Leu Pro Leu Pro Ala Ser
1               5                   10                  15

Val Ser Gly Ser Ser Ser Val Gly Glu Met Ser Gly Arg Ser Val Ser
            20                  25                  30

Gln Gln Lys Ser Asp Gln Tyr Ala Asn Asn Leu Ala Gly Arg Thr Glu
        35                  40                  45

Ser Pro Gln Gly Ser Ser Leu Ala Ser Arg Ile Ile Glu Arg Leu Ser
    50                  55                  60

Ser Met Ala His Ser Val Ile Gly Phe Ile Gln Arg Met Phe Ser Glu
65                  70                  75                  80

Gly Ser His Lys Pro Val Val Thr Pro Ala Leu Thr Pro Ala Gln Met
                85                  90                  95

Pro Ser Pro Thr Ser Phe Ser Asp Ser Ile Lys Gln Leu Ala Ala Glu
            100                 105                 110

Thr Leu Pro Lys Tyr Met Gln Gln Leu Ser Ser Leu Asp Ala Glu Thr
        115                 120                 125

Leu Gln Lys Asn His Asp Gln Phe Ala Thr Leu Glu Ser Arg Met Ser
    130                 135                 140

Ile Val Cys Ser Ala Glu Asp Ser Phe Arg Asn Leu Ile Leu Phe Phe
145                 150                 155                 160

Arg Pro Arg Leu Lys Met Tyr Ile Gln Val Glu Pro Val Leu Asp His
                165                 170                 175

Leu Ile Phe Leu Ser Ala Glu Thr Lys Glu Gln Ile Leu Lys Lys Ile
            180                 185                 190

Asn Thr Cys Gly Asn Thr Ser Ala Ala Glu Leu Leu Leu Ser Thr Leu
        195                 200                 205

Glu Gln Gly Gln Trp Pro Leu Gly Trp Thr Gln Met Phe Val Glu Ala
    210                 215                 220

Leu Glu His Ser Gly Asn Pro Leu Ala Ala Arg Tyr Val Lys Pro Thr
225                 230                 235                 240

Leu Thr Asp Leu Pro Ser Pro Ser Ser Glu Thr Ala His Asp Glu Cys
                245                 250                 255

Leu His Leu Leu Thr Leu Leu Gln Pro Thr Leu Val Asp Lys Leu Leu
            260                 265                 270

Ile Asn Asp Val Leu Asp Thr Cys Phe Glu Lys Gly Leu Leu Thr Val
        275                 280                 285

Glu Asp Arg Asn Arg Ile Ser Ala Ala Gly Asn Ser Gly Asn Glu Ser
    290                 295                 300

Gly Val Arg Glu Leu Leu Arg Arg Ile Val Gln Lys Glu Asn Trp Phe
305                 310                 315                 320

Ser Thr Phe Leu Asp Val Leu Arg Gln Thr Gly Asn Asp Ala Leu Phe
                325                 330                 335

Gln Glu Leu Thr Gly Gly Gly Cys Pro Glu Asp Asn Thr Asp Leu Ala
            340                 345                 350

Asn Ser Ser His Arg Asp Gly Pro Ala Ala Asn Glu Cys Leu Leu Pro
        355                 360                 365
```

Ala Val Asp Glu Ser
370

<210> SEQ ID NO 15
<211> LENGTH: 436
<212> TYPE: PRT
<213> ORGANISM: Artificial Sequence
<220> FEATURE:
<223> OTHER INFORMATION: YopE1-138 - human MDA51-294

<400> SEQUENCE: 15

Met Lys Ile Ser Ser Phe Ile Ser Thr Ser Leu Pro Leu Pro Ala Ser
1 5 10 15

Val Ser Gly Ser Ser Ser Val Gly Glu Met Ser Gly Arg Ser Val Ser
20 25 30

Gln Gln Lys Ser Asp Gln Tyr Ala Asn Asn Leu Ala Gly Arg Thr Glu
35 40 45

Ser Pro Gln Gly Ser Ser Leu Ala Ser Arg Ile Ile Glu Arg Leu Ser
50 55 60

Ser Met Ala His Ser Val Ile Gly Phe Ile Gln Arg Met Phe Ser Glu
65 70 75 80

Gly Ser His Lys Pro Val Val Thr Pro Ala Leu Thr Pro Ala Gln Met
85 90 95

Pro Ser Pro Thr Ser Phe Ser Asp Ser Ile Lys Gln Leu Ala Ala Glu
100 105 110

Thr Leu Pro Lys Tyr Met Gln Gln Leu Ser Ser Leu Asp Ala Glu Thr
115 120 125

Leu Gln Lys Asn His Asp Gln Phe Ala Thr Leu Glu Ser Arg Met Ser
130 135 140

Asn Gly Tyr Ser Thr Asp Glu Asn Phe Arg Tyr Leu Ile Ser Cys Phe
145 150 155 160

Arg Ala Arg Val Lys Met Tyr Ile Gln Val Glu Pro Val Leu Asp Tyr
165 170 175

Leu Thr Phe Leu Pro Ala Glu Val Lys Glu Gln Ile Gln Arg Thr Val
180 185 190

Ala Thr Ser Gly Asn Met Gln Ala Val Glu Leu Leu Leu Ser Thr Leu
195 200 205

Glu Lys Gly Val Trp His Leu Gly Trp Thr Arg Glu Phe Val Glu Ala
210 215 220

Leu Arg Arg Thr Gly Ser Pro Leu Ala Ala Arg Tyr Met Asn Pro Glu
225 230 235 240

Leu Thr Asp Leu Pro Ser Pro Ser Phe Glu Asn Ala His Asp Glu Tyr
245 250 255

Leu Gln Leu Leu Asn Leu Leu Gln Pro Thr Leu Val Asp Lys Leu Leu
260 265 270

Val Arg Asp Val Leu Asp Lys Cys Met Glu Glu Glu Leu Leu Thr Ile
275 280 285

Glu Asp Arg Asn Arg Ile Ala Ala Ala Glu Asn Asn Gly Asn Glu Ser
290 295 300

Gly Val Arg Glu Leu Leu Lys Arg Ile Val Gln Lys Glu Asn Trp Phe
305 310 315 320

Ser Ala Phe Leu Asn Val Leu Arg Gln Thr Gly Asn Asn Glu Leu Val
325 330 335

Gln Glu Leu Thr Gly Ser Asp Cys Ser Glu Ser Asn Ala Glu Ile Glu
340 345 350

```
Asn Leu Ser Gln Val Asp Gly Pro Gln Val Glu Glu Gln Leu Leu Ser
        355                 360                 365

Thr Thr Val Gln Pro Asn Leu Glu Lys Glu Val Trp Gly Met Glu Asn
    370                 375                 380

Asn Ser Ser Glu Ser Ser Phe Ala Asp Ser Ser Val Val Ser Glu Ser
385                 390                 395                 400

Asp Thr Ser Leu Ala Glu Gly Ser Val Ser Cys Leu Asp Glu Ser Leu
                405                 410                 415

Gly His Asn Ser Asn Met Gly Ser Asp Ser Gly Thr Met Gly Ser Asp
            420                 425                 430

Ser Asp Glu Glu
        435


<210> SEQ ID NO 16
<211> LENGTH: 373
<212> TYPE: PRT
<213> ORGANISM: Artificial Sequence
<220> FEATURE:
<223> OTHER INFORMATION: YopE1-138 - human MDA51-231

<400> SEQUENCE: 16

Met Lys Ile Ser Ser Phe Ile Ser Thr Ser Leu Pro Leu Pro Ala Ser
1               5                   10                  15

Val Ser Gly Ser Ser Ser Val Gly Glu Met Ser Gly Arg Ser Val Ser
            20                  25                  30

Gln Gln Lys Ser Asp Gln Tyr Ala Asn Asn Leu Ala Gly Arg Thr Glu
        35                  40                  45

Ser Pro Gln Gly Ser Ser Leu Ala Ser Arg Ile Ile Glu Arg Leu Ser
    50                  55                  60

Ser Met Ala His Ser Val Ile Gly Phe Ile Gln Arg Met Phe Ser Glu
65                  70                  75                  80

Gly Ser His Lys Pro Val Val Thr Pro Ala Leu Thr Pro Ala Gln Met
                85                  90                  95

Pro Ser Pro Thr Ser Phe Ser Asp Ser Ile Lys Gln Leu Ala Ala Glu
            100                 105                 110

Thr Leu Pro Lys Tyr Met Gln Gln Leu Ser Ser Leu Asp Ala Glu Thr
        115                 120                 125

Leu Gln Lys Asn His Asp Gln Phe Ala Thr Leu Glu Ser Arg Met Ser
    130                 135                 140

Asn Gly Tyr Ser Thr Asp Glu Asn Phe Arg Tyr Leu Ile Ser Cys Phe
145                 150                 155                 160

Arg Ala Arg Val Lys Met Tyr Ile Gln Val Glu Pro Val Leu Asp Tyr
                165                 170                 175

Leu Thr Phe Leu Pro Ala Glu Val Lys Glu Gln Ile Gln Arg Thr Val
            180                 185                 190

Ala Thr Ser Gly Asn Met Gln Ala Val Glu Leu Leu Leu Ser Thr Leu
        195                 200                 205

Glu Lys Gly Val Trp His Leu Gly Trp Thr Arg Glu Phe Val Glu Ala
    210                 215                 220

Leu Arg Arg Thr Gly Ser Pro Leu Ala Ala Arg Tyr Met Asn Pro Glu
225                 230                 235                 240

Leu Thr Asp Leu Pro Ser Pro Ser Phe Glu Asn Ala His Asp Glu Tyr
                245                 250                 255

Leu Gln Leu Leu Asn Leu Leu Gln Pro Thr Leu Val Asp Lys Leu Leu
            260                 265                 270
```

```
Val Arg Asp Val Leu Asp Lys Cys Met Glu Glu Glu Leu Leu Thr Ile
        275                 280                 285

Glu Asp Arg Asn Arg Ile Ala Ala Ala Glu Asn Asn Gly Asn Glu Ser
    290                 295                 300

Gly Val Arg Glu Leu Leu Lys Arg Ile Val Gln Lys Glu Asn Trp Phe
305                 310                 315                 320

Ser Ala Phe Leu Asn Val Leu Arg Gln Thr Gly Asn Asn Glu Leu Val
                325                 330                 335

Gln Glu Leu Thr Gly Ser Asp Cys Ser Glu Ser Asn Ala Glu Ile Glu
            340                 345                 350

Asn Leu Ser Gln Val Asp Gly Pro Gln Val Glu Glu Gln Leu Leu Ser
        355                 360                 365

Thr Thr Val Gln Pro
    370


<210> SEQ ID NO 17
<211> LENGTH: 20
<212> TYPE: PRT
<213> ORGANISM: Homo sapiens

<400> SEQUENCE: 17

Glu Asp Ile Ile Arg Asn Ile Ala Arg His Leu Ala Gln Val Gly Asp
1               5                   10                  15

Ser Met Asp Arg
            20


<210> SEQ ID NO 18
<211> LENGTH: 15
<212> TYPE: PRT
<213> ORGANISM: Homo sapiens

<400> SEQUENCE: 18

Ile Ala Arg His Leu Ala Gln Val Gly Asp Ser Met Asp Arg Ser
1               5                   10                  15


<210> SEQ ID NO 19
<211> LENGTH: 20
<212> TYPE: PRT
<213> ORGANISM: Mus musculus

<400> SEQUENCE: 19

Glu Glu Ile Ile His Asn Ile Ala Arg His Leu Ala Gln Ile Gly Asp
1               5                   10                  15

Glu Met Asp His
            20


<210> SEQ ID NO 20
<211> LENGTH: 14
<212> TYPE: PRT
<213> ORGANISM: Mus musculus

<400> SEQUENCE: 20

Ile Ala Arg His Leu Ala Gln Ile Gly Asp Glu Met Asp His
1               5                   10


<210> SEQ ID NO 21
<211> LENGTH: 17
<212> TYPE: PRT
<213> ORGANISM: Homo sapiens
```

<400> SEQUENCE: 21

Lys Lys Leu Ser Glu Cys Leu Lys Arg Ile Gly Asp Glu Leu Asp Ser
1               5                   10                  15

Asn

<210> SEQ ID NO 22
<211> LENGTH: 14
<212> TYPE: PRT
<213> ORGANISM: Homo sapiens

<400> SEQUENCE: 22

Leu Ser Glu Cys Leu Lys Arg Ile Gly Asp Glu Leu Asp Ser
1               5                   10

<210> SEQ ID NO 23
<211> LENGTH: 17
<212> TYPE: PRT
<213> ORGANISM: Mus musculus

<400> SEQUENCE: 23

Lys Lys Leu Ser Glu Cys Leu Arg Arg Ile Gly Asp Glu Leu Asp Ser
1               5                   10                  15

Asn

<210> SEQ ID NO 24
<211> LENGTH: 14
<212> TYPE: PRT
<213> ORGANISM: Mus musculus

<400> SEQUENCE: 24

Leu Ser Glu Cys Leu Arg Arg Ile Gly Asp Glu Leu Asp Ser
1               5                   10

<210> SEQ ID NO 25
<211> LENGTH: 138
<212> TYPE: PRT
<213> ORGANISM: Yersinia enterocolitica

<400> SEQUENCE: 25

Met Lys Ile Ser Ser Phe Ile Ser Thr Ser Leu Pro Leu Pro Ala Ser
1               5                   10                  15

Val Ser Gly Ser Ser Ser Val Gly Glu Met Ser Gly Arg Ser Val Ser
            20                  25                  30

Gln Gln Lys Ser Asp Gln Tyr Ala Asn Asn Leu Ala Gly Arg Thr Glu
        35                  40                  45

Ser Pro Gln Gly Ser Ser Leu Ala Ser Arg Ile Ile Glu Arg Leu Ser
    50                  55                  60

Ser Met Ala His Ser Val Ile Gly Phe Ile Gln Arg Met Phe Ser Glu
65                  70                  75                  80

Gly Ser His Lys Pro Val Val Thr Pro Ala Leu Thr Pro Ala Gln Met
                85                  90                  95

Pro Ser Pro Thr Ser Phe Ser Asp Ser Ile Lys Gln Leu Ala Ala Glu
            100                 105                 110

Thr Leu Pro Lys Tyr Met Gln Gln Leu Ser Ser Leu Asp Ala Glu Thr
        115                 120                 125

Leu Gln Lys Asn His Asp Gln Phe Ala Thr
    130                 135

<210> SEQ ID NO 26
<211> LENGTH: 81
<212> TYPE: PRT
<213> ORGANISM: Salmonella enterica

<400> SEQUENCE: 26

```
Val Thr Lys Ile Thr Leu Ser Pro Gln Asn Phe Arg Ile Gln Lys Gln
1               5                   10                  15

Glu Thr Thr Leu Leu Lys Glu Lys Ser Thr Glu Lys Asn Ser Leu Ala
            20                  25                  30

Lys Ser Ile Leu Ala Val Lys Asn His Phe Ile Glu Leu Arg Ser Lys
        35                  40                  45

Leu Ser Glu Arg Phe Ile Ser His Lys Asn Thr Glu Ser Ser Ala Thr
    50                  55                  60

His Phe His Arg Gly Ser Ala Ser Glu Gly Arg Ala Val Leu Thr Asn
65                  70                  75                  80

Lys
```

<210> SEQ ID NO 27
<211> LENGTH: 105
<212> TYPE: PRT
<213> ORGANISM: Salmonella enterica

<400> SEQUENCE: 27

```
Val Thr Lys Ile Thr Leu Ser Pro Gln Asn Phe Arg Ile Gln Lys Gln
1               5                   10                  15

Glu Thr Thr Leu Leu Lys Glu Lys Ser Thr Glu Lys Asn Ser Leu Ala
            20                  25                  30

Lys Ser Ile Leu Ala Val Lys Asn His Phe Ile Glu Leu Arg Ser Lys
        35                  40                  45

Leu Ser Glu Arg Phe Ile Ser His Lys Asn Thr Glu Ser Ser Ala Thr
    50                  55                  60

His Phe His Arg Gly Ser Ala Ser Glu Gly Arg Ala Val Leu Thr Asn
65                  70                  75                  80

Lys Val Val Lys Asp Phe Met Leu Gln Thr Leu Asn Asp Ile Asp Ile
                85                  90                  95

Arg Gly Ser Ala Ser Lys Asp Pro Ala
            100                 105
```

<210> SEQ ID NO 28
<211> LENGTH: 210
<212> TYPE: PRT
<213> ORGANISM: Salmonella enterica

<400> SEQUENCE: 28

```
Met Pro Tyr Thr Ser Val Ser Thr Tyr Ala Arg Ala Leu Ser Gly Asn
1               5                   10                  15

Lys Leu Pro His Val Ala Ala Gly Asp Tyr Glu Asn Lys Leu Ser Thr
            20                  25                  30

Lys Ile Met Lys Gly Ile Leu Tyr Val Leu Thr Ala Gly Leu Ala Tyr
        35                  40                  45

Gly Phe Thr Arg Val Ile Glu His Tyr Cys Asn Val Thr Pro Lys Val
    50                  55                  60

Ala Glu Phe Cys Ala Asn Ala Gly Asn Ile His Asn His Leu Ala Asp
65                  70                  75                  80

Ala Val Arg Asp Gly Leu Phe Thr Ile Asp Val Glu Leu Ser Asp Gly
                85                  90                  95
```

```
Arg Met Leu Thr Phe Glu Gln Leu Ser Leu Ile Ala Glu Gly Lys Pro
            100                 105                 110

Ile Val Arg Ile Ser Asp Gly Glu His Thr Val Glu Val Glu Gly Thr
        115                 120                 125

Phe Glu Glu Ile Cys Met Arg Leu Glu Glu Gly Phe Phe Glu Ala Pro
    130                 135                 140

Ala Tyr Tyr Asp Tyr Asp Ile Asp Glu Lys Tyr Lys Thr Val Arg Glu
145                 150                 155                 160

Arg Met Ala Ala Tyr Asn Ala Leu Pro Gln Ala Leu Gly Ala Ile Pro
                165                 170                 175

Cys Leu Glu Tyr Tyr Ile Ala Arg Ala Ser Asn Met Gln Glu Ala Lys
            180                 185                 190

Ala Gln Trp Ala Ala Asp Ile Lys Ala Arg Tyr His Asn Tyr Leu Asp
        195                 200                 205

Asn Tyr
    210


<210> SEQ ID NO 29
<211> LENGTH: 629
<212> TYPE: DNA
<213> ORGANISM: Artificial Sequence
<220> FEATURE:
<223> OTHER INFORMATION: pBR322 ori

<400> SEQUENCE: 29

tagaaaagat caaaggatct tcttgagatc cttttttct gcgcgtaatc tgctgcttgc      60

aaacaaaaaa accaccgcta ccagcggtgg tttgtttgcc ggatcaagag ctaccaactc    120

tttttccgaa ggtaactggc ttcagcagag cgcagatacc aaatactgtc cttctagtgt    180

agccgtagtt aggccaccac ttcaagaact ctgtagcacc gcctacatac ctcgctctgc    240

taatcctgtt accagtggct gctgccagtg gcgataagtc gtgtcttacc gggttggact    300

caagacgata gttaccggat aaggcgcagc ggtcgggctg aacggggggt tcgtgcacac    360

agcccagctt ggagcgaacg acctacaccg aactgagata cctacagcgt gagctatgag    420

aaagcgccac gcttcccgaa gggagaaagg cggacaggta tccggtaagc ggcagggtcg    480

gaacaggaga gcgcacgagg gagcttccag ggggaaacgc ctggtatctt tatagtcctg    540

tcgggtttcg ccacctctga cttgagcgtc gatttttgtg atgctcgtca ggggggcgga    600

gcctatggaa aaacgccagc aacgcggcc                                      629


<210> SEQ ID NO 30
<211> LENGTH: 629
<212> TYPE: DNA
<213> ORGANISM: Artificial Sequence
<220> FEATURE:
<223> OTHER INFORMATION: ColE1 ori

<400> SEQUENCE: 30

tagaaaagat caaaggatct tcttgagatc cttttttct gcgcgtaatc tgctgcttgc      60

aaacaaaaaa accaccgcta ccagcggtgg tttgtttgcc ggatcaagag ctaccaactc    120

tttttccgaa ggtaactggc ttcagcagag cgcagatacc aaatactgtt cttctagtgt    180

agccgtagtt aggccaccac ttcaagaact ctgtagcacc gcctacatac ctcgctctgc    240

taatcctgtt accagtggct gctgccagtg gcgataagtc gtgtcttacc gggttggact    300

caagacgata gttaccggat aaggcgcagc ggtcgggctg aacggggggt tcgtgcacac    360

agcccagctt ggagcgaacg acctacaccg aactgagata cctacagcgt gagctatgag    420
```

aaagcgccac gcttcccgaa gggagaaagg cggacaggta tccggtaagc ggcagggtcg 480
gaacaggaga gcgcacgagg gagcttccag ggggaaacgc ctggtatctt tatagtcctg 540
tcgggtttcg ccacctctga cttgagcgtc gatttttgtg atgctcgtca ggggggcgga 600
gcctatggaa aaacgccagc aacgcggcc 629

<210> SEQ ID NO 31
<211> LENGTH: 225
<212> TYPE: DNA
<213> ORGANISM: Artificial Sequence
<220> FEATURE:
<223> OTHER INFORMATION: rop

<400> SEQUENCE: 31
atgaacagaa atcccccctta cacggaggca tcagtgacca aacaggaaaa aaccgccctt 60
aacatggccc gctttatcag aagccagaca ttaacgcttc tggagaaact caacgagctg 120
gacgcggatg aacaggcaga catctgtgaa tcgcttcacg accacgctga tgagctttac 180
cgcagctgcc tcgcgcgttt cggtgatgac ggtgaaaacc tctga 225

<210> SEQ ID NO 32
<211> LENGTH: 45
<212> TYPE: DNA
<213> ORGANISM: Artificial Sequence
<220> FEATURE:
<223> OTHER INFORMATION: Primer-T3T_887

<400> SEQUENCE: 32
cacatgtggt cgacgaatag acagcgaaag ttgttgaaat aattg 45

<210> SEQ ID NO 33
<211> LENGTH: 47
<212> TYPE: DNA
<213> ORGANISM: Artificial Sequence
<220> FEATURE:
<223> OTHER INFORMATION: Primer-T3T_955

<400> SEQUENCE: 33
cactaccccc ttgtttttat ccatattaat tgcgcggttt aaacggg 47

<210> SEQ ID NO 34
<211> LENGTH: 25
<212> TYPE: DNA
<213> ORGANISM: Artificial Sequence
<220> FEATURE:
<223> OTHER INFORMATION: Primer - T3T_956

<400> SEQUENCE: 34
tatggataaa aacaaggggg tagtg 25

<210> SEQ ID NO 35
<211> LENGTH: 44
<212> TYPE: DNA
<213> ORGANISM: Artificial Sequence
<220> FEATURE:
<223> OTHER INFORMATION: Primer - T3T_888

<400> SEQUENCE: 35
catgcgaatg ggcccgtttt cagtataaaa agcacggtat atac 44

<210> SEQ ID NO 36
<211> LENGTH: 45
<212> TYPE: DNA

<213> ORGANISM: Artificial Sequence
<220> FEATURE:
<223> OTHER INFORMATION: Primer - T3T_957

<400> SEQUENCE: 36
cactaccccc ttgtttttat ccatattaat tgcgcggttt cagcg 45

<210> SEQ ID NO 37
<211> LENGTH: 39
<212> TYPE: DNA
<213> ORGANISM: Artificial Sequence
<220> FEATURE:
<223> OTHER INFORMATION: Primer - T3T_995

<400> SEQUENCE: 37
catggtcgac gttttcagta taaaaagcac ggtatatac 39

<210> SEQ ID NO 38
<211> LENGTH: 29
<212> TYPE: DNA
<213> ORGANISM: Artificial Sequence
<220> FEATURE:
<223> OTHER INFORMATION: Primer - T3T_822

<400> SEQUENCE: 38
catggtcgac ctcagggttc cagcttagc 29

<210> SEQ ID NO 39
<211> LENGTH: 29
<212> TYPE: DNA
<213> ORGANISM: Artificial Sequence
<220> FEATURE:
<223> OTHER INFORMATION: Primer - T3T_1021

<400> SEQUENCE: 39
catggtcgac ctcagggttc cagcttagc 29

<210> SEQ ID NO 40
<211> LENGTH: 29
<212> TYPE: DNA
<213> ORGANISM: Artificial Sequence
<220> FEATURE:
<223> OTHER INFORMATION: Primer - T3T_1022

<400> SEQUENCE: 40
catggtcgac ctcagggttc cagcttagc 29

<210> SEQ ID NO 41
<211> LENGTH: 29
<212> TYPE: DNA
<213> ORGANISM: Artificial Sequence
<220> FEATURE:
<223> OTHER INFORMATION: Primer - T3T_1023

<400> SEQUENCE: 41
catggtcgac ctcagggttc cagcttagc 29

<210> SEQ ID NO 42
<211> LENGTH: 29
<212> TYPE: DNA
<213> ORGANISM: Artificial Sequence
<220> FEATURE:
<223> OTHER INFORMATION: Primer - T3T_287

<400> SEQUENCE: 42
cggggtacct caactaaatg accgtggtg 29

<210> SEQ ID NO 43
<211> LENGTH: 43
<212> TYPE: DNA
<213> ORGANISM: Artificial Sequence
<220> FEATURE:
<223> OTHER INFORMATION: Primer - T3T_288

<400> SEQUENCE: 43
gttaaagctt ttcgaatcta gactcgagcg tggcgaactg gtc 43

<210> SEQ ID NO 44
<211> LENGTH: 138
<212> TYPE: DNA
<213> ORGANISM: Artificial Sequence
<220> FEATURE:
<223> OTHER INFORMATION: Multiple cloning site directly following the yopE1-138 fragment on pBad_Si2 plasmid

<400> SEQUENCE: 44
gttcgccacg ctcgagtcta gattcgaaaa gcttgggccc gaacaaaaac tcatctcaga 60
agaggatctg aatagcgccg tcgaccatca tcatcatcat cattgagttt aaacggtctc 120
cagcttggct gttttggc 138

<210> SEQ ID NO 45
<211> LENGTH: 5
<212> TYPE: PRT
<213> ORGANISM: Artificial Sequence
<220> FEATURE:
<223> OTHER INFORMATION: Amino acid motif recognized by Enterokinase (light chain) / Enteropeptidase

<400> SEQUENCE: 45

Asp Asp Asp Asp Lys
1 5

<210> SEQ ID NO 46
<211> LENGTH: 8
<212> TYPE: PRT
<213> ORGANISM: Artificial Sequence
<220> FEATURE:
<223> OTHER INFORMATION: Amino acid motif recognized by PreScission Protease/human Rhinovirusprotease (HRV 3C)

<400> SEQUENCE: 46

Leu Glu Val Leu Phe Gln Gly Pro
1 5

<210> SEQ ID NO 47
<211> LENGTH: 7
<212> TYPE: PRT
<213> ORGANISM: Artificial Sequence
<220> FEATURE:
<223> OTHER INFORMATION: Amino acid motif recognized by TEV protease (tobacco etch virus)

<400> SEQUENCE: 47

Glu Asn Leu Tyr Phe Gln Ser
1 5

<210> SEQ ID NO 48
<211> LENGTH: 7
<212> TYPE: PRT
<213> ORGANISM: Artificial Sequence
<220> FEATURE:

<223> OTHER INFORMATION: Modified amino acid motifs based on the Glu-X-X-Tyr-X-Gln/Gly or Ser (where X is any amino acid) recognized by TEV protease (tobacco etch virus)
<220> FEATURE:
<221> NAME/KEY: VARIANT
<222> LOCATION: (2)..(2)
<223> OTHER INFORMATION: Xaa can be any naturally occurring amino acid
<220> FEATURE:
<221> NAME/KEY: VARIANT
<222> LOCATION: (3)..(3)
<223> OTHER INFORMATION: Xaa can be any naturally occurring amino acid
<220> FEATURE:
<221> NAME/KEY: VARIANT
<222> LOCATION: (5)..(5)
<223> OTHER INFORMATION: Xaa can be any naturally occurring amino acid
<220> FEATURE:
<221> NAME/KEY: VARIANT
<222> LOCATION: (7)..(7)
<223> OTHER INFORMATION: Xaa can be serine or glycine

<400> SEQUENCE: 48

```
Glu Xaa Xaa Tyr Xaa Gln Xaa
1               5
```

<210> SEQ ID NO 49
<211> LENGTH: 7
<212> TYPE: PRT
<213> ORGANISM: Artificial Sequence
<220> FEATURE:
<223> OTHER INFORMATION: Amino acid motif recognized by TVMV protease

<400> SEQUENCE: 49

```
Glu Thr Val Arg Phe Gln Ser
1               5
```

<210> SEQ ID NO 50
<211> LENGTH: 4
<212> TYPE: PRT
<213> ORGANISM: Artificial Sequence
<220> FEATURE:
<223> OTHER INFORMATION: Amino acid motif recognized by FactorXa protease
<220> FEATURE:
<221> NAME/KEY: VARIANT
<222> LOCATION: (2)..(2)
<223> OTHER INFORMATION: Xaa can be glutamic acid or aspartic acid

<400> SEQUENCE: 50

```
Ile Xaa Gly Arg
1
```

<210> SEQ ID NO 51
<211> LENGTH: 6
<212> TYPE: PRT
<213> ORGANISM: Artificial Sequence
<220> FEATURE:
<223> OTHER INFORMATION: Amino acid motif recognized by Thrombin

<400> SEQUENCE: 51

```
Leu Val Pro Arg Gly Ser
1               5
```

<210> SEQ ID NO 52
<211> LENGTH: 8
<212> TYPE: PRT
<213> ORGANISM: Simian virus 40

-continued

```
<400> SEQUENCE: 52

Pro Pro Lys Lys Lys Arg Lys Val
1               5
```

BACTERIA BASED PROTEIN DELIVERY

THE FIELD OF THE INVENTION

The present invention relates to recombinant Gram-negative bacterial strains and its use in a method of treating cancer in a subject.

BACKGROUND OF THE INVENTION

Bacteria have evolved different mechanisms to directly inject proteins into target cells[1]. The type III secretion system (T3SS) used by bacteria like *Yersinia, Shigella* and *Salmonella*[2] functions like a nano-syringe that injects so-called bacterial effector proteins into host cells. T3SS has been exploited to deliver hybrid peptides and proteins into target cells. Heterologous bacterial T3SS effectors have been delivered in case the bacterium under study is hardly accessible by genetics (like *Chlamydia trachomatis*). Often reporter proteins were fused to possible T3SS secretion signals as to study requirements for T3SS dependent protein delivery, such as the *Bordetella pertussis* adenylate cyclase, murine DHFR or a phosphorylatable tag. Peptide delivery was mainly conducted with the aim of vaccination. This includes viral epitopes, bacterial epitopes (listeriolysin O) as well as peptides representing epitopes of human cancer cells. In few cases functional eukaryotic proteins have been delivered to modulate the host cell, as done with nanobodies[3], nuclear proteins (Cre-recombinase, MyoD)[4,5] or Il10 and IL1ra[6]. None of the above-mentioned systems allows single-protein delivery as in each case one or multiple endogenous effector proteins are still encoded. Furthermore, the vectors used have not been designed in a way allowing simple cloning of other DNA fragments encoding proteins of choice, hindering broad application of the system.

Approaches allowing targeted drug delivery are of great interest. For example, antibodies recognizing surface structures of tumor cells and, in an optimal case, selectively bind to tumor cells are used. To improve the mechanism of such antibodies they can be conjugated to therapeutic agents or to lipid vesicles packed with drugs. One of the challenges with such vesicles is the proper release of the active reagent. Even more complex is the delivery of therapeutic proteins or peptides, especially when intracellular mechanisms are targeted. Many alternative ways have been tried to solve the problem of delivering therapeutic proteins into eukaryotic cells, among which are "cell penetrating peptides" (CPP) or similar technologies as well as various nanoparticle-based methodologies. All these technologies have the drawback of low efficacy and that the cargo taken up by the cell via endocytosis is likely to end up being degraded in lysosomes. Furthermore, the conflict between need for stability of cargo-carrier in the human body and the requirement for destabilization and liberation within the target cell constitutes an intrinsic problem of such technologies. Various bacteria have been shown to replicate within malignant solid tumors when administered from a distal site, including *Escherichia coli, Vibrio cholerae, Salmonella enterica, Listeria monocytogenes, Pseudomonas aeruginosa* and Bifidobacteria. Currently, only *bacillus* Calmette-Guerin (BCG, derived from *Mycobacterium bovis*) is used in clinical practice. BCG is administrated to treat superficial bladder cancer, while the underlying molecular mechanism remains largely unknown. The development of bacterial strains which are capable e.g. to deliver cargo produced inside bacteria to its site of action inside cells like cancer cells, i.e. outside of bacteria, remains a major challenge.

SUMMARY OF THE INVENTION

The present invention relates to recombinant Gram-negative bacterial strains and its use in a method of treating cancer in a subject. In some embodiments the present invention provides recombinant Gram-negative bacterial strains and the use thereof for treating cancer in a subject wherein the recombinant Gram-negative bacterial strains allow the translocation of various type III effectors, but also of type IV effectors, of viral proteins and most importantly of functional eukaryotic proteins into cancer cells e.g. into cells of a malignant solid tumor.

The present invention provides a recombinant Gram-negative bacterial strain capable to express and secrete at least two different heterologous proteins each at high peak amounts wherein surprisingly maximal activity for each of the heterologous proteins is retained after delivery into eukaryotic cells e.g. into cancer cells while maintaining full tumour colonising capacity of the bacterial strain and optimized genetic stability.

In a first aspect the present invention relates to a recombinant Gram-negative bacterial strain which comprises i) a first polynucleotide molecule comprising a nucleotide sequence encoding a heterologous protein or a fragment thereof fused in frame to the 3'end of a nucleotide sequence encoding a delivery signal from a bacterial effector protein, wherein the nucleotide sequence encoding the delivery signal from a bacterial effector protein is operably linked to a promoter;

- ii) a second polynucleotide molecule comprising a nucleotide sequence encoding a heterologous protein or a fragment thereof fused in frame to the 3'end of a nucleotide sequence encoding a delivery signal from a bacterial effector protein, wherein the nucleotide sequence encoding the delivery signal from a bacterial effector protein is operably linked to a promoter;
- iii) a third polynucleotide molecule comprising a nucleotide sequence encoding a heterologous protein or a fragment thereof fused in frame to the 3'end of a nucleotide sequence encoding a delivery signal from a bacterial effector protein, wherein the nucleotide sequence encoding the delivery signal from a bacterial effector protein is operably linked to a promoter; and
- iv) a fourth polynucleotide molecule comprising a nucleotide sequence encoding a heterologous protein or a fragment thereof fused in frame to the 3'end of a nucleotide sequence encoding a delivery signal from a bacterial effector protein, wherein the nucleotide sequence encoding the delivery signal from a bacterial effector protein is operably linked to a promoter, wherein said first and said second polynucleotide molecule are located on a vector comprised by said Gram-negative bacterial strain and said third and said fourth polynucleotide molecule are located on a chromosome of said Gram-negative bacterial strain or on an extra-chromosomal genetic element comprised by said Gram-negative bacterial strain, with the proviso that the extra-chromosomal genetic element is not the vector on which the said first and said second polynucleotide molecule are located.

In a further aspect the present invention relates to a recombinant Gram-negative bacterial strain which comprises i) a first polynucleotide molecule comprising a nucleotide sequence encoding a heterologous protein or a fragment thereof fused in frame to the 3'end of a nucleotide sequence encoding a delivery signal from a bacterial effector protein, wherein the nucleotide sequence encoding the delivery signal from a bacterial effector protein is operably linked to a promoter;

ii) a second polynucleotide molecule comprising a nucleotide sequence encoding a heterologous protein or a fragment thereof fused in frame to the 3'end of a nucleotide sequence encoding a delivery signal from a bacterial effector protein, wherein the nucleotide sequence encoding the delivery signal from a bacterial effector protein is operably linked to a promoter;

iii) a third polynucleotide molecule comprising a nucleotide sequence encoding a heterologous protein or a fragment thereof fused in frame to the 3'end of a nucleotide sequence encoding a delivery signal from a bacterial effector protein, wherein the nucleotide sequence encoding the delivery signal from a bacterial effector protein is operably linked to a promoter; and iv) a fourth polynucleotide molecule comprising a nucleotide sequence encoding a heterologous protein or a fragment thereof fused in frame to the 3'end of a nucleotide sequence encoding a delivery signal from a bacterial effector protein, wherein the nucleotide sequence encoding the delivery signal from a bacterial effector protein is operably linked to a promoter, wherein said first and said second polynucleotide molecule are located on a vector comprised by said Gram-negative bacterial strain and said third and said fourth polynucleotide molecule are located on a chromosome of said Gram-negative bacterial strain or on an extra-chromosomal genetic element comprised by said Gram-negative bacterial strain, with the proviso that the extra-chromosomal genetic element is not the vector on which the said first and said second polynucleotide molecule are located, for use as a medicament.

In a further aspect the present invention relates to a recombinant Gram-negative bacterial strain which comprises i) a first polynucleotide molecule comprising a nucleotide sequence encoding a heterologous protein or a fragment thereof fused in frame to the 3'end of a nucleotide sequence encoding a delivery signal from a bacterial effector protein, wherein the nucleotide sequence encoding the delivery signal from a bacterial effector protein is operably linked to a promoter;

ii) a second polynucleotide molecule comprising a nucleotide sequence encoding a heterologous protein or a fragment thereof fused in frame to the 3'end of a nucleotide sequence encoding a delivery signal from a bacterial effector protein, wherein the nucleotide sequence encoding the delivery signal from a bacterial effector protein is operably linked to a promoter;

iii) a third polynucleotide molecule comprising a nucleotide sequence encoding a heterologous protein or a fragment thereof fused in frame to the 3'end of a nucleotide sequence encoding a delivery signal from a bacterial effector protein, wherein the nucleotide sequence encoding the delivery signal from a bacterial effector protein is operably linked to a promoter; and iv) a fourth polynucleotide molecule comprising a nucleotide sequence encoding a heterologous protein or a fragment thereof fused in frame to the 3'end of a nucleotide sequence encoding a delivery signal from a bacterial effector protein, wherein the nucleotide sequence encoding the delivery signal from a bacterial effector protein is operably linked to a promoter, wherein said first and said second polynucleotide molecule are located on a vector comprised by said Gram-negative bacterial strain and said third and said fourth polynucleotide molecule are located on a chromosome of said Gram-negative bacterial strain or on an extra-chromosomal genetic element comprised by said Gram-negative bacterial strain, with the proviso that the extra-chromosomal genetic element is not the vector on which the said first and said second polynucleotide molecule are located, for use in a method of treating cancer in a subject, the method comprising administering to the subject said recombinant Gram-negative bacterial strain, wherein the recombinant Gram-negative bacterial strain is administered in an amount that is sufficient to treat the subject.

Likewise the present invention relates to a method of treating cancer in a subject, comprising administering to the subject the above described recombinant Gram-negative bacterial strain, wherein the recombinant Gram-negative bacterial strain is administered in an amount that is sufficient to treat the subject.

Likewise the present invention relates to the use of the above described recombinant Gram-negative bacterial strain for the manufacture of a medicament for treating cancer in a subject.

*enterocolitica* promoter. I: araBAD promoter region (4 . . . 279), II: PBAD promoter (250 . . . 277), III: MCS I (317 . . . 331), IV: SycE (339 . . . 731), V: $YopE_{1-138}$ (924 . . . 1337), VI: MCS II (1338 . . . 1361), VII: c-Myc tag (1368 . . . 1397), VIII: 6His tag (1413 . . . 1430), IX: Stop codon (1431 . . . 1433), X: Chloramphenicol resistance (2110 . . . 2766), XI: pBR322 origin (2924 . . . 3552).

Figure 5:
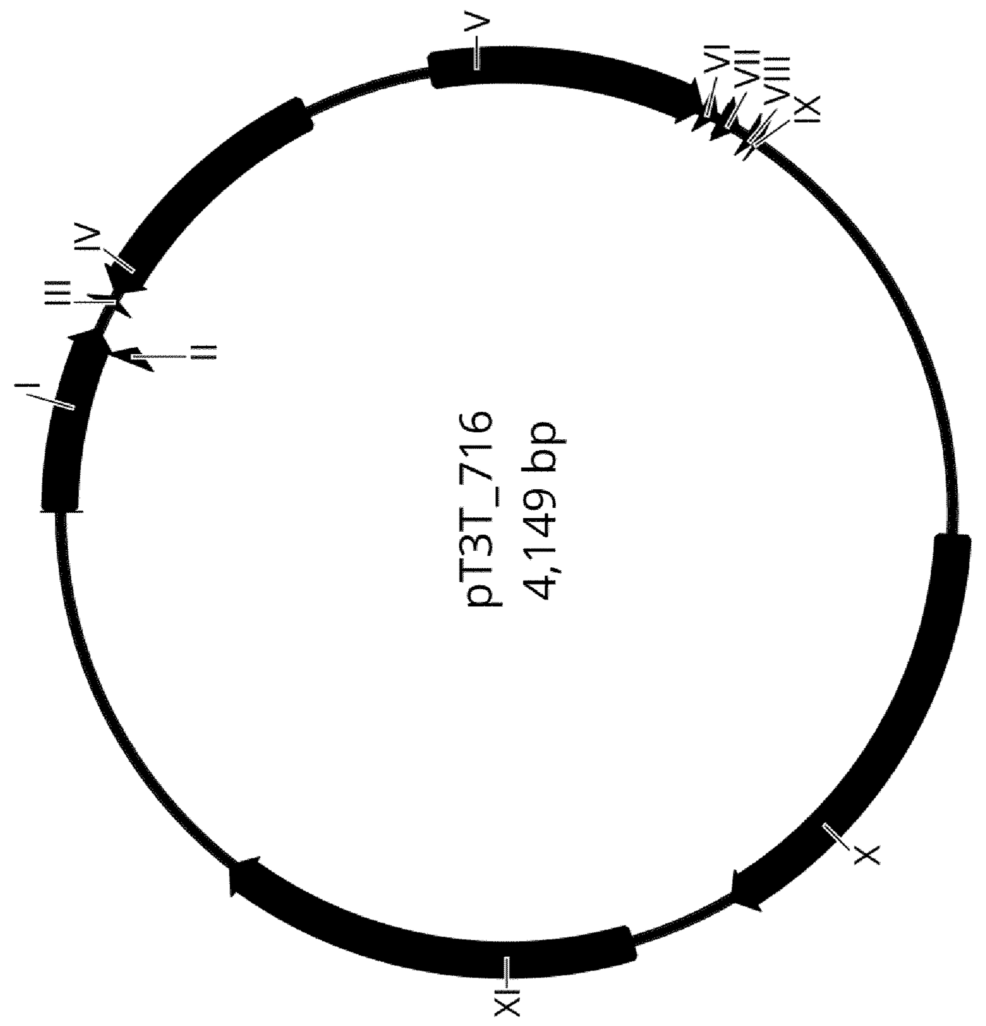

FIG. 5: Description of vector pT3P-716. Vector map of the high-copy number cloning plasmid pT3P-716 used to generate fusion constructs with $YopE_{1-138}$. The chaperone SycE and the $YopE_{1-138}$-fusion are under the native *Y. enterocolitica* promoter. I: araBAD promoter region (4 . . . 279), II: PBAD promoter (250 . . . 277), III: MCS I (317 . . . 331), IV: SycE (339 . . . 731), V: $YopE_{1-138}$ (924 . . . 1337), VI: MCS II (1338 . . . 1361), VII: c-Myc tag (1368 . . . 1397), VIII: 6His tag (1413 . . . 1430), IX: Stop codon (1431 . . . 1433), X: Chloramphenicol resistance (2110 . . . 2766), XI: ColE1 origin (2924 . . . 3552).

Figure 6:
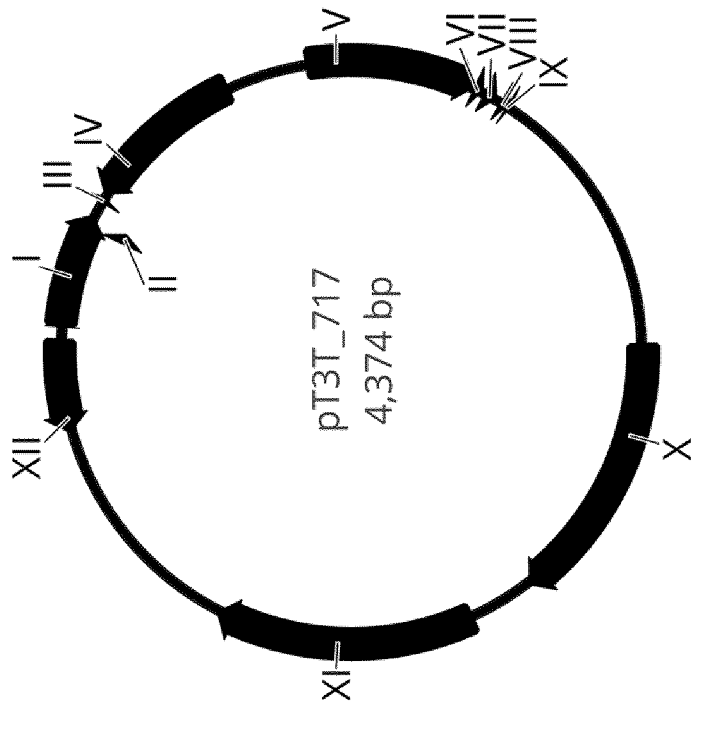

FIG. 6: Description of vector pT3P-717. Vector map of the low-copy number cloning plasmid pT3P-717 used to generate fusion constructs with $YopE_{1-138}$. The chaperone SycE and the $YopE_{1-138}$-fusion are under the native *Y. enterocolitica* promoter. I: araBAD promoter region (4 . . . 279), II: PBAD promoter (250 . . . 277), III: MCS I (317 . . . 331), IV: SycE (339 . . . 731), V: $YopE_{1-138}$ (924 . . . 1337), VI: MCS II (1338 . . . 1361), VII: c-Myc tag (1368 . . . 1397), VIII: 6His tag (1413 . . . 1430), IX: Stop codon (1431 . . . 1433), X: Chloramphenicol resistance (2110 . . . 2766), XI: pBR322 origin (2924 . . . 3552), XII: Rop (4124 . . . 4348).

Figure 7:
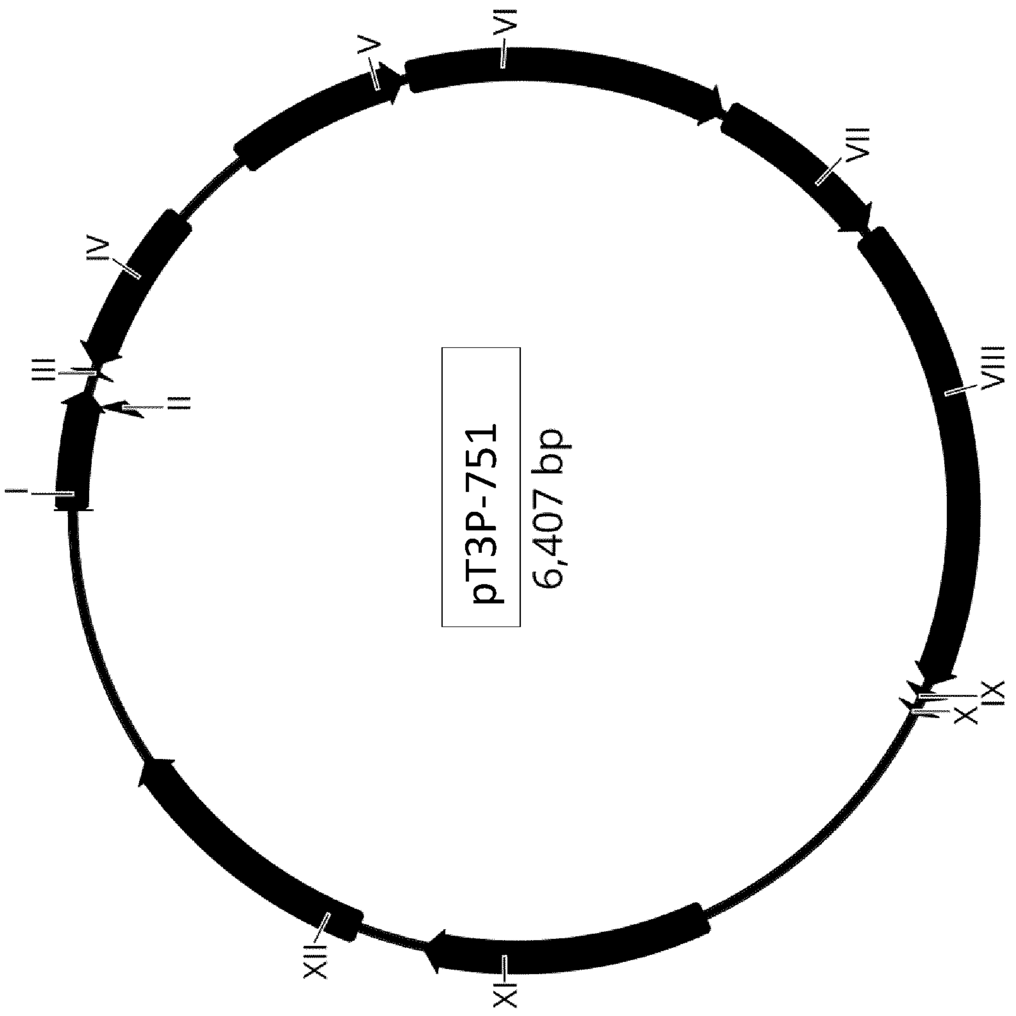

FIG. 7: Description of vector pT3P-751 encoding $YopE_{1-138}$-human $cGAS_{161-522}$ and $YopE_{1-138}$-human RIG-I $CARD_2$. Vector map of the medium-copy number vector pT3P-751 encoding $YopE_{1-138}$-human $cGAS_{161-522}$ and $YopE_{1-138}$-human RIG-I $CARD_2$ in one operon under control of the yopE promoter. I: araBAD promoter region (4 . . . 279), II: PBAD promoter (250 . . . 277), III: MCS I (317 . . . 331), IV: SycE (339 . . . 731), V: $YopE_{1-138}$ (924 . . . 1337), VI: human Rig1-$Card_2$ (1350 . . . 2087), VII: $YopE_{1-138}$ (codon altered) (2101 . . . 2514), VIII: human $cGas_{161-522}$ (2527 . . . 3614), IX: c-Myc tag (3626 . . . 3655), X:6His tag (3671 . . . 3688), XI: Chloramphenicol Resistance (4368 . . . 5024), XII: pBR322 origin (5182 . . . 5810).

Figure 8:
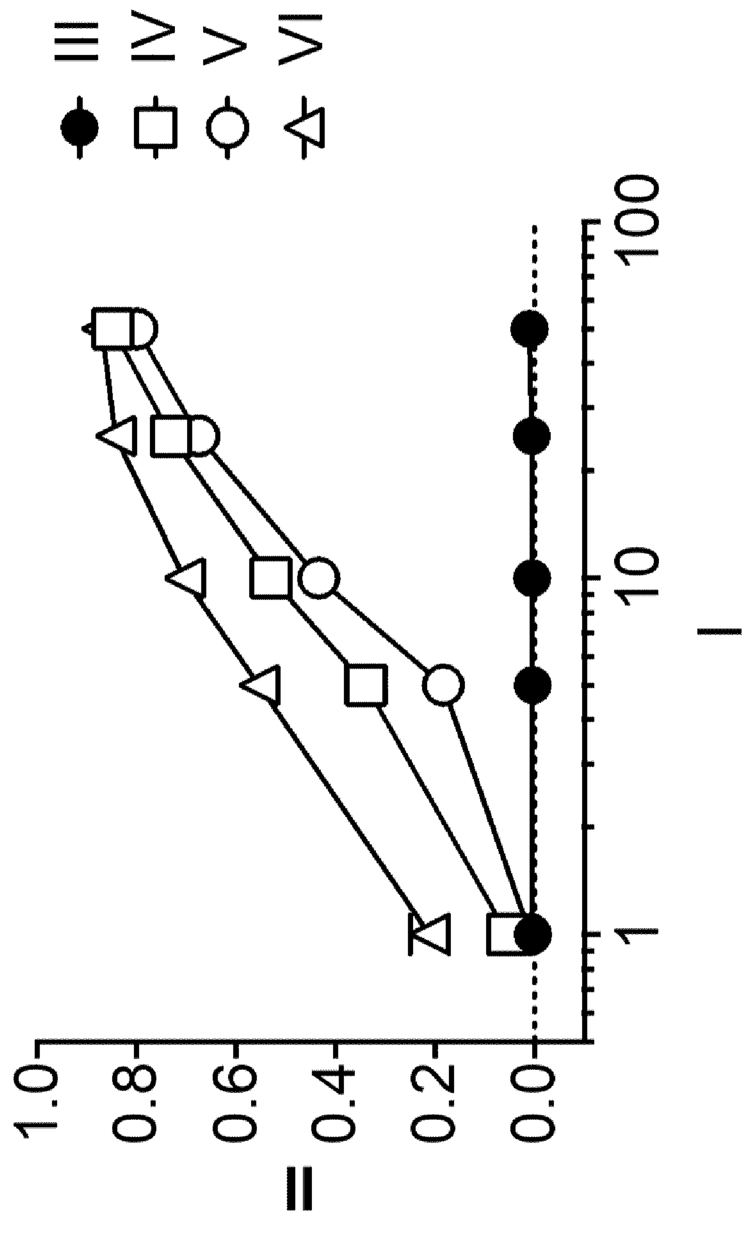

FIG. 8: Delivery of type I IFN inducing protein encoded on vector or on endogenous virulence plasmid. B16F1 IFN reporter cells were infected with *Y. enterocolitica* ΔyopHOPEMT, either a control strain not delivering a cargo (III), or encoding on the endogenous pYV plasmid IV: $YopE_{1-138}$-human RIG-I $CARD_2$ ($RIG\text{-}I_{1-245}$), V: $YopE_{1-138}$-human RIG-I $CARD_2$ and $YopE_{1-138}$-human $cGAS_{161-522}$ or on a medium copy number vector VI: $YopE_{1-138}$-human RIG-I $CARD_2$. A titration of the bacteria added to the cells was performed for each strain, indicated in I as Multiplicity of Infection (MOI). Type I IFN induction was measured as optical density at 650 nm (II).

Figure 9:
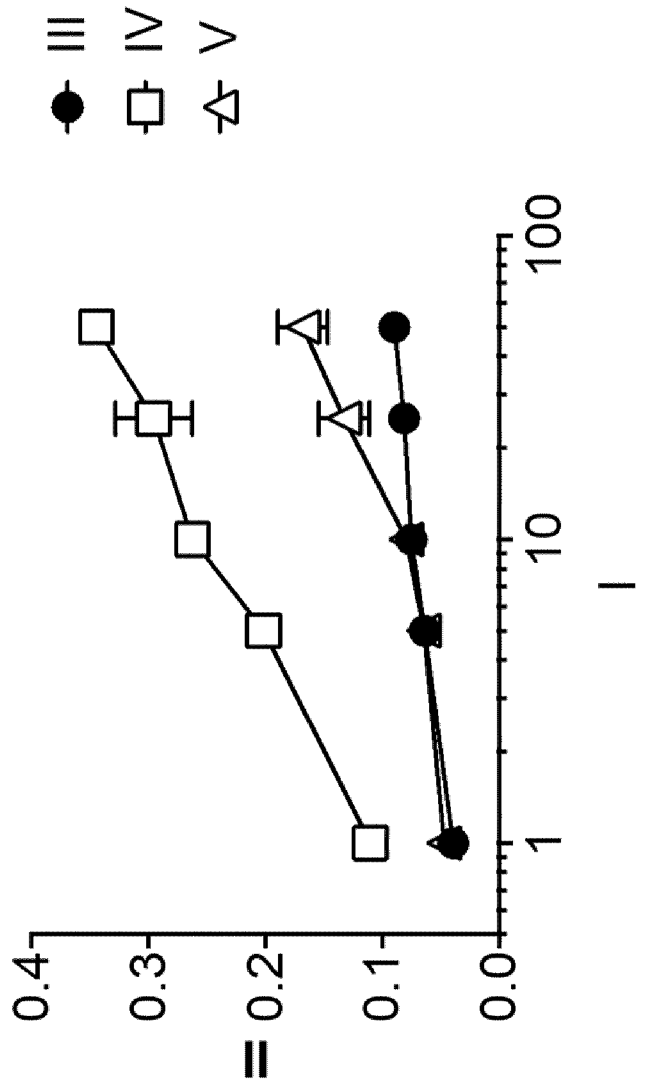

FIG. 9: Delivery of type I IFN inducing protein encoded on vector or on endogenous virulence plasmid. RAW macrophage IFN reporter cells were infected with *Y. enterocolitica* ΔyopHOPEMT, either a control strain not delivering a cargo (III), or encoding on a medium copy number vector $YopE_{1-138}$-human $cGAS_{161-522}$ (IV) or encoding on the endogenous pYV plasmid $YopE_{1-138}$-human $cGAS_{161-522}$ (V). A titration of the bacteria added to the cells was performed for each strain, indicated in I as Multiplicity of Infection (MOI). Type I IFN induction was measured as optical density at 650 nm (II).

Figure 10:
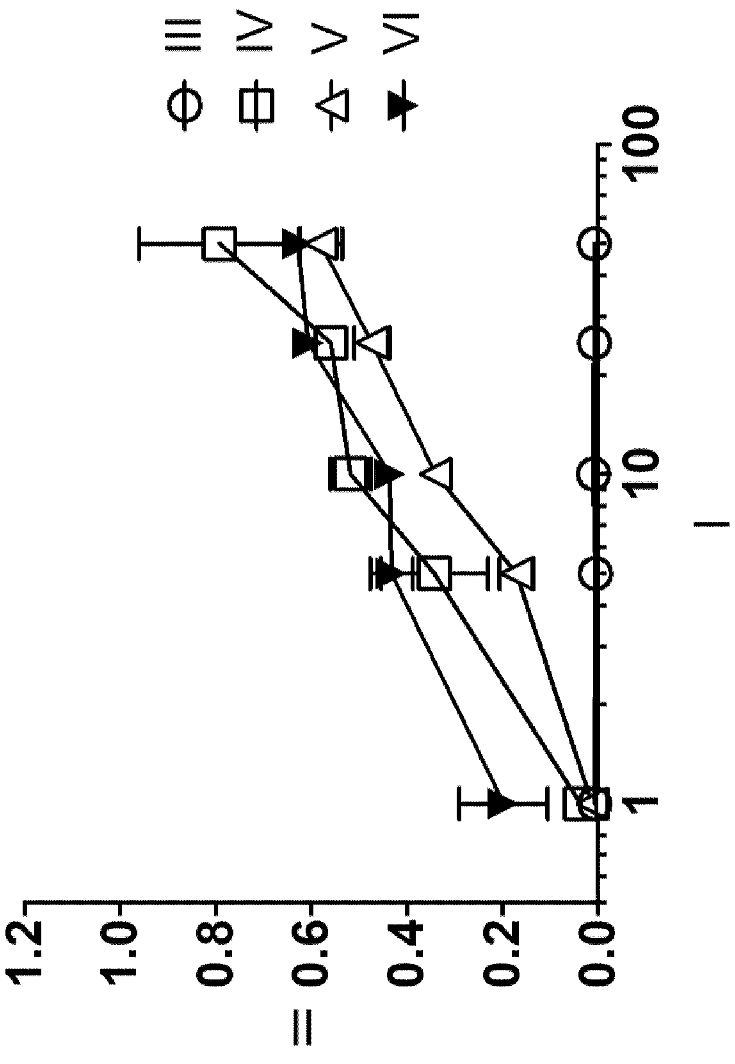

FIG. 10: Delivery of type I IFN inducing protein encoded on vector or on endogenous virulence plasmid. B16F1 melanocyte IFN reporter cells were infected with *Y. enterocolitica* ΔyopHOPEMT, either a control strain not delivering a cargo (III), or encoding on a medium copy number vector $YopE_{1-138}$-murine RIG-I $CARD_2$ ($RIG\text{-}I_{1-246}$) (IV) or encoding on the endogenous pYV plasmid $YopE_{1-138}$-murine RIG-I $CARD_2$ (V) or encoding both on a medium copy number vector and on the endogenous pYV plasmid $YopE_{1-138}$-murine RIG-I $CARD_2$ (VI). A titration of the bacteria added to the cells was performed for each strain, indicated in I as Multiplicity of Infection (MOI). Type I IFN induction was measured as optical density at 650 nm (II).

Figure 11:
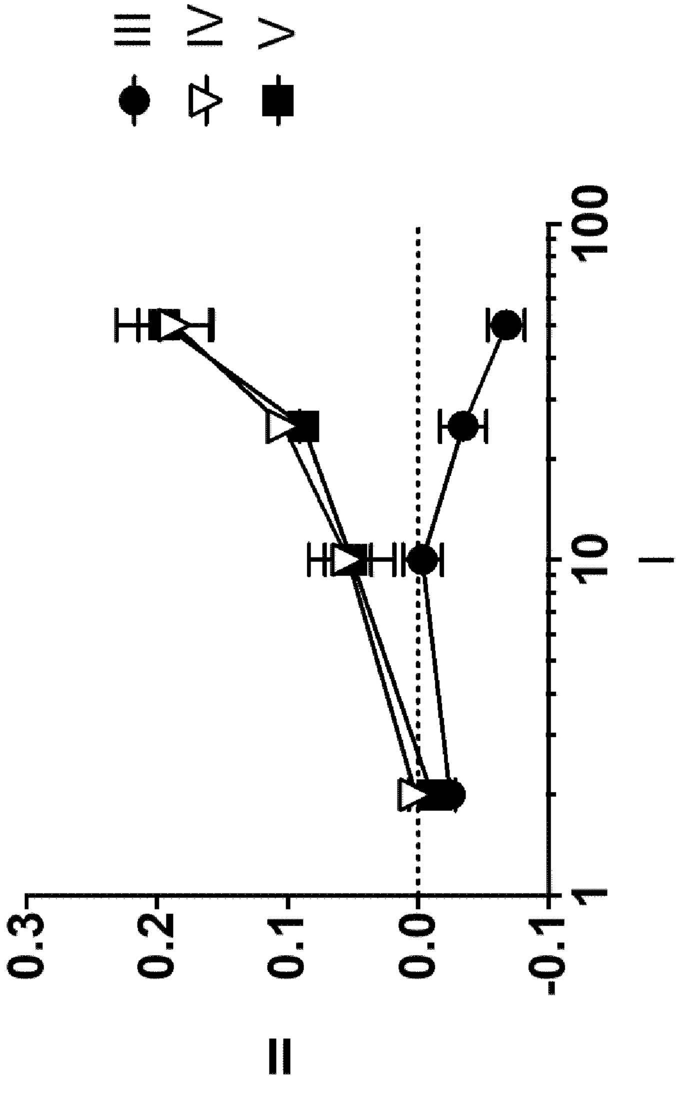

FIG. 11: Delivery of type I IFN inducing protein encoded on vector or on endogenous virulence plasmid. B16F1 melanocyte IFN reporter cells were infected with *Y. enterocolitica* ΔyopHOPEMT, either a control strain not delivering a cargo (III), or encoding on the endogenous pYV plasmid $YopE_{1-138}$-human $cGAS_{161-522}$ and human RIG-I $CARD_2$ ($RIG\text{-}I_{1-245}$) and additionally on a medium copy number vector $YopE_{1-138}$-human RIG-I $CARD_2$ (IV), or encoding both on the endogenous pYV plasmid and additionally on a medium copy number vector $YopE_{1-138}$-human $cGAS_{161-522}$ and human RIG-I $CARD_2$ (V). A titration of the bacteria added to the cells was performed for each strain, indicated in I as Multiplicity of Infection (MOI). Type I IFN induction was measured as optical density at 650 nm (II).

Figure 12:
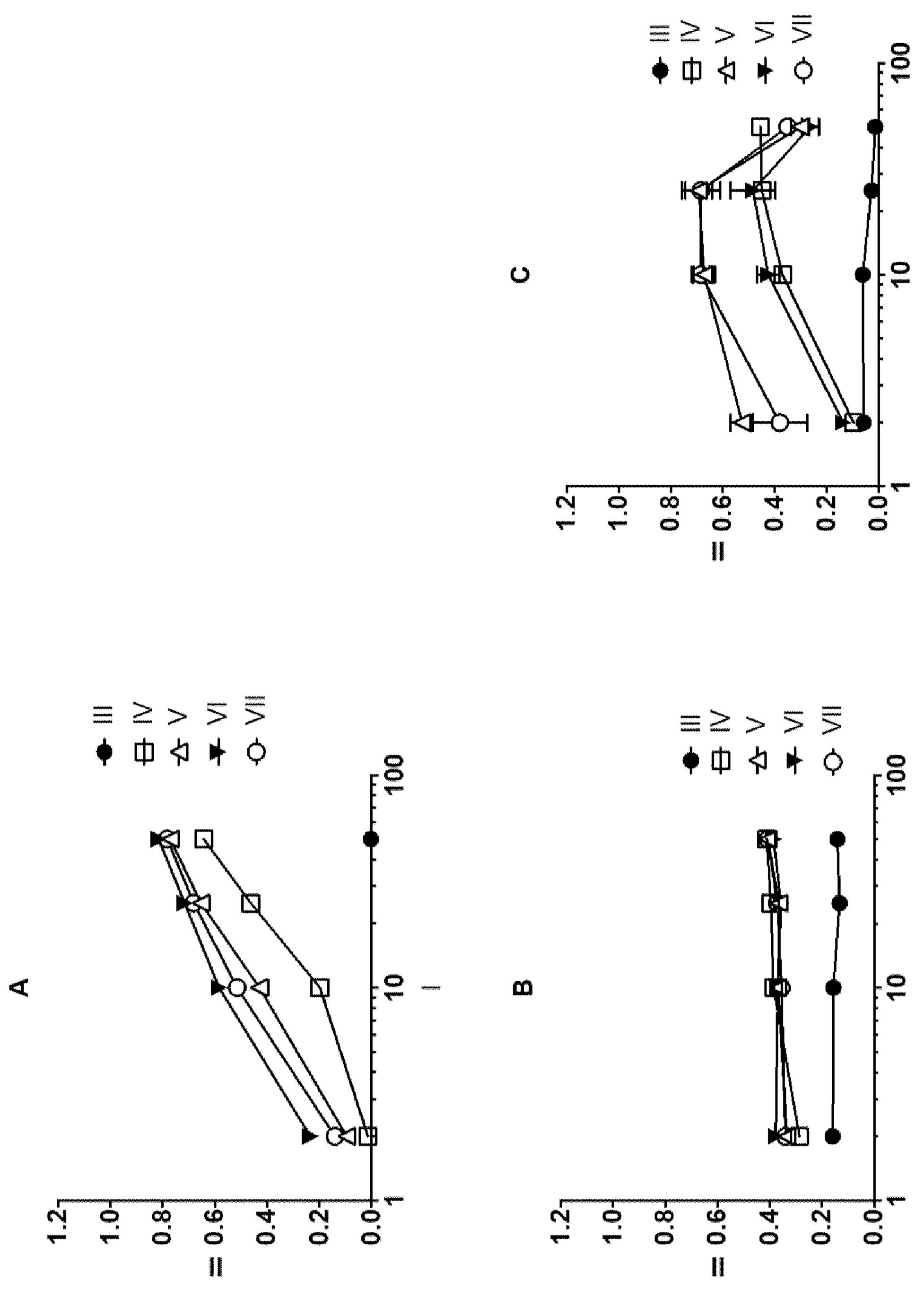

FIG. 12: Delivery of type I IFN inducing protein encoded on vector or on endogenous virulence plasmid. B16F1 melanocytes (A), RAW macrophages (B) or THP-1 macrophages (C) IFN reporter cells were infected with *Y. enterocolitica* ΔyopHOPEMT, either a control strain not delivering a cargo (III), or encoding on the endogenous pYV plasmid $YopE_{1-138}$-human $cGAS_{161-522}$ and human RIG-I $CARD_2$ ($RIG\text{-}I_{1-245}$) (IV) or encoding on the endogenous pYV plasmid $YopE_{1-138}$-human $cGAS_{161-522}$ and human RIG-I $CARD_2$ and additionally on a medium copy number vector $YopE_{1-138}$-human $cGAS_{161-522}$ (V), or encoding on the endogenous pYV plasmid $YopE_{1-138}$-human $cGAS_{161-522}$ and human RIG-I $CARD_2$ and additionally on a medium copy number vector $YopE_{1-138}$-human RIG-I $CARD_2$ (VI), or encoding both on the endogenous pYV plasmid and additionally on a vector $YopE_{1-138}$-human $cGAS_{161-522}$ and human RIG-I $CARD_2$ (VII). A titration of the bacteria added to the cells was performed for each strain, indicated in I as Multiplicity of Infection (MOI). Type I IFN induction was measured as optical density at 650 nm (II).

Figure 13:
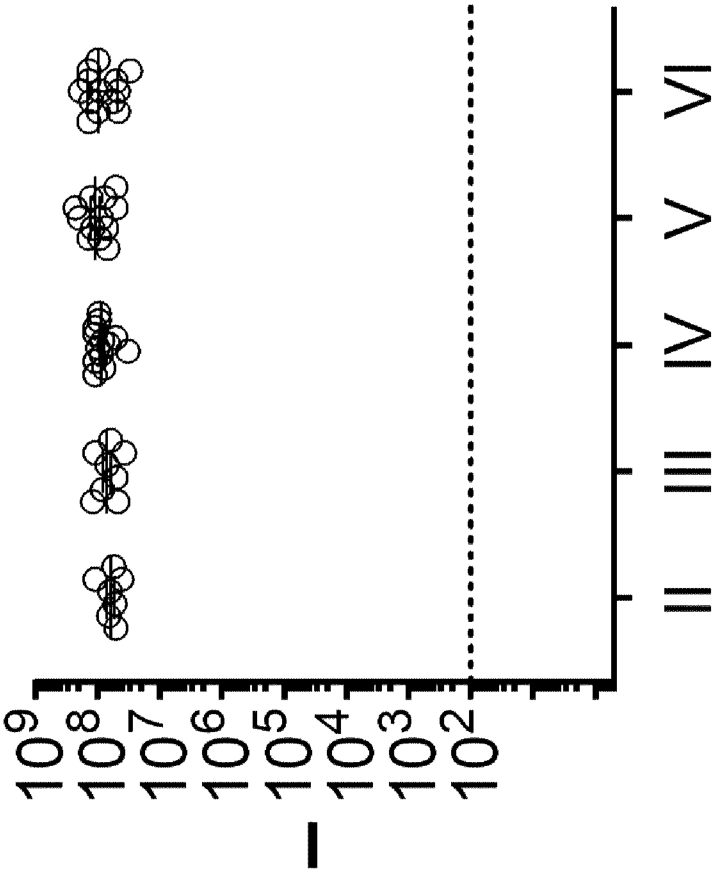

FIG. 13: Tumour colonization with strains coding for type I IFN inducing protein on vector or on endogenous virulence plasmid. Delivery of human $cGAS_{161-522}$ and RIG-I $CARD_2$ ($RIG\text{-}I_{1-245}$) and copy number of vector does not alter bacterial loads in solid tumors in the 4T1 breast cancer model. Mice bearing subcutaneous 4T1 breast tumours were iv injected with $5\times10^6$ CFU *Y. enterocolitica* ΔyopHOPEMT, either a control strain not delivering a cargo (II), or encoding on the endogenous pYV plasmid $YopE_{1-138}$-human $cGAS_{161-522}$ and human RIG-I $CARD_2$ (III) or encoding both on the endogenous pYV plasmid and on a medium copy number vector $YopE_{1-138}$-human $cGAS_{161-522}$ and human RIG-I $CARD_2$ (IV), or encoding both on the endogenous pYV plasmid and on a high copy number vector $YopE_{1-138}$-human $cGAS_{161-522}$ and human RIG-I $CARD_2$ (V), or encoding both on the endogenous pYV plasmid and on a low copy number vector $YopE_{1-138}$-human $cGAS_{161-522}$ and human RIG-I $CARD_2$ (VI). Bacterial load was determined as colony forming units CFU per gram of tumor (CFU/g) (I).

Figure 14:
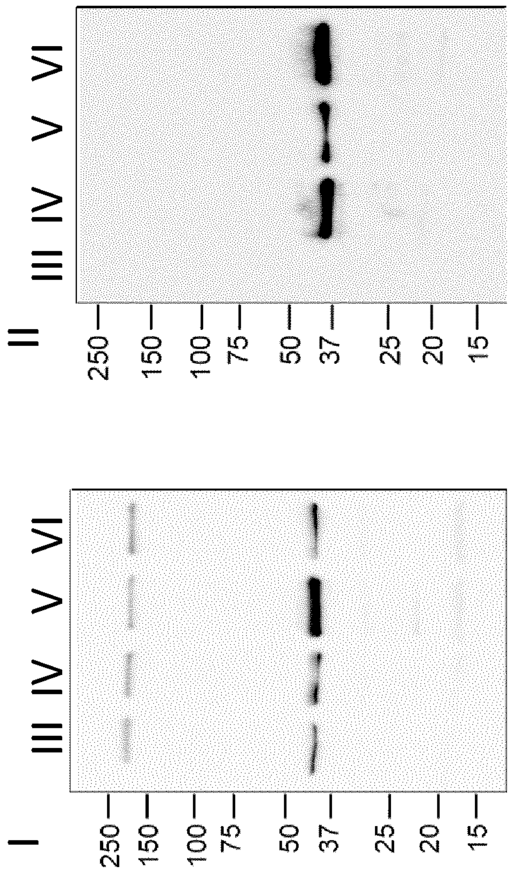

FIG. 14: Expression and secretion of type I IFN inducing proteins encoded on vector of low/medium/high copy number. Expression and secretion of human RIG-I $CARD_2$ ($RIG\text{-}I_{1\text{-}245}$) in relation to copy number of vector. Expression in bacteria (I) or secretion to supernatant (II) was assessed for *Y. enterocolitica* ΔyopHOPEMT, either a control strain not delivering a cargo (III), or encoding on a medium copy number vector $YopE_{1\text{-}138}$-human RIG-I $CARD_2$ (IV), or encoding on a high copy number vector $YopE_{1\text{-}138}$-human RIG-I $CARD_2$ (V), or encoding on a low copy number vector $YopE_{1\text{-}138}$-human RIG-I $CARD_2$ (VI).

Figure 15:
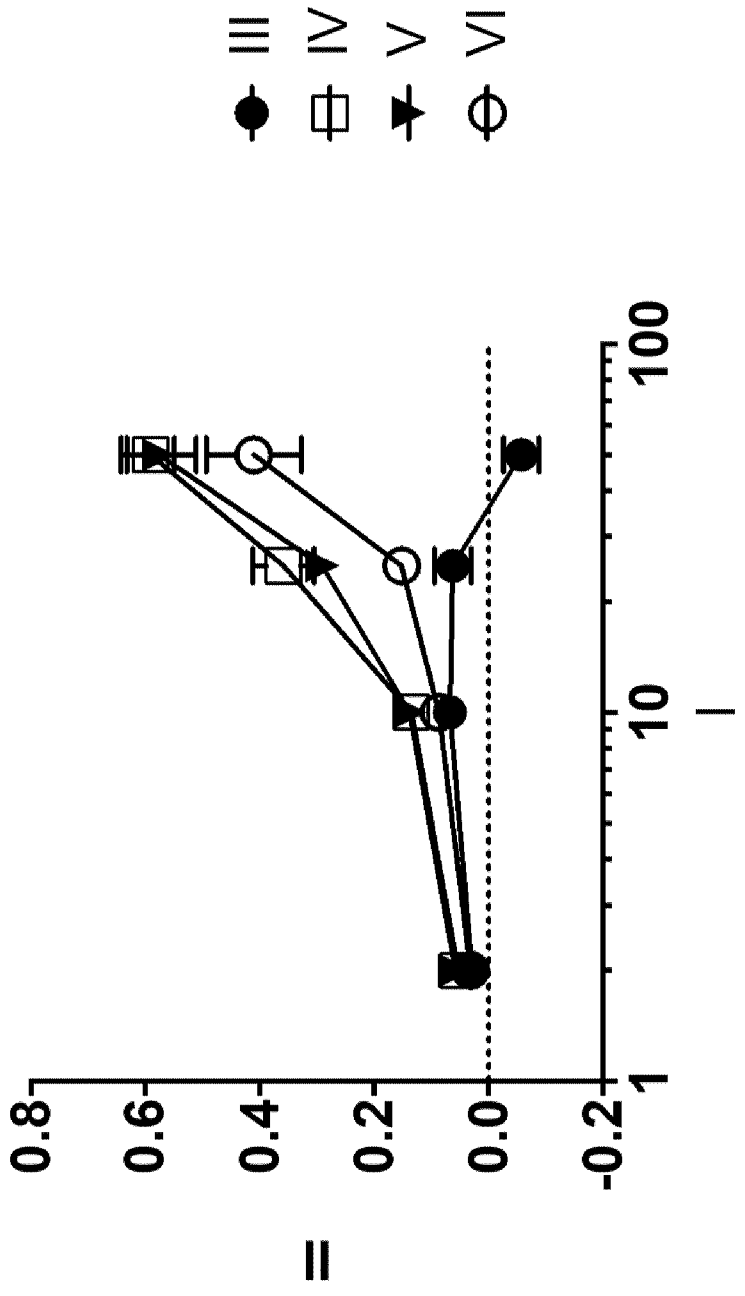

FIG. 15: Delivery of type I IFN inducing protein encoded on endogenous virulence and on vector of low/mid/high copy number. B16F1 IFN reporter cells were infected with *Y. enterocolitica* ΔyopHOPEMT, either a control strain not delivering a cargo (III), or encoding on the endogenous pYV plasmid $YopE_{1\text{-}138}$-human $cGAS_{161\text{-}522}$ and human RIG-I $CARD_2$ ($RIG\text{-}I_{1\text{-}245}$) and additionally on a medium (IV), high (V) or low (VI) copy number vector $YopE_{1\text{-}138}$-human RIG-I $CARD_2$. A titration of the bacteria added to the cells was performed for each strain, indicated in I as Multiplicity of Infection (MOI). Type I IFN induction was measured as optical density at 650 nm (II).

Figure 16:
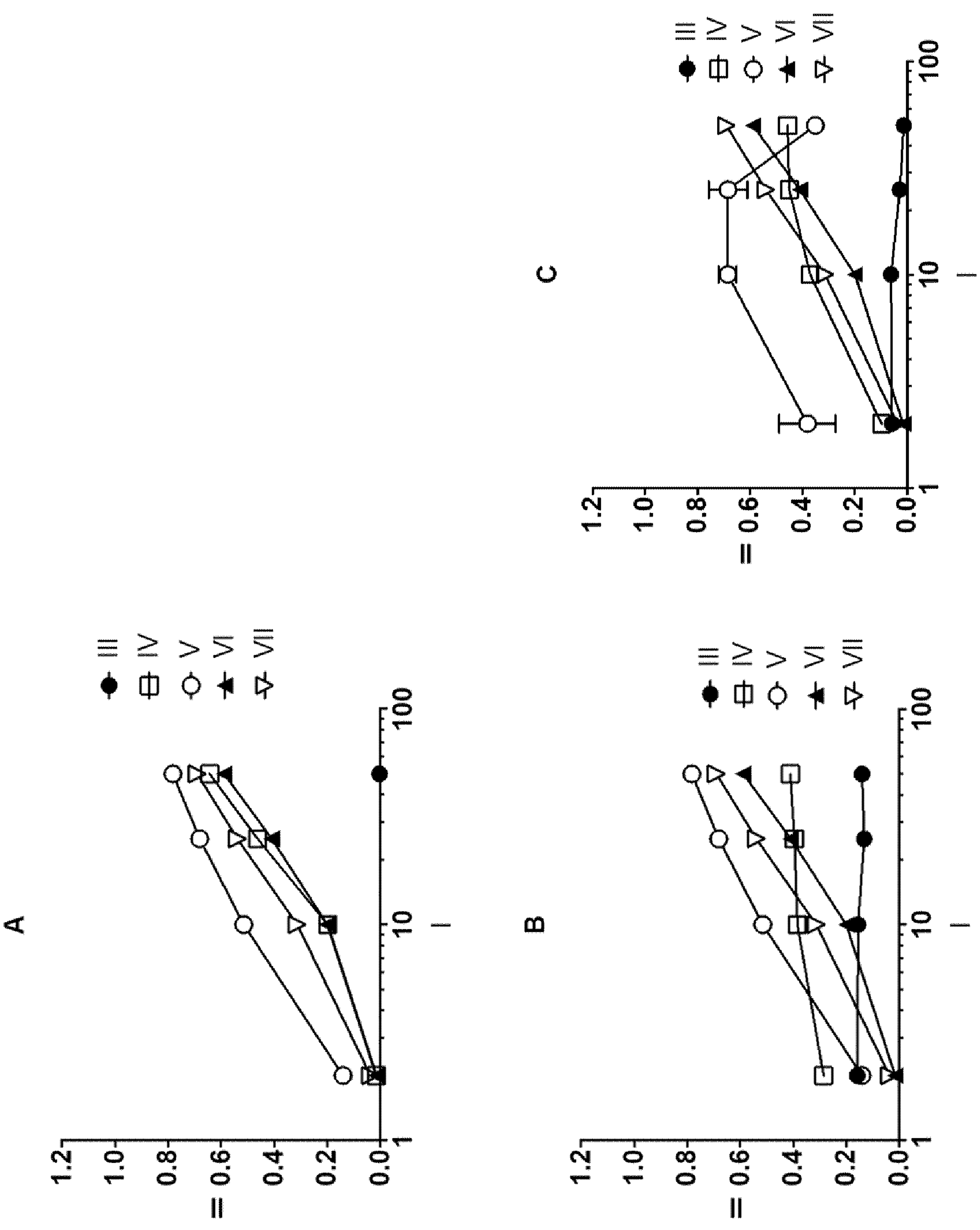

FIG. 16: Delivery of type I IFN inducing protein encoded on endogenous virulence plasmid and on vector of low/mid/high copy number. B16F1 melanocytes (A), RAW macrophages (B) or THP-1 macrophages (C) IFN reporter cells were infected with *Y. enterocolitica* ΔyopHOPEMT, either a control strain not delivering a cargo (III), or encoding on the endogenous pYV plasmid $YopE_{1\text{-}138}$-human $cGAS_{161\text{-}522}$ and human RIG-I $CARD_2$ ($RIG\text{-}I_{1\text{-}245}$) (IV) or encoding on the endogenous pYV plasmid $YopE_{1\text{-}138}$-human $cGAS_{161\text{-}522}$ and human RIG-I $CARD_2$ and additionally on a medium (V), high (VI) or low (VII) copy number vector $YopE_{1\text{-}138}$-human $cGAS_{161\text{-}522}$ and RIG-I $CARD_2$. A titration of the bacteria added to the cells was performed for each strain, indicated in I as Multiplicity of Infection (MOI). Type I IFN induction was measured as optical density at 650 nm (II).

Figure 17:
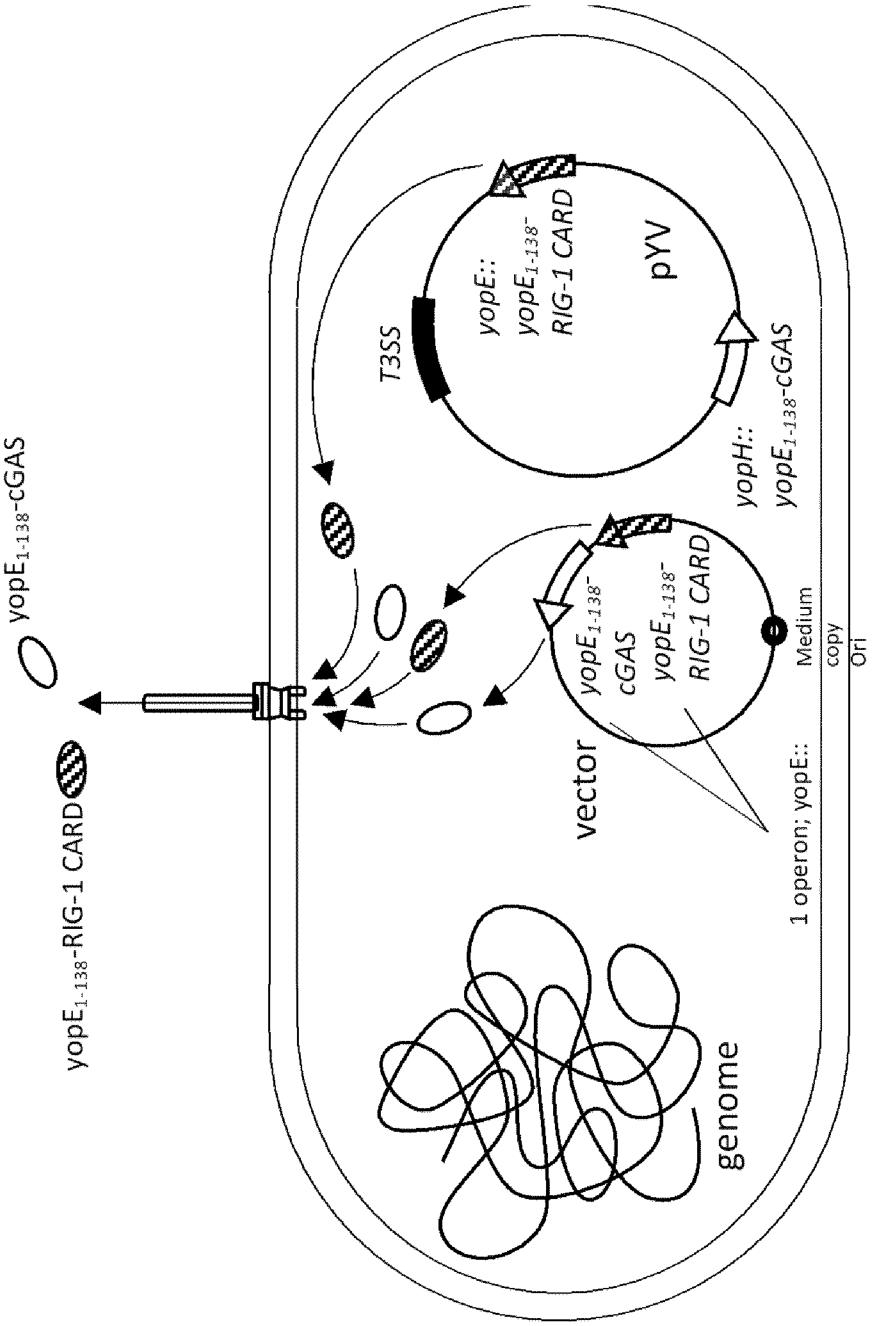

FIG. 17: Strain for optimal delivery of type I IFN inducing protein encoded on endogenous virulence and on vector. Delivery of $YopE_{1\text{-}138}$-human $cGAS_{161\text{-}522}$ and $YopE_{1\text{-}138}$-RIG-I $CARD_2$ ($RIG\text{-}I_{1\text{-}245}$) encoded on the endogenous pYV plasmid on the endogenous sites of yopH and yopE, respectively, and additionally on a medium copy number vector, whereon $YopE_{1\text{-}138}$-human $cGAS_{161\text{-}522}$ and $YopE_{1\text{-}138}$-RIG-I $CARD_2$ are encoded in one operon under control of the yopE promoter.

Figure 18:
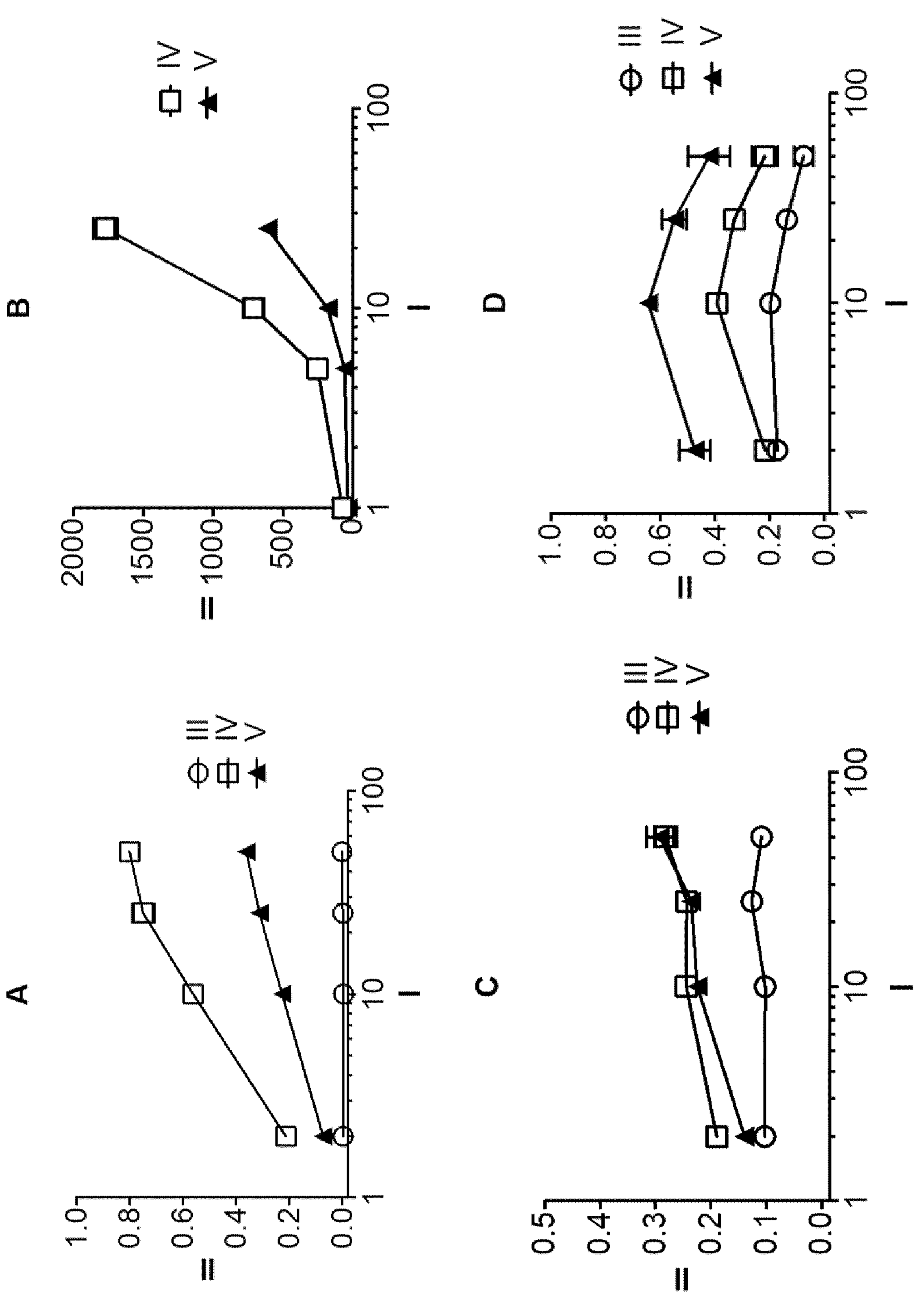

FIG. 18: Delivery of type I IFN inducing proteins cGAS and RIG-I $CARD_2$ and its effect on different cell types. Delivery of human $cGAS_{161\text{-}522}$ and RIG-I $CARD_2$ ($RIG\text{-}I_{1\text{-}245}$) leads to differential induction of type I IFN signalling in B16F1 melanocytes (A), human glioblastoma LN-229 (B), murine RAW macrophage (C) or human THP-1 macrophages (D). B16F1, RAW or THP-1 IFN reporter cells and human LN-229 glioblastoma cells were infected with *Y. enterocolitica* ΔyopHOPEMT, either a control strain not delivering a cargo (III), or encoding on a medium copy number vector $YopE_{1\text{-}138}$-murine RIG-I $CARD_2$ (IV) or encoding on a medium copy number vector $YopE_{1\text{-}138}$-human $cGAS_{161\text{-}522}$ (V). A titration of the bacteria added to the cells was performed for each strain, indicated in I as Multiplicity of Infection (MOI). Type I IFN induction was measured as optical density at 650 nm (II) in A, C and D, and by ELISA on IFNb for B indicate as pg/ml.

Figure 19:
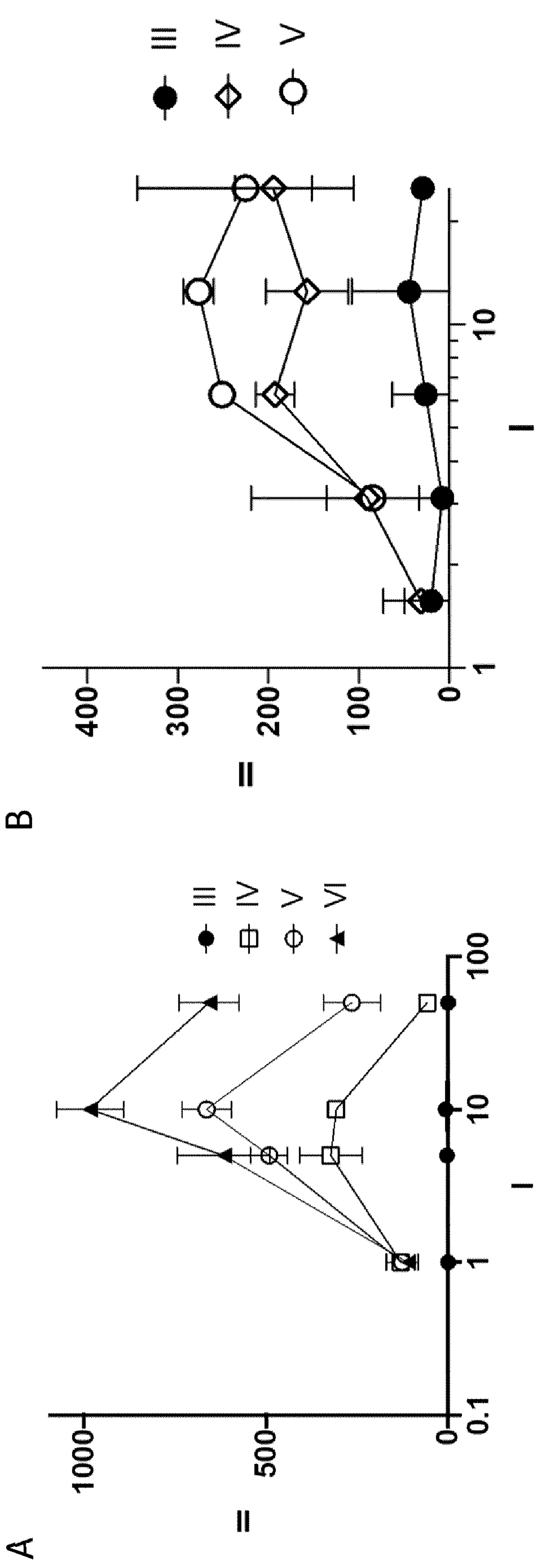

FIG. 19: Delivery of type I IFN inducing proteins encoded on endogenous virulence plasmid and on a vector of medium copy number. Delivery of human $cGAS_{161\text{-}522}$ and RIG-I $CARD_2$ ($RIG\text{-}I_{1\text{-}245}$) leads to differential induction of type I IFN signalling in A20 B-cell lymphoma (A) or Jurkat T lymphocytic (B) cells. A) Murine A20 lymphoma cells were infected with *Y. enterocolitica* ΔyopHOPEMT, either a control strain not delivering a cargo (III), or encoding on a medium copy number vector $YopE_{1\text{-}138}$-murine RIG-I $CARD_2$ (IV), or encoding on a medium copy number vector $YopE_{1\text{-}138}$-murine RIG-I $CARD_2$ and $YopE_{1\text{-}138}$-human $cGAS_{161\text{-}522}$ (V), or encoding on the pYV and a medium copy number vector $YopE_{1\text{-}138}$-murine RIG-I $CARD_2$ and $YopE_{1\text{-}138}$-human $cGAS_{161\text{-}522}$ (VI). B) Human Jurkat T cells were infected with *Y. enterocolitica* ΔyopHOPEMT, either a control strain not delivering a cargo (III), or encoding on a medium-copy number vector $YopE_{1\text{-}138}$-human RIG-I $CARD_2$ and $YopE_{1\text{-}138}$-human $cGAS_{161\text{-}522}$ (IV), or encoding on the pYV and a medium-copy number vector $YopE_{1\text{-}138}$-human RIG-I $CARD_2$ and $YopE_{1\text{-}138}$-human $cGAS_{161\text{-}522}$ (V). A titration of the bacteria added to the cells was performed for each strain, indicated in I as Multiplicity of Infection (MOI). Type I IFN induction was measured by ELISA on IFNb for B indicate as pg/ml (II).

Figure 20:
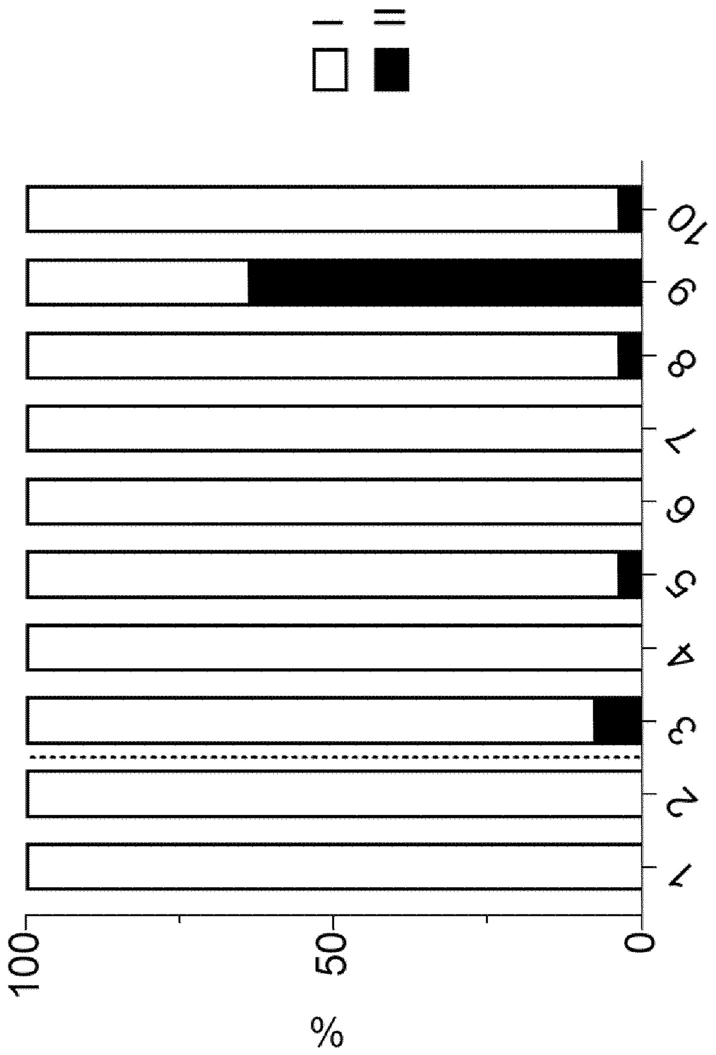

FIG. 20: Genetic stability of tumour colonizing bacterial strains coding for type I IFN inducing protein on endogenous virulence plasmid. Encoding of human $cGAS_{161\text{-}522}$ and RIG-I $CARD_2$ ($RIG\text{-}I_{1\text{-}245}$) is genetically stable when encoding on endogenous pYV virulence plasmid in vivo in the B16F10 melanoma model. Mice bearing subcutaneous B16F10 tumours were iv injected with $1\times10^6$ CFU *Y. enterocolitica* ΔyopHOPEMT encoding on the endogenous pYV plasmid $YopE_{1\text{-}138}$-human $cGAS_{161\text{-}522}$ and human RIG-I $CARD_2$. Bacteria were isolated on day 2 after administration (animals 1 and 2) or day 4 after administration (animals 3-10), and replica picked on selective medium to assess presence in % of pYV plasmid (I), or absence of pYV plasmid (II).

Figure 21:
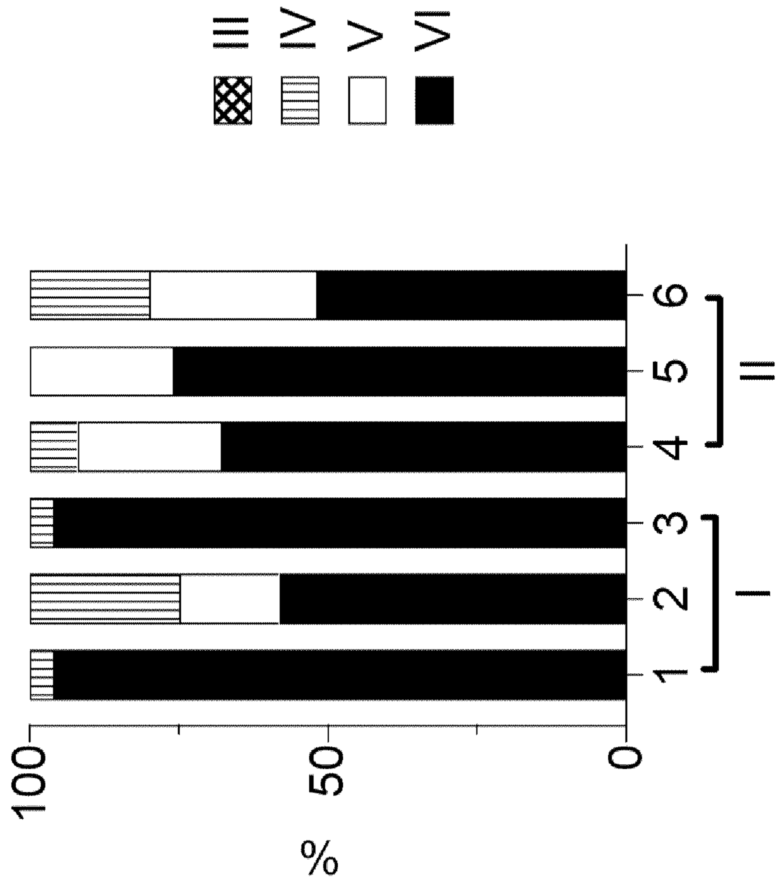

FIG. 21: Genetic stability of tumour colonizing bacterial strains coding for type I IFN inducing protein on vector and on endogenous virulence plasmid. It seems that encoding of human $cGAS_{161\text{-}522}$ and RIG-I $CARD_2$ ($RIG\text{-}I_{1\text{-}245}$) on medium copy number vector and endogenous virulence plasmid is genetically more stable than encoding on endogenous pYV virulence plasmid or vector alone in vivo in the EMT-6 breast cancer model. Mice bearing subcutaneous EMT-6 tumours were i.t. injected with $7.5\times10^7$ CFU *Y. enterocolitica* ΔyopHOPEMT encoding both on the endogenous pYV plasmid and on a medium copy number vector $YopE_{1\text{-}138}$-human $cGAS_{161\text{-}522}$ and human RIG-I $CARD_2$. Bacteria were isolated on day 1 after administration (animals 1 and 2) or day 2 after administration (animals 4-6), and replica picked on selective medium to assess presence in % of both pYV plasmid and medium copy vector (VI), presence of pYV plasmid only (V), presence of medium copy number vector only (IV) or absence of both pYV plasmid and medium copy vector (III).

Figure 22:
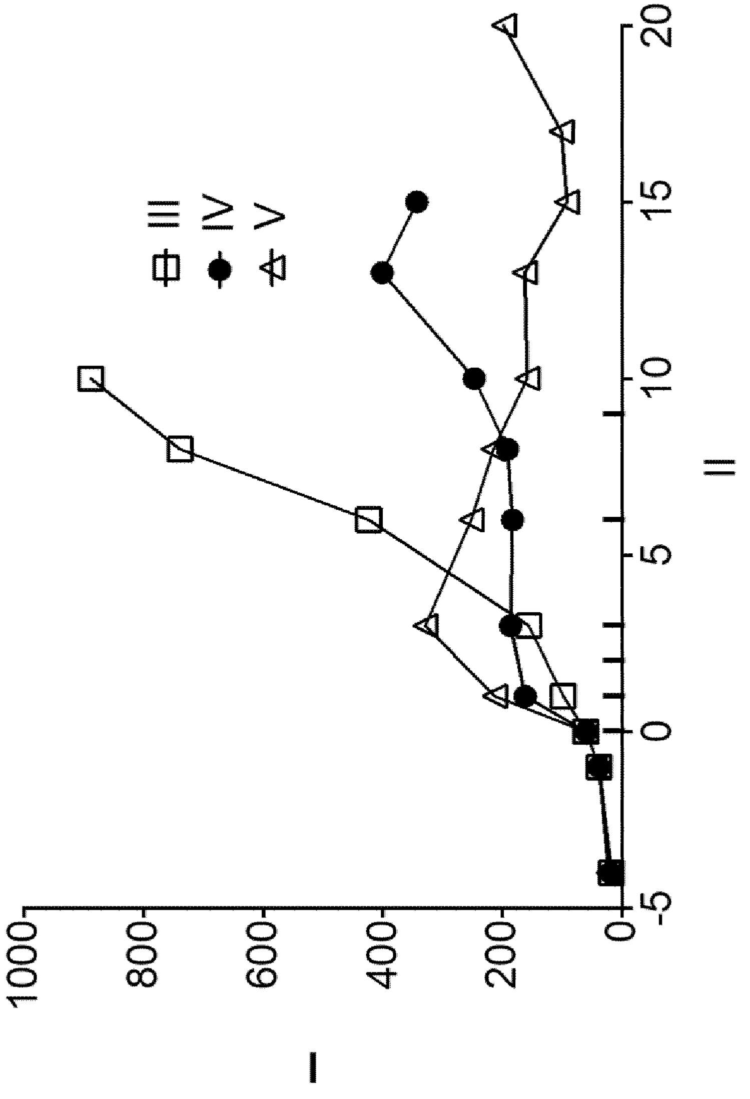

FIG. 22: Tumor progression in wildtype C57BL/6 mice allografted s.c. with B16F10 melanoma cells. Wildtype C57BL/6 mice allografted s.c. with B16F10 melanoma cells were intratumorally injected with III: PBS, or $7.5*10^7$ CFU of IV: *Y. enterocolitica* dHOPEMT, or V: *Y. enterocolitica* dHOPEMT encoding $YopE_{1\text{-}138}$-human $cGAS_{161\text{-}522}$ and $YopE_{1\text{-}138}$-human RIG-I $CARD_2$ ($RIG\text{-}I_{1\text{-}245}$), while both proteins are encoded on the endogenous pYV plasmid (on the endogenous sites of yopH and yopE, respectively), and additionally on a medium copy number vector (whereon $YopE_{1\text{-}138}$-human $cGAS_{161\text{-}522}$ and $YopE_{1\text{-}138}$-RIG-I $CARD_2$ are encoded in one operon under control of the yopE promoter). Intratumoral injection started once the tumor had reached a size of 61 (+/−22) mm3. The day of the first intratumoral injection of bacteria was defined as day 0, treatments were performed on d0, d1, d2, d3, d6 and d9. Tumor volume was measured over the following days (II: days) with calipers. The mean tumor volume is indicated (I) as $mm^3$.

Figure 23:
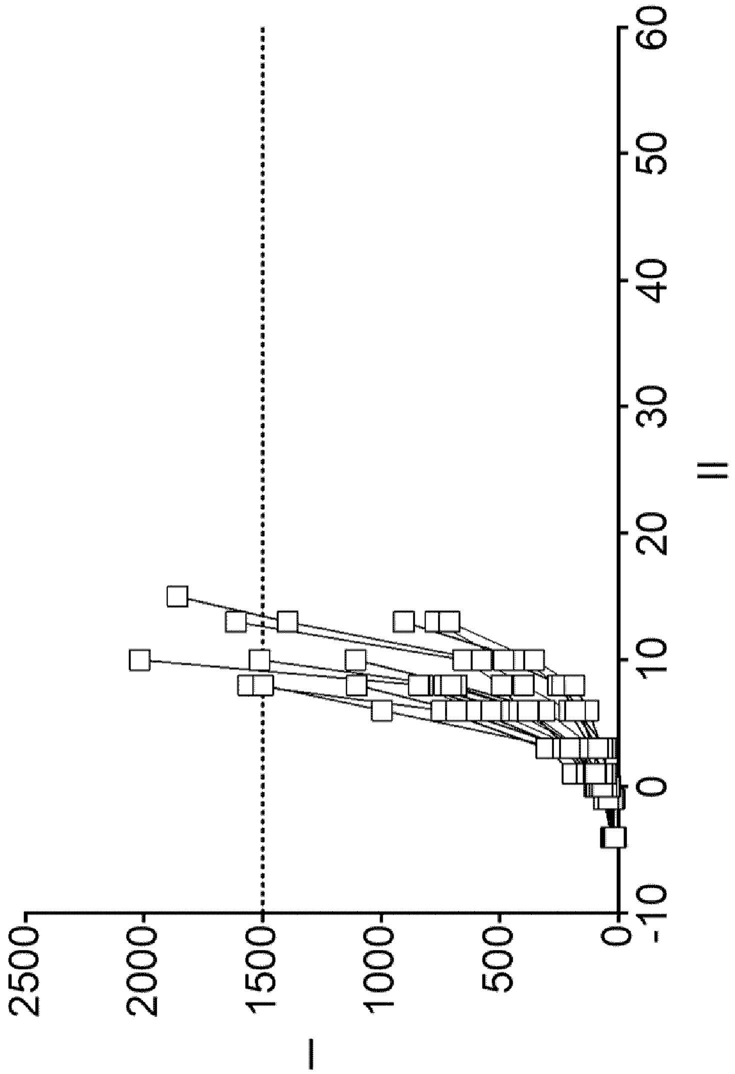

FIG. 23: Tumor progression in wildtype C57BL/6 mice allografted s.c. with B16F10 melanoma cells. Wildtype C57BL/6 mice allografted s.c. with B16F10 melanoma cells were intratumorally injected with PBS. Intratumoral injection started once the tumor had reached a size of 61 (+/−22) mm3. The day of the first intratumoral injection was defined as day 0, treatments were performed on d0, d1, d2, d3, d6 and d9. Tumor volume was measured over the following days (II: days) with calipers. The tumor volume of individual animals (n=15) is indicated (I) as $mm^3$.

Figure 24:
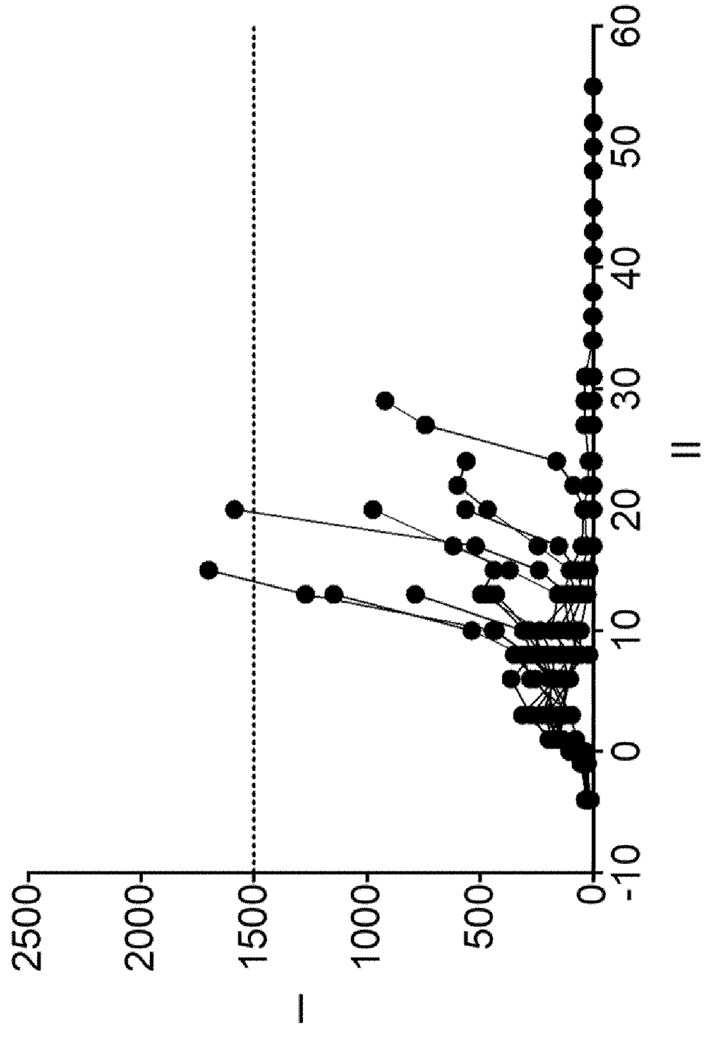

FIG. 24: Tumor progression in wildtype C57BL/6 mice allografted s.c. with B16F10 melanoma cells. Wildtype C57BL/6 mice allografted s.c. with B16F10 melanoma cells were intratumorally injected with $7.5*10^7$ CFU of *Y. enterocolitica* dHOPEMT. Intratumoral injection started once the tumor had reached a size of 61 (+/−22) mm3. The day of the first intratumoral injection was defined as day 0, treatments were performed on d0, d1, d2, d3, d6 and d9. Tumor volume was measured over the following days (II: days) with calipers. The tumor volume of individual animals (n=15) is indicated (I) as $mm^3$.

Figure 25:
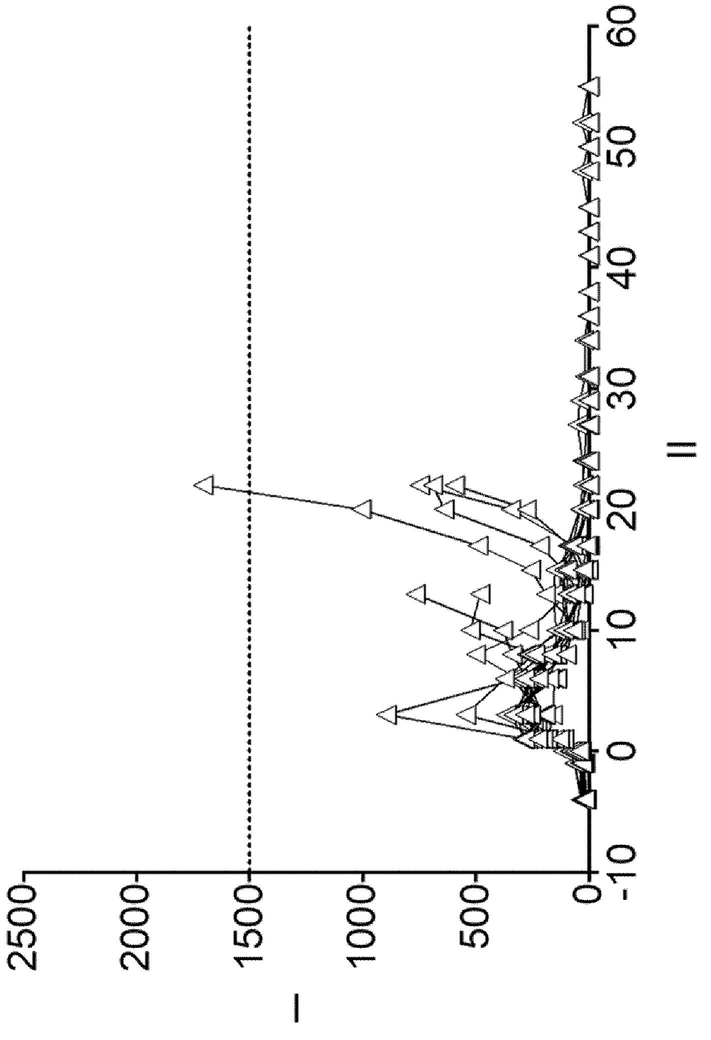

FIG. 25: Tumor progression in wildtype C57BL/6 mice allografted s.c. with B16F10 melanoma cells. Wildtype C57BL/6 mice allografted s.c. with B16F10 melanoma cells were intratumorally injected with $7.5*10^7$ CFU of *Y. enterocolitica* dHOPEMT encoding $YopE_{1-138}$-human $cGAS_{161-522}$ and $YopE_{1-137}$-human RIG-I $CARD_2$ ($RIG\text{-}I_{1-245}$), while both proteins are encoded on the endogenous pYV plasmid (on the endogenous sites of yopH and yopE, respectively), and additionally on a medium copy number vector (whereon $YopE_{1-138}$-human $cGAS_{161-522}$ and $YopE_{1-138}$-RIG-I $CARD_2$ are encoded in one operon under control of the yopE promoter). Intratumoral injection started once the tumor had reached a size of 61 (+/−22) mm3. The day of the first intratumoral injection was defined as day 0, treatments were performed on d0, d1, d2, d3, d6 and d9. Tumor volume was measured over the following days (II: days) with calipers. The tumor volume of individual animals (n=15) is indicated (I) as $mm^3$.

Figure 26:
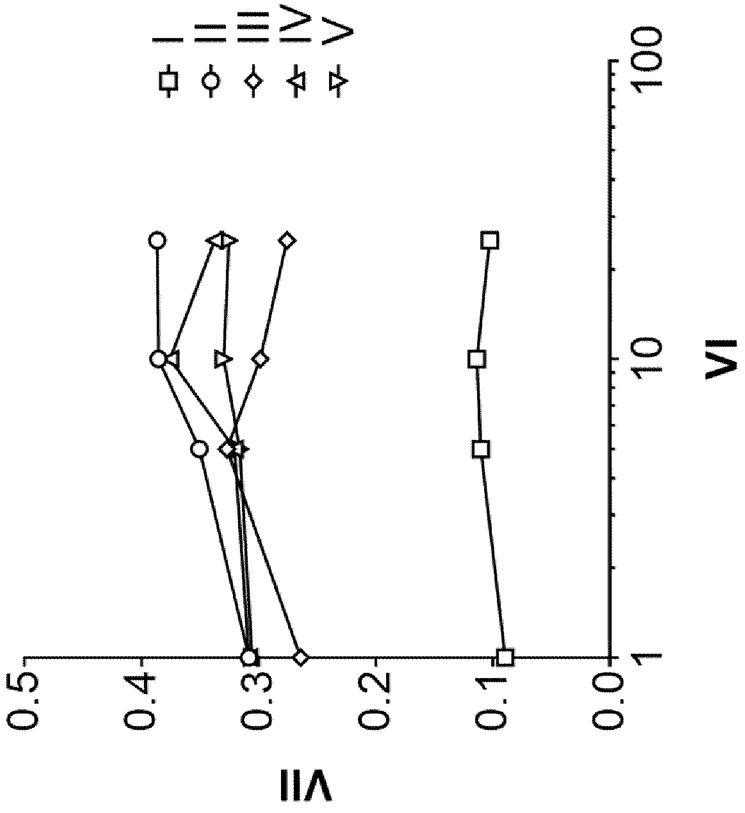

FIG. 26: Delivery of type I Interferon response inducing proteins via the bacterial T3SS-RIG1. Delivery of human and murine RIG1 CARD domain variants lead to type I IFN induction in a RAW IFN-reporter cell line. RAW reporter cells were infected with I: *Y. enterocolitica* ΔHOPEMT, or *Y. enterocolitica* ΔHOPEMT encoding on a pBad_Si2 derived plasmid II: $YopE_{1-138}$-human RIG1 CARD $domains_{1-245}$, III: $YopE_{1-138}$-murine RIG1 CARD $domains_{1-246}$, IV: $YopE_{1-138}$-murine RIG1 CARD $domains_{1-229}$, V: $YopE_{1-138}$-murine RIG1 CARD $domains_{1-218}$. A titration of the bacteria added to the cells (VI: indicated as MOI) was performed for each strain, and IFN stimulation was assessed based on activity of secreted alkaline phosphatase (VII: OD650) which is under the control of the I-ISG54 promoter which is comprised of the IFN-inducible ISG54 promoter enhanced by a multimeric ISRE.

FIG. 27 A-E: list of strains as used in this application.

DETAILED DESCRIPTION OF THE INVENTION

The present invention relates to recombinant Gram-negative bacterial strains and its use in a method of treating cancer e.g. a malignant solid tumor in a subject.

For the purposes of interpreting this specification, the following definitions will apply and whenever appropriate, terms used in the singular will also include the plural and vice versa. It is to be understood that the terminology used herein is for the purpose of describing particular embodiments only and is not intended to be limiting.

The term "Gram-negative bacterial strain" as used herein includes the following bacteria: *Aeromonas salmonicida, Aeromonas hydrophila, Aeromonas veronii, Anaeromyxobacter dehalogenans, Bordetella bronchiseptica, Bordetella parapertussis, Bordetella pertussis, Bradyrhizobium japonicum, Burkholderia cenocepacia, Burkholderia cepacia, Burkholderia mallei, Burkholderia pseudomallei, Chlamydia muridarum, Chlamydia trachmoatis, Chlamydophila abortus, Chlamydophila pneumoniae, Chromobacterium violaceum, Citrobacter rodentium, Desulfovibrio vulgaris, Edwardsiella tarda, Endozoicomonas elysicola, Erwinia amylovora, Escherichia albertii, Escherichia coli, Lawsonia intracellularis, Mesorhizobium loti, Myxococcus xanthus, Pantoea agglomerans, Photobacterium damselae, Photorhabdus luminescens, Photorabdus temperate, Pseudoalteromonas spongiae, Pseudomonas aeruginosa, Pseudomonas plecoglossicida, Pseudomonas syringae, Ralstonia solanacearum, Rhizobium* sp, *Salmonella enterica* and other *Salmonella* sp, *Shigella flexneri* and other *Shigella* sp, *Sodalis glossinidius, Vibrio alginolyticus, Vibrio azureus, Vibrio campellii, Vibrio caribbenthicus, Vibrio harvey, Vibrio parahaemolyticus, Vibrio tasmaniensis, Vibrio tubiashii, Xanthomonas axonopodis, Xanthomonas campestris, Xanthomonas oryzae, Yersinia enterocolitica, Yersinia pestis, Yersinia pseudotuberculosis*. Preferred Gram-negative bacterial strains of the invention are Gram-negative bacterial strains comprised by the family of Enterobacteriaceae and Pseudomonadaceae. The Gram-negative bacterial strain of the present invention is normally used for delivery of heterologous proteins by the bacterial T3 SS into eukaryotic cells in vitro and/or in vivo, preferably in vivo.

The term "recombinant Gram-negative bacterial strain" as used herein refers to a recombinant Gram-negative bacterial strain genetically transformed with a polynucleotide construct like a vector. Virulence of such a recombinant Gram-negative bacterial strain is usually attenuated by deletion of bacterial effector proteins having virulence activity which are transported by one or more bacterial proteins, which are part of a secretion system machinery. Such effector proteins are delivered by a secretion system machinery into a host cells where they exert their virulence activity toward various host proteins and cellular machineries. Many different effector proteins are known, transported by various secretion system types and displaying a large repertoire of biochemical activities that modulate the functions of host regulatory molecules. Virulence of the recombinant Gram-negative bacterial strain used herein can be attenuated additionally by lack of a siderophore normally or occasionally produced by the Gram-negative bacterial strain so that the strain does not produce the siderophore e.g. is deficient in the production of the siderophore. Thus in a preferred embodiment a recombinant Gram-negative bacterial strain is used which lacks of a siderophore normally or occasionally produced by the Gram-negative bacterial strain so that the strain does not produce the siderophore e.g. is deficient in the production of a siderophore, more preferably a *Yersinia* strain, in particular *Y. enterocolitica* MRS40 ΔyopH,O,P,E,M,T, *Y. enterocolitica* MRS40 ΔyopH,O,P,E,M,T ΔHairpinI-virF or *Y. enterocolitica* MRS40 ΔyopH,O,P,E,M,T Δasd pYV-asd is used which lack of a siderophore normally or occasionally produced by the Gram-negative bacterial strain so that the strain does not produce the siderophore e.g. is deficient in the production of a siderophore, in particular is deficient in the production of Yersiniabactin. Most preferably a *Yersinia* strain, in particular *Y. enterocolitica* MRS40 ΔyopH,O,P,E,M,T is used which lack of a siderophore normally or occasionally produced by the Gram-negative bacterial strain so that the strain does not produce the siderophore e.g. is deficient in the production of a siderophore, in particular is deficient in the production of Yersiniabactin. *Y. enterocolitica* MRS40 ΔyopH,O,P,E,M,T which is deficient in the production of Yersiniabactin has been described in WO02077249 and was deposited on 24 Sep. 2001, according to the Budapest Treaty on the International Recognition of the Deposit of Microorganisms for the Purposes of Patent Procedure with the Belgian Coordinated Collections of Microorganisms (BCCM) and was given accession number LMG P-21013. The recombinant Gram-negative bacterial strain preferably does not produce a siderophore e.g. is deficient in the production of a siderophore.

The term "siderophore", "iron siderophore" or "iron chelator" which are used interchangeably herein refer to compounds with high affinity for iron e.g. small compounds with high affinity for iron.

Siderophores of Gram-negative bacteria are e.g. Enterobactin and dihydroxybenzoylserine synthetized by *Salmonella, Escherichia, Klebsiella, Shigella, Serratia* (but used by all enterobacteria), Pyoverdins synthetized by *Pseudomonas*, Vibriobactin synthetized by *Vibrio*, Acinetobactin and Acinetoferrin by *Acinetobacter*, Yersiniabactin and Aerobactin synthetized by *Yersinia*, Ornibactin synthetized by *Burkholderia*, Salmochelin synthetized by *Salmonella*, Aerobactin synthetized by *Escherichia, Shigella, Salmonella*, and *Yersinia*, Alcaligin synthetized by *Bordetella*, Bisucaberin synthetized by *Vibrio*.

Siderophores include hydroxamate, catecholate and mixed ligand siderophores. Several siderophores have to date been approved for use in humans, mainly with the aim of treating iron overload. Preferred siderophores are Deferoxamine (also known as desferrioxamine B, desferoxamine B, DFO-B, DFOA, DFB or desferal), Desferrioxamine E, Deferasirox (Exjade, Desirox, Defrijet, Desifer) and Deferiprone (Ferriprox).

The term "an endogenous protein essential for growth" used herein refers to proteins of the recombinant Gram-negative bacterial strain without those the Gram-negative bacterial strain cannot grow. Endogenous proteins essential for growth are e.g. an enzyme essential for amino acid production, an enzyme involved in peptidoglycan biosynthesis, an enzyme involved in LPS biosynthesis, an enzyme involved in nucleotide synthesis or a translation initiation factor.

The term "an enzyme essential for amino acid production" used herein refers to enzymes which are related to the amino acid production of the recombinant Gram-negative bacterial strain and without those the Gram-negative bacterial strain can not grow. Enzymes essential for amino acid production, are e.g aspartate-beta-semialdehyde dehydrogenase (asd), glutamine synthetase (glnA), tryptophanyl tRNA synthetase (trpS) or serine hydroxymethly transferase (glyA), or Transketolase 1 (tktA), Transketolase 2 (tktB), Ribulose-phosphate 3-epimerase (rpe), Ribose-5-phosphate isomerase A (rpiA), Transaldolase A (talA), Transaldolase B (talB), phosphoribosylpyrophosphate synthase (prs), ATP phosphoribosyltransferase (hisG), Histidine biosynthesis bifunctional protein HisIE (hisI), 1-(5-phosphoribosyl)-5-[(5-phosphoribosylamino)methylideneamino] imidazole-4-carboxamide isomerase (hisA), Imidazole glycerol phosphate synthase subunit HisH (hisH), Imidazole glycerol phosphate synthase subunit HisF (hisF), Histidine biosynthesis bifunctional protein HisB (hisB), Histidinol-phosphate aminotransferase (hisC), Histidinol dehydrogenase (hisD), 3-dehydroquinate synthase (aroB), 3-dehydroquinate dehydratase (aroD), Shikimate dehydrogenase (NADP (+)) (aroE), Shikimate kinase 2 (aroL), Shikimate kinase 1 (aroK), 3-phosphoshikimate 1-carboxyvinyltransferase (aroA), Chorismate synthase (aroC), P-protein (pheA), T-protein (tyrA), Aromatic-amino-acid aminotransferase (tyrB), Phospho-2-dehydro-3-deoxyheptonate aldolase (aroG), Phospho-2-dehydro-3-deoxyheptonate aldolase (aroH), Phospho-2-dehydro-3-deoxyheptonate aldolase (aroF), Quinate/shikimate dehydrogenase (ydiB), ATP-dependent 6-phosphofructokinase isozyme 1 (pfkA), ATP-dependent 6-phosphofructokinase isozyme 2 (pfkB), Fructose-bisphosphate aldolase class 2 (fbaA), Fructose-bisphosphate aldolase class 1 (fbaB), Triosephosphate isomerase (tpiA), Pyruvate kinase I (pykF), Pyruvate kinase II (pykA), Glyceraldehyde-3-phosphate dehydrogenase A (gapA), Phosphoglycerate kinase (pgk), 2,3-bisphosphoglycerate-dependent phosphoglycerate mutase (gpmA), 2,3-bisphosphoglycerate-independent phosphoglycerate mutase (gpmM/yibO), Probable phosphoglycerate mutase (ytjC/gpmB), enolase (eno), D-3-phosphoglycerate dehydrogenase (serA), Phosphoserine aminotransferase (serC), Phosphoserine phosphatase (serB), L-serine dehydratase 1 (sdaA), L-serine dehydratase 2 (sdaB), L-threonine dehydratase catabolic (tdcB), L-threonine dehydratase biosynthetic (ilvA), L-serine dehydratase (tdcG), Serine acetyltransferase (cysE), Cysteine synthase A (cysK), Cysteine synthase B (cysM), beta-cystathionase (malY), Cystathionine beta-lyase (metC), 5-methyltetrahydropteroyltriglutamate-homocysteine methyltransferase (metE), Methionine synthase (metH), S-adenosylmethionine synthase (metK), Cystathionine gamma-synthase (metB), Homoserine O-succinyltransferase (metA), 5'-methylthioadenosine/S-adenosylhomocysteine nucleosidase (mtnN), S-ribosylhomocysteine lyase (luxS), cystathione beta lyase, cystathione gamma lyase, Serine hydroxymethyltransferase (glyA), Glycine hydroxymethyltransferase (itaE), 3-isopropylmalate dehydratase small subunit (leuD), 3-isopropylmalate dehydratase large subunit (leuC), 3-isopropylmalate dehydrogenase (leuB), L-threonine dehydratase biosynthetic (ilvA), Acetolactate synthase isozyme 3 large subunit (ilvI), Acetolactate synthase isozyme 3 small subunit (ilvH), Acetolactate synthase isozyme 1 small subunit (ilvN), Acetolactate synthase isozyme 2 small subunit (ilvM), Ketol-acid reductoisomerase (NADP(+)) (ilvC), Dihydroxy-acid dehydratase (ilvD), Branched-chain-amino-acid aminotransferase (ilvE), Bifunctional aspartokinase/homoserine dehydrogenase 1 (thrA), Bifunctional aspartokinase/homoserine dehydrogenase 2 (metL), 2-isopropylmalate synthase (leuA), Glutamate-pyruvate aminotransferase (alaA), Aspartate aminotransferase (aspC), Bifunctional aspartokinase/homoserine dehydrogenase 1 (thrA), Bifunctional aspartokinase/homoserine dehydrogenase 2 (metL), Lysine-sensitive aspartokinase 3 (lysC), Aspartate-semialdehyde dehydrogenase (asd), 2-keto-3-deoxy-galactonate aldolase (yagE), 4-hydroxy-tetrahydrodipicolinate synthase (dapA), 4-hydroxy-tetrahydrodipicolinate reductase (dapB), 2,3,4,5-tetrahydropyridine-2,6-dicarboxylate N-succinyltransferase (dapD), Succinyl-diaminopimelate desuccinylase (dapE), Diaminopimelate epimerase (dapF), Putative lyase (yjhH), Acetylornithine/succinyldiaminopimelate aminotransferase (argD), Citrate synthase (gltA), Aconitate hydratase B (acnB), Aconitate hydratase A (acnA), uncharacterized putative aconitate hydratase (ybhJ), isocitrate dehydrogenase (icd), Aspartate aminotransferase (aspC), Glutamate-pyruvate aminotransferase (alaA), Glutamate synthase [NADPH] large chain (gltB), Glutamate synthase [NADPH] small chain (gltD), Glutamine synthetase (glnA), Amino-acid acetyltransferase (argA), Acetylglutamate kinase (argB), N-acetyl-gamma-glutamyl-phosphate reductase (argC), Acetylornithine/succinyldiaminopimelate amino-transferase (argD), Acetylornithine deacetylase (argE), Ornithine carbamoyltransferase chain F (argF), Ornithine carbamoyltransferase chain I (argI), Argininosuccinate synthase (argG), Argininosuccinate lyase (argH), Glutamate 5-kinase (proB), Gamma-glutamyl phosphate reductase (proA), pyrroline-5-carboxylate reductase (proC), ornithine cyclodeaminase, Leucine-tRNA ligase (leuS), Glutamine-tRNA ligase (glnS), Serine-tRNA ligase (serS), Glycine-tRNA ligase beta subunit (glyS), Glycine-tRNA ligase alpha subunit (glyQ), Tyrosine-tRNA ligase (tyrS), Threonine-tRNA ligase (thrS), Phenylalanine-tRNA ligase alpha subunit (pheS), Phenylalanine-tRNA ligase beta subunit (pheT), Arginine-tRNA ligase (argS), Histidine-tRNA ligase (hisS), Valine-tRNA ligase (valS), Alanine-tRNA ligase (alaS), Isoleucine-tRNA ligase (ileS), Proline-tRNA ligase (proS), Cystein-tRNA ligase (cysS), Asparagine-tRNA ligase (asnS), Aspartate-tRNA ligase (aspS), Glutamate-tRNA ligase (gltX), Tryptophan-tRNA ligase (trpS), Glycine-tRNA ligase beta subunit (glyS), Methionine-tRNA ligase (metG), Lysine-tRNA ligase (lysS). Preferred enzymes essential for amino acid production are tktA, rpe, prs, aroK, tyrB, aroH, fbaA, gapA, pgk, eno, tdcG, cysE, metK, glyA, asd, dapA/B/D/E/F, argC, proC, leuS, glnS, serS, glyS/Q, tyrS, thrS, pheS/T, argS, hisS, valS, alaS, ileS, proS, cysS, asnS, aspS, gltX, trpS, glyS, metG, lysS, more preferred are asd, glyA, leuS, glnS, serS, glyS/Q, tyrS, thrS, pheS/T, argS, hisS, valS, alaS, ileS, proS, cysS, asnS, aspS, gltX, trpS, glyS, metG, lysS, most preferred is asd.

The terms "Gram-negative bacterial strain deficient to produce an amino acid essential for growth" and "auxotroph mutant" are used herein interchangeably and refer to Gram-negative bacterial strains which can not grow in the absence of at least one exogenously provided essential amino acid or a precursor thereof. The amino acid the strain is deficient to produce is e.g. aspartate, meso-2,6-diaminopimelic acid, aromatic amino acids or leucine-arginine. Such a strain can be generated by e.g. deletion of the aspartate-beta-semialdehyde dehydrogenase gene (Δasd). Such an auxotroph mutant cannot grow in absence of exogenous meso-2,6-diaminopimelic acid. The mutation, e.g. deletion of the aspartate-beta-semialdehyde dehydrogenase gene is preferred herein for a Gram-negative bacterial strain deficient to produce an amino acid essential for growth of the present invention.

The term "Gram-negative bacterial strain deficient to produce adhesion proteins binding to the eukaryotic cell surface or extracellular matrix" refers to mutant Gram-negative bacterial strains which do not express at least one adhesion protein compared to the adhesion proteins expressed by the corresponding wild type strain. Adhesion proteins may include e.g. extended polymeric adhesion molecules like pili/fimbriae or non-fimbrial adhesins. Fimbrial adhesins include type-1 pili (such as *E. coli* Fim-pili with the FimH adhesin), P-pili (such as Pap-pili with the PapG adhesin from *E. coli*), type 4 pili (as pilin protein from e.g. *P. aeruginosa*) or curli (Csg proteins with the CsgA adhesin from *S. enterica*). Non-fimbrial adhesions include trimeric autotransporter adhesins such as YadA from *Y. enterocolitica*, BpaA (*B. pseudomallei*), Hia (*H. influenzae*), BadA (*B. henselae*), NadA (*N. meningitidis*) or UspA1 (*M. catarrhalis*) as well as other autotransporter adhesins such as AIDA-1 (*E. coli*) as well as other adhesins/invasins such as InvA from *Y. enterocolitica* or Intimin (*E. coli*) or members of the Dr-family or Afa-family (*E. coli*). The terms YadA and InvA as used herein refer to proteins from *Y. enterocolitica*. The autotransporter YadA[7] binds to different forms of collagen as well as fibronectin, while the invasin InvA[8] binds to P-integrins in the eukaryotic cell membrane. If the Gram-negative bacterial strain is a *Y. enterocolitica* strain the strain is preferably deficient in InvA and/or YadA.

As used herein, the term "family of Enterobacteriaceae" comprises a family of gram-negative, rod-shaped, facultatively anaerobic bacteria found in soil, water, plants, and animals, which frequently occur as pathogens in vertebrates. The bacteria of this family share a similar physiology and demonstrate a conservation within functional elements and genes of the respective genomes. As well as being oxidase negative, all members of this family are glucose fermenters and most are nitrate reducers. Enterobacteriaceae bacteria of the invention may be any bacteria from that family, and specifically includes, but is not limited to, bacteria of the following genera: *Escherichia, Shigella, Edwardsiella, Salmonella, Citrobacter, Klebsiella, Enterobacter, Serratia, Proteus, Erwinia, Morganella, Providencia*, or *Yersinia*. In more specific embodiments, the bacterium is of the *Escherichia coli, Escherichia blattae, Escherichia fergusonii, Escherichia hermanii, Escherichia vuneris, Salmonella enterica, Salmonella bongori, Shigella dysenteriae, Shigella flexneri, Shigella boydii, Shigella sonnei, Enterobacter aerogenes, Enterobacter gergoviae, Enterobacter sakazakii, Enterobacter cloacae, Enterobacter agglomerans, Klebsiella pneumoniae, Klebsiella oxytoca, Serratia marcescens, Yersinia pseudotuberculosis, Yersinia pestis, Yersinia enterocolitica, Erwinia amylovora, Proteus mirabilis, Proteus vulgaris, Proteus penneri, Proteus hauseri, Providencia alcalifaciens*, or *Morganella morganii* species.

Preferably the Gram-negative bacterial strain is selected from the group consisting of the genera *Yersinia, Escherichia, Salmonella, Shigella, Pseudomonas, Chlamydia, Erwinia, Pantoea, Vibrio, Burkholderia, Ralstonia, Xanthomonas, Chromobacterium, Sodalis, Citrobacter, Edwardsiella, Rhizobiae, Aeromonas, Photorhabdus, Bordetella* and *Desulfovibrio*, more preferably from the group consisting of the genera *Yersinia, Escherichia, Salmonella*, and *Pseudomonas*, most preferably from the group consisting of the genera *Yersinia* and *Salmonella*, in particular *Yersinia*.

The term "*Yersinia*" as used herein includes all species of *Yersinia*, including *Yersinia enterocolitica, Yersinia pseudotuberculosis* and *Yersinia pestis*. Preferred is *Yersinia enterocolitica*.

The term "*Salmonella*" as used herein includes all species of *Salmonella*, including *Salmonella enterica* and *S. bongori*. Preferred is *Salmonella enterica*.

"Promoter" as used herein refers to a nucleic acid sequence that regulates expression of a transcriptional unit. A "promoter region" is a regulatory region capable of binding RNA polymerase in a cell and initiating transcription of a downstream (3' direction) coding sequence. Within the promoter region will be found a transcription initiation site (conveniently defined by mapping with nuclease Si), as well as protein binding domains (consensus sequences) responsible for the binding of RNA polymerase such as the putative −35 region and the Pribnow box. The term "operably linked" when describing the relationship between two nucleotide e.g. DNA regions simply means that they are functionally related to each other and they are located on the same nucleic acid fragment. A promoter is operably linked to a structural gene if it controls the transcription of the gene and it is located on the same nucleic acid fragment as the gene. Usually the promoter is functional in said Gram-negative bacterial strain, i.e. the promoter is capable of expressing the fusion protein of the present invention, i.e. the promoter is capable of expressing the fusion protein of the present invention without further genetic engineering or expression of further proteins. Furthermore, a functional promoter must not be naturally counter-regulated to the bacterial T3SS.

The term "extra-chromosomal genetic element" used herein refers to a genetic element other than a chromosome which is endogenously harboured by the Gram-negative bacterial strain of the present invention such as a virulence plasmid or which is an exogenous genetic element with which the Gram-negative bacterial strain is transformed and which is transiently or stably integrated into the chromosome or into a genetic element other than a chromosome which is endogenously harboured such as an endogenous virulence plasmid. An endogenous virulence plasmid is the preferred extra-chromosomal genetic element of the present invention. Such an extra-chromosomal genetic element may be generated by integration of a vector like an expression vector, a vector for homologous recombination or other integration into the chromosome or into a genetic element other than a chromosome which is endogenously harboured such as a virulence plasmid, by integration of DNA fragments for homologous recombination or other integration into the chromosome or into a genetic element other than a chromosome which is endogenously harboured such as a virulence plasmid or via an RNA element guiding site specific insertion into the chromosome or into a genetic element other than a chromosome which is endogenously harboured such as a virulence plasmid, such as CRISPR/Cas9 and related guide RNA.

The terms "polynucleic acid molecule" and "polynucleotide molecule" are used herein interchangeably and have the identical meaning herein, and refer to both DNA and RNA molecules, which can either be single-stranded or double-stranded, and that can be partially or fully transcribed and translated (DNA), or partially or fully translated (RNA), into a gene product.

The terms "nucleic acid sequence", "nucleotide sequence" and "nucleotide acid sequence" are used herein interchangeably and have the identical meaning herein, and refer to preferably DNA or RNA. The terms "nucleic acid sequence", "nucleotide sequence" and "nucleotide acid sequence" are preferably used synonymous with the term "polynucleotide sequence".

The term "operon" used herein refers to two or more genes transcribed under the control of a single promoter. These genes are thus typically transcribed together and form one messenger RNA, whereat this single mRNA encodes more than one protein (polycistronic mRNA). Additionally to a promoter and two or more genes, an operator element may also be present, which controls transcription.

The term "delivery" used herein refers to the transportation of a protein from a recombinant Gram-negative bacterial strain to a eukaryotic cell, including the steps of expressing the heterologous protein in the recombinant Gram-negative bacterial strain, secreting the expressed protein(s) from such recombinant Gram-negative bacterial strain and translocating the secreted protein(s) by such recombinant Gram-negative bacterial strain into the cytosol of the eukaryotic cell. Accordingly, the terms "delivery signal" or "secretion signal" which are used interchangeably herein refer to a polypeptide sequence which can be recognized by the secretion and translocation system of the Gram-negative bacterial strain and directs the delivery of a protein from the Gram-negative bacterial strain to eukaryotic cells.

The term "delivery signal from a bacterial effector protein" used herein refers to a delivery signal from a bacterial effector protein functional in the recombinant Gram-negative bacterial strain, i.e. which allows an expressed heterologous protein in the recombinant Gram-negative bacterial strain to be secreted from such recombinant Gram-negative bacterial strain by a secretion system such as the type III, type IV or type VI secretion system or to be translocated by such recombinant Gram-negative bacterial strain into the cytosol of a eukaryotic cell by a secretion system such as the type III, type IV or type VI secretion system. The term "delivery signal from a bacterial effector protein" used herein also comprises a fragment of a delivery signal from a bacterial effector protein i.e. shorter versions of a delivery signal e.g. a delivery signal comprising up to 10, preferably up to 20, more preferably up to 50, even more preferably up to 100, in particular up to 140 amino acids of a delivery signal e.g. of a naturally occurring delivery signal. Thus a nucleotide sequence such as e.g. a DNA sequence encoding a delivery signal from a bacterial effector protein may encode a full length delivery signal or a fragment thereof wherein the fragment usually comprises usually up to 30, preferably up to 60, more preferably up to 150, even more preferably up to 300, in particular up to 420 nucleic acids.

As used herein, the "secretion" of a protein refers to the transportation of a heterologous protein outward across the cell membrane of a recombinant Gram-negative bacterial strain. The "translocation" of a protein refers to the transportation of a heterologous protein from a recombinant Gram-negative bacterial strain across the plasma membrane of a eukaryotic cell into the cytosol of such eukaryotic cell.

The term "bacterial protein, which is part of a secretion system machinery" as used herein refers to bacterial proteins constituting essential components of the bacterial type 3 secretion system (T3SS), type 4 secretion system (T4SS) and type 6 secretion system (T6SS), preferably T3SS. Without such proteins, the respective secretion system is non-functional in translocating proteins to host cells, even if all other components of the secretion system and the bacterial effector protein to be translocated are still encoded and produced.

The term "bacterial effector protein" as used herein refers to bacterial proteins transported by secretion systems e.g. by bacterial proteins, which are part of a secretion system machinery into host cells. Such effector proteins are delivered by a secretion system into a host cell where they exert e.g. virulence activity toward various host proteins and cellular machineries. Many different effector proteins are known, transported by various secretion system types and displaying a large repertoire of biochemical activities that modulate the functions of host regulatory molecules. Secretion systems include type 3 secretion system (T3SS), type 4 secretion system (T4SS) and type 6 secretion system (T6SS). Some effector proteins (as *Shigella flexneri* IpaC) as well belong to the class of bacterial protein, which are part of a secretion system machinery and allow protein translocation. The recombinant Gram-negative bacterial strain used herein usually comprises bacterial proteins constituting essential components of the bacterial type 3 secretion system (T3SS), type 4 secretion system (T4SS) and/or the type 6 secretion system (T6SS), preferably of the type 3 secretion system (T3SS). The term "bacterial proteins constituting essential components of the bacterial T3SS" as used herein refers to proteins, which are naturally forming the injectisome e.g. the injection needle or are otherwise essential for its function in translocating proteins into eukaryotic cells. Proteins forming the injectisome or are otherwise essential for its function in translocating proteins into eukaryotic cells include, but are not limited to:

SctC, YscC, MxiD, InvG, SsaC, EscC, HrcC, HrcC (Secretin), SctD, YscD, MxiG, Prg, SsaD, EscD, HrpQ, HrpW, FliG (Outer MS ring protein), SctJ, YscJ, MxiJ, PrgK, SsaJ, EscJ, HrcJ, HrcJ, FliF (Inner MS ring protein), SctR, YscR, Spa24, SpaP, SpaP, SsaR, EscR, HrcR, HrcR, FliP (Minor export apparatus protein), SctS, YscS, Spa9 (SpaQ), SpaQ, SsaS, EscS, HrcS, HrcS, FliQ (Minor export apparatus protein), SctT, YscT, Spa29 (SpaR), SpaR, SsaT, EscT, HrcT, HrcT, FliR (Minor export apparatus protein), SctU, YscU, Spa40, SpaS, SpaS, SsaU, EscU, HrcU, HrcU, FlhB (Export apparatus switch protein), SctV, YscV, MxiA, InvA, SsaV, EscV, HrcV, HrcV, FlhA (Major export apparatus protein), SctK, YscK, MxiK, OrgA, HrpD (Accessory cytosolic protein), SctQ, YscQ, Spa33, SpaO, SpaO, SsaQ, EscQ, HrcQA+B, HrcQ, FliM+FliN (C ring protein), SctL, YscL, MxiN, OrgB, SsaK, EscL, Orf5, HrpE, HrpF, FliH (Stator), SctN, YscN, Spa47, SpaL, InvC, SsaN, EscN, HrcN, HrcN, FliI (ATPase), SctO, YscO, Spa13, SpaM, InvI, SsaO, Orf15, HrpO, HrpD, FliJ (Stalk), SctF, YscF, MxiH, PrgI, SsaG, EscF, HrpA, HrpY (Needle filament protein), SctI, YscI, MxiI, PrgJ, SsaI, EscI, rOrf8, HrpB, HrpJ, (Inner rod protein), SctP, YscP, Spa32, SpaN, InvJ, SsaP, EscP, Orf16, HrpP, HpaP, FliK (Needle length regulator), LcrV, IpaD, SipD (Hydrophilic translocator, needle tip protein), YopB, IpaB, SipB, SseC, EspD, HrpK, PopF1, PopF2 (Hydrophobic translocator, pore protein), YopD, IpaC, SipC, SseD, EspB (Hydrophobic translocator, pore protein), YscW, MxiM, InvH (Pilotin), SctW, YopN, MxiC, InvE, SsaL, SepL, HrpJ, HpaA (Gatekeeper).

The term "T6SS effector protein" or "bacterial T6SS effector protein" as used herein refers to proteins which are naturally injected by T6S systems into the cytosol of eukaryotic cells or bacteria and to proteins which are naturally secreted by T6S systems that might e.g form translocation pores into the eukaryotic membrane. The term "T4SS effector protein" or "bacterial T4SS effector protein" as used herein refers to proteins which are naturally injected by T4S systems into the cytosol of eukaryotic cells and to proteins which are naturally secreted by T4S systems that might e.g form the translocation pore into the eukaryotic membrane.

The term "T3SS effector protein" or "bacterial T3SS effector protein" as used herein refers to proteins which are naturally injected by T3S systems into the cytosol of eukaryotic cells and to proteins which are naturally secreted by T3S systems that might e.g form the translocation pore into the eukaryotic membrane (including pore-forming tranlocators (as *Yersinia* YopB and YopD) and tip-proteins like *Yersinia* LcrV). Preferably proteins which are naturally injected by T3S systems into the cytosol of eukaryotic cells are used. These virulence factors will paralyze or reprogram the eukaryotic cell to the benefit of the pathogen. T3S effectors display a large repertoire of biochemical activities and modulate the function of crucial host regulatory molecules and include, but are not limited to, AvrA, AvrB, AvrBs2, AvrBS3, AvrBsT, AvrD, AvrD1, AvrPphB, AvrPphC, AvrPphEPto, AvrPpiBPto, AvrPto, AvrPtoB, AvrRpm1, AvrRpt2, AvrXv3, CigR, EspF, EspG, EspH, EspZ, ExoS, ExoT, GogB, GtgA, GtgE, GALA family of proteins, HopAB2, HopAO1, HopI1, HopM1, HopN1, HopPtoD2, HopPtoE, HopPtoF, HopPtoN, HopU1, HsvB, IcsB, IpaA, IpaB, IpaC, IpaH, IpaH7.8, IpaH9.8, IpgB1, IpgB2, IpgD, LcrV, Map, OspC1, OspE2, OspF, OspG, OspI, PipB, PipB2, PopB, PopP2, PthXo1, PthXo6, PthXo7, SifA, SifB, SipA/SspA, SipB, SipC/SspC, SipD/SspD, SlrP, SopA, SopB/SigD, SopD, SopE, SopE2, SpiC/SsaB, SptP, SpvB, SpvC, SrfH, SrfJ, Sse, SseB, SseC, SseD, SseF, SseG, SseI/SrfH, SseJ, SseK1, SseK2, SseK3, SseL, SspH1, SspH2, SteA, SteB, SteC, SteD, SteE, TccP2, Tir, VirA, VirPphA, VopF, XopD, YopB, YopD YopE, YopH, YopJ, YopM, YopO, YopP, YopT, YpkA.

The term "recombinant Gram-negative bacterial strain accumulating in a malignant solid tumor" or "the recombinant Gram-negative bacterial strain accumulates in a malignant solid tumor" as used herein refers to a recombinant Gram-negative bacterial strain which replicates within a malignant solid tumor thereby increasing the bacterial count of this recombinant Gram-negative bacterial strain inside the malignant solid tumor. Surprisingly it has been found that the recombinant Gram-negative bacterial strain after administration to the subject accumulates specifically in the malignant solid tumor i.e. accumulates specifically in the organ where the malignant tumor is present, wherein the bacterial counts of the recombinant Gram-negative bacterial strain in organs where no malignant solid tumor is present is low or not detectable.

In case of extracellular residing bacteria as *Yersinia*, the bacteria mostly accumulate within the intercellular space formed between tumor cells or cells of the tumor microenvironment. Intracellular growing bacteria as *Salmonella* will mostly invade tumor cells or cells of the tumor microenvironment and reside inside such cells, while extracellular accumulations might still occur. Bacterial counts of the recombinant Gram-negative bacterial strain accumulated inside the malignant solid tumor can be e.g. in the range of $10^4$ to $10^9$ bacteria per gram of tumor tissue.

The term "cancer" used herein refers to a disease in which abnormal cells divide without control and can invade nearby tissues. Cancer cells can also spread to other parts of the body through the blood and lymph systems. There are several main types of cancer. Carcinoma is a cancer that begins in the skin or in tissues that line or cover internal organs. Sarcoma is a cancer that begins in bone, cartilage, fat, muscle, blood vessels, or other connective or supportive tissue. Leukemia is a cancer that starts in blood-forming tissue, such as the bone marrow, and causes large numbers of abnormal blood cells to be produced and enter the blood. Lymphoma and multiple myeloma are cancers that begin in the cells of the immune system. Central nervous system cancers are cancers that begin in the tissues of the brain and spinal cord. The term "cancer" used herein comprises solid tumors i.e. malignant solid tumors such as e.g. sarcomas, carcinomas, and lymphomas and non-solid tumors such as e.g. leukemias (cancers of the blood). Malignant solid tumors are preferred.

The term "solid tumor", "solid tumor indication", "malignant solid tumor" or "malignant solid tumor indication" used herein refers to an abnormal mass of tissue that usually does not contain cysts or liquid areas. Solid tumors may be benign (not cancer), or malignant (cancer). Malignant solid tumors are treated with the methods of the present invention. Different types of malignant solid tumors are named for the type of cells that form them. Examples of malignant solid tumors are sarcomas, carcinomas, and lymphomas. Leukemias (cancers of the blood) generally do not form malignant solid tumors (definition according to the national cancer institute of the NIH). Malignant solid tumors include, but are not limited to, abnormal mass of cells which may stem from different tissue types such as liver, colon, colorectum, skin, breast, pancreas, cervix uteri, corpus uteri, bladder, gallbladder, kidney, larynx, lip, oral cavity, oesophagus, ovary, prostate, stomach, testis, thyroid gland or lung and thus include malignant solid liver, colon, colorectum, skin, breast, pancreas, cervix uteri, corpus uteri, bladder, gallbladder, kidney, larynx, lip, oral cavity, oesophagus, ovary, prostate, stomach, testis, thyroid gland or lung tumors. Preferred malignant solid tumors which can be treated with the methods of the present invention are malignant solid tumors which stem from skin, breast, liver, pancreas, bladder, prostate and colon and thus include malignant solid skin, breast, liver, pancreas, bladder, prostate and colon tumors. Equally preferred malignant solid tumors which can be treated with the methods of the present invention are malignant solid tumors associated with liver cancer, such as hepatocellular carcinoma.

The term "objective response rate" (ORR) as used herein refers to the proportion of patients with tumor size reduction of a predefined amount and for a minimum time period. Response duration usually is measured from the time of initial response until documented tumor progression. Generally, the FDA has defined ORR as the sum of partial responses plus complete responses. When defined in this manner, ORR is a direct measure of drug antitumor activity, which can be evaluated in a single-arm study. The ORR refers to the sum of complete response (CR) and partial response (PR). The definition of ORR, CR and PR for humans is provided in RECIST guidelines (RECIST 1.1[69]) and adapted guidelines for assessment of immunotherapeutic compound (iRECIST[70]).

In preclinical studies with tumour bearing mice, the definition of tumour response is adapted as compared to the RECIST definition for humans: no tumour regression is defined as tumour volumes increased by more than 35% compared to their respective volume at day 0; stable disease is defined as tumor volume change between 50% decrease and 35% increase of tumour volume compared to day 0; partial regression is defined as a decrease of tumour volume between 50% and 95% volume compared to day 0; and complete regression or complete response is defined as a decrease in tumour volume of >95% as compared to day 0.

The term "complete response", "complete tumor regression" and "complete regression" are used herein interchangeably and have the same meaning. The term "complete response" (CR) in relation to target lesions refers to disappearance of all target lesions. Any pathological lymph nodes (whether target or non-target) must have reduction in short axis to <10 mm. The term complete response (CR) as used herein in relation to non-target lesions refers to disappearance of all non-target lesions and normalization of tumor marker level. All lymph nodes must be non-pathological in size (<10 mm short axis).

The term "partial response" (PR) as used herein in relation to target lesions refers to at least a 30% decrease in the sum of the diameters of target lesions, taking as reference the baseline sum diameters.

The term "progressive disease" (PD) as used herein in relation to target lesions refers to at least a 20% increase in the sum of the diameters of target lesions, taking as reference the smallest sum on study (this includes the baseline sum if that is the smallest on study). In addition to the relative increase of 20%, the sum must also demonstrate an absolute increase of at least 5 mm. The appearance of one or more new lesions is also considered progressions. The term progressive disease (PD) as used herein in relation to non-target lesions refers to appearance of one or more new lesions and/or unequivocal progression of existing non-target lesions. Unequivocal progression should not normally trump target lesion status. It must be representative of overall disease status change, not a single lesion increase.

The term "stable disease" (SD) as used herein in relation to target lesions refers to neither sufficient shrinkage to qualify for PR nor sufficient increase to qualify for PD, taking as reference the smallest sum diameters while on study.

The term "progression-free survival" (PFS) as used herein relates to the duration of time from start of treatment to time of progression or death, whichever occurs first.

The term "bacterial effector protein which is virulent toward eukaryotic cells" as used herein refers to bacterial effector proteins, which are transported by secretion systems into host cells where they exert their virulence activity toward various host proteins and cellular machineries. Many different effector proteins are known, transported by various secretion system types and displaying a large repertoire of biochemical activities that modulate the functions of host regulatory molecules. Secretion systems include type 3 secretion system (T3SS), type 4 secretion system (T4SS) and type 6 secretion system (T6SS). Importantly, some effector proteins which are virulent toward eukaryotic cells (as *Shigella flexneri* IpaC) as well belong to the class of bacterial proteins, which are part of a secretion system machinery. In case the bacterial effector protein which is virulent toward eukaryotic cells is as well essential for the function of the secretion machinery, such a protein is excluded from this definition. T3SS effector proteins which are virulent towards eukaryotic cells refers to proteins as *Y. enterocolitica* YopE, YopH, YopJ, YopM, YopO, YopP, YopT or *Shigella flexneri* OspF, IpgD, IpgB1 or *Salmonella enterica* SopE, SopB, SptP or *P. aeruginosa* ExoS, ExoT, ExoU, ExoY or *E. coli* Tir, Map, EspF, EspG, EspH, EspZ. T4SS effector proteins which are virulent towards eukaryotic cells refers to proteins as *Legionella pneumophila* LidA, SidC, SidG, SidH, SdhA, SidJ, SdjA, SdeA, SdeA, SdeC, LepA, LepB, WipA, WipB, YlfA, YlfB, VipA, VipF, VipD, VpdA, VpdB, DrrA, LegL3, LegL5, LegL7, LegLC4, LegLC8, LegC5, LegG2, Ceg10, Ceg23, Ceg29 or *Bartonella henselae* BepA, BepB, BepC, BepD, BepE, BepF BepG or *Agrobacterium tumefaciens* VirD2, VirE2, VirE3, VirF or *H. pylori* CagA or *Bordetella pertussis* pertussis toxin. T6SS effector proteins which are virulent towards eukaryotic cells refers to proteins as *Vibrio cholerae* VgrG proteins (as VgrG1).

The term "T3SS effector protein which is virulent toward eukaryotic cells" or "bacterial T3SS effector protein which is virulent toward eukaryotic cells" as used herein refers to proteins which are naturally injected by T3S systems into the cytosol of eukaryotic cells and to proteins which are naturally secreted by T3S systems that might e.g form the translocation pore into the eukaryotic membrane, which are virulence factors toward eukaryotic cells i.e. to proteins which paralyze or reprogram the eukaryotic cell to the benefit of the pathogen. Effectors display a large repertoire of biochemical activities and modulate the function of crucial host regulatory mechanisms such as e.g. phagocytosis and the actin cytoskeleton, inflammatory signaling, apoptosis, endocytosis or secretory pathways[2,9] and include, but are not limited to, AvrA, AvrB, AvrBs2, AvrBS3, AvrBsT, AvrD, AvrD1, AvrPphB, AvrPphC, AvrPphEPto, AvrPpiBPto, AvrPto, AvrPtoB, AvrRpm1, AvrRpt2, AvrXv3, CigR, EspF, EspG, EspH, EspZ, ExoS, ExoT, GogB, GtgA, GtgE, GALA family of proteins, HopAB2, HopAO1, HopI1, HopM1, HopN1, HopPtoD2, HopPtoE, HopPtoF, HopPtoN, HopU1, HsvB, IcsB, IpaA, IpaH, IpaH7.8, IpaH9.8, IpgB1, IpgB2, IpgD, LcrV, Map, OspC1, OspE2, OspF, OspG, OspI, PipB, PipB2, PopB, PopP2, PthXo1, PthXo6, PthXo7, SifA, SifB, SipA/SspA, SlrP, SopA, SopB/SigD, SopD, SopE, SopE2, SpiC/SsaB, SptP, SpvB, SpvC, SrfH, SrfJ, Sse, SseB, SseC, SseD, SseF, SseG, SseI/SrfH, SseJ, SseK1, SseK2, SseK3, SseL, SspH1, SspH2, SteA, SteB, SteC, SteD, SteE, TccP2, Tir, VirA, VirPphA, VopF, XopD, YopE, YopH, YopJ, YopM, YopO, YopP, YopT, YpkA.

T3SS effector genes of *Yersinia* which are virulent to a eukaryotic cell and can be deleted/mutated from e.g. *Y. enterocolitica* are YopE, YopH, YopM, YopO, YopP (also named YopJ), and YopT[10]. The respective effector genes which are virulent to a eukaryotic cell can be deleted/mutated from *Shigella flexneri* (e.g. OspF, IpgD, IpgB1), *Salmonella enterica* (e.g. SopE, SopB, SptP), *P. aeruginosa* (e.g ExoS, ExoT, ExoU, ExoY) or *E. coli* (e.g. Tir, Map, EspF, EspG, EspH, EspZ). The nucleic acid sequences of these genes are available to those skilled in the art, e.g., in the Genebank Database (yopH, yopO, yopE, yopP, yopM, yopT from NC_002120 GI:10955536; *S. flexneri* effector proteins from AF386526.1 GI:18462515; *S. enterica* effectors from NC_016810.1 GI:378697983 or FQ312003.1 GI:301156631; *P. aeruginosa* effectors from AE004091.2 GI:110227054 or CP000438.1 GI:115583796 and *E. coli* effector proteins from NC_011601.1 GI:215485161).

For the purpose of the present invention, genes are denoted by letters of lower case and italicised to be distinguished from proteins. In case the genes (denoted by letters of lower case and italicised) are following a bacterial species name (like *E. coli*), they refer to a mutation of the corresponding gene in the corresponding bacterial species. For example, YopE refers to the effector protein encoded by the yopE gene. *Y. enterocolitica* yopE represents a *Y. enterocolitica* having a mutation in the yopE gene.

As used herein, the terms “polypeptide”, “peptide”, “protein”, “polypeptidic” and “peptidic” are used interchangeably to designate a series of amino acid residues connected to each other by peptide bonds between the alpha-amino and carboxy groups of adjacent residues. Preferred are proteins which have an amino acid sequence comprising at least 10 amino acids, more preferably at least 20 amino acids.

According to the present invention, “a heterologous protein or a fragment thereof” includes naturally occurring proteins or a fragment thereof and also includes artificially engineered proteins or a fragment thereof. As used herein, the term “heterologous protein or a fragment thereof” refers to a protein or a fragment thereof other than the T3SS effector protein or N-terminal fragment thereof to which it can be fused. In particular the heterologous protein or a fragment thereof as used herein refers to a protein or a fragment thereof, which do not belong to the proteome, i.e. the entire natural protein complement of the specific recombinant Gram-negative bacterial strain provided and used by the invention, e.g. which do not belong to the proteome, i.e. the entire natural protein complement of a specific bacterial strain of the genera *Yersinia, Escherichia, Salmonella* or *Pseudomonas*. Usually the heterologous protein or a fragment thereof is of animal origin including human origin. Preferably the heterologous protein or a fragment thereof is a human protein or a fragment thereof. More preferably the heterologous protein or a fragment thereof is selected from the group consisting of proteins involved in induction or regulation of an interferon (IFN) response, proteins involved in apoptosis or apoptosis regulation, cell cycle regulators, ankyrin repeat proteins, cell signaling proteins, reporter proteins, transcription factors, proteases, small GTPases, GPCR related proteins, nanobody fusion constructs and nanobodies, bacterial T3SS effectors, bacterial T4SS effectors and viral proteins, or a fragment thereof. Particular preferably the heterologous protein or a fragment thereof is selected from the group consisting of proteins involved in induction or regulation of an interferon (IFN) response, proteins involved in apoptosis or apoptosis regulation, cell cycle regulators, ankyrin repeat proteins, reporter proteins, small GTPases, GPCR related proteins, nanobody fusion constructs, bacterial T3SS effectors, bacterial T4SS effectors and viral proteins, or a fragment thereof. Further particular preferred heterologous protein or a fragment thereof are selected from the group consisting of proteins involved in induction or regulation of an interferon (IFN) response, proteins involved in apoptosis or apoptosis regulation, cell cycle regulators, ankyrin repeat proteins, cell signalling proteins, nanobody fusion constructs and nanobodies. Even more particular preferred are heterologous proteins or a fragment thereof selected from the group consisting of proteins involved in induction or regulation of an interferon (IFN) response, proteins involved in apoptosis or apoptosis regulation, cell cycle regulators, and ankyrin repeat proteins, or a fragment thereof. Further even more particular preferred heterologous proteins or a fragment thereof are selected from the group consisting of proteins involved in induction or regulation of an interferon (IFN) response, proteins involved in apoptosis or apoptosis regulation, ankyrin repeat proteins, cell signalling proteins, nanobody fusion constructs and nanobodies. Further even more particular preferred heterologous proteins or a fragment thereof are selected from the group consisting of proteins involved in induction or regulation of an interferon (IFN) response, proteins involved in apoptosis or apoptosis regulation, ankyrin repeat proteins, nanobody fusion constructs and nanobodies. Further even more particular preferred heterologous proteins or a fragment thereof are selected from the group consisting of proteins involved in induction or regulation of an interferon (IFN) response, proteins involved in apoptosis or apoptosis regulation and cell signalling proteins. Further even more particular preferred heterologous proteins or a fragment thereof are selected from the group consisting of proteins involved in induction or regulation of an interferon (IFN) response, proteins involved in apoptosis or apoptosis regulation, nanobody fusion constructs and nanobodies. Further even more particular preferred heterologous proteins or a fragment thereof are selected from the group consisting of proteins involved in induction or regulation of an interferon (IFN) response, proteins involved in apoptosis or apoptosis regulation and nanobody fusion constructs. Most preferred are proteins or a fragment thereof involved in apoptosis or apoptosis regulation or proteins or a fragment thereof involved in induction or regulation of an interferon (IFN) response, in particular proteins or a fragment thereof involved in induction or regulation of an interferon (IFN) response, like animal, preferably human heterologous proteins or a fragment thereof involved in apoptosis or apoptosis regulation or human proteins or a fragment thereof involved in induction or regulation of an interferon (IFN) response. Proteins involved in induction or regulation of an interferon (IFN) response or a fragment thereof are preferably proteins involved in induction or regulation of a type I interferon (IFN) response or a fragment thereof, more preferably human proteins or a fragment thereof involved in induction or regulation of a type I interferon (IFN) response.

In some embodiments the Gram-negative bacterial strain of the present invention comprises two nucleotide sequences encoding the identical or two different heterologous proteins or a fragment thereof fused independently from each other in frame to the 3'end of a nucleotide sequence encoding a delivery signal from a bacterial effector protein.

In some embodiments the Gram-negative bacterial strain of the present invention comprises three nucleotide sequences encoding the identical or three different heterologous proteins or a fragment thereof fused independently from each other in frame to the 3'end of a nucleotide sequence encoding a delivery signal from a bacterial effector protein. In some embodiments the Gram-negative bacterial strain of the present invention comprises four nucleotide sequences encoding the identical or four different heterologous proteins or a fragment thereof fused independently from each other in frame to the 3'end of a nucleotide sequence encoding a delivery signal from a bacterial effector protein.

The heterologous protein expressed by the recombinant Gram-negative bacterial strain has usually a molecular weight of between 1 and 150 kDa, preferably between 1 and 120 kDa, more preferably between land 100 kDa, most preferably between 10 and 80 kDa. A fragment of a heterologous protein contains usually between 10 and 1500 amino acids, preferably between 10 and 800 amino acids, more preferably between 100 and 800 amino acids, in particular between 100 and 500 amino acids. A fragment of a heterologous protein as defined herein does usually have the same functional properties as the heterologous protein from which it is derived. The term "the heterologous protein from which it is derived" in relation to a fragment refers to the full-length heterologous protein from which the fragment is derived. The term "same functional properties as the heterologous protein from which it is derived" refers to the molecular function (or one of the molecular functions) of the full-length protein from which the fragment is derived, which for example can be an enzymatic activity, a function in protein-protein interaction and/or acting as scaffold protein. With respect to a fragment of proteins involved in induction or regulation of an interferon (IFN) response, human cGAS and human RIG-I can serve as an example. Full-length human cGAS is a nucleotidyltransferase that catalyses the formation of cyclic GMP-AMP (cGAMP) from ATP and guanosine triphosphate (GTP). A fragment of human cGAS having "the same functional properties", shall be able to perform the same enzymatic activity (cGAMP synthesis from GTP and ATP in the case of cGAS). Likewise for human RIG-I, a cytoplasmic sensor for short double-stranded RNA that consists of an RNA helicase domain, a C-terminal domain and an N-terminal domain (Brisse & Ly, 2019). The helicase domain is responsible for double-stranded RNA recognition; the C-terminal domain includes a repressor domain; and the N-terminal domain includes two caspase-recruitment domains (CARDs) which activate downstream signalling pathways. Thus, a fragment of human RIG-I having "the same functional properties", shall be able to perform the same activity as one of the molecular functions of the full-length RIG-I, in case of the N-terminal CARD domain to activate corresponding activate downstream signalling pathways.

In some embodiments a fragment of a heterologous protein comprises a domain of a heterologous protein. Thus in some embodiments the Gram-negative bacterial strain of the present invention comprises a nucleotide sequence encoding a domain of a heterologous protein. Preferably the Gram-negative bacterial strain of the present invention comprises a nucleotide sequence encoding one or two domains of a heterologous protein, more preferably two domains of a heterologous protein.

In some embodiments the Gram-negative bacterial strain of the present invention comprises a nucleotide sequence encoding repeated domains of a heterologous protein or two or more domains of different heterologous proteins fused in frame to the 3'end of a nucleotide sequence encoding a delivery signal from a bacterial effector protein.

The term "heterologous proteins which belong to the same functional class of proteins" as used herein refers to heterologous proteins which have the same function e.g. heterologous proteins having specific enzymatic activity, heterologous proteins which act in the same pathway such as e.g. cell cycle regulation, or share a common specific feature as e.g. belonging to the same class of bacterial effector proteins. Functional classes of proteins are e.g. proteins involved in apoptosis or apoptosis regulation, proteins which act as cell cycle regulators, ankyrin repeat proteins, cell signaling proteins, proteins involved in induction or regulation of an interferon (IFN) response, reporter proteins, transcription factors, proteases, small GTPases, GPCR related proteins, nanobody fusion constructs and nanobodies, bacterial T3SS effectors, bacterial T4SS effectors or viral proteins which act jointly in the biological process of establishing virulence to eukaryotic cells.

According to the present invention, "a domain of a heterologous protein" includes domains of naturally occurring proteins and also includes domains of artificially engineered proteins. As used herein, the term "domain of a heterologous protein" refers to a domain of a heterologous protein other than a domain of a T3SS effector protein or a domain other than a domain comprising the N-terminal fragment thereof to which it can be fused to achieve a fusion protein. In particular the domain of a heterologous protein as used herein refers to a domain of a heterologous protein, which do not belong to the proteome, i.e. the entire natural protein complement of the specific recombinant Gram-negative bacterial strain provided and used by the invention, e.g. which do not belong to the proteome, i.e. the entire natural protein complement of a specific bacterial strain of the genera *Yersinia, Escherichia, Salmonella* or *Pseudomonas*. Usually the domain of the heterologous protein is of animal origin including human origin. Preferably the domain of the heterologous protein is a domain of a human protein. More preferably the domain of the heterologous protein is a domain of a protein selected from the group consisting of proteins involved in apoptosis or apoptosis regulation, proteins involved in induction or regulation of an interferon (IFN) response, cell cycle regulators, ankyrin repeat proteins, cell signaling proteins, reporter proteins, transcription factors, proteases, small GTPases, GPCR related proteins, nanobody fusion constructs and nanobodies, bacterial T3SS effectors, bacterial T4SS effectors and viral proteins. Particular preferably the domain of the heterologous protein is a domain of a protein selected from the group consisting of proteins involved in apoptosis or apoptosis regulation, proteins involved in induction or regulation of an interferon (IFN) response, cell cycle regulators, ankyrin repeat proteins, reporter proteins, small GTPases, GPCR related proteins, nanobody fusion constructs, bacterial T3SS effectors, bacterial T4SS effectors and viral proteins. Even more particular preferred are domains of heterologous proteins selected from the group consisting of proteins involved in apoptosis or apoptosis regulation, proteins involved in induction or regulation of an interferon (IFN) response, cell cycle regulators, and ankyrin repeat proteins. Most preferred are domains of proteins involved in induction or regulation of an interferon (IFN) response, like animal proteins involved in induction or regulation of an interferon (IFN) response, preferably domains of human heterologous proteins involved in induction or regulation of an interferon (IFN) response, in particular domains of human heterologous proteins involved in induction or regulation of a type 1 interferon (IFN) response.

The domain of a heterologous protein expressed by the recombinant Gram-negative bacterial strain has usually a molecular weight of between 1-50 kDa, preferably between 1-30 kDa, more preferably between 1-20 kDa, most preferably between 1-15 kDa.

According to the present invention "proteins involved in induction or regulation of an IFN response" include, but are not limited to, cGAS, STING, TRIF, TBK1, IKKepsilon, IRF3, TREX1, VPS34, ATG9a, DDX3, LC3, DDX41, IFI16, MRE11, DNA-PK, RIG1 (DDX58), MDA5, LGP2, IPS-1/MAVS/Cardif/VISA, Trim25, Trim32, Trim56, Riplet, TRAF2, TRAF3, TRAF5, TANK, IRF3, IRF7, IRF9, STAT1, STAT2, PKR, TLR3, TLR7, TLR9, DAI, IFI16, IFIX, MRE11, DDX41, LSm14A, LRRFIP1, DHX9, DHX36, DHX29, DHX15, Ku70, IFNAR1, IFNAR2, TYK2, JAK1, ISGF3, IL10R2, IFNLR1, IFNGR1, IFNGR2, JAK2, STAT4, cyclic dinucleotide generating enzymes (cyclic-di-AMP, cyclic-di-GMP and cyclic-di-GAMP cyclases) as WspR, DncV, DisA and DisA-like, CdaA, CdaS and cGAS or a fragment thereof. Preferred proteins involved in induction or regulation of an IFN response are selected from the group consisting of cGAS, STING, TRIF, TBK1, IKKepsilon, IRF3, TREX1, VPS34, ATG9a, DDX3, LC3, DDX41, IFI16, MRE11, DNA-PK, RIG1 (DDX58), MDA5, LGP2, IPS-1/MAVS/Cardif/VISA, Trim25, Trim32, Trim56, Riplet, TRAF2, TRAF3, TRAF5, TANK, IRF3, IRF7, IRF9, STAT1, STAT2, PKR, TLR3, TLR7, TLR9, DAI, IFI16, IFIX, MRE11, DDX41, LSm14A, LRRFIP1, DHX9, DHX36, DHX29, DHX15, Ku70, IFNAR1, IFNAR2, TYK2, JAK1, ISGF3, IL10R2, IFNLR1, IFNGR1, IFNGR2, JAK2, STAT4, cyclic dinucleotide generating enzymes (cyclic-di-AMP, cyclic-di-GMP and cyclic-di-GAMP cyclases) as WspR, DncV, DisA and DisA-like, CdaA, CdaS and cGAS or a fragment thereof.

According to the present invention "proteins involved in induction or regulation of a type I IFN response" include, but are not limited to, cGAS, STING, TRIF, TBK1, IKKepsilon, IRF3, TREX1, VPS34, ATG9a, DDX3, LC3, DDX41, IFI16, MRE11, DNA-PK, RIG1, MDA5, LGP2, IPS-1/MAVS/Cardif/VISA, Trim25, Trim32, Trim56, Riplet, TRAF2, TRAF3, TRAF5, TANK, IRF3, IRF7, IRF9, STAT1, STAT2, PKR, TLR3, TLR7, TLR9, DAI, IFI16, IFIX, MRE11, DDX41, LSm14A, LRRFIP1, DHX9, DHX36, DHX29, DHX15, Ku70, cyclic dinucleotide generating enzymes (cyclic-di-AMP, cyclic-di-GMP and cyclic-di-GAMP cyclases) as WspR, DncV, DisA and DisA-like, CdaA, CdaS and cGAS or a fragment thereof.

Preferred proteins involved in induction or regulation of a type I IFN response are selected from the group consisting of cGAS, STING, TRIF, TBK1, IKKepsilon, IRF3, TREX1, VPS34, ATG9a, DDX3, LC3, DDX41, IFI16, MRE11, DNA-PK, RIG1, MDA5, LGP2, IPS-1/MAVS/Cardif/VISA, Trim25, Trim32, Trim56, Riplet, TRAF2, TRAF3, TRAF5, TANK, IRF3, IRF7, IRF9, STAT1, STAT2, PKR, LSm14A, LRRFIP1, DHX29, DHX15, or a fragment thereof, and cyclic dinucleotide generating enzymes such as cyclic-di-AMP, cyclic-di-GMP and cyclic-di-GAMP cyclases selected from the group consisting of WspR, DncV, DisA and DisA-like, CdaA, CdaS and cGAS, or a fragment thereof.

More preferred proteins involved in induction or regulation of a type I IFN response are selected from the group consisting of cGAS (as Uniprot. Q8N884 for the human protein), RIG1 (as Uniprot. O95786 for the human protein), MDA5 (as Uniprot. Q9BYX4 for the human protein), IPS-1/MAVS (as Uniprot. Q7Z434 for the human protein), IRF3 (as Uniprot. Q14653 for the human protein), IRF7 (as Uniprot. Q92985 for the human protein), IRF9 (as Uniprot. Q00978 for the human protein) and cyclic dinucleotide generating enzymes such as cyclic-di-AMP, cyclic-di-GMP and cyclic-di-GAMP cyclases selected from the group consisting of WspR (as Uniprot. Q9HXT9 for the *P. aeruginosa* protein), DncV (as Uniprot. Q9KVG7 for the *V. cholerae* protein), DisA and DisA-like (as Uniprot. Q812L9 for the *B. cereus* protein), CdaA (as Uniprot. Q8Y5E4 for the *L. monocytogenes* protein), CdaS (as Uniprot. 031854 or constitutive active L44F mutation for the *B. subtilis* protein) and cGAS (as Uniprot. Q8N884 for the human protein) or a fragment of these proteins.

IPS-1/MAVS/Cardif/VISA refer to the eukaryotic mitochondrial antiviral-signaling protein containing an N-terminal CARD domain and with the Uniprot (www.uniprot.org) identifier for the human sequence "Q7Z434" and "Q8VCF0" for the murine sequence. The terms "IPS-1/MAVS", "MAVS/IPS-1" and "MAVS" are used herein interchangeably and refer to the eukaryotic mitochondrial antiviral-signaling protein containing an N-terminal CARD domain and with the Uniprot (www.uniprot.org) identifier for the human sequence "Q7Z434" and "Q8VCF0" for the murine sequence.

In some embodiments the heterologous proteins involved in induction or regulation of a type I IFN response are selected from the group consisting of a CARD domain containing proteins or a fragment thereof and cyclic dinucleotide generating enzymes such as cyclic-di-AMP, cyclic-di-GMP and cyclic-di-GAMP cyclases or a fragment thereof. CARD domain containing heterologous proteins involved in induction or regulation of a type I IFN response are e.g. RIG1, which normally contains two CARD domains, MDA5 which normally contains two CARD domains, and MAVS which normally contains one CARD domain.

A fragment of a heterologous proteins involved in induction or regulation of a IFN response or a type I IFN response contains usually between 25 and 1000 amino acids, preferably between 50 and 600 amino acids, more preferably between 100 and 500 amino acids, even more preferably between 100 and 362 amino acids. In some embodiments a fragment of a heterologous proteins involved in induction or regulation of a IFN response or a type I IFN response comprises a fragment of the heterologous proteins involved in induction or regulation of a IFN response or a type I IFN response which contains usually between 25 and 1000 amino acids, preferably between 50 and 600 amino acids, more preferably between 100 and 500 amino acids, even more preferably between 100 and 362 amino acids, in particular between 100 and 246 amino acids or, comprises a fragment of the heterologous protein involved in induction or regulation of a IFN response or a type I IFN response which has a deletion of an amino acid sequence containing between amino acid 1 and amino acid 160 of the N-terminal amino acids, preferably a deletion of an amino acid sequence containing N-terminal amino aids 1-59 or N-terminal amino aids 1-160, and wherein the fragment of the heterologous protein involved in induction or regulation of a IFN response or a type I IFN response contains usually between 25 and 1000 amino acids, preferably between 50 and 600 amino acids, more preferably between 100 and 500 amino acids, even more preferably between 100 and 362 amino acids.

A fragment of a CARD domain containing heterologous proteins involved in induction or regulation of a IFN response or a type I IFN response contains usually an amino acid sequence from N-terminal amino acid 1 to any of amino acid 100-500, preferably an amino acid sequence from N-terminal amino acid 1 to any of amino acid 100-400, more preferably an amino acid sequence from N-terminal amino acid 1 to any of amino acid 100-300, more preferably an amino acid sequence from N-terminal amino acid 1 to any of amino acid 100-294, more preferably an amino acid sequence from N-terminal amino acid 1 to any of amino acid 100-246.

In some embodiments a fragment of a CARD domain containing heterologous proteins involved in induction or regulation of a IFN response or a type I IFN response contains an amino acid sequence selected from the group consisting of an amino acid sequence comprising at least N-terminal amino acid 1 and no more than amino acid 294, an amino acid sequence comprising at least N-terminal amino acid 1 and no more than amino acid 246, an amino acid sequence comprising at least N-terminal amino acid 1 and no more than amino acid 245, an amino acid sequence comprising at least N-terminal amino acid 1 and no more than amino acid 231, an amino acid sequence comprising at least N-terminal amino acid 1 and no more than amino acid 229, an amino acid sequence comprising at least N-terminal amino acid 1 and no more than amino acid 228, an amino acid sequence comprising at least N-terminal amino acid 1 and no more than amino acid 218, an amino acid sequence comprising at least N-terminal amino acid 1 and no more than amino acid 217, an amino acid sequence comprising at least N-terminal amino acid 1 and no more than amino acid 100 and an amino acid sequence comprising at least N-terminal amino acid 1 and no more than amino acid 101, more particular an amino acid sequence selected from the group consisting of an amino acid sequence comprising at least N-terminal amino acid 1 and no more than amino acid 245, an amino acid sequence comprising at least N-terminal amino acid 1 and no more than amino acid 228, an amino acid sequence comprising at least N-terminal amino acid 1 and no more than amino acid 217 and an amino acid sequence comprising at least N-terminal amino acid 1 and no more than amino acid 100, most particular an amino acid sequence comprising at least N-terminal amino acid 1 and no more than amino acid 245, of a CARD domain containing heterologous protein, preferably of a human CARD domain containing heterologous protein.

In some preferred embodiments the heterologous protein is a fragment of a CARD domain containing heterologous protein involved in induction or regulation of a IFN response or a type I IFN response or comprises a fragment of a CARD domain containing heterologous protein involved in induction or regulation of a IFN response or a type I IFN response. Usually the fragment of a CARD domain containing heterologous protein involved in induction or regulation of a IFN response or a type I IFN response comprises at least one CARD domain. In these embodiments the heterologous protein in particular contains or consists of an amino acid sequence selected from the group consisting of an amino acid sequence from N-terminal amino acid 1 to amino acid 294, an amino acid sequence from N-terminal amino acid 1 to amino acid 246, an amino acid sequence from N-terminal amino acid 1 to amino acid 245, an amino acid sequence from N-terminal amino acid 1 to amino acid 231, an amino acid sequence from N-terminal amino acid 1 to amino acid 229, an amino acid sequence from N-terminal amino acid 1 to amino acid 228, an amino acid sequence from N-terminal amino acid 1 to amino acid 218, an amino acid sequence from N-terminal amino acid 1 to amino acid 217, an amino acid sequence from N-terminal amino acid 1 to amino acid 100, an amino acid sequence from N-terminal amino acid 1 to amino acid 101, more particular an amino acid sequence selected from the group consisting of an amino acid sequence from N-terminal amino acid 1 to amino acid 245, an amino acid sequence from N-terminal amino acid 1 to amino acid 228, an amino acid sequence from N-terminal amino acid 1 to amino acid 217 and an amino acid sequence from N-terminal amino acid 1 to amino acid 100 of a heterologous protein involved in induction or regulation of a IFN response or a type I IFN response containing a CARD domain.

In these embodiments the heterologous protein more particular contains or consists of an amino acid sequence selected from the group consisting of an amino acid sequence from N-terminal amino acid 1 to amino acid 246, an amino acid sequence from N-terminal amino acid 1 to amino acid 245, an amino acid sequence from N-terminal amino acid 1 to amino acid 229, an amino acid sequence from N-terminal amino acid 1 to amino acid 228, an amino acid sequence from N-terminal amino acid 1 to amino acid 218, and an amino acid sequence from N-terminal amino acid 1 to amino acid 217, in particular an amino acid sequence from N-terminal amino acid 1 to amino acid 245, an amino acid sequence from N-terminal amino acid 1 to amino acid 228, an amino acid sequence from N-terminal amino acid 1 to amino acid 217, most particular an amino acid sequence from N-terminal amino acid 1 to amino acid 245, of RIG-1, or

- an amino acid sequence selected from the group consisting of an amino acid sequence from N-terminal amino acid 1 to amino acid 100, and an amino acid sequence from N-terminal amino acid 1 to amino acid 101 of MAVS, or an amino acid sequence selected from the group consisting of an amino acid sequence from N-terminal amino acid 1 to amino acid 294 and an amino acid sequence from N-terminal amino acid 1 to amino acid 231 of MDA5, even more particular an amino acid sequence selected from the group consisting of an amino acid sequence from N-terminal amino acid 1 to amino acid 245, an amino acid sequence from N-terminal amino acid 1 to amino acid 228, and an amino acid sequence from N-terminal amino acid 1 to amino acid 217 of RIG-1, or
- an amino acid sequence from N-terminal amino acid 1 to amino acid 100, of MAVS, or an amino acid sequence selected from the group consisting of an amino acid sequence from N-terminal amino acid 1 to amino acid 294 and an amino acid sequence from N-terminal amino acid 1 to amino acid 231 of MDA5.

Most preferred are the amino acid sequence from N-terminal amino acid 1 to amino acid 245 of human RIG-I and the amino acid sequence from N-terminal amino acid 1 to amino acid 246 of murine RIG-1. The human RIG-1 1-245 fragment and the murine RIG-1 1-246 fragment correspond to each other by a sequence identity of 73% (and sequence similarity of 85%) and they are functionally equivalent i.e. both fragments show equivalent activity in murine cells and human cells.

In some preferred embodiments the heterologous protein is a fragment of cyclic dinucleotide generating enzymes such as cyclic-di-AMP, cyclic-di-GMP and cyclic-di-GAMP cyclases. A fragment of cyclic dinucleotide generating enzymes such as cyclic-di-AMP, cyclic-di-GMP and cyclic-di-GAMP cyclases contains usually an amino acid sequence from N-terminal amino acid 1 to any of amino acid 100-600, preferably an amino acid sequence from amino acid 50 to any of amino acid 100-550, more preferably an amino acid sequence from amino acid 60 to any of amino acid 100-530, in particular an amino acid sequence from amino acid 60 to amino acid 530, more particular an amino acid sequence from amino acid 146 to amino acid 507 or an amino acid sequence from amino acid 161 to amino acid 522, most particular an amino acid sequence from amino acid 161 to amino acid 522 of the cyclic dinucleotide generating enzymes, preferably of the human cGAS. In some embodiments a fragment of cGAS contains in particular an amino acid sequence selected from the group consisting of an amino acid sequence comprising at least amino acid 60 and no more than amino acid 422, an amino acid sequence comprising at least amino acid 146 and no more than amino acid 507, and an amino acid sequence comprising at least amino acid 161 and no more than amino acid 522. In some embodiments a fragment of cGAS contains more particular an amino acid sequence selected from the group consisting of an amino acid sequence from amino acid 60 to amino acid 422, an amino acid sequence from amino acid 146 to amino acid 507, and an amino acid sequence from amino acid 161 to amino acid 522, most preferably an amino acid sequence from amino acid 161 to amino acid 522.

In a more preferred embodiment the heterologous protein involved in induction or regulation of a type I IFN response is selected from the group consisting of a CARD domain comprising RIG1, MDA5, and MAVS or a fragment thereof, wherein the fragment comprises at least one CARD domain, and cGAS and a fragment thereof, in particular selected from the group consisting of a CARD domain comprising RIG1 and a fragment thereof, wherein the fragment comprises at least one CARD domain, a CARD domain comprising MAVS and a fragment thereof, wherein the fragment comprises at least one CARD domain, and cGAS and a fragment thereof. Fragments of these proteins as outlined supra are particular preferred. In this more preferred embodiment, a CARD domain comprising RIG1, MDA5, MAVS comprises the naturally occurring CARD domain(s) and optionally additionally C-terminal amino acids following the naturally occurring CARD domain(s) e.g. comprising the naturally occurring helicase domain in case of RIG-1 or a fragment thereof, preferably a fragment containing 1-500, more preferably 1-250, even more preferably 1-150 amino acids wherein the naturally occurring helicase domain or fragment thereof is not functional, i.e. does not bind a CARD domain or, comprises optionally the downstream C-terminal sequence in case of MAVS or a fragment thereof, preferably a fragment containing 1-500, more preferably 1-250, even more preferably 1-150 amino acids. In these embodiments cGAS and a fragment thereof comprises usually the naturally occurring synthase domain (NTase core and C-terminal domain; amino acids 160-522 of the human cGAS as described in[65] and as Uniprot. Q8N884 for the human protein), preferably cGAS and a fragment thereof comprises the naturally occurring synthase domain, but has a deletion of a part or the complete N-terminal domain, preferably a deletion of the complete N-terminal helical extension (N-terminal helical extension; amino acids 1-160 of the human cGAS as described in[65] and as Uniprot. Q8N884 for the human protein). The deletion of a part or the complete N-terminal domain is preferably a deletion of the amino acids 1-59.

In a preferred embodiment the heterologous proteins involved in induction or regulation of a type I IFN response are selected from the group consisting of the RIG-I-like receptor (RLR) family (as RIG1 and MDA5) and/or a fragment thereof, other CARD domain containing proteins involved in antiviral signaling and type I IFN induction (as MAVS) and/or a fragment thereof and cyclic dinucleotide generating enzymes such as cyclic-di-AMP, cyclic-di-GMP and cyclic-di-GAMP cyclases selected from the group consisting of WspR, DncV, DisA and DisA-like, CdaA, CdaS and cGAS, and/or a fragment thereof, leading to stimulation of STING. The term "other CARD domain containing proteins involved in antiviral signaling and type I IFN induction and a fragment thereof" include MAVS, CRADD/RAIDD, RIPK2/RIP2, CARD6, NOD1 and NOD2, or a fragment thereof. Thus, in a further preferred embodiment the heterologous proteins involved in induction or regulation of a type I IFN response are selected from the group consisting of the RIG-I-like receptor (RLR) family (as RIG1 and MDA5) or a fragment thereof, other CARD domain containing proteins involved in antiviral signaling and type I IFN induction selected from the group consisting of MAVS, CRADD/RAIDD, RIPK2/RIP2, CARD6, NOD1 and NOD2, or a fragment thereof, and cyclic dinucleotide generating enzymes such as cyclic-di-AMP, cyclic-di-GMP and cyclic-di-GAMP cyclases selected from the group consisting of WspR, DncV, DisA and DisA-like, CdaA, CdaS and cGAS, or a fragment thereof, leading to stimulation of STING.

In some embodiments the heterologous proteins involved in induction or regulation of a type I IFN response are selected from the group consisting of RIG1, MDA5, LGP2, MAVS, WspR, DncV, DisA and DisA-like, CdaA, CdaS and cGAS or a fragment thereof, more preferably selected from the group consisting of RIG1, MAVS, MDA5, WspR, DncV, DisA-like, and cGAS or a fragment thereof, most preferably selected from the group consisting of RIG1 or a fragment thereof and cGAS or a fragment thereof.

In a more preferred embodiment the protein involved in induction or regulation of a type I IFN response is selected from the group consisting of RIG1, MDA5, MAVS, WspR, DncV, DisA and DisA-like, CdaA, and cGAS or a fragment thereof, even more preferably selected from the group consisting of RIG1, MDA5, MAVS, WspR, DncV, DisA-like, CdaA, and cGAS or a fragment thereof, in particular selected from the group consisting of RIG1, MDA5, MAVS and cGAS or a fragment thereof. Fragments of these proteins as described supra are particular preferred.

In this more preferred embodiment a fragment of RIG1, MDA5, MAVS usually contains an amino acid sequence from N-terminal amino acid 1 to any of amino acid 100-500, preferably an amino acid sequence from N-terminal amino acid 1 to any of amino acid 100-400, more preferably an amino acid sequence from N-terminal amino acid 1 to any of amino acid 100-300.

In this more preferred embodiment a fragment of RIG1 contains an amino acid sequence selected from the group consisting of an amino acid sequence comprising at least N-terminal amino acid 1 and no more than amino acid 246, an amino acid sequence comprising at least N-terminal amino acid 1 and no more than amino acid 245, an amino acid sequence comprising at least N-terminal amino acid 1 and no more than amino acid 229, an amino acid sequence comprising at least N-terminal amino acid 1 and no more than amino acid 228, an amino acid sequence comprising at least N-terminal amino acid 1 and no more than amino acid 218, and an amino acid sequence comprising at least N-terminal amino acid 1 and no more than amino acid 217, in particular an amino acid sequence comprising at least N-terminal amino acid 1 and no more than amino acid 245; a fragment of MDA5 contains an amino acid sequence selected from the group consisting of an amino acid sequence comprising at least N-terminal amino acid 1 and no more than amino acid 294, an amino acid sequence comprising at least N-terminal amino acid 1 and no more than amino acid 231, and a fragment of MAVS contains an amino acid sequence selected from the group consisting of an amino acid sequence comprising at least N-terminal amino acid 1 and no more than amino acid 100 and an amino acid sequence comprising at least N-terminal amino acid 1 and no more than amino acid 101.

In this more preferred embodiment a fragment of RIG1 contains more particular an amino acid sequence selected from the group consisting of an amino acid sequence from N-terminal amino acid 1 to amino acid 246, an amino acid sequence from N-terminal amino acid 1 to amino acid 245, an amino acid sequence from N-terminal amino acid 1 to amino acid 229, an amino acid sequence from N-terminal amino acid 1 to amino acid 228, an amino acid sequence from N-terminal amino acid 1 to amino acid 218, and an amino acid sequence from N-terminal amino acid 1 to amino acid 217, even more particular an amino acid sequence from N-terminal amino acid 1 to amino acid 245, an amino acid sequence from N-terminal amino acid 1 to amino acid 228, an amino acid sequence from N-terminal amino acid 1 to amino acid 217, most particular an amino acid sequence from N-terminal amino acid 1 to amino acid 245; a fragment of MDA5 contains more particular an amino acid sequence selected from the group consisting of an amino acid sequence from N-terminal amino acid 1 to amino acid 294 and an amino acid sequence from N-terminal amino acid 1 to amino acid 231; and a fragment of MAVS contains more particular an amino acid sequence selected from the group consisting of amino acid sequence from N-terminal amino acid 1 to amino acid 100 and an amino acid sequence from N-terminal amino acid 1 to amino acid 101.

In this more preferred embodiment a fragment of cGAS contains usually an amino acid sequence from N-terminal amino acid 1 to any of amino acid 100-600, preferably an amino acid sequence from amino acid 50 to any of amino acid 100-550, more preferably an amino acid sequence from amino acid 60 to any of amino acid 100-530, in particular an amino acid sequence from amino acid 60 to amino acid 530, an amino acid sequence from amino acid 146 to amino acid 507 or an amino acid sequence from amino acid 161 to amino acid 530, more particular an amino acid sequence from amino acid 60 to amino acid 530, or an amino acid sequence from amino acid 161 to amino acid 530 of the human cGAS.

In this more preferred embodiment a fragment of cGAS contains in particular an amino acid sequence selected from the group consisting of an amino acid sequence comprising at least amino acid 60 and no more than amino acid 422, an amino acid sequence comprising at least amino acid 146 and no more than amino acid 507, and an amino acid sequence comprising at least amino acid 161 and no more than amino acid 522.

In this more preferred embodiment a fragment of cGAS contains more particular an amino acid sequence selected from the group consisting of an amino acid sequence from amino acid 60 to amino acid 422, an amino acid sequence from amino acid 146 to amino acid 507, an amino acid sequence from amino acid 161 to amino acid 522, most particular an amino acid sequence from amino acid 161 to amino acid 522.

In an even more preferred embodiment the protein involved in induction or regulation of a type I IFN response is selected from the group consisting of human RIG1 CARD domains$_{1-245}$ (SEQ ID NO: 1), human RIG1 CARD domains$_{1-228}$ (SEQ ID NO: 2), human RIG1 CARD domains$_{1-217}$ (SEQ ID NO: 3), murine RIG1 CARD domains$_{1-246}$ (SEQ ID NO: 4), murine RIG1 CARD domains$_{1-229}$ (SEQ ID NO: 5), murine RIG1 CARD domains$_{1-218}$ (SEQ ID NO: 6), human MAVS CARD domain$_{1-100}$ (SEQ ID NO: 7), murine MAVS CARD domain$_{1-101}$ (SEQ ID NO: 8), *N. vectensis* cGAS (SEQ ID NO: 9), human cGAS$_{161-522}$ (SEQ ID NO: 10), murine cGAS$_{146-507}$ (SEQ ID NO: 11), *N. vectensis* cGAS$_{60-422}$ (SEQ ID NO: 12), murine MDA5$_{1-294}$ (SEQ ID NO: 13), murine MDA5$_{1-231}$ (SEQ ID NO: 14), human MDA5$_{1-294}$ (SEQ ID NO: 15), and human MDA5$_{1-231}$ (SEQ ID NO: 16).

In a particular preferred embodiment the protein involved in induction or regulation of a type I IFN response is selected from the group consisting of human RIG1 CARD domains$_{1-245}$, (SEQ ID NO: 1), human RIG1 CARD domains$_{1-228}$ (SEQ ID NO: 2), human RIG1 CARD domains$_{1-217}$ (SEQ ID NO: 3), human MAVS CARD domain$_{1-100}$ (SEQ ID NO: 7), and human cGAS$_{161-522}$ (SEQ ID NO: 10).

In a more particular preferred embodiment the protein involved in induction or regulation of a type I IFN response is selected from the group consisting of human RIG1 CARD domains$_{1-245}$ (SEQ ID NO: 1), murine RIG1 CARD domains$_{1-246}$ (SEQ ID NO: 4), murine RIG1 CARD domains$_{1-229}$ (SEQ ID NO: 5), murine RIG1 CARD domains$_{1-218}$ (SEQ ID NO: 6), and human cGAS$_{161-522}$ (SEQ ID NO: 10), most particular selected from the group consisting of human RIG1 CARD domains$_{1-245}$ (SEQ ID NO: 1) and human cGAS$_{161-522}$ (SEQ ID NO: 10).

The RIG-I-like receptor (RLR) family comprises proteins selected from the group consisting of RIG1, MDA5 and LGP2. Preferred heterologous proteins involved in induction or regulation of a type I IFN response are the CARD domain containing proteins RIG1 and MDA5, in particular the CARD domain containing protein RIG1. Other preferred CARD domain containing proteins involved in type I IFN induction comprises proteins selected form the group consisting of MAVS.

In some preferred embodiments the heterologous proteins involved in induction or regulation of a type I IFN response are selected from the group of proteins comprising a CARD domain of RIG1, a CARD domain of MDA5, and/or a CARD domain of MAVS, and WspR, DncV, DisA and DisA-like, CdaA, CdaS and cGAS and a fragment thereof, preferably selected from the group of proteins comprising of a CARD domain of RIG1, a CARD domain of MDA5 and/or a CARD domain of MAVS, and WspR, DncV, DisA and DisA-like, CdaA, and cGAS or a fragment thereof.

In some preferred embodiments the heterologous proteins involved in induction or regulation of a type I IFN response are selected from the group consisting of a CARD domain of RIG1, a CARD domain of MDA5, a CARD domain of MAVS, WspR, DncV, DisA and DisA-like, CdaA, CdaS and cGAS, more preferably selected from the group consisting of a CARD domain of RIG1, WspR, DncV, DisA-like, and cGAS.

In some preferred embodiments the heterologous proteins involved in induction or regulation of a type I IFN response comprises one or more (e.g. two, three or four) CARD domains, preferably comprises one or more (e.g. two, three or four) CARD domains of RIG1, MDA5, and/or MAVS, preferably of RIG1 and/or MAVS. In a more preferred embodiment the heterologous proteins involved in induction or regulation of a type I IFN response comprises both CARD domains of RIG1, both CARD domains of MDA5 and/or the CARD domain of MAVS and cGAS or a fragment thereof, in particular both CARD domains of RIG1 and cGAS or a fragment thereof, more particular both CARD domains of RIG1.

In some embodiments the heterologous proteins involved in induction or regulation of a type I IFN response are selected from the group consisting of a type I IFN response inducing protein without enzymatic function and a type I IFN response inducing protein with enzymatic function. A type I IFN response inducing protein without enzymatic function encompassed by the present invention comprise usually at least one CARD domain preferably two CARD domains. A CARD domain is normally composed of a bundle of six to seven alpha-helices, preferably an arrangement of six to seven antiparallel alpha helices with a hydrophobic core and an outer face composed of charged residues. A type I IFN response inducing protein with enzymatic function encompassed by the present invention comprise usually a cyclic dinucleotide generating enzyme (cyclic-di-AMP, cyclic-di-GMP and cyclic-di-GAMP cyclases) or a domain thereof leading to stimulation of STING, preferably a di-adenylate-cyclase (DAC), di-guanlyate-cyclase (DGC) or GMP-AMP-cylcase (GAC) or domain thereof.

According to the present invention “proteins involved in apoptosis or apoptosis regulation” include, but are not limited to, Bad, Blc2, Bak, Bmt, Bax, Puma, Noxa, Bim, Bcl-xL, Apaf1, Caspase 9, Caspase 3, Caspase 6, Caspase 7, Caspase 10, DFFA, DFFB, ROCK1, APP, CAD, ICAD, CAD, EndoG, AIF, HtrA2, Smac/Diablo, Arts, ATM, ATR, Bok/Mtd, Bmf, Mcl-1(S), IAP family, LC8, PP2B, 14-3-3 proteins, PKA, PKC, PI3K, Erk1/2, p90RSK, TRAF2, TRADD, FADD, Daxx, Caspase8, Caspase2, RIP, RAIDD, MKK7, INK, FLIPs, FKHR, GSK3, CDKs and their inhibitors like the INK4-family (p16(Ink4a), p15(Ink4b), p18 (Ink4c), p19(Ink4d)), and the Cip1/Waf1/Kip1-2-family (p21(Cip1/Waf1), p27(Kip1), p57(Kip2). Preferably Bad, Bmt, Blc2, Bak, Bax, Puma, Noxa, Bim, Bcl-xL, Caspase9, Caspase3, Caspase6, Caspase7, Smac/Diablo, Bok/Mtd, Bmf, Mcl-1(S), LC8, PP2B, TRADD, Daxx, Caspase8, Caspase2, RIP, RAIDD, FKHR, CDKs and their inhibitors like the INK4-family (p16(Ink4a), p15(Ink4b), p18(Ink4c), p19(Ink4d)), most preferably BIM, Bid, truncated Bid, FADD, Caspase 3 (and subunits thereof), Bax, Bad, Akt, CDKs and their inhibitors like the INK4-family (p16(Ink4a), p15(Ink4b), p18(Ink4c), p19(Ink4d)) are used[11-13]. Additionally proteins involved in apoptosis or apoptosis regulation include DIVA, Bcl-Xs, Nbk/Bik, Hrk/Dp5, Bid and tBid, Egl-1, Bcl-Gs, Cytochrome C, Beclin, CED-13, BNIP1, BNIP3, Bcl-B, Bcl-W, Ced-9, A1, NR13, Bfl-1, Caspase 1, Caspase 2, Caspase 4, Caspase 5, Caspase 8.

Proteins involved in apoptosis or apoptosis regulation are selected from the group consisting of pro-apoptotic proteins, anti-apoptotic proteins, inhibitors of apoptosis-prevention pathways and inhibitors of pro-survival signalling or pathways. Pro-apoptotic proteins comprise proteins selected form the group consisting of Bax, Bak, Diva, Bcl-Xs, Nbk/Bik, Hrk/Dp5, Bmf, Noxa, Puma, Bim, Bad, Bid and tBid, Bok, Apaf1, Smac/Diablo, BNIP1, BNIP3, Bcl-Gs, Beclin 1, Egl-1 and CED-13, Cytochrome C, FADD, the Caspase family, and CDKs and their inhibitors like the INK4-family (p16(Ink4a), p15(Ink4b), p18(Ink4c), p19 (Ink4d)) or selected from the group consisting of Bax, Bak, Diva, Bcl-Xs, Nbk/Bik, Hrk/Dp5, Bmf, Noxa, Puma, Bim, Bad, Bid and tBid, Bok, Egl-1, Apaf1, Smac/Diablo, BNIP1, BNIP3, Bcl-Gs, Beclin 1, Egl-1 and CED-13, Cytochrome C, FADD, and the Caspase family. Preferred are Bax, Bak, Diva, Bcl-Xs, Nbk/Bik, Hrk/Dp5, Bmf, Noxa, Puma, Bim, Bad, Bid and tBid, Bok, Egl-1, Apaf1, BNIP1, BNIP3, Bcl-Gs, Beclin 1, Egl-1 and CED-13, Smac/Diablo, FADD, the Caspase family, CDKs and their inhibitors like the INK4-family (p16(Ink4a), p15(Ink4b), p18(Ink4c), p19 (Ink4d)). Equally preferred are Bax, Bak, Diva, Bcl-Xs, Nbk/Bik, Hrk/Dp5, Bmf, Noxa, Puma, Bim, Bad, Bid and tBid, Bok, Apaf1, BNIP1, BNIP3, Bcl-Gs, Beclin 1, Egl-1 and CED-13, Smac/Diablo, FADD, the Caspase family.

Anti-apoptotic proteins comprise proteins selected form the group consisting of Bcl-2, Bcl-Xl, Bel-B, Bcl-W, Mcl-1, Ced-9, A1, NR13, IAP family and Bfl-1. Preferred are Bcl-2, Bcl-Xl, Bel-B, Bcl-W, Mcl-1, Ced-9, A1, NR13 and Bfl-1. Inhibitors of apoptosis-prevention pathways comprise proteins selected form the group consisting of Bad, Noxa and Cdc25A. Preferred are Bad and Noxa. Inhibitors of pro-survival signalling or pathways comprise proteins selected from the group consisting of PTEN, ROCK, PP2A, PHLPP, INK, p38. Preferred are PTEN, ROCK, PP2A and PHLPP.

In some embodiments, the heterologous proteins involved in apoptosis or apoptosis regulation are selected from the group consisting of BH3-only proteins, caspases and intracellular signalling proteins of death receptor control of apoptosis or a fragment thereof. BH3-only proteins or a fragment thereof are preferred.

BH3-only proteins comprise proteins selected form the group consisting of Bad, BIM, Bid and tBid, Puma, Bik/Nbk, Bod, Hrk/Dp5, BNIP1, BNIP3, Bmf, Noxa, Mcl-1, Bcl-Gs, Beclin 1, Egl-1 and CED-13. Preferred are Bad, BIM, Bid and tBid, in particular tBid.

Caspases comprise proteins selected form the group consisting of Caspase 1, Caspase 2, Caspase 3, Caspase 4, Caspase 5, Caspase 6, Caspase 7, Caspase 8, Caspase 9, Caspase 10. Preferred are Caspase 3, Caspase 8 and Caspase 9.

Intracellular signalling proteins of death receptor control of apoptosis comprise proteins selected form the group consisting of FADD, TRADD, ASC, BAP31, GULP1/CED-6, CIDEA, MFG-E8, CIDEC, RIPK1/RIP1, CRADD, RIPK3/RIP3, Crk, SHB, CrkL, DAXX, the 14-3-3 family, FLIP, DFF40 and 45, PEA-15, SODD. Preferred are FADD and TRADD.

In some embodiments two heterologous proteins involved in apoptosis or apoptosis regulation are comprised by the Gram-negative bacterial strain, wherein one protein is a pro-apoptotic protein and the other protein is an inhibitor of apoptosis-prevention pathways or wherein one protein is a pro-apoptotic protein and the other protein is an inhibitor of pro-survival signalling or pathways.

Pro-apoptotic proteins encompassed by the present invention have usually an alpha helical structure, preferably a hydrophobic helix surrounded by amphipathic helices and usually comprise at least one of BH1, BH2, BH3 or BH4 domains, preferably comprise at least one BH3 domain. Usually pro-apoptotic proteins encompassed by the present invention have no enzymatic activity.

Anti-apoptotic proteins encompassed by the present invention have usually an alpha helical structure, preferably a hydrophobic helix surrounded by amphipathic helices and comprises a combination of different BH1, BH2, BH3 and BH4 domains, preferably a combination of different BH1, BH2, BH3 and BH4 domains wherein a BH1 and a BH2 domain is present, more preferably BH4-BH3-BH1-BH2, BH1-BH2, BH4-BH1-BH2 or BH3-BH1-BH2 (from N- to the C-terminus). Additionally, proteins containing at least one BIR domain are also encompassed.

Inhibitors of apoptosis-prevention pathways encompassed by the present invention have usually an alpha helical structure, preferably a hydrophobic helix surrounded by amphipathic helices and usually comprise one BH3 domain.

BH1, BH2, BH3 or BH4 domains are each usually between about 5 to about 50 amino acids in length. Thus in some embodiments the heterologous proteins involved in apoptosis or apoptosis regulation is selected from the group consisting of heterologous proteins involved in apoptosis or apoptosis regulation which are about 5 to about 200, preferably about 5 to about 150, more preferably about 5 to about 100, most preferably about 5 to about 50, in particular about 5 to about 25 amino acids in length.

A particular preferred heterologous protein is the BH3 domain of apoptosis inducer tBID, more particular the BH3 domain comprising a sequence selected from the group consisting of SEQ ID NOs: 17-20, preferably SEQ ID NO: 17 or SEQ ID NO: 18. Equally preferred is the BH3 domain of apoptosis regulator BAX, more particular the BAX domain comprising a sequence selected from the group consisting of SEQ ID NOs: 21-24, preferably SEQ ID NO: 21 or SEQ ID NO: 22. The human and murine sequences are given in SEQ ID NOs, but tBID and BAX BH3 domains of all other species are equally included.

According to the present invention "cell cycle regulators" include, but are not limited to cyclins (such as Cyclin A, Cyclin B, Cyclin D1, CyclinD2, CyclinD3, Cyclin E, CyclinH), cyclin dependent kinases (CDKs, as CDK1, CDK2, CDK4, CDK6) and CDK activating kinases (as CDK7), Cdk inhibitors (such as INK4 family including INK4A, INK4B, INK4C, INNK4D and Cip/Kip family that includes p21 (Waf1, Cip1), p27 (Cip2), p57 (Kip2)), CDK substrates (such as the product of the retinoblastoma tumour suppressor gene, NPAT, HistoneH1, p107, p130) and anaphase promoting complex/cyclosome and cell-cycle-checkpoint proteins (such as Mad1, Mad2, BubR1, BUB1, p53, Mdm2, Cdc25, 14-3-3 proteins, Cdc20). Preferred cell cycle regulators are selected from the group consisting of cyclins, cyclin dependent kinases (CDKs), CDK activating kinases, Cdk inhibitors, CDK substrates, anaphase promoting complex/cyclosome and cell-cycle-checkpoint proteins. More preferred cell cycle regulators are selected from the group consisting of Cyclin A, Cyclin B, Cyclin D1, CyclinD2, CyclinD3, Cyclin E, CyclinH, CDK1, CDK2, CDK4, CDK7, INK4A, INK4B, INK4C, INNK4D, Waf1 (Cip1/p21), p27 (Cip2), p57 (Kip2), NPAT, HistoneH1, p107, p130, Mad1, Mad2, BubR1, BUB1, p53, Mdm2, Cdc25, 14-3-3 proteins, and Cdc20.

According to the present invention "cell signalling proteins" include, but are not limited to
 I. cytokine signalling (such as cytokine and Interleukin receptors as IL-2 receptor; adaptor proteins and kinases as the JAK family; regulatory factors as SOCS; transcription factors as IRF3 or IRF9 or STAT family; and kinase-/downstream-targets as AKT, GRB2),
 II. survival factor signalling/death signalling/growth factor or hormone signaling (such as kinases as the MAP-Kinases as MEKs, ERKs, other kinases as Akt or PI3K or SRC or ATM, and kinase complexes as mTORComplex1; transcription factors as Elk1 or c-Myc; GTPases as Ras; growth factor receptors which usually are receptor tyrosine kinases as EGFR; hormone receptors as estrogen receptors),
 III. chemokine signalling (such as chemokine receptors which usually are 7-transmembrane proteins/G-protein coupled receptors such as CXCR2; G protein complexes such as the Gi complex composed of Galphai, Gbeta and Ggamma, kinases; adaptor proteins and signal transducers/regulators as phospholipase C, protein Kinase C, JAK family, PI3K, RhoGTPases as CDC42 or RhoA, MAPK as INK, mTORComplex1; transcription factors as STAT family or NFkB; translation initiation factors as eIF4E) and
 IV. extracellular matrix/Wnt/Hedgehog signalling (such as WNT ligands as Wnt1 or Wnt3a; WNT ligand receptors as Frizzled; LRP co-receptors as LRP6; beta-Catenin, LGR5, Axin. APC, kinases as GSK3beta, CK1alpha, FAK and casein; Cadherins; ubiquitin ligases as beta-TrCP, repressive nuclear complex composed of TLE, Histone Deacetylaseses HDACs; Dvl, enhancers as TCF and LEF; co-activators as p300; Rho GTPases as Rac1; Integrins).

Preferred cell signalling proteins are selected from the group consisting of cytokine signalling proteins, survival factor signalling proteins, death signalling proteins, growth factor signalling proteins, hormone signalling proteins, chemokine signalling proteins, and extracellular matrix/Wnt/Hedgehog signalling proteins. More preferred cell signalling proteins are selected from the group consisting of cytokine receptors as GM-CSF receptor, Interferon alpha/beta receptor, interferon gamma receptor, CD40 or CD120, or their adaptor proteins; Interleukin receptors as IL-2 receptor, IL-7 receptor, IL-12 receptor, IL-21 receptor or IL-18 receptor, or their adaptor proteins; kinases as the JAK family, the MAPKinases, PI3K, Akt and kinase complexes as mTORComplex; transcription factors as IRF3 or IRF9, the STAT family or NFkB; RhoGTPases as CDC42, RhoA or Rac1. Even more preferred cell signalling proteins are selected from the group consisting of GM-CSF receptor, Interferon alpha/beta receptor, interferon gamma receptor, CD40, CD120, or their adaptor proteins; IL-2 receptor, IL-7 receptor, IL-12 receptor, IL-21 receptor, IL-18 receptor, or their adaptor proteins; the JAK family, the MAPKinases, PI3K, Akt, mTORComplex, IRF3, IRF9, the STAT family, NFkB, CDC42, RhoA and Rac1.

According to the present invention "reporter proteins" include, but are not limited to fluorescent proteins (as GFP), luciferases or enzymatic reporter proteins (as alkaline phosphatase). Preferred reporter proteins are enzymatic reporter proteins.

According to the present invention "GPCR related proteins" include, but are not limited to G-protein coupled receptors (such as CXCR2), G protein complexes (composed of Galpha, Gbeta and Ggamma), kinases (as PKA), adaptor proteins and signal transducers/regulators (as phospholipases, adenylate cyclases, phosphodiesterases), kinases (as protein Kinase C PKC, or PKA), transcription factors (as CREB). Preferred GPCR related proteins are selected from the group consisting of G-protein coupled receptors, G protein complexes, kinases, adaptor proteins, signal transducers/regulators and transcription factors. More preferred GPCR related proteins are selected from the group consisting of CXCR2, G protein complexes composed of Galpha, Gbeta and Ggamma, PKA, phospholipases, adenylate cyclases, phosphodiesterases), protein Kinase C PKC, and CREB.

According to the present invention "nanobody fusion proteins" include, but are not limited to nanobodies fused to protein degrading domains (as N-terminal F-box domain of the *drosophila* Slmb protein or ubiquitin ligases; hence nanobodies fused to cell signalling proteins or parts thereof), nanobodies fused to identical or other nanobodies (bi- or multi-specific nanobodies), nanbodies fused to reporter proteins, nanobodies fused to subcellular localization signals (as a nuclear localization signal NLS). Preferred nanobody fusion proteins are selected from the group consisting of nanobodies fused to protein degrading domains, nanobodies fused to cell signalling proteins or parts thereof, nanobodies fused to identical or other nanobodies, nanbodies fused to reporter proteins and nanobodies fused to subcellular localization signals. More preferred nanobody fusion proteins are selected from the group consisting of nanobodies fused to the N-terminal F-box domain of the *drosophila* Slmb protein, nanobodies fused to ubiquitin ligases, nanobodies fused to identical or other nanobodies being bi- or multi-specific, nanobodies fused to NLS. According to the present invention "nanobodies" include, but are not limited to single antibodies composed of a monomeric single-chain variable antibody domain. The camelid VHH fragments are an example of nanobodies. Preferred nanobodies are single antibodies composed of a monomeric single-chain variable antibody domain.

Another particular preferred heterologous protein is a heterologous protein containing a domain of a protein involved in induction or regulation of a type I IFN response, more particular a heterologous protein containing a domain of a protein involved in induction or regulation of a type I IFN response selected from the group consisting of i) a CARD domain of RIG1 comprising a sequence selected from the group consisting of SEQ ID NOs: 1-6, ii) a CARD domain of MDA5 comprising a sequence selected from the group consisting of SEQ ID NOs: 13-16, preferably SEQ ID NOs: 15 or 16, and iii) a CARD domain of MAVS comprising a sequence selected from the group consisting of SEQ ID NO: 7 or 8, preferably SEQ ID NO: 7. Another particular preferred heterologous protein is a full-length cGAS such as *N. vectensis* cGAS (SEQ ID NO: 9), human $cGAS_{161-522}$ (SEQ ID NO: 10), *N. vectensis* $cGAS_{60-422}$ (SEQ ID NO: 12) or murine $cGAS_{146-507}$(SEQ ID NO: 11). Most particularly preferred heterologous protein are heterologous proteins containing a CARD domain of human RIG1 (SEQ ID NOs: 1-3), in particular a CARD domain of human RIG1 (SEQ ID NO: 1), and human $cGAS_{161-522}$ (SEQ ID NO: 10).

In some embodiments the heterologous proteins is a pro-drug converting enzyme. In these embodiments the recombinant Gram-negative bacterial strain expresses, preferably expresses and secretes a pro-drug converting enzyme. A prodrug converting enzyme as referred herein comprises enzymes converting non-toxic prodrugs into a toxic drug, preferably enzymes selected from the group consisting of cytosine deaminase, purine nucleoside phosphorylase, thymidine kinase, beta-galactosidase, carboxylesterases, nitroreductase, carboxypeptidases and beta-glucuronidases, more preferably enzymes selected from the group consisting of cytosine deaminase, purine nucleoside phosphorylase, thymidine kinase, and beta-galactosidase.

The term "protease cleavage site" as used herein refers to a specific amino acid motif within an amino acid sequence e.g. within an amino acid sequence of a protein or a fusion protein, which is cleaved by a specific protease, which recognizes the amino acid motif. For review see[14]. Examples of protease cleavage sites are amino acid motifs, which are cleaved by a protease selected from the group consisting of enterokinase (light chain), enteropeptidase, prescission protease, human rhinovirus protease (HRV 3C), TEV protease, TVMV protease, FactorXa protease and thrombin. The following amino acid motif is recognized by the respective protease:

Asp-Asp-Asp-Asp-Lys: Enterokinase (light chain)/Enteropeptidase (SEQ ID NO: 45)

Leu-Glu-Val-Leu-Phe-Gln/Gly-Pro: PreScission Protease/human Rhinovirus protease (HRV 3C) (SEQ ID NO: 46)

Glu-Asn-Leu-Tyr-Phe-Gln-Ser (SEQ ID NO: 47) and modified motifs based on the Glu-X-X-Tyr-X-Gln-Gly/Ser (where X is any amino acid) recognized by TEV protease (tobacco etch virus) (SEQ ID NO: 48)

Glu-Thr-Val-Arg-Phe-Gln-Ser: TVMV protease (SEQ ID NO: 49)

Ile-(Glu or Asp)-Gly-Arg: FactorXa protease (SEQ ID NO: 50)

Leu-Val-Pro-Arg/Gly-Ser: Thrombin (SEQ ID NO: 51).

Encompassed by the protease cleavage sites as used herein is ubiquitin. Thus in some preferred embodiments ubiquitin is used as protease cleavage site, i.e. a nucleotide sequence encodes ubiquitin as protease cleavage site, which can be cleaved by a specific ubiquitin processing proteases at the N-terminal site, e.g. which can be cleaved by a specific ubiquitin processing proteases called Deubiquitinating enzymes at the N-terminal site endogenously in the cell where the fusion protein has been delivered to. Ubiquitin is processed at its C-terminus by a group of endogenous Ubiquitin-specific C-terminal proteases (Deubiquitinating enzymes, DUBs). The cleavage of Ubiquitin by DUBs is supposed to happen at the very C-terminus of Ubiquitin (after G76).

An "individual," "subject" or "patient" is a vertebrate. In certain embodiments, the vertebrate is a mammal. Mammals include, but are not limited to, primates (including human and non-human primates) and rodents (e.g., mice and rats). In preferred embodiments, a subject is a human.

The term "mutation" is used herein as a general term and includes changes of both single base pair and multiple base pairs. Such mutations may include substitutions, frame-shift mutations, deletions, insertions and truncations.

The term "nuclear localization signal" as used herein refers to an amino acid sequence that marks a protein for import into the nucleus of a eukaryotic cell and includes preferably a viral nuclear localization signal such as the SV40 large T-antigen derived NLS (PPKKKRKV) (SEQ ID NO: 52).

The term "multiple cloning site" as used herein refers to a short DNA sequence containing several restriction sites for cleavage by restriction endonucleases such as AclI, HindIII, SspI, MluCI, Tsp509I, PciI, AgeI, BspMI, BfuAI, SexAI, MluI, BceAI, HpyCH4IV, HpyCH4III, BaeI, BsaXI, AflIII, SpeI, BsrI, BmrI, BglII, AfeI, AluI, StuI, ScaI, ClaI, BspDI, PI-SceI, NsiI, AseI, SwaI, CspCI, MfeI, BssSI, BmgBI, PmlI, DraIII, AleI, EcoP15I, PvuII, AlwNI, BtsIMutI, TspRI, NdeI, NlaIII, CviAII, FatI, MslI, FspEI, XcmI, BstXI, PflMI, BccI, NeoI, BseYI, FauI, SmaI, XmaI, TspMI, Nt.CviPII, LpnPI, AciI, SacII, BsrBI, MspI, HpaII, ScrFI, BssKI, StyD4I, BsaJI, BslI, BtgI, NeiI, AvrII, MnlI, BbvCI, Nb.BbvCI, Nt.BbvCI, SbfI, Bpul0I, Bsu36I, EcoNI, HpyAV, BstNI, PspGI, StyI, BegI, PvuI, BstUI, EagI, RsrII, BsiEI, BsiWI, BsmBI, Hpy99I, MspAlI, MspJI, SgrAI, BfaI, BspCNI, XhoI, EarI, AcuI, PstI, BpmI, DdeI, SfcI, AflII, BpuEI, SmlI, AvaI, BsoBI, MboII, BbsI, XmnI, BsmI, Nb.BsmI, EcoRI, HgaI, AatII, ZraI, Tt111I PflFI, PshAI, AhdI, DrdI, Eco53kI, SacI, BseRI, PleI, Nt.BstNBI, MlyI, HinfI, EcoRV, MboI, Sau3AI, DpnII BfuCI, DpnI, BsaBI, TfiI, BsrDI, Nb.BsrDI, BbvI, BtsI, Nb.BtsI, BstAPI, SfaNI, SphI, NmeAIII, NaeI, NgoMIV, BglI, AsiSI, BtgZI, HinPlI, HhaI, BssHII, NotI, Fnu4HI, Cac8I, MwoI, NheI, BmtI, SapI, BspQI, Nt.BspQI, BlpI, TseI, ApeKI, Bsp1286I, AlwI, Nt.AlwI, BamHI, FokI, BtsCI, HaeIII, PhoI, FseI, SfiI, NarI, KasI, SfoI, PluTI, AscI, EciI, BsmFI, ApaI, PspOMI, Sau96I, NlaIV, KpnI, Acc65I, BsaI, HphI, BstEII, AvaII, BanI, BaeGI, BsaHI, BanII, RsaI, CviQI, BstZ17I, BeiVI, SalI, Nt.BsmAI, BsmAI, BeoDI, ApaLI, BsgI, AccI, Hpy166II, Tsp45I, HpaI, PmeI, HincII, BsiHKAI, ApoI, NspI, BsrFI, BstYI, HaeII, CviKI-1, EcoOI09I, PpuMI, I-CeuI, SnaBI, I-SceI, BspHI, BspEI, MmeI, TaqaI, NruI, Hpy188I, Hpy188III, XbaI, BelI, HpyCH4V, FspI, PI-PspI, MscI, BsrGI, MseI, PacI, PsiI, BstBI, DraI, PspXI, BsaWI, BsaAI, EaeI, preferably XhoI, XbaI, HindIII, NeoI, NotI, EcoRI, EcoRV, BamHI, NheI, SacI, SalI, BstBI. The term "multiple cloning site" as used herein further refers to a short DNA sequence used for recombination events as e.g in Gateway cloning strategy or for methods such as Gibbson assembly or topo cloning.

The term "wild type strain" or "wild type of the Gram-negative bacterial strain" as used herein refers to a naturally occurring variant or a naturally occurring variant containing genetic modifications allowing the use of vectors, such as deletion mutations in restriction endonucleases or antibiotic resistance genes. These strains contain chromosomal DNA as well as in some cases (e.g. *Y. enterocolitica, S. flexneri*) an unmodified virulence plasmid.

The term "*Yersinia* wild type strain" as used herein refers to a naturally occurring variant (as *Y. enterocolitica* E40) or a naturally occurring variant containing genetic modifications allowing the use of vectors, such as deletion mutations in restriction endonucleases or antibiotic resistance genes (as *Y. enterocolitica* MRS40, the Ampicillin sensitive derivate of *Y. enterocolitica* E40) These strains contain chromosomal DNA as well as an unmodified virulence plasmid (called pYV).

*Y. enterocolitica* subspecies *palearctica* refers to the low-pathogenic *Y. enterocolitica* strains, which are in contrast to the higher virulent strains of subspecies *enterocolitica*[15,16]. *Y. enterocolitica* subsp. *palearctica* lack, in comparison to *Y. enterocolitica* subsp. *enterocolitica*, a high-pathogenicity island (IPI). This HPI encodes the iron siderophore called yersiniabactin[17]. The lack of yersiniabactin in *Y. enterocolitica* subsp. *palearctica* renders this subspecies less pathogenic and dependent on induced systemic accessible iron for persistent infection in e.g. liver or spleen[17]. Iron can be made accessible for the bacteria in an individual e.g by pretreatment with deferoxamine, an iron chelator used to treat iron overload in patients[18].

The term "comprise" and variations thereof, such as, "comprises" and "comprising" is generally used in the sense of include, that is, as "including, but not limited to", that is to say permitting the presence of one or more features or components.

The singular forms "a," "an," and "the" include plural referents unless the content clearly dictates otherwise.

The term "about" refers to a range of values ±10% of a specified value. For example, the phrase "about 200" includes ±10% of 200, or from 180 to 220.

In one aspect the present invention provides a recombinant Gram-negative bacterial strain which comprises i) a first polynucleotide molecule comprising a nucleotide sequence encoding a heterologous protein or a fragment thereof fused in frame to the 3'end of a nucleotide sequence encoding a delivery signal from a bacterial effector protein, wherein the nucleotide sequence encoding the delivery signal from a bacterial effector protein is operably linked to a promoter;

ii) a second polynucleotide molecule comprising a nucleotide sequence encoding a heterologous protein or a fragment thereof fused in frame to the 3'end of a nucleotide sequence encoding a delivery signal from a bacterial effector protein, wherein the nucleotide sequence encoding the delivery signal from a bacterial effector protein is operably linked to a promoter;

iii) a third polynucleotide molecule comprising a nucleotide sequence encoding a heterologous protein or a fragment thereof fused in frame to the 3'end of a nucleotide sequence encoding a delivery signal from a bacterial effector protein, wherein the nucleotide sequence encoding the delivery signal from a bacterial effector protein is operably linked to a promoter; and iv) a fourth polynucleotide molecule comprising a nucleotide sequence encoding a heterologous protein or a fragment thereof fused in frame to the 3'end of a nucleotide sequence encoding a delivery signal from a bacterial effector protein, wherein the nucleotide sequence encoding the delivery signal from a bacterial effector protein is operably linked to a promoter, wherein said first and said second polynucleotide molecule are located on a vector comprised by said Gram-negative bacterial strain and said third and said fourth polynucleotide molecule are located on a chromosome of said Gram-negative bacterial strain or on an extra-chromosomal genetic element comprised by said Gram-negative bacterial strain, with the proviso that the extra-chromosomal genetic element is not the vector on which the said first and said second polynucleotide molecule are located.

In some embodiments the recombinant Gram-negative bacterial strain is a recombinant virulence attenuated Gram-negative bacterial strain.

The recombinant Gram-negative bacterial strain of the present invention can be obtained by 1) transforming a Gram-negative bacterial strain with a polynucleotide molecule, preferably a DNA polynucleotide molecule, comprising a nucleotide sequence encoding a heterologous protein and a nucleotide sequence which is homologous or identical to a nucleotide sequence encoding a delivery signal from a bacterial effector protein or which is homologous or identical to a nucleotide sequence encoding a fragment of a delivery signal from a bacterial effector protein, wherein the delivery signal from a bacterial effector protein or a fragment thereof is encoded on the chromosome or on an endogenous virulence plasmid of the Gram-negative bacterial strain. Preferably the nucleotide sequence which is homologous or identical to a nucleotide sequence of a delivery signal from a bacterial effector protein or to a fragment thereof is located on the 5' end of the nucleotide sequence encoding a heterologous protein. The nucleotide sequence encoding a heterologous protein can be flanked on its 3' end by a nucleotide sequence homologous to the nucleotide sequence of the chromosome or of the endogenous virulence plasmid at the 3' end of the delivery signal from a bacterial effector protein or to a fragment thereof. This nucleotide sequence flanking the homologous protein on its 3' end can be homologous to the nucleotide sequence lying within 10 kbp on the chromosome or on an endogenous virulence plasmid at the 3' end of the delivery signal from a bacterial effector protein or to a fragment thereof. This nucleotide sequence flanking the homologous protein on its 3' end can be homologous to the nucleotide sequence and can be within the same operon on the chromosome or on an endogenous virulence plasmid as the delivery signal from a bacterial effector protein or a fragment thereof. Transformation is usually performed so that the nucleotide sequence encoding a heterologous protein is inserted on an endogenous virulence plasmid or a chromosome of the recombinant virulence attenuated Gram-negative bacterial strain, preferably on an endogenous virulence plasmid, at the 3'end of a delivery signal from a bacterial effector protein encoded by the chromosome or the endogenous virulence plasmid, wherein the heterologous protein fused to the delivery signal is expressed and secreted.

2) Subsequently (or in parallel) to step 1), the recombinant bacterial strain obtained under 1) can be transformed with a further polynucleotide molecule, preferably a DNA polynucleotide molecule, comprising a nucleotide sequence encoding a heterologous protein and a nucleotide sequence which is homologous or identical to a nucleotide sequence encoding a delivery signal from a bacterial effector protein or which is homologous or identical to a nucleotide sequence encoding a fragment of a delivery signal from a bacterial effector protein, wherein the delivery signal from a bacterial effector protein or a fragment thereof is encoded on the chromosome or on an endogenous virulence plasmid of the Gram-negative bacterial strain. The nucleotide sequence can be homologous or identical to a nucleotide sequence of a delivery signal from a bacterial effector protein or to a fragment thereof can be located on the 5' end of the nucleotide sequence encoding a heterologous protein. The nucleotide sequence encoding a heterologous protein can be flanked on its 3' end by a nucleotide sequence homologous to the nucleotide sequence of the chromosome or of the endogenous virulence plasmid at the 3' end of the delivery signal from a bacterial effector protein or to a fragment thereof. This nucleotide sequence flanking the homologous protein on its 3' end can be homologous to the nucleotide sequence lying within 10 kbp on the chromosome or on an endogenous virulence plasmid at the 3' end of the delivery signal from a bacterial effector protein or to a fragment thereof. This nucleotide sequence flanking the homologous protein on its 3' end can be homologous to the nucleotide sequence and can be within the same operon on the chromosome or on an endogenous virulence plasmid as the delivery signal from a bacterial effector protein or a fragment thereof. Transformation is usually performed so that the nucleotide sequence encoding a heterologous protein is inserted on an endogenous virulence plasmid or a chromosome of the recombinant virulence attenuated Gram-negative bacterial strain, preferably on an endogenous virulence plasmid, at the 3'end of a delivery signal from a bacterial effector protein encoded by the chromosome or the endogenous virulence plasmid, wherein the heterologous protein fused to the delivery signal is expressed and secreted.

3) The recombinant bacterial strain obtained under 1) and 2) can be additionally genetically transformed with one or two polynucleotide construct(s) like an expression vector comprising one (in case of two vectors) or two (in case of one vector) nucleotide sequence(s) encoding a heterologous protein and a nucleotide sequence which is homologous or identical to a nucleotide sequence encoding a delivery signal from a bacterial effector protein or which is homologous or identical to a nucleotide sequence encoding a fragment of a delivery signal from a bacterial effector protein. In case the recombinant bacterial strain obtained under 1) and 2) is transformed with one vector comprising two nucleotide sequences encoding each a heterologous protein and a nucleotide sequence which is homologous or identical to a nucleotide sequence encoding a delivery signal from a bacterial effector protein or which is homologous or identical to a nucleotide sequence encoding a fragment of a delivery signal from a bacterial effector protein, in one embodiment these two sequences can be fused to form an operon.

Order of steps 1-3) can be interchanged or steps may be combined without altering the finally generated recombinant bacterial strain.

In case the recombinant virulence attenuated Gram-negative bacterial strain is a *Yersinia* strain the endogenous virulence plasmid is pYV (plasmid of *Yersinia* Virulence). In case the recombinant virulence attenuated Gram-negative bacterial strain is a *Salmonella* strain, the endogenous location for insertion is one of the gene clusters called SpiI or SpiII (for *Salmonella* pathogenicity island), a position where an effector protein is elsewhere encoded or alternatively one of the *Salmonella* virulence plasmids (SVPs).

In one embodiment the third and fourth polynucleotide molecule is inserted and/or located on an endogenous virulence plasmid, preferably inserted and/or located on an endogenous virulence plasmid at the native site of a bacterial effector protein e.g. at the native site of a virulence factor, preferably in case the recombinant Gram-negative bacterial strain is a *Yersinia* strain, at the native site of YopE and/or YopH or at the native site of another Yop (YopO, YopP, YopM, YopT), preferably at the native site of YopE and YopH, respectively, or in case the recombinant Gram-negative bacterial strain is a *Salmonella* strain at the native site of an effector protein encoded within SpiI, SpiII or encoded elsewhere, preferably at the native site of an effector protein encoded within SpiI or SpiII, more preferably at the native site of SopE or SteA.

In a preferred embodiment, the heterologous protein or a fragment thereof encoded by the nucleotide sequence of the first, second, third and fourth polynucleotide molecule is, independently of each other, selected from the group consisting of proteins involved in induction or regulation of a type I IFN response selected from the group consisting of cGAS, STING, TRIF, TBK1, IKKepsilon, IRF3, TREX1, VPS34, ATG9a, DDX3, LC3, DDX41, IFI16, MRE11, DNA-PK, RIG1, MDA5, LGP2, IPS-1/MAVS/Cardif/VISA, Trim25, Trim32, Trim56, Riplet, TRAF2, TRAF3, TRAF5, TANK, IRF3, IRF7, IRF9, STAT1, STAT2, PKR, TLR3, TLR7, TLR9, DAI, IFI16, IFIX, MRE11, DDX41, LSm14A, LRRFIP1, DHX9, DHX36, DHX29, DHX15, Ku70, cyclic dinucleotide generating enzymes (cyclic-di-AMP, cyclic-di-GMP and cyclic-di-GAMP cyclases) as WspR, DncV, DisA and DisA-like, CdaA, CdaS and cGAS, or a fragment thereof: proteins involved in apoptosis or apoptosis regulation selected from the group consisting of pro-apoptotic proteins, anti-apoptotic proteins, inhibitors of apoptosis-prevention pathways and inhibitors of pro-survival signalling or pathways; cell cycle regulators selected from the group consisting of cyclins, cyclin dependent kinases (CDKs), CDK activating kinases, Cdk inhibitors, CDK substrates, anaphase promoting complex/cyclosome and cell-cycle-checkpoint proteins; ankyrin repeat proteins; cell signalling proteins selected from the group consisting of cytokine signalling proteins, survival factor signaling proteins, death signalling proteins, growth factor signalling proteins, hormone signalling proteins, chemokine signalling proteins, and extracellular matrix/Wnt/Hedgehog signalling proteins; reporter proteins selected from the group consisting of fluorescent proteins, luciferases and enzymatic reporter proteins; transcription factors; proteases; small GTPases; GPCR related proteins selected from the group consisting of G-protein coupled receptors, G protein complexes, kinases, adaptor proteins, signal transducers/regulators and transcription factors; nanobody fusion constructs selected from the group consisting of nanobodies fused to protein degrading domains, nanobodies fused to cell signalling proteins or parts thereof, nanobodies fused to identical or other nanobodies, nanbodies fused to reporter proteins and nanobodies fused to subcellular localization signals; nanobodies; bacterial T3SS effectors; bacterial T4SS effectors and viral proteins; or a fragment thereof.

In one embodiment the nucleotide sequence encoding a heterologous protein or a fragment thereof of the first polynucleotide molecule and the nucleotide sequence encoding a heterologous protein or a fragment thereof of the third polynucleotide molecule encode the same heterologous protein or a fragment thereof.

In a further embodiment the nucleotide sequence encoding a heterologous protein or a fragment thereof of the second polynucleotide molecule and the nucleotide sequence encoding a heterologous protein or a fragment thereof of the fourth polynucleotide molecule encode the same heterologous protein or a fragment thereof.

In a preferred embodiment the nucleotide sequence encoding a heterologous protein or a fragment thereof of the first polynucleotide molecule and the nucleotide sequence encoding a heterologous protein or a fragment thereof of the third polynucleotide molecule encode the same heterologous protein or a fragment thereof and the nucleotide sequence encoding a heterologous protein or a fragment thereof of the second polynucleotide molecule and the nucleotide sequence encoding a heterologous protein or a fragment thereof of the fourth polynucleotide molecule encode the same heterologous protein or a fragment thereof, wherein the heterologous protein or a fragment thereof encoded by the first and third polynucleotide molecule is different from the heterologous protein or a fragment thereof encoded by the second and fourth polynucleotide molecule.

In a more preferred embodiment the heterologous protein encoded by the nucleotide sequence of the first and the third polynucleotide molecule, independently of each other, is selected from the group consisting of the RIG-I-like receptor (RLR) family, other CARD domain containing proteins involved in antiviral signaling and type I IFN induction or a fragment thereof, and cyclic dinucleotide generating enzymes such as cyclic-di-AMP, cyclic-di-GMP and cyclic-di-GAMP cyclases selected from the group consisting of WspR, DncV, DisA and DisA-like, CdaA, CdaS and cGAS, leading to stimulation of STING or a fragment thereof as described supra. Even more preferably the heterologous protein encoded by the nucleotide sequence of the first and the third polynucleotide molecule, independently of each other, is selected from the group consisting of RIG1, MDA5, MAVS, WspR, DncV, DisA and DisA-like, CdaA, and cGAS or a fragment thereof as described supra. In particular the heterologous protein encoded by the nucleotide sequence of the first and the third polynucleotide molecule is cGAS or a fragment thereof e.g. fragments thereof as described supra, more particular the human cGAS as shown in SEQ ID NO: 10 or a fragment thereof.

In a more preferred embodiment the heterologous protein encoded by the nucleotide sequence of the second and the fourth polynucleotide molecule, independently of each other, is selected from the group consisting of the RIG-I-like receptor (RLR) family, other CARD domain containing proteins involved in antiviral signaling and type I IFN induction or a fragment thereof, and cyclic dinucleotide generating enzymes such as cyclic-di-AMP, cyclic-di-GMP and cyclic-di-GAMP cyclases selected from the group consisting of WspR, DncV, DisA and DisA-like, CdaA, CdaS and cGAS, leading to stimulation of STING or a fragment thereof as described supra. Even more preferably the heterologous protein encoded by the nucleotide sequence of the second and the fourth polynucleotide molecule, independently of each other, is selected from the group consisting of RIG1, MDA5, MAVS, WspR, DncV, DisA and DisA-like, CdaA, and cGAS or a fragment thereof. In particular the heterologous protein encoded by the nucleotide sequence of the second and the fourth polynucleotide molecule, independently of each other, is selected from the group consisting of RIG1, MDA5, MAVS, WspR, DncV, DisA and DisA-like, and CdaA, or a fragment thereof. More particular the heterologous protein encoded by the nucleotide sequence of the second and the fourth polynucleotide molecule is RIG1 or a fragment thereof as described supra, more particular a fragment of RIG1 comprising a CARD domain, even more particular a fragment of RIG1, preferably human RIG1, comprising two CARD domains, most particular a fragment of human RIG1 comprising two CARD domains as shown in SEQ ID NO: 1, SEQ ID NO: 2 or SEQ ID NO: 3, preferably as shown in SEQ ID NO: 1.

In one embodiment the nucleotide sequence encoding a heterologous protein or a fragment thereof fused in frame to the 3'end of the nucleotide sequence encoding a delivery signal from a bacterial effector protein of the first polynucleotide molecule and the nucleotide sequence encoding a heterologous protein or a fragment thereof fused in frame to the 3'end of the nucleotide sequence encoding a delivery signal from a bacterial effector protein of the second polynucleotide molecule are each operably linked to the same promoter. The term "each operably linked to the same promoter" means in this connection that one promoter (the same promoter) drives expression of the heterologous proteins of the first and the second polynucleotide molecule. In a preferred embodiment the nucleotide sequence encoding a heterologous protein or a fragment thereof fused in frame to the 3'end of the nucleotide sequence encoding a delivery signal from a bacterial effector protein of the first polynucleotide molecule and the nucleotide sequence encoding a heterologous protein or a fragment thereof fused in frame to the 3'end of the nucleotide sequence encoding a delivery signal from a bacterial effector protein of the second polynucleotide molecule are each operably linked to the same YopE promoter.

In a further embodiment the nucleotide sequence encoding a heterologous protein or a fragment thereof fused in frame to the 3'end of the nucleotide sequence encoding a delivery signal from a bacterial effector protein of the third polynucleotide molecule and the nucleotide sequence encoding a heterologous protein or a fragment thereof fused in frame to the 3'end of the nucleotide sequence encoding a delivery signal from a bacterial effector protein of the fourth polynucleotide molecule are operably linked to two different promoters. In a preferred embodiment the nucleotide sequence encoding a heterologous protein or a fragment thereof fused in frame to the 3'end of the nucleotide sequence encoding a delivery signal from a bacterial effector protein of the third polynucleotide molecule is operably linked to the YopE promoter and the nucleotide sequence encoding a heterologous protein or a fragment thereof fused in frame to the 3'end of the nucleotide sequence encoding a delivery signal from a bacterial effector protein of the fourth polynucleotide molecule is operably linked to the YopH promoter.

In a further preferred embodiment the nucleotide sequence encoding a heterologous protein or a fragment thereof fused in frame to the 3'end of the nucleotide sequence encoding a delivery signal from a bacterial effector protein of the first polynucleotide molecule and the nucleotide sequence encoding a heterologous protein or a fragment thereof fused in frame to the 3'end of the nucleotide sequence encoding a delivery signal from a bacterial effector protein of the second polynucleotide molecule are operably linked to the same promoter and the nucleotide sequence encoding a heterologous protein or a fragment thereof fused in frame to the 3'end of the nucleotide sequence encoding a delivery signal from a bacterial effector protein of the third polynucleotide molecule and the nucleotide sequence encoding a heterologous protein or a fragment thereof fused in frame to the 3'end of the nucleotide sequence encoding a delivery signal from a bacterial effector protein of the fourth polynucleotide molecule are operably linked to two different promoters.

The vector comprising said first and second polynucleotide molecule can be a low, medium or high copy number plasmid. Low copy number plasmids have usually 1-15 copies/bacterial cell, preferably 1-10 copies/bacterial cell. Medium copy number plasmids have usually 5-200 copies/bacterial cell, preferably 10-150 copies/bacterial cell. High copy number plasmids have usually 100-1'000 copies/bacterial cell, preferably 150-700 copies/bacterial cell.

In a preferred embodiment the vector comprising said first and second polynucleotide molecule is a medium copy number plasmid. In a preferred embodiment the vector is a medium copy number plasmid with 5-200 copies/bacterial cell, i.e. 5-200 copies of the plasmid are present in a single bacterial cell, preferably 10-150 copies/bacterial cell i.e. 10-150 copies of the plasmid are present in a single bacterial cell.

In one embodiment the vector comprising said first and second polynucleotide molecule is a plasmid which has without insert a size of between 1 and 15 kDa, preferably between 2 and 10 kDa, more preferably between 3 and 7 kDa.

In one embodiment the extra-chromosomal genetic element is an endogenous virulence plasmid, preferably an endogenous virulence plasmid which naturally (in nature) encodes proteins of the type III secretion system. In a preferred embodiment the extra-chromosomal genetic element is the endogenous virulence plasmid pYV.

In one embodiment of the present invention the recombinant Gram-negative bacterial strain is selected from the group consisting of the genera *Yersinia, Escherichia, Salmonella* and *Pseudomonas*. In one embodiment the recombinant Gram-negative bacterial strain is selected from the group consisting of the genera *Yersinia* and *Salmonella*. Preferably the recombinant Gram-negative bacterial strain is a *Yersinia* strain, more preferably a *Yersinia enterocolitica* strain. Most preferred is *Yersinia enterocolitica* E40 (O:9, biotype 2)[19] or Ampicilline sensitive derivates thereof as *Y. enterocolitica* MRS40 (also named *Y. enterocolitica* subsp. *palearctica* MRS40) as described in[20]. *Y. enterocolitica* E40 and its derivate *Y. enterocolitica* MRS40 as described in[20] is identical to *Y. enterocolitica* subsp. *palearctica* E40 and its derivate *Y. enterocolitica* subsp. *palearctica* MRS40 as described in[15,17,21]. Also preferably the recombinant Gram-negative bacterial strain is a *Salmonella* strain, more preferably a *Salmonella enterica* strain. Most preferred is *Salmonella enterica* Serovar *Typhimurium* SL1344 as described by the Public health England culture collection (NCTC 13347).

In some embodiments of the present invention the recombinant Gram-negative bacterial strain is a strain which does not produce a siderophore e.g. is deficient in the production of a siderophore, preferably does not produce siderophores e.g. is deficient in the production of any siderophore. Such a strain is for example *Y. enterocolitica* subsp. *palearctica* MRS40 as described in[15,17,20], which does not produce yersiniabactin and which is preferred.

In one embodiment of the present invention the delivery signal from a bacterial effector protein comprises a bacterial effector protein or a N-terminal fragment thereof, preferably a bacterial effector protein which is virulent toward eukaryotic cells or a N-terminal fragment thereof.

In one embodiment of the present invention the delivery signal from a bacterial effector protein is a delivery signal from a bacterial effector protein selected from the group consisting of a bacterial T3SS effector protein or a N-terminal fragment thereof, a bacterial T4SS effector protein or a N-terminal fragment thereof and a bacterial T6SS effector protein or a N-terminal fragment thereof. In one embodiment of the present invention the delivery signal from a bacterial effector protein is a bacterial T3SS effector protein comprising a bacterial T3SS effector protein or a N-terminal fragment thereof wherein the T3SS effector protein or a N-terminal fragment thereof may comprise a chaperone binding site. A T3SS effector protein or a N-terminal fragment thereof which comprises a chaperone binding site is particular useful as delivery signal in the present invention. Preferred T3SS effector proteins or N-terminal fragments thereof are selected from the group consisting of SopE, SopE2, SptP, YopE, ExoS, SipA, SipB, SipD, SopA, SopB, SopD, IpgB1, IpgD, SipC, SifA, SseJ, Sse, SrfH, YopJ, AvrA, AvrBsT, YopT, YopH, YpkA, Tir, EspF, TccP2, IpgB2, OspF, Map, OspG, OspI, IpaH, SspH1, VopF, ExoS, ExoT, HopAB2, XopD, AvrRpt2, HopAO1, HopPtoD2, HopU1, GALA family of proteins, AvrBs2, AvrD1, AvrBS3, YopO, YopP, YopE, YopM, YopT, EspG, EspH, EspZ, IpaA, IpaB, IpaC, VirA, IcsB, OspC1, OspE2, IpaH9.8, IpaH7.8, AvrB, AvrD, AvrPphB, AvrPphC, AvrPphEPto, AvrPpiBPto, AvrPto, AvrPtoB, VirPphA, AvrRpm1, HopPtoE, HopPtoF, HopPtoN, PopB, PopP2, AvrBs3, XopD, and AvrXv3. More preferred T3SS effector proteins or N-terminal fragments thereof are selected from the group consisting of SopE, SptP, YopE, ExoS, SopB, IpgB1, IpgD, YopJ, YopH, EspF, OspF, ExoS, YopO, YopP, YopE, YopM, YopT, whereof most preferred T3SS effector proteins or N-terminal fragments thereof are selected from the group consisting of IpgB1, SopE, SopB, SptP, OspF, IpgD, YopH, YopO, YopP, YopE, YopM, YopT, in particular YopE or an N-terminal fragment thereof.

Equally preferred T3SS effector proteins or N-terminal fragments thereof are selected from the group consisting of SopE, SopE2, SptP, SteA, SipA, SipB, SipD, SopA, SopB, SopD, IpgB1, IpgD, SipC, SifA, SifB, SseJ, Sse, SrfH, YopJ, AvrA, AvrBsT, YopH, YpkA, Tir, EspF, TccP2, IpgB2, OspF, Map, OspG, OspI, IpaH, VopF, ExoS, ExoT, HopAB2, AvrRpt2, HopAO1, HopU1, GALA family of proteins, AvrBs2, AvrD1, YopO, YopP, YopE, YopT, EspG, EspH, EspZ, IpaA, IpaB, IpaC, VirA, IcsB, OspC1, OspE2, IpaH9.8, IpaH7.8, AvrB, AvrD, AvrPphB, AvrPphC, AvrPphEPto, AvrPpiBPto, AvrPto, AvrPtoB, VirPphA, AvrRpm1, HopPtoD2, HopPtoE, HopPtoF, HopPtoN, PopB, PopP2, AvrBs3, XopD, and AvrXv3. Equally more preferred T3SS effector proteins or N-terminal fragments thereof are selected from the group consisting of SopE, SptP, SteA, SifB, SopB, IpgB1, IpgD, YopJ, YopH, EspF, OspF, ExoS, YopO, YopP, YopE, YopT, whereof equally most preferred T3SS effector proteins or N-terminal fragments thereof are selected from the group consisting of IpgB1, SopE, SopB, SptP, SteA, SifB, OspF, IpgD, YopH, YopO, YopP, YopE, and YopT, in particular SopE, SteA, or YopE or an N-terminal fragment thereof, more particular SteA or YopE or an N-terminal fragment thereof, most particular YopE or an N-terminal fragment thereof.

In some embodiments the delivery signal from a bacterial effector protein of the first, second, third and fourth polynucleotide molecule is the same delivery signal. In a preferred embodiment the delivery signal from a bacterial effector protein of the first, second, third and fourth polynucleotide molecule is a delivery signal from a bacterial T3SS effector protein, preferably the same delivery signal from a bacterial T3SS effector protein. In a more preferred embodiment the delivery signal from a bacterial effector protein of the first, second, third and fourth polynucleotide molecule comprises the YopE effector protein or an N-terminal fragment thereof.

In some embodiments the delivery signal from a bacterial effector protein is encoded by a nucleotide sequence comprising the bacterial effector protein or an N-terminal fragment thereof, wherein the N-terminal fragment thereof includes at least the first 10, preferably at least the first 20, more preferably at least the first 100 amino acids of the bacterial T3 SS effector protein. The term "at least the first 10 amino acids of the bacterial T3SS effector protein" refers to the first 10 $NH_2$-terminal (also called N-terminal) amino acids of the bacterial T3SS effector protein.

In some embodiments the delivery signal from the bacterial effector protein is encoded by a nucleotide sequence comprising the bacterial T3SS effector protein or an N-terminal fragment thereof, wherein the bacterial T3SS effector protein or the N-terminal fragment thereof comprises a chaperone binding site.

Preferred T3SS effector proteins or a N-terminal fragment thereof, which comprise a chaperone binding site comprise the following combinations of chaperone binding site and T3SS effector protein or N-terminal fragment thereof: SycE-YopE, InvB-SopE, SicP-SptP, SycT-YopT, SycO-YopO, SycN/YscB-YopN, SycH-YopH, SpcS-ExoS, CesF-EspF, SycD-YopB, SycD-YopD. More preferred are SycE-YopE, InvB-SopE, SycT-YopT, SycO-YopO, SycN/YscB-YopN, SycH-YopH, SpcS-ExoS, CesF-EspF. Most preferred is a YopE or an N-terminal fragment thereof comprising the SycE chaperone binding site such as an N-terminal fragment of a YopE effector protein containing the N-terminal 138 amino acids of the YopE effector protein designated herein as $YopE_{1-138}$ and as shown in SEQ ID NO: 25 or a SopE effector protein or an N-terminal fragment thereof comprising the InvB chaperone binding site as such an N-terminal fragment of a SopE effector protein containing the N-terminal 81 or 105 amino acids of the SopE effector protein designated herein as $SopE_{1-81}$ or $SopE_{1-105}$ respectively, and as shown in SEQ ID NOs: 26 and 27.

In one embodiment of the present invention the recombinant Gram-negative bacterial strain is a *Yersinia* strain and the delivery signal from the bacterial effector protein comprises a YopE effector protein or an N-terminal part, preferably the *Y. enterocolitica* YopE effector protein or an N-terminal part thereof. Preferably the SycE binding site is comprised within the N-terminal part of the YopE effector protein. In this connection an N-terminal fragment of a YopE effector protein may comprise the N-terminal 12, 16, 18, 52, 53, 80 or 138 amino acids[22-24,68]. Most preferred is an N-terminal fragment of a YopE effector protein containing the N-terminal 138 amino acids of the YopE effector protein e.g. as described in Forsberg and Wolf-Watz[25] designated herein as $YopE_{1-138}$ and as shown in SEQ ID NO: 25.

In one embodiment of the present invention the recombinant Gram-negative bacterial strain is a *Salmonella* strain and the delivery signal from the bacterial effector protein encoded by a nucleotide sequence comprises a SopE or SteA effector protein or an N-terminal part thereof, preferably the *Salmonella enterica* SopE or SteA effector protein or an N-terminal part thereof. Preferably the chaperon binding site is comprised within the N-terminal part of the SopE effector protein. In this connection an N-terminal fragment of a SopE effector protein protein may comprise the N-terminal 81 or 105 amino acids. Most preferred is the full length SteA (SEQ ID NO: 28) and an N-terminal fragment of a SopE effector protein containing the N-terminal 105 amino acids of the effector protein e.g. as described in SEQ ID NO: 27.

One skilled in the art is familiar with methods for identifying the polypeptide sequences of an effector protein that are capable of delivering a protein. For example, one such method is described by Sory et al.[19]. Briefly, polypeptide sequences from e.g. various portions of the Yop proteins can be fused in-frame to a reporter enzyme such as the calmodulin-activated adenylate cyclase domain (or Cya) of the *Bordetella pertussis* cyclolysin. Delivery of a Yop-Cya hybrid protein into the cytosol of eukaryotic cells is indicated by the appearance of cyclase activity in the infected eukaryotic cells that leads to the accumulation of cAMP. By employing such an approach, one skilled in the art can determine, if desired, the minimal sequence requirement, i.e., a contiguous amino acid sequence of the shortest length, that is capable of delivering a protein, see, e.g.[19]. Accordingly, preferred delivery signals of the present invention consists of at least the minimal sequence of amino acids of a T3SS effector protein that is capable of delivering a protein.

In one embodiment, the recombinant Gram-negative bacterial strain is deficient in producing at least one bacterial effector protein, more preferably is deficient in producing at least one bacterial effector protein which is virulent toward eukaryotic cells, even more preferably is deficient in producing at least one T3SS effector protein, most preferably is deficient in producing at least one T3SS effector protein which is virulent toward eukaryotic cells. In some embodiments the recombinant Gram-negative bacterial strains are deficient in producing at least one, preferably at least two, more preferably at least three, even more preferably at least four, in particular at least five, more particular at least six, most particular all bacterial effector proteins which are virulent toward eukaryotic cells. In some embodiments the recombinant Gram-negative bacterial strains are deficient in producing at least one preferably at least two, more preferably at least three, even more preferably at least four, in particular at least five, more particular at least six, most particular all functional bacterial effector proteins which are virulent toward eukaryotic cells such that the resulting recombinant Gram-negative bacterial strain produces less bacterial effector proteins or produces bacterial effector proteins to a lesser extent compared to the non virulence attenuated Gram-negative bacterial wild type strain i.e. compared to the Gram-negative bacterial wild type strain which normally produces bacterial effector proteins or such that the resulting recombinant Gram-negative bacterial strain no longer produce any functional bacterial effector proteins which are virulent toward eukaryotic cells.

According to the present invention, such a mutant Gram-negative bacterial strain i.e. such a recombinant Gram-negative bacterial strain which is deficient in producing at least one bacterial effector protein e.g. which is deficient in producing at least one bacterial effector protein which is virulent toward eukaryotic cells e.g. such a mutant *Yersinia* strain can be generated by introducing at least one mutation into at least one effector-encoding gene. Preferably, such effector-encoding genes include YopE, YopH, YopO/YpkA, YopM, YopP/YopJ and YopT as far as a *Yersinia* strain is concerned. Preferably, such effector-encoding genes include AvrA, CigR, GogB, GtgA, GtgE, PipB, SifB, SipA/SspA, SipB, SipC/SspC, SipD/SspD, SlrP, SopB/SigD, SopA, SpiC/SsaB, SseB, SseC, SseD, SseF, SseG, SseI/SrfH, SopD, SopE, SopE2, SspH1, SspH2, PipB2, SifA, SopD2, SseJ, SseK1, SseK2, SseK3, SseL, SteC, SteA, SteB, SteD, SteE, SpvB, SpvC, SpvD, SrfJ, SptP, as far as a *Salmonella* strain is concerned. Most preferably, all effector-encoding genes are deleted. The skilled artisan may employ any number of standard techniques to generate mutations in these T3SS effector genes. Sambrook et al. describe in general such techniques. See Sambrook et al.[26]

In accordance with the present invention, the mutation can be generated in the promoter region of an effector-encoding gene so that the expression of such effector gene is abolished.

The mutation can also be generated in the coding region of an effector-encoding gene such that the catalytic activity of the encoded effector protein is abolished. The “catalytic activity” of an effector protein refers normally to the anti-target cell function of an effector protein, i.e., toxicity. Such activity is governed by the catalytic motifs in the catalytic domain of an effector protein. The approaches for identifying the catalytic domain and/or the catalytic motifs of an effector protein are well known by those skilled in the art. See, for example,[27,28]

Accordingly, one preferred mutation of the present invention is a deletion of the entire catalytic domain. Another preferred mutation is a frameshift mutation in an effector-encoding gene such that the catalytic domain is not present in the protein product expressed from such “frameshifted” gene. A most preferred mutation is a mutation with the deletion of the entire coding region of the effector protein. Other mutations are also contemplated by the present invention, such as small deletions or base pair substitutions, which are generated in the catalytic motifs of an effector protein leading to destruction of the catalytic activity of a given effector protein.

The mutations that are generated in the genes of the functional bacterial effector proteins may be introduced into the particular strain by a number of methods. One such method involves cloning a mutated gene into a “suicide” vector which is capable of introducing the mutated sequence into the strain via allelic exchange. An example of such a “suicide” vector is described by[29].

In this manner, mutations generated in multiple genes may be introduced successively into a Gram-negative bacterial strain giving rise to polymutant, e.g a sixtuple mutant recombinant strain. The order in which these mutated sequences are introduced is not important. Under some circumstances, it may be desired to mutate only some but not all of the effector genes. Accordingly, the present invention further contemplates polymutant *Yersinia* other than sixtuple-mutant *Yersinia*, e.g., double-mutant, triple-mutant, quadruple-mutant and quintuple-mutant strains. For the purpose of delivering proteins, the secretion and translocation system of the instant mutant strain needs to be intact.

A preferred recombinant Gram-negative bacterial strain of the present invention is a sixtuple-mutant *Yersinia* strain in which all the effector-encoding genes (which are yopH, yopO, yopP, yopE, yopM, yopT) are mutated such that the resulting *Yersinia* no longer produce any functional effector proteins. Such sixtuple-mutant *Yersinia* strain is designated as ΔyopH,O,P,E,M,T for *Y. enterocolitica*. As an example such a sixtuple-mutant can be produced from the *Y. enterocolitica* MRS40 strain giving rise to *Y. enterocolitica* MRS40 ΔyopH,O,P,E,M,T, (also named *Y. enterocolitica* subsp. *palearctica* MRS40 ΔyopH,O,P,E,M,T or *Y. enterocolitica* ΔyopH,O,P,E,M,T herein) which is preferred. *Y. enterocolitica* MRS40 ΔyopH,O,P,E,M,T which is deficient in the production of Yersiniabactin has been described in WO02077249 and was deposited on 24 Sep. 2001, according to the Budapest Treaty on the International Recognition of the Deposit of Microorganisms for the Purposes of Patent Procedure with the Belgian Coordinated Collections of Microorganisms (BCCM) and was given accession number LMG P-21013.

Equally preferred is *Y. enterocolitica* MRS40 ΔyopH,O,P,E,M,T which comprises a deletion on the endogenous virulence plasmid pYV which removes a RNA hairpin structure or parts thereof such as a deletion of Hairpin I upstream of the gene coding for an endogenous AraC-type DNA binding protein (ΔHairpinI-virF) such as *Y. enterocolitica* MRS40 ΔyopH,O,P,E,M,T ΔHairpinI-virF (also named *Y. enterocolitica* ΔyopH,O,P,E,M,T ΔHairpinI-virF). Equally preferred is *Y. enterocolitica* MRS40 ΔyopH,O,P,E,M,T which comprises a deletion of a chromosomal gene coding for asd and the endogenous virulence plasmid pYV which comprises a nucleotide sequence comprising a gene coding for asd operably linked to a promoter (pYV-asd) such as *Y. enterocolitica* MRS40 ΔyopH,O,P,E,M,T Δasd pYV-asd (also named *Y. enterocolitica* ΔyopH,O,P,E,M,T Δasd pYV-asd herein). Particular preferred is *Y. enterocolitica* MRS40 ΔyopH,O,P,E,M,T Δasd ΔHairpinI-virF pYV-asd which comprises both modifications as described above (also named *Y. enterocolitica* ΔyopH,O,P,E,M,T Δasd ΔHairpinI-virF pYV-asd herein). Particular preferred strains are *Y. enterocolitica* MRS40 ΔyopH,O,P,E,M,T ΔHairpinI-virF (also named *Y. enterocolitica* ΔyopH,O,P,E,M,T ΔHairpinI-virF), *Y. enterocolitica* MRS40 ΔyopH,O,P,E,M,T Δasd pYV-asd (also named *Y. enterocolitica* ΔyopH,O,P,E,M,T Δasd pYV-asd herein) or *Y. enterocolitica* MRS40 ΔyopH,O,P,E,M,T Δasd ΔHairpinI-virF pYV-asd (also named *Y. enterocolitica* ΔyopH,O,P,E,M,T Δasd ΔHairpinI-virF pYV-asd herein) which are deficient in the production of a siderophore, preferably does not produce siderophores e.g. are deficient in the production of any siderophore, as is the case for all *Y. enterocolitica* subsp. *palearctica* strains. Thus, equally particular preferred strains are *Y. enterocolitica* subsp. *palearctica* ΔyopH,O,P,E,M,T ΔHairpinI-virF (also named *Y. enterocolitica* subsp. *palearctica* ΔyopH,O,P,E,M,T ΔHairpinI-virF), *Y. enterocolitica* subsp. *palearctica* ΔyopH,O,P,E,M,T Δasd pYV-asd also named *Y. enterocolitica* ΔyopH,O,P,E,M,T Δasd pYV-asd herein) or *Y. enterocolitica* subsp. *palearctica* ΔyopH,O,P,E,M,T Δasd ΔHairpinI-virF pYV-asd (also named *Y. enterocolitica* ΔyopH,O,P,E,M,T Δasd ΔHairpinI-virF pYV-asd herein).

Most preferred is the sixtuple-mutant *Yersinia enterocolitica* strain which is designated as ΔyopH,O,P,E,M,T.

Polynucleic acid constructs like vectors which can be used according to the invention to transform a Gram-negative bacterial strain may depend on the Gram-negative bacterial strains used as known to the skilled person. Polynucleic acid constructs which can be used according to the invention include expression vectors (including synthetic or otherwise generated modified versions of endogenous virulence plasmids), vectors for chromosomal or virulence plasmid insertion and nucleotide sequences such as e.g. DNA fragments for chromosomal or virulence plasmid insertion. Expression vectors which are useful in e.g. *Yersinia, Escherichia, Salmonella* or *Pseudomonas* strain are e.g pUC, pBad, pACYC, pUCP20 and pET plasmids. Vectors for chromosomal or virulence plasmid insertion which are useful in e.g. *Yersinia, Escherichia, Salmonella* or *Pseudomonas* strain are e.g pKNG101. DNA fragments for chromosomal or virulence plasmid insertion refer to methods used in e.g. *Yersinia, Escherichia, Salmonella* or *Pseudomonas* strain as e.g. lambda-red genetic engineering. Vectors for chromosomal or virulence plasmid insertion or DNA fragments for chromosomal or virulence plasmid insertion may insert the nucleotide sequences of the present invention so that e.g. the nucleotide sequence encoding a heterologous protein fused in frame to the 3'end of a nucleotide sequence encoding a delivery signal from a bacterial effector protein is operably linked to an endogenous promoter of the recombinant Gram-negative bacterial strain. Thus if a vector for chromosomal or virulence plasmid insertion or a DNA fragment for chromosomal or virulence plasmid insertion is used, an endogenous promoter can be encoded on the endogenous bacterial DNA (chromosomal or plasmid DNA) and only the respective nucleotide sequence will be provided by the engineered vector for chromosomal or virulence plasmid insertion or DNA fragment for chromosomal or virulence plasmid insertion. Alternatively, if a vector for chromosomal or virulence plasmid insertion or a polynucleic acid construct such as e.g. a nucleotide sequence for chromosomal or virulence plasmid insertion is used, an endogenous promoter and the delivery signal from a bacterial effector protein can be encoded on the endogenous bacterial DNA (chromosomal or plasmid DNA) and only the polynucleic acid construct such as e.g. a nucleotide sequence encoding the heterologous protein will be provided by a vector for chromosomal or virulence plasmid insertion or by a polynucleic acid construct such as e.g. a nucleotide sequence for chromosomal or virulence plasmid insertion. Thus a promoter is not necessarily needed to be comprised by the vector used for transformation of the recombinant Gram-negative bacterial strains i.e. the recombinant Gram-negative bacterial strains of the present invention may be transformed with a vector which dose not comprise a promoter.

A preferred vector e.g. a preferred expression vector for *Yersinia* is selected from the group consisting of pBad_Si_1, pBad_Si_2 and pT3P-715, pT3P-716 and pT3P-717. pBad_Si2 was constructed by cloning of the SycE-YopE$_{1-138}$ fragment containing endogenous promoters for YopE and SycE from purified pYV40 into KpnI/HindIII site of pBad-MycHisA (Invitrogen). Additional modifications include removal of the NcoI/BglII fragment of pBad-MycHisA by digest, Klenow fragment treatment and religation. Further at the 3' end of YopE$_{1-138}$ the following cleavage sites were added: XbaI-XhoI-BstBI-(HindIII). pBad_Si1 is equal to pBad_Si2 but encodes EGFP amplified from pEGFP-C1 (Clontech) in the NcoI/BglII site under the Arabinose inducible promoter. Equally preferred is the use of modified versions of the endogenous *Yersinia* virulence plasmid pYV encoding heterologous proteins as fusions to a T3SS signal sequence.

A preferred vector e.g. a preferred expression vector for *Salmonella* is selected from the group consisting of pT3P_267, pT3P_268 and pT3P_269. Plasmids pT3P_267, pT3P_268 and pT3P_269 containing the corresponding endogenous promoter and the full length SteA sequence (pT3P_267), the SopE1.si fragment (pT3P 268) or the SopE$_{1-105}$ fragment (pT3P_269) were amplified from *S. enterica* SL1344 genomic DNA and cloned into NcoI/KpnI site of pBad-MycHisA (Invitrogen). pT3P-715 is a fully synthetic plasmid (de-novo synthesized vector) with similar characteristics to pSi_2, while the corresponding AraC coding region has been deleted, and the Ampicillin resistance gene (plus 70 bp upstream) is replaced by a chlorampenicol resistance gene with 200 bp upstream region. For clarity, pT3P-715 comprises the SycE-YopE$_{1-138}$ fragment containing endogenous promoters for YopE and SycE from pYV40, where at the 3' end of YopE1-138 the following cleavage sites were added: XbaI-XhoI-BstBI-HindIII. It features a pBR322 origin of replication, and a chloramphenicol acetyl transferase (cat) from transposable genetic element Tn9[67].

pBad_Si2 and pT3P-715 are medium copy number plasmids with a pBR322 (pMB1) origin of replication (SEQ ID NO: 29).

Derivative pT3P-716 is a high copy number plasmid based on a point mutation in the pBR322 origin of replication (SEQ ID NO: 29), which then results in the ColE1 origin of replication (SEQ ID NO: 30). High-copy number plasmids for expression and delivery of heterologous cargo proteins are based on pT3P-716.

Derivative pT3P-717 is a low copy number plasmid based on the pBR322 origin of replication as in pT3P-715, but additionally comprising the rop (for "repressor of primer") gene (SEQ ID NO: 31). Low-copy number plasmids for expression and delivery of heterologous cargo proteins are based on pT3P-717.

The polynucleotide molecules of the instant invention may include other sequence elements such as a 3' termination sequence (including a stop codon and a poly A sequence), or a gene conferring a drug resistance which allows the selection of transformants having received the polynucleotide molecules or other element allowing selection of transformants.

The polynucleotide molecules of the present invention may be transformed by a number of known methods into the recombinant Gram-negative bacterial strains. For the purpose of the present invention, the methods of transformation for introducing the polynucleotide molecules include, but are not limited to, electroporation, calcium phosphate mediated transformation, conjugation, or combinations thereof. For example, a polynucleotide molecules e.g. located on a vector can be transformed into a first bacteria strain by a standard electroporation procedure. Subsequently, such a polynucleotide molecule e.g. located on a vector can be transferred from the first bacteria strain into the desired strain by conjugation, a process also called "mobilization". Transformant (i.e., Gram-negative bacterial strains having taken up the vector) may be selected, e.g., with antibiotics. These techniques are well known in the art. See, for example,[19].

In accordance with the present invention, the promoter operably linked to the bacterial effector protein of the recombinant Gram-negative bacterial strain of the invention can be a native promoter of a T3SS effector protein of the respective strain or a compatible bacterial strain, or another native promoter of the respective or a compatible bacterial strain or a promoter used in expression vectors which are useful in e.g. *Yersinia, Escherichia, Salmonella* or *Pseudomonas* strain e.g pUC and pBad. Such promoters are the T7 promoter, Plac promoter or the arabinose inducible Ara-bad promoter.

If the recombinant Gram-negative bacterial strain is a *Yersinia* strain the promoter can be from a *Yersinia* virulon gene. A "*Yersinia* virulon gene" refers to genes on the *Yersinia* pYV plasmid, the expression of which is controlled both by temperature and by contact with a target cell. Such genes include genes coding for elements of the secretion machinery (the Ysc genes), genes coding for translocators (YopB, YopD, and LcrV), genes coding for the control elements (YopN, TyeA and LcrG), genes coding for T3SS effector chaperones (SycD, SycE, SycH, SycN, SycO and SycT), and genes coding for effectors (YopE, YopH, YopO/YpkA, YopM, YopT and YopP/YopJ) as well as other pYV encoded proteins as VirF and YadA.

In a preferred embodiment of the present invention, the promoter is the native promoter of a T3SS functional effector encoding gene. If the recombinant Gram-negative bacterial strain is a *Yersinia* strain the promoter is selected from any one of YopE, YopH, YopO/YpkA, YopM and YopP/YopJ. More preferably, the promoter is from YopE and/or YopH. Most preferred is the YopE and the YopH promoter, respectively.

If the recombinant Gram-negative bacterial strain is a *Salmonella* strain the promoter can be from SpiI or SpiII pathogenicity island or from an effector protein elsewhere encoded. Such genes include genes coding for elements of the secretion machinery, genes coding for translocators, genes coding for the control elements, genes coding for T3SS effector chaperones, and genes coding for effectors as well as other proteins encoded by SPI-1 or SPI-2. In a preferred embodiment of the present invention, the promoter is the native promoter of a T3SS functional effector encoding gene. If the recombinant Gram-negative bacterial strain is a *Salmonella* strain the promoter is selected from any one of the effector proteins. More preferably, the promoter is from SopE, InvB or SteA.

In some embodiments the promoter is an artificially inducible promoter, as e.g. the IPTG inducible promoter, a light inducible promoter and the arabinose inducible promoter.

In one embodiment of the present invention the recombinant Gram-negative bacterial strain comprises a nucleotide sequence encoding a protease cleavage site. The protease cleavage site is usually located on the polynucleotide molecule comprising a nucleotide sequence encoding a heterologous protein fused in frame to the 3'end of a nucleotide sequence encoding a delivery signal from a bacterial effector protein between the nucleotide sequence encoding a heterologous protein and the nucleotide sequence encoding a delivery signal. Generation of a functional and generally applicable cleavage site allows cleaving off the delivery signal after translocation. As the delivery signal can interfere with correct localization and/or function of the translocated protein within the target cells the introduction of a protease cleavage site between the delivery signal and the protein of interest provides delivery of almost native proteins into eukaryotic cells. Preferably the protease cleavage site is an amino acid motif which is cleaved by a protease or the catalytic domains thereof selected from the group consisting of enterokinase (light chain), enteropeptidase, prescission protease, human rhinovirus protease 3C, TEV protease, TVMV protease, FactorXa protease and thrombin, more preferably an amino acid motif which is cleaved by TEV protease. Equally preferable the protease cleavage site is an amino acid motif which is cleaved by a protease or the catalytic domains thereof selected from the group consisting of enterokinase (light chain), enteropeptidase, prescission protease, human rhinovirus protease 3C, TEV protease, TVMV protease, FactorXa protease, ubiquitin processing protease, called Deubiquitinating enzymes, and thrombin. Most preferred is an amino acid motif which is cleaved by TEV protease or by an ubiquitin processing protease.

Thus in a further embodiment of the present invention, the heterologous protein is cleaved from the delivery signal from a bacterial effector protein by a protease.

Preferred methods of cleavage are methods wherein:

a) the protease is translocated into the eukaryotic cell by a recombinant Gram-negative bacterial strain as described herein which expresses a fusion protein which comprises the delivery signal from the bacterial effector protein and the protease as heterologous protein; or
b) the protease is expressed constitutively or transiently in the eukaryotic cell.

Usually the recombinant Gram-negative bacterial strain used to deliver a desired protein into a eukaryotic cell and the recombinant Gram-negative bacterial strain translocating the protease into the eukaryotic cell are different.

In one embodiment of the present invention the recombinant Gram-negative bacterial strain comprises a further nucleotide sequence encoding a labelling molecule or an acceptor site for a labelling molecule. The further nucleotide sequence encoding a labelling molecule or an acceptor site for a labelling molecule is usually fused to the 5' end or to the 3' end of the nucleotide sequence encoding a heterologous protein. A preferred labelling molecule or an acceptor site for a labelling molecule is selected from the group consisting of enhanced green fluorescent protein (EGFP), coumarin, coumarin ligase acceptor site, resorufin, resurofin ligase acceptor site, the tetra-Cysteine motif in use with FlAsH/ReAsH dye (life technologies). Most preferred is resorufin and a resurofin ligase acceptor site or EGFP. The use of a labelling molecule or an acceptor site for a labelling molecule will lead to the attachment of a labelling molecule to the heterologous protein of interest, which will then be delivered as such into the eukaryotic cell and enables tracking of the protein by e.g. live cell microscopy.

In one embodiment of the present invention the recombinant Gram-negative bacterial strain comprises a further nucleotide sequence encoding a peptide tag. The further nucleotide sequence encoding a peptide tag is usually fused to the 5' end or to the 3' end of the nucleotide sequence encoding a heterologous protein. A preferred peptide tag is selected from the group consisting of Myc-tag, His-tag, Flag-tag, HA tag, Strep tag or V5 tag or a combination of two or more tags out of these groups. Most preferred is Myc-tag, Flag-tag, His-tag and combined Myc- and His-tags. The use of a peptide tag will lead to traceability of the tagged protein e.g by immunofluorescence or Western blotting using anti-tag antibodies. Further, the use of a peptide tag allows affinity purification of the desired protein either after secretion into the culture supernatant or after translocation into eukaryotic cells, in both cases using a purification method suiting the corresponding tag (e.g. metal-chelate affinity purification in use with a His-tag or anti-Flag antibody based purification in use with the Flag-tag).

In one embodiment of the present invention the recombinant Gram-negative bacterial strain comprises a further nucleotide sequence encoding a nuclear localization signal (NLS). The further nucleotide sequence encoding a nuclear localization signal (NLS) is usually fused to the 5'end or to the 3'end of the nucleotide sequence encoding a heterologous protein wherein said further nucleotide sequence encodes a nuclear localization signal (NLS). A preferred NLS is selected from the group consisting of SV40 large T-antigen NLS and derivates thereof[30] as well as other viral NLS. Most preferred is SV40 large T-antigen NLS and derivates thereof.

In one embodiment of the present invention the recombinant Gram-negative bacterial strain comprises a multiple cloning site. The multiple cloning site is usually located at the 3'end of the nucleotide sequence encoding a delivery signal from a bacterial effector protein and/or at the 5'end or 3'end of the nucleotide sequence encoding a heterologous protein. One or more than one multiple cloning sites can be comprised by the vector. A preferred multiple cloning site is selected from the group of restriction enzymes consisting of XhoI, XbaI, HindIII, NcoI, NotI, EcoRI, EcoRV, BamHI, NheI, SacI, SalI, BstBI. Most preferred is XbaI, XhoI, BstBI and HindIII.

The fused protein expressed by the recombinant Gram-negative bacterial strain of the present invention is also termed as a “fusion protein” or a “hybrid protein”, i.e., a fused protein or hybrid of delivery signal and a heterologous protein. The fusion protein can also comprise e.g. a delivery signal and two or more different heterologous proteins.

The present invention contemplates the Gram-negative bacterial strain as described herein for use as a medicament.

Thus in a further aspect the present invention relates to a recombinant Gram-negative bacterial strain which comprises i) a first polynucleotide molecule comprising a nucleotide sequence encoding a heterologous protein or a fragment thereof fused in frame to the 3'end of a nucleotide sequence encoding a delivery signal from a bacterial effector protein, wherein the nucleotide sequence encoding the delivery signal from a bacterial effector protein is operably linked to a promoter;

ii) a second polynucleotide molecule comprising a nucleotide sequence encoding a heterologous protein or a fragment thereof fused in frame to the 3'end of a nucleotide sequence encoding a delivery signal from a bacterial effector protein, wherein the nucleotide sequence encoding the delivery signal from a bacterial effector protein is operably linked to a promoter;

iii) a third polynucleotide molecule comprising a nucleotide sequence encoding a heterologous protein or a fragment thereof fused in frame to the 3'end of a nucleotide sequence encoding a delivery signal from a bacterial effector protein, wherein the nucleotide sequence encoding the delivery signal from a bacterial effector protein is operably linked to a promoter; and iv) a fourth polynucleotide molecule comprising a nucleotide sequence encoding a heterologous protein or a fragment thereof fused in frame to the 3'end of a nucleotide sequence encoding a delivery signal from a bacterial effector protein, wherein the nucleotide sequence encoding the delivery signal from a bacterial effector protein is operably linked to a promoter, wherein said first and said second polynucleotide molecule are located on a vector comprised by said Gram-negative bacterial strain and said third and said fourth polynucleotide molecule are located on a chromosome of said Gram-negative bacterial strain or on an extra-chromosomal genetic element comprised by said Gram-negative bacterial strain, with the proviso that the extra-chromosomal genetic element is not the vector on which the said first and said second polynucleotide molecule are located, for use as a medicament.

The present invention also contemplates methods for treating cancer in a subject e.g. treating malignant solid tumors including delivering heterologous proteins as hereinabove described into cancer cells e.g. to cells of a malignant solid tumor or to cells of the tumor microenvironment.

Thus in a further aspect the present invention relates to a recombinant Gram-negative bacterial strain which comprises i) a first polynucleotide molecule comprising a nucleotide sequence encoding a heterologous protein or a fragment thereof fused in frame to the 3'end of a nucleotide sequence encoding a delivery signal from a bacterial effector protein, wherein the nucleotide sequence encoding the delivery signal from a bacterial effector protein is operably linked to a promoter;

ii) a second polynucleotide molecule comprising a nucleotide sequence encoding a heterologous protein or a fragment thereof fused in frame to the 3'end of a nucleotide sequence encoding a delivery signal from a bacterial effector protein, wherein the nucleotide sequence encoding the delivery signal from a bacterial effector protein is operably linked to a promoter;

iii) a third polynucleotide molecule comprising a nucleotide sequence encoding a heterologous protein or a fragment thereof fused in frame to the 3'end of a nucleotide sequence encoding a delivery signal from a bacterial effector protein, wherein the nucleotide sequence encoding the delivery signal from a bacterial effector protein is operably linked to a promoter; and iv) a fourth polynucleotide molecule comprising a nucleotide sequence encoding a heterologous protein or a fragment thereof fused in frame to the 3'end of a nucleotide sequence encoding a delivery signal from a bacterial effector protein, wherein the nucleotide sequence encoding the delivery signal from a bacterial effector protein is operably linked to a promoter, wherein said first and said second polynucleotide molecule are located on a vector comprised by said Gram-negative bacterial strain and said third and said fourth polynucleotide molecule are located on a chromosome of said Gram-negative bacterial strain or on an extra-chromosomal genetic element comprised by said Gram-negative bacterial strain, with the proviso that the extra-chromosomal genetic element is not the vector on which the said first and said second polynucleotide molecule are located, for use in a method of treating cancer in a subject, the method comprising administering to the subject said recombinant Gram-negative bacterial strain, wherein the recombinant Gram-negative bacterial strain is administered in an amount that is sufficient to treat the subject.

Likewise the present invention relates to a method of treating cancer in a subject, comprising administering to the subject the above described recombinant Gram-negative bacterial strain, wherein the recombinant Gram-negative bacterial strain is administered in an amount that is sufficient to treat the subject.

Likewise the present invention relates to the use of the above described recombinant Gram-negative bacterial strain for the manufacture of a medicament for treating cancer in a subject.

Likewise, the present invention relates to the use of the above described recombinant Gram-negative bacterial strain for treating cancer in a subject.

The proteins may be delivered i.e. translocated into the cancer cell e.g. to cells of a malignant solid tumor at the time of administering the recombinant Gram-negative bacterial strain to a subject or may be delivered i.e. translocated into the cancer cell e.g. to cells of a malignant solid tumor or cells of the tumor microenvironment at a later time e.g. after the recombinant Gram-negative bacterial strain has reached a cancer cell e.g. the site of the malignant solid tumor and/or has reached a cancer cell e.g. the site of the malignant solid tumor and has replicated as described above. The time of delivery can be regulated e.g by the promoter used to express the heterologous proteins in the recombinant Gram-negative bacterial strain. In the first case, either a constitutive promoter or, more preferred, an endogenous promoter of a bacterial effector protein might drive the heterologous protein. In the case of delayed protein delivery, an artificially inducible promoter, as the arabinose inducible promoter, might drive the heterologous protein. In this case, arabinose (or an inducer of a corresponding inducible promoter) will be administered to a subject once bacteria have reached and accumulated at the desired site. Arabinose will then induce the bacterial expression of the protein to be delivered.

Thus in one embodiment the method of treating cancer comprises i) culturing the recombinant Gram-negative bacterial strain as described herein;

ii) administering to the subject said recombinant Gram-negative bacterial strain of i) wherein a fusion protein which comprises a delivery signal from a bacterial effector protein and the heterologous protein is expressed by the recombinant Gram-negative bacterial strain and is translocated into the cancer cell or a cell of the tumor microenvironment; and optionally iii) cleaving the fusion protein so that the heterologous protein is cleaved from the delivery signal from the bacterial effector protein inside of the cancer cell, wherein the recombinant Gram-negative bacterial strain is administered in an amount that is sufficient to treat the subject.

The cancer cells for delivering heterologous proteins are usually cancer cells from cancers selected from the group consisting of Sarcoma, Leukemia, Lymphoma, multiple myeloma, Central nervous system cancers, and malignant solid tumors, which include, but are not limited to, abnormal mass of cells which may stem from different tissue types such as liver, colon, colorectum, skin, breast, pancreas, cervix uteri, corpus uteri, bladder, gallbladder, kidney, larynx, lip, oral cavity, oesophagus, ovary, prostate, stomach, testis, thyroid gland or lung and thus include malignant solid liver, colon, colorectum, skin, breast, pancreas, cervix uteri, corpus uteri, bladder, gallbladder, kidney, larynx, lip, oral cavity, oesophagus, ovary, prostate, stomach, testis, thyroid gland or lung tumors. Preferably the cancer cells for delivering heterologous proteins are cancer cells of malignant solid tumors.

Thus in one preferred embodiment the cancer is a malignant solid tumor and the method comprises i) culturing the recombinant Gram-negative bacterial strain as described herein;

ii) administering to the subject said recombinant Gram-negative bacterial strain of i) wherein a fusion protein which comprises a delivery signal from a bacterial effector protein and the heterologous protein is expressed by the recombinant Gram-negative bacterial strain and is translocated into the cell of a malignant solid tumor or a cell in the tumor microenvironment; and optionally iii) cleaving the fusion protein so that the heterologous protein is cleaved from the delivery signal from the bacterial effector protein inside of the cell of a malignant solid tumor, wherein the recombinant Gram-negative bacterial strain is administered in an amount that is sufficient to treat the subject.

In some embodiments at least two fusion proteins which comprise each a delivery signal from a bacterial effector protein and a heterologous protein are expressed by the recombinant Gram-negative bacterial strain and are translocated into the eukaryotic cell e.g the cancer cell by the methods of the present inventions.

The recombinant Gram-negative bacterial strain can be cultured so that a fusion protein is expressed which comprises the delivery signal from the bacterial effector protein and the heterologous protein according to methods known in the art (e.g. FDA, Bacteriological Analytical Manual (BAM), chapter 8: *Yersinia enterocolitica*). Preferably the recombinant Gram-negative bacterial strain can be cultured in Brain Heart infusion broth e.g. at 28° C. For induction of expression of T3SS and e.g. YopE/SycE promoter dependent genes, bacteria can be grown at 37° C.

In one embodiment, the cancer cell e.g the cell of a malignant solid tumor is contacted with two recombinant Gram-negative bacterial strains of i), wherein the first recombinant Gram-negative bacterial strain expresses a first fusion protein which comprises the delivery signal from the bacterial effector protein and a first heterologous protein and the second recombinant Gram-negative bacterial strain expresses a second fusion protein which comprises the delivery signal from the bacterial effector protein and a second heterologous protein, so that the first and the second fusion protein are translocated into the cell of a malignant solid tumor or a cell of the tumor microenvironment. This embodiment provided for co-infection of a cancer cell e.g a cell of a malignant solid tumor with two bacterial strains as a valid method to deliver e.g. two different hybrid proteins into single cells.

Those skilled in the art can also use a number of assays to determine whether the delivery of a fusion protein is successful. For example, the fusion protein may be detected via immunofluorescence using antibodies recognizing a fused tag (like Myc-tag). The determination can also be based on the enzymatic activity of the protein being delivered, e.g., the assay described by[19].

The present invention also provides a pharmaceutical composition comprising a recombinant Gram-negative bacterial strain as described herein optionally comprising a suitable pharmaceutically acceptable carrier. Thus the present invention also provides a pharmaceutical composition comprising a recombinant Gram-negative bacterial strain as described herein for use in a method of treating cancer e.g. a malignant solid tumor in a subject.

The recombinant Gram-negative bacteria can be compounded for convenient and effective administration in an amount that is sufficient to treat the subject as pharmaceutical composition with a suitable pharmaceutically acceptable carrier. A unit dosage form of the recombinant Gram-negative bacteria or of the pharmaceutical composition to be administered can, for example, contain the recombinant Gram-negative bacteria in an amount from about $10^5$ to about $10^{10}$ bacteria per ml, preferably about $10^6$ to about $10^9$ bacteria per ml, more preferably about $10^7$ to about $10^9$ bacteria per ml, most preferably about $10^8$ bacteria per ml.

By "amount that is sufficient to treat the subject" or "effective amount" which are used herein interchangeably is meant to be an amount of a bacterium or bacteria, high enough to significantly positively modify the condition to be treated but low enough to avoid serious side effects (at a reasonable benefit/risk ratio), within the scope of sound medical judgment. An effective amount of a bacterium will vary with the particular goal to be achieved, the age and physical condition of the subject being treated, the duration of treatment, the nature of concurrent therapy and the specific bacterium employed. The effective amount of a bacterium will thus be the minimum amount, which will provide the desired effect. Usually an amount from about $10^5$ to about $10^{10}$ bacteria e.g. from about $10^5$ to about $10^{10}$ bacteria/$m^2$ body surface, preferably from about $10^6$ to about $10^9$ bacteria e.g. from about $10^6$ to about $10^9$ bacteria/$m^2$ body surface, more preferably from about $10^7$ to about $10^8$ bacteria e.g. from about $10^7$ to about $10^8$ bacteria/$m^2$ body surface, most preferably $10^8$ bacteria e.g. $10^8$ bacteria/$m^2$ body surface are administered to the subject.

A single dose of the recombinant Gram-negative bacterial strain to administer to a subject, e.g. to a human to treat cancer e.g. a malignant solid tumor is usually from about $10^4$ to about $10^{10}$ bacteria e.g. from about $10^4$ bacteria/$m^2$ body surface to about $10^{10}$ bacteria/$m^2$ body surface, preferably from about $10^5$ to about $10^9$ bacteria e.g. from about $10^5$ to about $10^9$ bacteria/$m^2$ body surface, more preferably from about $10^6$ to about $10^8$ bacteria e.g. from about $10^6$ to about $10^8$ bacteria/$m^2$ body surface, even more preferably from about $10^7$ to about $10^8$ bacteria e.g. from about $10^7$ to about $10^8$ bacteria/$m^2$ body surface, most preferably $10^8$ bacteria e.g. $10^8$ bacteria/$m^2$ body surface of total recombinant Gram-negative bacteria.

Examples of substances which can serve as pharmaceutical carriers are sugars, such as lactose, glucose and sucrose; starches and its derivatives such as corn starch and potato starch; cellulose and its derivatives such as sodium carboxymethycellulose, ethylcellulose and cellulose acetates; powdered tragancanth; malt; gelatin; talc; stearic acids; magnesium stearate; calcium sulfate; calcium carbonate; vegetable oils, such as peanut oils, cotton seed oil, sesame oil, olive oil, corn oil and oil of theobroma; polyols such as propylene glycol, glycerine, sorbitol, manitol, and polyethylene glycol; agar; alginic acids; pyrogen-free water; isotonic saline; cranberry extracts and phosphate buffer solution; skim milk powder; as well as other non-toxic compatible substances used in pharmaceutical formulations such as Vitamin C, estrogen and echinacea, for example. Wetting agents and lubricants such as sodium lauryl sulfate, as well as coloring agents, flavoring agents, lubricants, excipients, tabletting agents, stabilizers, anti-oxidants and preservatives, can also be present.

Modes of administration of the recombinant Gram-negative bacteria to a subject may be selected from the group consisting of intravenous, intratumoral, intraperitoneal and per-oral administration. Although this invention is not intended to be limited to any particular mode of application, intravenous or intratumoral administration of the bacteria or the pharmaceutical compositions is preferred.

Depending on the route of administration, the active ingredients which comprise bacteria may be required to be coated in a material to protect said organisms from the action of enzymes, acids and other natural conditions which may inactivate said organisms. In order to administer bacteria by other than parenteral administration, they should be coated by, or administered with, a material to prevent inactivation. For example, bacteria may be co-administered with enzyme inhibitors or in liposomes. Enzyme inhibitors include pancreatic trypsin inhibitor, diisopropylfluorophosphate (DFP) and trasylol. Liposomes include water-in-oil-in-water P40 emulsions as well as conventional and specifically designed liposomes which transport bacteria, such as *Lactobacillus*, or their by-products to an internal target of a host subject.

One bacterium may be administered alone or in conjunction with a second, different bacterium. Any number of different bacteria may be used in conjunction. By "in conjunction with" is meant together, substantially simultaneously or sequentially. The compositions may be also administered in the form of tablet, pill or capsule, for example, such as a freeze-dried capsule comprising the bacteria or the pharmaceutical compositions of the present invention or as frozen solution of bacteria or the pharmaceutical compositions of the present invention containing DMSO or glycerol. Another preferred form of application involves the preparation of a lyophilized capsule of the bacteria or the pharmaceutical compositions of the present invention. Still another preferred form of application involves the preparation of a heat dried capsule of the bacteria or the pharmaceutical compositions of the present invention.

The recombinant Gram-negative bacteria or the pharmaceutical composition to be administered can be administered by injection. Forms suitable for injectable use include monoseptic suspensions and monoseptic powders for the extemporaneous preparation of monoseptic injectable suspension. In all cases the form must be monoseptic and must be fluid to the extent that easy syringability exists. It must be stable under the conditions of manufacture and storage. The carrier can be a solvent or dispersion medium containing, for example, water, sugars, polyol (for example, glycerol, propylene glycol, liquid polyethylene glycol, and the like), suitable mixtures thereof and vegetable oils. The proper fluidity can be maintained, for example, by the use of a coating such as lecithin, by the maintenance of the required particle size in the case of dispersion. In many cases it will be preferable to include isotonic agents, for example, sugars or sodium chloride. Prolonged absorption of the injectable compositions can be brought about by the use in the compositions of agents delaying absorption, for example, aluminum monostearate and gelatin.

In some embodiments of the present invention the recombinant Gram-negative bacterial strain is co-administered with a siderophore to the subject. These embodiments are preferred. Siderophores which can be co-administered are siderophores including hydroxamate, catecholate and mixed ligand siderophores. Preferred siderophores are Deferoxamine (also known as desferrioxamine B, desferoxamine B, DFO-B, DFOA, DFB or desferal), Desferrioxamine E, Deferasirox (Exjade, Desirox, Defrijet, Desifer) and Deferiprone (Ferriprox), more preferred is Deferoxamine. Deferoxamine is a bacterial siderophore produced by the Actinobacteria *Streptomyces pilosus* and is commercially available from e.g. Novartis Pharma Schweiz AG (Switzerland).

Co-administration with a siderophore can be before, simultaneous to or after administration of the recombinant Gram-negative bacterial strain. Preferably a siderophore is administered before the administration of recombinant Gram-negative bacterial strain, more preferably is administered at about 24 hours before, preferably about 6 hours before, more preferably 3 hours before, hours, in particular 1 hour before the administration of the recombinant Gram-negative bacterial strain to the subject. In a particular embodiment the subject is pretreated with desfreoxamine 1 hour prior to infection with the recombinant Gram-negative bacterial strain in order to allow bacterial growth. Usually a siderophore is co-administered at a single dose from about $0.5\times10^{-5}$ Mol to about $1\times10^{-3}$ Mol, more preferably from about $1\times10^{-5}$ Mol to about $5\times10^{-4}$ Mol preferably from about $1\times10^{-4}$ Mol to about $4\times10^{-4}$ Mol. Usually desferoxamine is co-administered at single dose from about 20 mg to about 500 mg preferably from about 50 mg to about 200 mg per subject, more preferably a single dose of 100 mg desferoxamine is co-administered.

Dosis regimens of the administration of the recombinant Gram-negative bacterial strain or the pharmaceutical composition described herein will vary with the particular goal to be achieved, the age and physical condition of the subject being treated, the duration of treatment, the nature of concurrent therapy and the specific bacterium employed, as known to the skilled person. The recombinant Gram-negative bacterial strain is usually administered to the subject according to a dosing regimen consisting of a single dose every 1-20 days, preferably every 1-10 days, more preferably every 1-7 days. The period of administration is usually about 20 to about 60 days, preferably about 30-40 days. Alternatively the period of administration is usually about 8 to about 32 weeks, preferably about 8 to about 24 weeks, more preferably about 12 to about 16 weeks.

The present invention also provides a kit for treating cancer e.g. such as malignant solid tumors, preferably in human. Such kits generally will comprise the recombinant Gram-negative bacterial strain or the pharmaceutical composition described herein, and instructions for using the kit. In some embodiments, kits include a carrier, package, or container that is compartmentalized to receive one or more containers such as vials, tubes, and the like, each of the container(s) including one of the separate elements to be used in a method described herein. Suitable containers include, for example, bottles, vials, syringes, and test tubes. In other embodiments, the containers are formed from a variety of materials such as glass or plastic.

EXAMPLES

Example 1

A) Materials and Methods

Bacterial strains and growth conditions. The strains used in this study are listed in FIGS. 27A to E. *E. coli* Top10, used for plasmid purification and cloning, and *E. coli* Sm10λ pir, used for conjugation, as well as *E. coli* BW19610[31], used to propagate pKNG101, were routinely grown on LB agar plates and in LB broth at 37° C. Ampicillin was used at a concentration of 200 μg/ml (*Yersinia*) or 100 μg/ml (*E. coli*) and Chloramphenicol was used at 10 μg/ml to select for expression vectors. Streptomycin was used at a concentration of 100 μg/ml to select for suicide vectors. *Y. enterocolitica* MRS40 (O:9, biotype 2)[20] a non Ampicillin resistant E40-derivate[19] and strains derived thereof were routinely grown on Brain Heart Infusion (BHI; Difco) at RT. To all *Y. enterocolitica* strains Nalidixic acid was added (35 μg/ml) and all *Y. enterocolitica* asd strains were additionally supplemented with 100 μg/ml meso-2,6-Diaminopimelic acid (mDAP, Sigma Aldrich).

Genetic manipulations of *Y. enterocolitica*. Genetic manipulations of *Y. enterocolitica* has been described[32,33] Briefly, mutators for modification or deletion of genes in the pYV plasmids or on the chromosome were constructed by 2-fragment overlapping PCR using purified pYV40 plasmid or genomic DNA as template, leading to 200-250 bp of flanking sequences on both sides of the deleted or modified part of the respective gene. Alternatively, fully synthetic DNA fragments (de-novo synthesized) with 200-250 bp of flanking sequences on both sides of the deleted or modified part of the respective gene were used. Resulting fragments were cloned in pKNG101[29] in *E. coli* BW19610[31]. Sequence verified plasmids were transformed into *E. coli* Sm10λ pir, from where plasmids were mobilized into the corresponding *Y. enterocolitica* strain. Mutants carrying the integrated vector were propagated for several generations without selection pressure. Then sucrose was used to select for clones that have lost the vector. Finally, mutants were identified by colony PCR. Specific mutators (pT3P-456, pT3P-457, pT3P-697 and pT3P-714) are listed in Table III.

Figure 3:
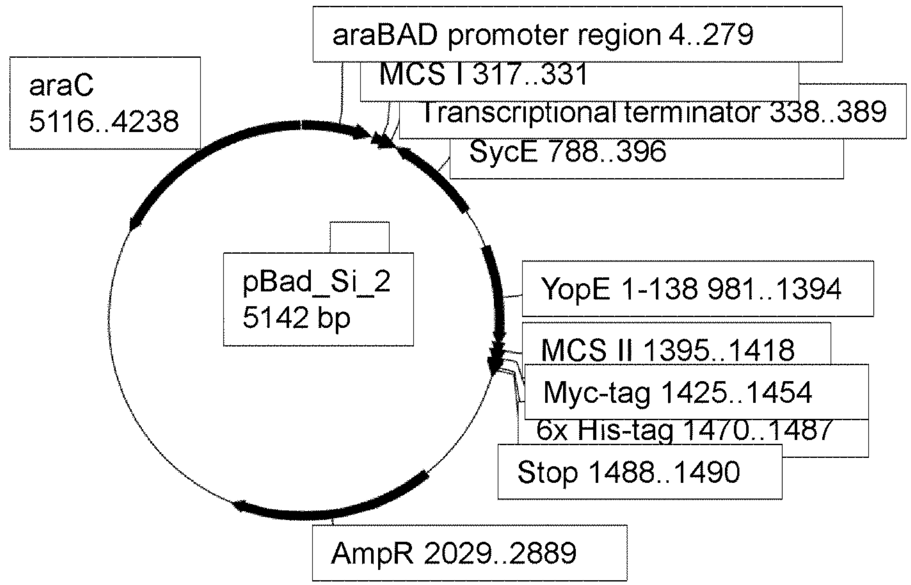
FIG. 3: Description of vector pBad_Si2. (A) Vector map of the cloning plasmid pBad_Si2 used to generate fusion constructs with $YopE_{1-138}$. The chaperone SycE and the $YopE_{1-138}$-fusion are under the native *Y. enterocolitica* promoter. (B) Multiple cloning site (SEQ ID NO: 44) directly following the $yopE_{1-138}$ fragment on pBad_Si2 plasmid.
Figure 3:
Figure 4:
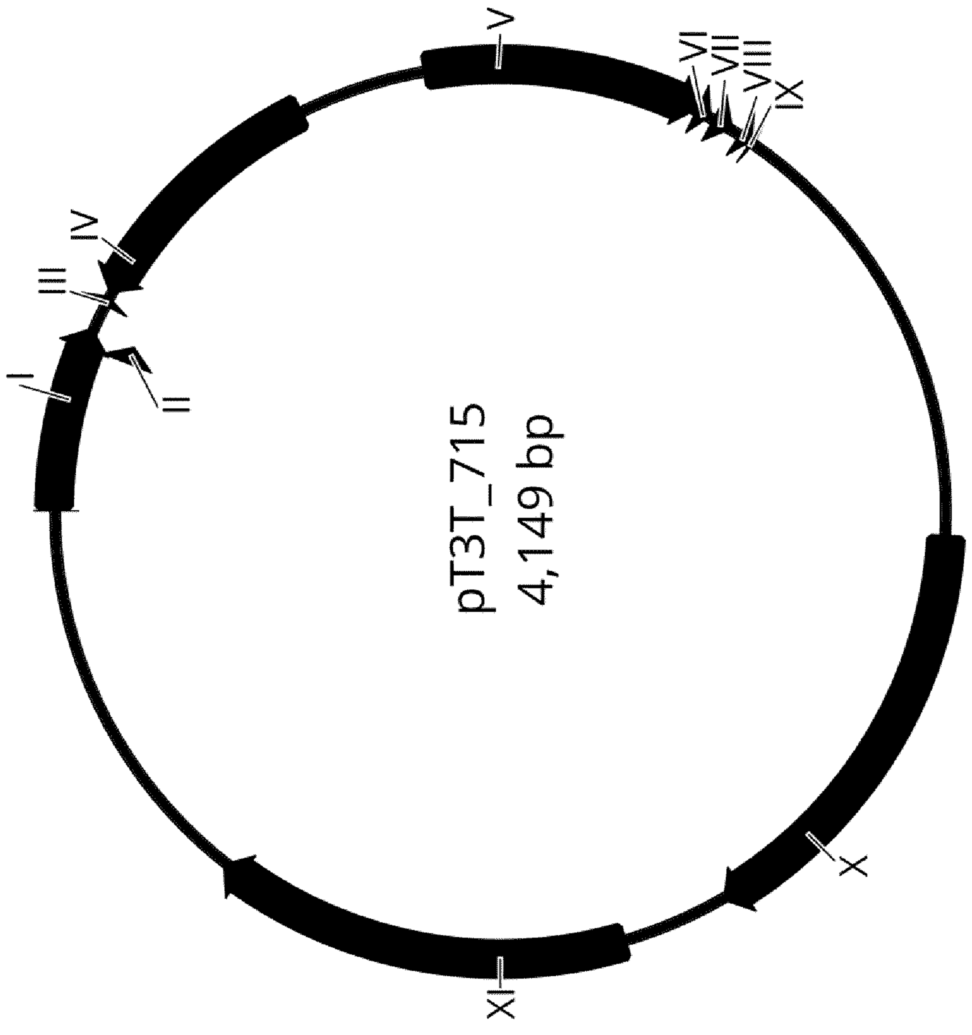
FIG. 4: Description of vector pT3P-715. Vector map of the medium-copy number cloning plasmid pT3P-715 used to generate fusion constructs with $YopE_{1-138}$. The chaperone SycE and the $YopE_{1-138}$-fusion are under the native *Y.*

Construction of plasmids. Plasmid pBad_Si2, pBad_Si1 or pT3P-715 (or derivatives pT3P-716 and pT3P-717) were used for cloning of fusion proteins with the N-terminal 138 amino acids of YopE (SEQ ID No. 25). pBad_Si2 (FIG. 3) was constructed by cloning of the SycE-$YopE_{1-138}$ fragment containing endogenous promoters for YopE and SycE from purified pYV40 into KpnI/HindIII site of pBad-MycHisA (Invitrogen). Additional modifications include removal of the NcoI/BglII fragment of pBad-MycHisA by digestion, Klenow fragment treatment and religation. A bidirectional transcriptional terminator (BBa_B1006; iGEM foundation) was cloned into KpnI cut and Klenow treated (pBad_Si2) or BglII cut site (pBad_Si1). Further at the 3' end of $YopE_{1-138}$ the following cleavage sites were added: XbaI-XhoI-BstBI-(HindIII) (FIG. 3 B). pBad_Si1 is equal to pBad_Si2 but encodes EGFP amplified from pEGFP-C1 (Clontech) in the NcoI/BglII site under the Arabinose inducible promoter. pT3P-715 (FIG. 4) is a fully synthetic plasmid (de-novo synthesized vector) with similar characteristics to pSi_2, while the corresponding AraC coding region has been deleted, and the Ampicillin resistance gene (plus 70 bp upstream) is replaced by a chlorampenicol resistance gene with 200 bp upstream region. For clarity, pT3P-715 comprises the SycE-YopE1-138 fragment containing endogenous promoters for YopE and SycE from pYV40, where at the 3' end of YopE1-138 the following cleavage sites were added: XbaI-XhoI-BstBI-HindIII. It features a pBR322 origin of replication, and a chloramphenicol acetyl transferase (cat) from transposable genetic element Tn9 (Alton N K, Vapnek D (1979) Nucleotide sequence analysis of the chloramphenicol resistance transposon Tn9. Nature 282: 864-869).

Derivative pT3P-716 (FIG. 5) is a high copy number plasmid based on a point mutation in the pBR322 origin of replication (SEQ ID NO: 29), which then results in the ColE1 origin of replication (SEQ ID NO: 30). High-copy number plasmids for expression and delivery of heterologous cargo proteins are based on pT3P-716. Derivative pT3P-717 (FIG. 6) is a low copy number plasmid based on the pBR322 origin of replication as in pT3P-715, but additionally comprising the rop (for "repressor of primer") gene (SEQ ID NO: 31). Low-copy number plasmids for expression and delivery of heterologous cargo proteins are based on pT3P-717. pT3P-716 and pT3P-717 fully synthetic plasmid (de-novo synthesized vectors).

Heterologous proteins for delivery—RIG-I. RIG-I (also called DDX58; Uniprot O95786 for the human protein) is a cytoplasmic sensor for short double-stranded RNA and a major pattern recognition receptor of the innate immune system. RIG-I consists of an RNA helicase domain, a C-terminal domain and an N-terminal domain (Brisse & Ly, 2019). The helicase domain is responsible for double-stranded RNA recognition; the C-terminal domain includes a repressor domain; and the N-terminal domain includes two caspase-recruitment domains (CARDs) which activate downstream signalling pathways. In its resting state, RIG-I is found in a state with the C-terminal repressor domain covering the RNA-binding and helicase domains. Upon binding of agonistic viral RNA to the helicase domain, the protein unfolds and the N-terminal CARD domains become accessible for interaction with downstream partners such as mitochondrial antiviral-signalling protein (MAVS) and TANK-binding kinase 1 (TBK1). This is followed by nuclear translocation of activated IFN-regulatory factor 3 (IRF3) and IRF7, which results in transcription of interferon stimulating responsive element (ISRE)-regulated coding sequences, such as IFN-α and -β. Heterologous protein for delivery was selected to be composed of the N-terminal CARD domains of RIG-I alone (without the rest of the protein; e.g. human RIG-I$_{1-245}$ or RIG-I$_{1-229}$ or RIG-I$_{1-218}$, all of which comprise both N-terminal CARD domains of RIG-I, and are thus referred to as RIG-I CARD$_2$ fragments, RIG-1 CARD$_2$, or RIG-1 CARD domains which are used interchangeably herein), results in RNA-independent, constitutive activation of the RIG-I pathway. The bacterially delivered RIG-I CARD domains are accessible and result in MAVS and TBK1 activation. This is followed by nuclear translocation of activated IRF3 and IRF7, which results in transcription of ISRE-regulated coding sequences, such as IFN a and b.

Similarly, CARD domain or CARD domains of MAVS or MDA5 have been selected to function agonist-independently upon delivery by bacteria.

Heterologous proteins for delivery—cGAS. Cyclic GMP-AMP synthase (cGAS; Uniprot Q8N884 for the human protein) is a cytoplasmic sensor for DNA. cGAS is a nucleotidyltransferase that catalyses the formation of cyclic GMP-AMP (cGAMP) from ATP and guanosine triphosphate (GTP), and is part of the cGAS-STING DNA sensing pathway. It has two major dsDNA-binding sites on opposite sides of a catalytic pocket and is activated by binding to cytosolic DNA. After binding to DNA, cGAS catalyses cGAMP synthesis, which then functions as a second messenger that binds to and activates the endoplasmic reticulum-located transmembrane protein 173 (TMEM173)/STING. STING then activates the protein kinases IκB kinase (IKK) and TBK1, which in turn activate the transcription factors NF-κB and IRF3 to induce interferons and other cytokines. The second messenger cGAMP may also pass to other cells in several ways and thereby pass on the danger signal of cytosolic DNA to surrounding cells. N-terminally truncated cGAS (as human cGAS$_{161-522}$), lacks the N-terminal DNA binding domain but retains enzymatic activity. Delivery of this truncated cGAS into eukaryotic cells leads to intracellular cGAMP production due to the enzymatic activity of cGAS, which results in activation of the STING pathway. As seen with the RIG-I pathway, activation of the STING pathway ultimately results in production of type I IFNs.

Human (and other eukaryotic) genes were de novo synthesized, which allowed codon usage to be adapted to *Y. enterocolitica* (FIGS. 27 A to E) and cloned as fusions to YopE$_{1-138}$ into plasmid pBad_Si2 or pT3P-715 (for medium copy-number), pT3P-716 (high copy number) or pT3P-717 (for low copy number) (see Table II below). Ligated plasmids were cloned in *E. coli* Top10. Sequenced plasmids were electroporated into the desired *Y. enterocolitica* strain using settings as for standard *E. coli* electroporation.

TABLE I

| (Primer No. T3P_: Sequence) |
|---|
| Seq_Id_No_32: Primer No.: T3T_887<br>cacatgtggtcgacGAATAGACAGCGAAAGTTGTTGAAATAATTG |
| Seq_Id_No_33: Primer No.: T3T_955<br>cactacccccttgtttttatccataTTAATTGCGCGGTTTAAACGGG |
| Seq_Id_No_34: Primer No.: T3T_956<br>TATGGATAAAAACAAGGGGGTAGTG |
| Seq_Id_No_35: Primer No.: T3T_888<br>catgcgaatgggcccGTTTTCAGTATAAAAAGCACGGTATATAC |
| Seq_Id_No_36: Primer No.: T3T_957<br>cactacccccttgtttttatccataTTAATTGCGCGGTTTCAGCG |
| Seq_Id_No_37: Primer No.: T3T_995<br>catggtcgacGTTTTCAGTATAAAAAGCACGGTATATAC |
| Seq_Id_No_38: Primer No.: T3T_822<br>catggtcgacCTCAGGGTTCCAGCTTAGC |
| Seq_Id_No_39: Primer No.: T3T_1021<br>catggtcgacCTCAGGGTTCCAGCTTAGC |
| Seq_Id_No_40: Primer No.: T3T_1022<br>catggtcgacCTCAGGGTTCCAGCTTAGC |
| Seq_Id_No_41: Primer No.: T3T_1023<br>catggtcgacCTCAGGGTTCCAGCTTAGC |
| Seq_Id_No_42: Primer No.: T3T_287<br>CGGGGTACCTCAACTAAATGACCGTGGTG |
| Seq_Id_No_43: Primer No.: T3T_288<br>GTTAAAGCTTttcgaatctagactcgagCGTGGCGAACTGGTC |

TABLE II

| Cloned fusion proteins | | | | | |
|---|---|---|---|---|---|
| Protein to be delivred by T3SS | Protein Seq ID. No. | Backbone plasmid | Resulting plasmid name | Primers. T3T_Nr.: | Primer Seq ID No. |
| $YopE_{1-138}$- *Y. enterocolitica* codon optimized human RIG-1 $CARD_2$ (Aa. 1-245) | 1 | pBad_Si_2 | pT3P_453 | synthetic construct | / |
| $YopE_{1-138}$- *Y. enterocolitica* codon optimized human RIG-1 $CARD_2$ (Aa. 1-245) | 1 | pT3P-715 | pT3P-718 | synthetic construct | / |

TABLE II-continued

Cloned fusion proteins

| Protein to be delivred by T3SS | Protein Seq ID. No. | Backbone plasmid | Resulting plasmid name | Primers. T3T_Nr.: | Primer Seq ID No. |
|---|---|---|---|---|---|
| $YopE_{1-138}$- *Y. enterocolitica* codon optimized human RIG-1 CARD2 (Aa. 1-245) | 1 | pT3P-716 | pT3P-719 | synthetic construct | / |
| $YopE_{1-138}$- *Y. enterocolitica* codon optimized human RIG-1 $CARD_2$ (Aa. 1-245) | 1 | pT3P-717 | pT3P-720 | synthetic construct | / |
| $YopE_{1-138}$- *Y. enterocolitica* codon optimized murine RIG-1 $CARD_2$ (Aa. 1-246) | 4 | pBad_Si_2 | pT3P-454 | synthetic construct | / |
| $YopE_{1-138}$- *Y. enterocolitica* codon optimized murine RIG-1 $CARD_2$ (Aa. 1-246) | 4 | pT3P-715 | pT3P-721 | synthetic construct | |
| $YopE_{1-138}$- *Y. enterocolitica* codon optimized murine RIG-1 $CARD_2$ (Aa. 1-246) | 4 | pT3P-716 | pT3P-722 | synthetic construct | / |
| $YopE_{1-138}$- *Y. enterocolitica* codon optimized murine RIG-1 $CARD_2$ (Aa. 1-246) | 4 | pT3P-717 | pT3P-723 | synthetic construct | / |
| YopE1-138 - *Y. enterocolitica* codon optimized murine RIGI $CARD_2$ (Aa. 1-229) | 5 | pBad_Si_2 | pT3P_521 | 1021/1022 | 39/40 |
| YopE1-138- *Y. enterocolitica* codon optimized murine RIG1 $CARD_2$ (Aa. 1-218) | 6 | pBad_Si_2 | pT3P_522 | 1021/1023 | 39/41 |
| YopE1-138- *Y. enterocolitica* codon optimized human cGAS (Aa. 161-522) | 10 | pBad_Si_2 | pT3P_515 | synthetic construct | / |
| YopE1-138- *Y. enterocolitica* codon optimized human cGAS (Aa. 161-522) | 10 | pT3P-715 | pT3P-745 | synthetic construct | / |
| $YopE_{1-138}$- *Y. enterocolitica* codon optimized human RIG-1 $CARD_2$ (Aa. 1-245) AND YopE1-138- *Y. enterocolitica* codon optimized human cGAS (Aa. 161-522) | 1 and 10 | pT3P-715 | pT3P-751 | synthetic construct | / |
| $YopE_{1-138}$- *Y. enterocolitica* codon optimized human RIG-1 $CARD_2$ (Aa. 1-245) AND YopE1-138- *Y. enterocolitica* codon optimized human cGAS (Aa. 161-522) | 1 and 10 | pT3P-716 | pT3P-731 | synthetic construct | / |
| $YopE_{1-138}$- *Y. enterocolitica* codon optimized human RIG-1 $CARD_2$ | 1 and 10 | pT3P-717 | pT3P-732 | synthetic construct | / |

TABLE II-continued

| Cloned fusion proteins | | | | | |
|---|---|---|---|---|---|
| Protein to be delivred by T3SS | Protein Seq ID. No. | Backbone plasmid | Resulting plasmid name | Primers. T3T_Nr.: | Primer Seq ID No. |
| (Aa. 1-245) AND YopE1-138- *Y. enterocolitica* codon optimized human cGAS (Aa. 161-522) | | | | | |

TABLE III

| Mutators for genetic modification and resulting pYV plasmids | | | | | | | | |
|---|---|---|---|---|---|---|---|---|
| Mutator/ Construct | To be inserted onto: | Backbone plasmid | Resulting mutator name | Resulting pYV name | Primers T3T_Nr. | Primers Seq Id No | Template | used with parent strain |
| YopE$_{1-138}$- *Y. enterocolitica* codon optimized murine RIG-1 CARD$_2$ (Aa. 1-246) | pYV (yopE::) | pKNG101 | pT3P_457 | pYV-022 | PCR1: 887/957; PCR2: 956/888; overlapping PCR: 887/888 | 32/36, 34/35, 32/35 | PCR1: ppT3 P-454 PCR2: Y. enterocolitica | *Y. enterocolitica* Δyop HOP EMT |
| YopE$_{1-138}$- *Y. enterocolitica* codon optimized human RIG-1 CARD$_2$ (Aa. 1-245) | pYV (yopE::) | pKNG101 | pT3P_456 | pYV-021 | PCR1: 887/955; PCR2: 956/888; overlapping PCR: 887/888 | 32/33, 34/35, 32/35 | PCR1: ppT3 P-453 PCR2: Y. enterocolitica | *Y. enterocolitica* Δyop HOP EMT |
| YopE1-138- *Y. enterocolitica* codon optimized human cGAS (Aa. 161-522) | pYV (yopE::) | pKNG101 | pT3P_697 | pYV-048 | 995/822 | 37/38 | pT3P-515 | *Y. enterocolitica* Δyop HOP EMT |
| YopE1-138- *Y. enterocolitica* codon optimized human cGAS (Aa. 161-522) | pYV (yopH::) | pKNG101 | pT3P_714 | pYV-050 | / (Synthetic gene) | / | / | *Y. enterocolitica* Δyop HOP EMT |
| YopE$_{1-138}$- *Y. enterocolitica* codon optimized human RIG-1 CARD$_2$ (Aa. 1-245) AND YopE1-138- *Y. enterocolitica* codon optimized human cGAS (Aa. 161-522) | pYV (yopE:: and yopH::) | pKNG101 | pT3P_714 | pYV-051 | / (Synthetic gene) | / | / | *Y. enterocolitica* Δyop HOP EMT pYV-021 |

Yop secretion. Induction of the yop regulon was performed by shifting the culture to 37° C. in BHI-Ox (secretion-permissive conditions)[34]. As carbon source glucose was added (4 mg/ml).

Total cell and supernatant fractions were separated by centrifugation at 20 800 g for 10 min at 4° C. The cell pellet was taken as total cell fraction. Proteins in the supernatant were precipitated with trichloroacetic acid 10% (w/v) final for 1 h at 4° C. After centrifugation (20 800 g for 15 min) and removal of the supernatant, the resulting pellet was washed in ice-cold Acetone over-night. The samples were centrifuged again, the supernatant was discarded and the pellet was air-dried and resuspended in 1×SDS loading dye.

Secreted proteins were analysed by SDS-PAGE; in each case, proteins secreted by $3\times10^8$ bacteria were loaded per lane. Detection of specific secreted proteins by immunoblotting was performed using 12.5% SDS-PAGE gels. For detection of proteins in total cells, $2\times10^8$ bacteria were loaded per lane, if not stated otherwise, and proteins were separated on 12.5% SDS-PAGE gels before detection by immunoblotting.

Immunoblotting was carried out using rat monoclonal antibodies against YopE (MIPA193-13A9; 1:1000,[35]). The antiserum was preabsorbed twice overnight against *Y. enterocolitica* ΔHOPEMT asd to reduce background staining. Detection was performed with secondary antibodies directed against rat antibodies and conjugated to horseradish peroxidase (1:5000; Southern biotech), before development with ECL chemiluminescent substrate (LumiGlo, KPM).

Cell culture and infections. B16F1, LN-229 and RAW cells were cultured in Dulbecco's modified Eagle's medium (DMEM) supplemented with 10% FCS and 2 mM L-Glutamine (cDMEM). THP-1, A20, Jurkat, and 4T1 cells were cultured in RPMI 1640 supplemented with 10% FCS and 2 mM L-Glutamine, for A20 cells additionally 1 mM Natrium pyruvate, 2.5/L D-glucose, 10 mM HEPES and 0.05 mM mercaptoethanol were added. *Y. enterocolitica* were grown in BHI with additives overnight at RT, diluted in fresh BHI to an $OD_{600}$ of 0.2 and grown for 2 h at RT before a temperature shift to a 37° C. waterbath shaker for further 30 min to 1 h. Finally, the bacteria were collected by centrifugation (6000 rcf, 30 sec) and washed once with DMEM supplemented with 10 mM HEPES and 2 mM L-glutamine. Cells seeded in 96-well or 6-well plates were infected at indicated MOIs in DMEM/RPMI supplemented with 10 mM HEPES and 2 mM L-glutamine. THP-1 cells were differentiated by addition of PMA (phorbol myristate acetate) at a final concentration of 20-50 ng/ml for 3-48 h prior to bacterial infection. After adding bacteria, plates were centrifuged for 1 min at 500 g and placed at 37° C. for indicated time periods.

Direct type I Interferon activation assay. Murine B16F1 melanoma cells, murine RAW264.7 wildtype macrophages or human THP-1 monocyte/macrophages each stably expressing secreted embryonic alkaline phosphatase (SEAP) under the control of the I-ISG54 promoter which is comprised of the IFN-inducible ISG54 promoter enhanced by a multimeric ISRE were purchased from InvivoGen (B16-Blue ISG, RAW-Blue ISG, THP1-Blue ISG). Growth conditions and type I IFN assay were adapted from the protocols provided by InvivoGen. Briefly, 12'500 B16-Blue ISG cells, 30'000 RAW-Blue or 100'000 THP-1 cells in 150 μl test medium (RPMI+2 mM L-glutamine+10% FCS for B16-Blue ISG and PMA-differentiated THP 1-Blue ISG cells; DMEM+2 mM L-glutamine+10% FCS for RAW-Blue,) per well were seeded in a flat-bottom 96-well plate (NUNC or Corning). The same or the next day, the cells were infected with the bacterial strains to be assessed by adding 15 μl per well of the desired multiplicity of infection (MOI, diluted in test medium) followed by a brief centrifugation (500 g, 60 sec, RT). After 2 hours of incubation (37° C. and 5% $CO_2$) the bacteria were killed by adding test medium containing penicillin (100 U/ml) and streptomycin (100 ug/ml). The incubation was continued for 20-24 h. Detection of SEAP and luciferase followed the QUANTI-Blue™ and QUANTI-Luc™ protocol (InvivoGen), respectively. For SEAP detection: 20 μl of the cell supernatant was incubated with 180 μl detection reagent (QUANTI-Blue™, InvivoGen). The plate was incubated at 37° C. and SEAP activity was measured by reading the OD at 650 nm using a microplate reader (Molecular Devices). As a positive control murine IFNγ (stock: 1'000'000 U/ml) diluted to the respective concentrations in test medium was used. For luciferase detection: To 20 μl of the cell supernatant 50 μl detection reagent (QUANTI-Luc™, InvivoGen) was added in opaque plates (Thermo-Scientific). Luminescence was measured immediately using a plate reader (BioTek). For activation of LN-229, Jurkat or A20 cells, 20'000-30'000 cells in 100 μl test medium (DMEM+2 mM L-glutamine+10% FCS for LNN-29 or RPMI+2 mM L-glutamine+10% FCS+1 mM Natrium pyruvate+2.5/L D-glucose+10 mM HEPES and for A20 cells additionally 0.05 mM mercaptoethanol) per well were seeded in a flat-bottom 96-well plate (NUNC or Corning). The same or the next day, the cells were infected with the bacterial strains to be assessed by adding 15 μl per well of the desired multiplicity of infection (MOI, diluted in test medium). After 4 hours of incubation (37° C. and 5% $CO_2$) supernatants were collected and analyzed for presence of IFNβ by the LumiKine™ Xpress human IFN-β ELISA or LumiKine™ Xpress murine IFN-β ELISA (Invivogen) according to manufacturer's instructions Biodistribution or Efficacy in 4T1, EMT-6 and B16F10 Tumor Allograft Mouse Models All animal experiments were approved (license 1908; Kantonales Veterinäramt Basel-Stadt) and performed according to local guidelines (Tierschutz-Verordnung, Basel-Stadt) and the Swiss animal protection law (Tierschutz-Gesetz). 6 week old BALB/c (4T1 or EMT-6 model) or C57BL/6 (B16F10 model) mice were ordered from Janvier Labs. After at least one week of accommodation, mice were anesthetized using isoflurane and 100 ul 4T1, EMT-6 or B16F10 cells ($1\times10^5$-$1\times10^6$ cells) were subcutaneously injected into the flank of mice. Throughout the experiment, mice were scored for behavior and physical appearance, and surface temperature, as well as body weight was measured.

Once tumors had developed, mice were administered an 8 mg/ml desferal solution (10 ml/kg) through i.p. injection. On the same or the following day, mice were infected with the corresponding *Y. enterocolitica* strain ($1\times10^7$ bacteria for 4T1 experiment; $1\times10^6$ bacteria for B16F10 experiment) by injection into the tail vein or for intratumoral (i.t.) administration by direct injection into the tumour on days as indicated ($7.5\times10^7$ bacteria for EMT-6 and B16F10 experiment). The inoculum administered to the mice was validated by dilution plating. As control, mice were injected with endotoxin-free PBS only. For experiments with multiple administrations, 24 hours before the last bacterial treatment mice were administered an 8 mg/ml desferal solution (10 ml/kg) through i.p. injection. Tumor progression was followed by measurements of tumor length and width with digital calipers. Tumor volume was determined as 0.5×length×width$^2$. A tumor volume exceeding 1500 mm$^3$ was defined as humane endpoint. On respective days postinfection, mice were sacrificed by $CO_2$ inhalation. The tumor was isolated and the weight determined. The tumor was homogenized. Total CFU in each sample was determined by spotting of serial dilutions onto LB agar plates containing nalidixic acid (35 ug/ml). To assess presence of pYV plasmid, colonies were replica picked on LB agar plates containing nalidixic acid (35 ug/ml) and arsenite (400 uM) and percentage was calculated. To assess presence of (medium copy number) vector, colonies were replica picked on LB agar plates containing nalidixic acid (35 ug/ml) and Chloramphenicol (10 ug/ml) and percentage was calculated. To assess presence of both pYV plasmid and (medium copy number) vector, colonies were replica picked on LB agar plates containing nalidixic acid (35 ug/ml), arsenite (400 uM) and Chloramphenicol (10 ug/ml) and percentage was calculated.

B) Results

A Protein Delivery System Based on Type 3 Secretion of YopE Fusion Proteins

We selected the N-terminal 138 amino acids of YopE (SEQ ID No. 25) to be fused to proteins to be delivered, as this had been shown to give best results for translocation of other heterologous T3S substrates[68]. As these N-terminal 138 amino acids of YopE contain the CBS, we further decided to coexpress SycE. The SycE-YopE$_{1-138}$ fragment cloned from purified *Y. enterocolitica* pYV40 virulence plasmid contains the endogenous promoters of YopE and of its chaperone SycE. Therefore, SycE and any YopE$_{1-138}$ fusion protein are induced by a rapid temperature shift from growth at RT to 37° C. Culture time at 37° C. will affect fusion protein amount present in bacteria. A multiple cloning site (MCS) was added at the 3' end of YopE$_{1-138}$ optionally followed by a Myc and a 6×His tag and a Stop codon (SEQ ID NO: 44).

The background strain was carefully selected. First, to limit the translocation of endogenous effectors, we used a *Y. enterocolitica* strain that was deleted for all known effectors, Yop H, O, P, E, M and T (named ΔHOPEMT)[37].

Figure 1:
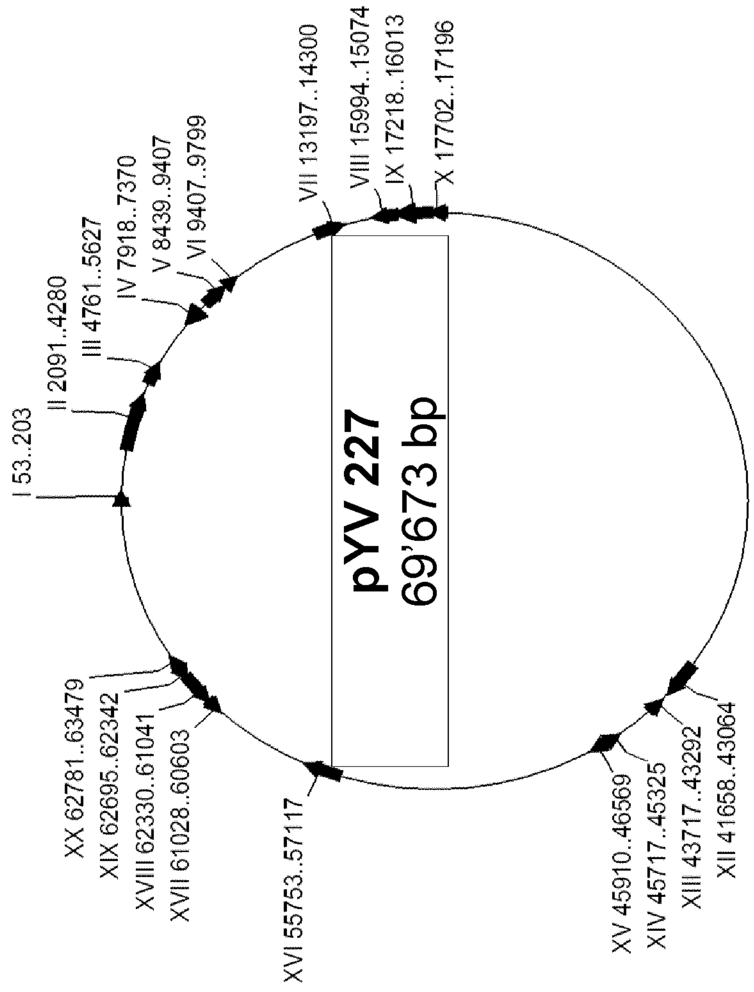
FIG. 1: The *Yersinia enterocolitica* W227 virulence plasmid, pYV. The 69'673 bp plasmid of *Yersinia* virulence (pYV) of strain W227 drawn to scale. T3SS effector proteins, origin of replication and the arsenic resistance (encoded by genes arsC, B, R and H) are indicated: I: origin of replication, II: yopO, III: yopP, IV: yopQ, V: yopT, VI: sycT, VII: yopM, VIII: yopD, IX: yopB, X: sycD, XII: yopH, XIII: sycH, XIV: sycE, XV: yopE, XVI: yadA, XVII-XX: arsC, B, R and H.
Figure 2:
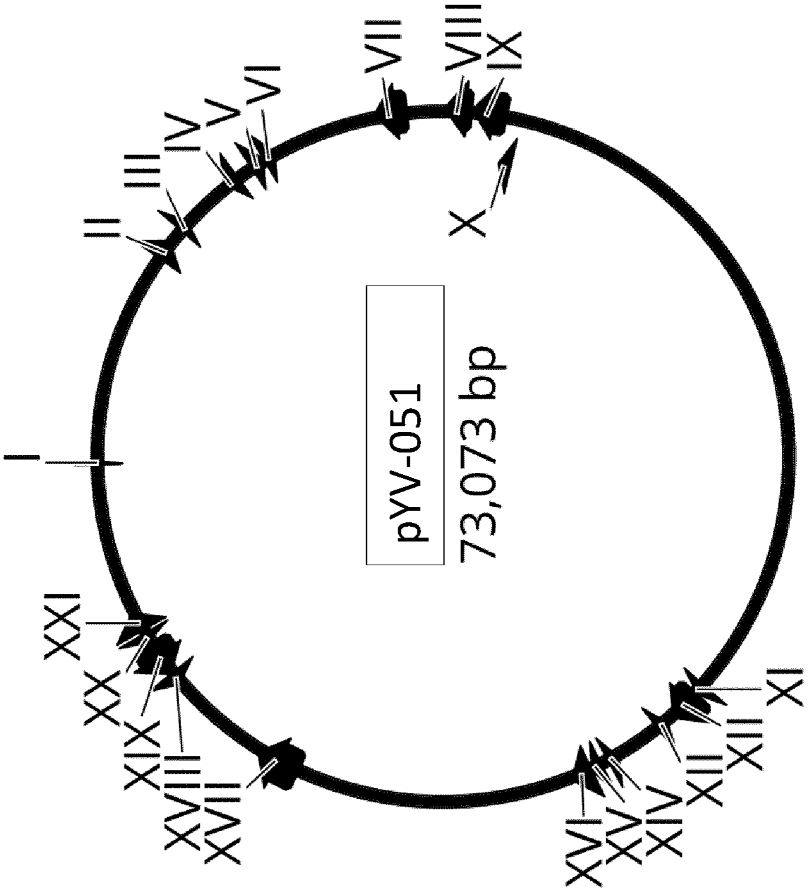
FIG. 2: The modified *Yersinia enterocolitica* W227 virulence plasmid, pYV-051, encoding $YopE_{1-138}$-human $cGAS_{161-522}$ and $YopE_{1-138}$-human RIG-I $CARD_2$ encoded on the endogenous pYV plasmid on the endogenous sites of yopH and yopE, respectively. The 73'073 bp pYV-051 drawn to scale. I: replication origin (53 . . . 203), II: YopO disrupted (7409 . . . 8116), III: YopP disrupted (8597 . . . 8949), IV: YopQ (10692 . . . 11240), V: YopT disrupted (11761 . . . 12301), VI: sycT (12301 . . . 12693), VII: YopM disrupted (16270 . . . 17375), VIII: YopD (18629 . . . 19549), IX: YopB (19568 . . . 20773), X: sycD (20751 . . . 21257), XI: $YopE_{1-138}$ (codon altered) (45228 . . . 0.45641), XII: human $cGas_{161-522}$ (45654 . . . 46742), XIII: sycH (46970 . . . 47395), XIV: sycE (49006 . . . 49398), XV: $YopE_{1-138}$ (49591 . . . 50004), XVI: human Rig1-$Card_2$ (50017 . . . 50754), XVII: yadA (60173 . . . 61636), XVIII: arsC (65122 . . . 65547), XIX: arsB (65560 . . . 66849), XX: arsR (66861 . . . 67215), XXI: arsH (67301 . . . 67999).

Virulence Attenuation by Deletion/Mutation of Bacterial Effector Proteins with Virulence Activity Towards Eukaryotic Cells In case of *Y. enterocolitica*, the virulence was reduced by deletion of the six endogenous effector proteins, called "*Yersinia* outer proteins" (Yops), in detail YopH, O, P, E, M, T (MRS40 pIML421 [yopHΔ1-352, yopOΔ65-558, yopP23, yopE21, yopM23, yopT135])[37]. These Yops are encoded on the "*Yersinia* virulence plasmid" (pYV), a about 70 kbp sized plasmid, on which the complete type 3 secretion system (T3SS) as well as other virulence players are encoded (FIG. 1) YopH, O, P, E, M and T are the six effector proteins, which are delivered to host cells by the bacterial type three secretion system in order to modulate and dampen the immune system. Each Yop has a specific biochemical activity in the host cell. YopT cleaves off the C-terminal Cysteine of Rho GTPases and thus removes the isporenyl group anchoring the GTPases to the membrane. This inactivation of the Rho due to mislocalization avoids phagocytosis by immune cells as macrophages and neutrophils[49]. In the same pathway, YopE acts as GTPase activating protein (GAP) for Rho GTPases, deactivating them. This results in decreased phagocytosis and inhibition of release of IL-1 beta by immune cells[49]. Furthermore, YopO acts as guanidine nucleotide dissociation inhibitor (GDI), deactivating Rho GTPases. YopO further has a serine/threonine kinase domain acting in a not yet defined way on the actin cytoskeleton[49]. YopH is a tyrosine phsophatase acting on focal adhesion proteins as Focal adhesion kinase (Fak), paxillin and others, thus strongly preventing phagocytosis by macrophages and neutrophils[49]. YopP, termed YopJ in *Y. pseudotuberculosis* or *Y. pestis*, was found to inactivate the MAPK/NFkB pathway in immune cells, preventing TNFa and IL-8 release from immune cells stimulated by the presence of the bacteria. Furthermore, YopP was found to induce apoptosis in immune cells, which might be related to the effect sin the MAPK pathway, which in its activated state protects cells from apoptosis[49]. The role of YopM is not yet completely clear, but it was found associated with ribosomal S6 kinase 1 (RSK1) and protein kinase C-like 2 (PRK2). It seems as if YopM could stimulate phosphorylation of RSK1 and thus affects downstream targets, as e.g cell cycle progression[49]. By deleting one or several of these Yops, the defense mechanism of the bacteria against the immune system are dramatically affected[50]. Mutation of respective yops was confirmed by PCR on the respective region, and by in vitro secretion assay. Analysis of in vitro secretion by SDS-PAGE and Coomassie-blue staining confirmed absence of full-length YopH,O,M and YopE.

Furthermore, optionally a *Y. enterocolitica* strain with deletions in asd (aspartate semialdehyde dehydrogenase) was constructed. The mutation in asd leads to a complete loss of growth capability without addition of meso-diaminopimelic acid. This allows generating antibiotic free plasmid maintenance systems based on the presence of asd on the respective plasmid. In a similar way, other auxotroph mutants might be used.

The fusion to the N-terminal secretion signal of bacteria has lead to successful delivery of bacterially expressed YopE$_{1-138}$-GCN4 leucin zipper (yeast)-WspR GGDEF (*P. aeruginosa*) protein and has not prevented the folding and function of the this tri-partite protein within the eukaryotic cell. This implies, that the YopE-fused GCN4 leucin zipper-WspR GGDEF is still able to dimerize and thus lead to active GGDEF domains, which is surprising.

Delivery of cGAS/STING and RIG-1-Like Receptor Pathway Triggering Proteins Via the Bacterial T3SS for Induction of a Type I IFN Response and Optimized Genetic Encoding.

In the following section, different type I IFN reporter cell lines have been used (as well as native non-reporter cell lines):

- B16F1 murine melanoma: In the B16F1 reporter cell line, cGAS delivery does only minimally contribute to IFN induction compared to RIG-1 signaling (FIG. 18). The B16F1 reporter cell line can thus be used to assess mainly RIG1-dependent signaling and disturbance of it by additional encoding of cGAS or other STING-activating proteins.
- Murine RAW 264.7 macrophages: In the RAW reporter cell line, cGAS delivery and activating RIG signaling contribute to overall activation comparably (FIG. 18). The RAW reporter cell line can thus be used to assess combination of RIG1- and cGAS-dependent signaling and disturbance or enhancement of it by multiple encoding.
- Human THP-I monocyte/macrophage: In the THP-I reporter cell line, cGAS delivery does mainly contribute to IFN induction on THP-1 cells compared to RIG-1 signaling (FIG. 18). The THP-1 reporter cell line can thus be used to assess mainly cGAS-dependent signaling and disturbance of it by additional encoding of RIG-1 or other RLR-activating proteins.

Delivery of the fusion protein YopE$_{1-138}$-human RIG-1 CARD$_2$ (RIG-I$_{1-245}$) was assessed on a melanoma reporter cell line for type I IFN induction. Murine B16F1 melanocyte reporter cells for type I IFN stimulation are based on activity of secreted alkaline phosphatase, which is under the control of the I-ISG54 promoter, which is comprised of the IFN-inducible ISG54 promoter enhanced by a multimeric ISRE. In this cell line, cGAS delivery does only minimally contribute to IFN induction on B16F1 cells compared to RIG signaling. This reporter cell line can thus be used to assess mainly RIG-dependent signaling and disturbance of it by additional encoding of cGAS or other STING-activating proteins. Reporter cells were infected with various amounts (MOI) of bacterial strains expressing and translocating the YopE$_{1-138}$-human RIG-1 CARD$_2$ (RIG-I$_{1-245}$), and YopE$_{1-138}$-human cGAS$_{161-522}$. YopE$_{1-138}$-human RIG-1 CARD$_2$ showed to dose-dependently induce a type I IFN response in this melanoma reporter cell line (FIG. 8), while the bacterial background strain (*Y. enterocolitica* ΔHOPEMT) was not capable of inducing such a response (FIG. 8). Activity of YopE$_{1-138}$-human RIG-1 CARD$_2$ was found slightly higher when being encoded on the medium copy-number vector (as pBad_Si2 or pT3P-715) as compared to encoding on the pYV (FIG. 8). The additional encoding of YopE$_{1-138}$-human cGAS$_{161-522}$ on the pYV (where cGAS$_{161-522}$ delivery does only minimally contribute to IFN induction on B16F1 cells) was found not to impair the activity of pYV encoded YopE$_{1-138}$-human RIG-1 CARD$_2$.

The activity of YopE$_{1-138}$-human RIG-1 CARD$_2$ was thus found surprisingly high when encoded on the pYV as compared to vector encoding, as due to the very low (single) copy number compared to a vector (of medium copy number) a strongly reduced activity must be assumed. Furthermore, the additional encoding of YopE$_{1-138}$-human cGAS$_{161-522}$ on the pYV was found not to impair the activity of pYV encoded YopE$_{1-138}$-human RIG-1 CARD$_2$, which is equally surprising, as presence of a second cargo protein must be expected to lead to reduced amounts of delivery of the first cargo protein.

Delivery of the fusion protein YopE$_{1-138}$-human cGAS$_{161-522}$ was assessed on a RAW macrophage reporter cell line for type I IFN induction. Reporter cells were infected with various amounts (MOI) of bacterial strains expressing and translocating the YopE$_{1-138}$-human cGAS$_{161-522}$. YopE$_{1-138}$-human cGAS$_{161-522}$ showed to dose-dependently induce a type I IFN response in this melanoma reporter cell line (FIG. 9), while the bacterial background strain (*Y. enterocolitica* ΔHOPEMT) was not capable of inducing such a response (FIG. 9). Activity of YopE$_{1-138}$-human cGAS$_{161-522}$ was found strongly increased when being encoded on the medium copy-number vector (as pBad_Si2 or pT3P-715) as compared to encoding on the pYV (FIG. 9).

Delivery of the fusion protein YopE$_{1-138}$-murine RIG-1 CARD$_2$ (RIG-I$_{1-246}$) was assessed on a melanoma reporter cell line for type I IFN induction. Murine B16F1 melanocyte reporter cells were infected with various amounts (MOI) of bacterial strains expressing and translocating the YopE$_{1-138}$-murine RIG-1 CARD$_2$. YopE$_{1-138}$-murine RIG-1 CARD$_2$ showed to dose-dependently induce a type I IFN response in this melanoma reporter cell line (FIG. 10), while the bacterial background strain (*Y. enterocolitica* ΔHOPEMT) was not capable of inducing such a response (FIG. 10). Activity of YopE$_{1-138}$-murine RIG-1 CARD$_2$ was found slightly higher when being encoded on the medium copy-number vector (as pBad_Si2 or pT3P-715) as compared to encoding on the pYV (FIG. 10). The double encoding of YopE$_{1-138}$-murine RIG-1 CARD$_2$ on the pYV and a medium copy number vector was found comparable to medium copy number vector-only encoded YopE$_{1-138}$-murine RIG-1 CARD$_2$, while surprisingly exhibiting higher signal already at lower MOIs (FIG. 10).

Delivery of the fusion protein YopE$_{1-138}$-human RIG-1 CARD$_2$ (RIG-I$_{1-245}$) combined with YopE$_{1-138}$-human cGAS$_{161-522}$ was assessed on a melanoma reporter cell line for type I IFN induction. In the murine B16F1 melanocyte reporter cell line, cGAS$_{161-522}$ delivery does only minimally contribute to IFN induction on B16F1 cells compared to RIG signaling. This reporter cell line can thus be used to assess mainly RIG-dependent signaling and disturbance of it by additional encoding of cGAS$_{161-522}$ or other STING-activating proteins. Reporter cells were infected with various amounts (MOI) of bacterial strains expressing and translocating the YopE$_{1-138}$-human RIG-1 CARD$_2$, and YopE$_{1-138}$-human cGAS$_{161-522}$. YopE$_{1-138}$-human RIG-1 CARD$_2$ combined with YopE$_{1-138}$-human cGAS$_{161-522}$ showed to dose-dependently induce a type I IFN response in this melanoma reporter cell line (FIG. 11), while the bacterial background strain (*Y. enterocolitica* ΔHOPEMT) was not capable of inducing such a response (FIG. 11). Activity was found identical when YopE$_{1-183}$-human RIG-1 CARD$_2$ and and YopE$_{1-138}$-human cGAS$_{161-522}$ were both encoded on the medium copy-number vector (as pBad_Si2 or pT3P-715) as well as on the pYV compared to encoding of YopE$_{1-138}$-human RIG-1 on the medium copy-number vector (as pBad_Si2 or pT3P-715) and on the pYV and additionally encoding YopE$_{1-138}$-human cGAS$_{161-522}$ only on the pYV (FIG. 11). The additional encoding of YopE$_{1-138}$-human cGAS$_{161-522}$ (where cGAS$_{161-522}$ delivery does only minimally contribute to IFN induction on B16F1 cells) on the vector was thus found not to impair the activity of pYV and vector encoded YopE$_{1-138}$-human RIG-1 CARD$_2$ (FIG. 11).

Delivery of the fusion protein YopE$_{1-138}$-human RIG-1 CARD$_2$ (RIG-I$_{1-245}$) combined with YopE$_{1-138}$-human cGAS$_{161-522}$ was assessed on the B16F1 melanoma, the RAW macrophage and the human THP-1 reporter cell line for type I IFN induction. The B16F1 reporter cell line can be used to assess mainly RIG1-dependent signaling, the THP-1 cell line to mainly assess cGAS dependent signaling and the RAW cell line to assess joint activation potential of cGAS and RIG-1. Reporter cells were infected with various amounts (MOI) of bacterial strains expressing and translocating the YopE$_{1-138}$-human RIG-1 CARD$_2$, and YopE$_{1-138}$-human cGAS$_{161-522}$. YopE$_{1-138}$-human RIG-1 CARD$_2$ combined with YopE$_{1-138}$-human cGAS$_{161-522}$ showed to dose-dependently induce a type I IFN response in all reporter cell lines (FIG. 12), while the bacterial background strain (*Y. enterocolitica* ΔHOPEMT) was not capable of inducing such a response (FIG. 12).

In the B16F1 cells reflecting RIG-1 dependent signaling, strongest signal was observed when YopE$_{1-138}$-human RIG-1 CARD$_2$ was encoded on a medium copy-number vector, while the difference to pYV-encoded YopE$_{1-138}$-human RIG-1 CARD$_2$ is small. Additional encoding of cGAS$_{161-522}$ on the vector seems not to hamper RIG-1 CARD$_2$ delivery and activity (FIG. 12).

In the THP-1 cells reflecting cGAS dependent signaling, strongest signal was observed when YopE$_{1-138}$-human cGAS$_{161-522}$ was encoded on a medium copy-number vector, with a marked difference to pYV-encoded YopE$_{1-138}$-human cGAS$_{161-522}$. Additional encoding of RIG-1 CARD$_2$ on the vector seems not to hamper cGAS$_{161-522}$ delivery and activity (FIG. 12).

In the RAW cells reflecting cGAS and RIG-1 dependent signaling, signals were found equal, whether cGAS$_{161-522}$ or RIG-1 CARD$_2$ were only pYV or additionally (medium copy-number) vector encoded (FIG. 12). In this cell line, peak-level of activation was reached at very low MOIs, which may explain equal signal of all tested constructs.

In summary, delivery of human cGAS$_{161-522}$ and RIG-I CARD$_2$ encoded on the endogenous pYV plasmid, and additionally on a medium copy number vector, provided the best results when considering the results from all cell lines tested and thus seems to show cell type independent high delivery and activity.

Biodistribution studies in a murine model of breast cancer: Mice carrying syngeneic sub-cutaneous 4T1 breast tumours were colonised with different bacterial strains by iv administration and assessed for colonization. In order to validate *Y. enterocolitica* subsp. *palearctica* MRS40 ΔyopH, O,P,E,M,T and derivatives encoding heterologous type I IFN inducing proteins (either on the pYV or on a vector, or on both the pYV and a vector), murine allograft tumor studies using the well-established 4T1 model of breast cancer (ATCC No. CRL-2539) were performed. When s.c. tumors had reached a certain size (about 100-200 mm3), mice were i.v. infected with $1\times10^7$ cfu *Y. enterocolitica* subsp. *palearctica* MRS40 ΔyopH,O,P,E,M,T, either with a control strain not delivering a cargo, or encoding on the endogenous pYV plasmid $YopE_{1-138}$-human $cGAS_{161-522}$ and $YopE_{1-138}$-human RIG-I $CARD_2$ (RIG-$I_{1-245}$) or encoding both on the endogenous pYV plasmid and on a medium copy number vector $YopE_{1-138}$-human $cGAS_{161-522}$ and $YopE_{1-138}$-human RIG-I $CARD_2$, or encoding both on the endogenous pYV plasmid and on a high copy number vector $YopE_{1-138}$-human $cGAS_{161-522}$ and human $YopE_{1-138}$-human RIG-I $CARD_2$, or encoding both on the endogenous pYV plasmid and on a low copy number vector $YopE_{1-138}$-human $cGAS_{161-522}$ and $YopE_{1-138}$-human RIG-I $CARD_2$. In order to allow bacterial growth, mice were pretreated 24 h prior to infection with desferoxamine. Mice infected with the virulence attenuated *Y. enterocolitica* subsp. *palearctica* MRS40 ΔyopH,O,P,E, M,T strain did not show significant weight loss and scored normally for physical appearance and behavior still at day 6 post infection. Bacterial load was determined as colony forming units CFU per gram of tumor (CFU/g) (FIG. 13) on day 6 post infection. In these mice infected with *Y. enterocolitica* subsp. *palearctica* MRS40 ΔyopH,O,P,E,M,T, living bacteria were found in the malignant solid tumor at day 6 post infection (FIG. 13). Similarly, for all derivative strains from *Y. enterocolitica* ΔyopH,O,P,E,M,T, whether encoding a heterologous type I IFN protein on the pYV, on a vector or on both the pYV and a vector, living bacteria were found in the malignant solid tumor at day 6 post infection at similar levels as *Y. enterocolitica* ΔyopH,O,P,E,M,T. Delivery of $YopE_{1-138}$-human $cGAS_{161-522}$ and $YopE_{1-138}$-RIG-I $CARD_2$ and copy number of vector was thus found not to alter bacterial loads in solid tumors in the 4T1 breast cancer model (FIG. 13).

Expression and secretion of $YopE_{1-138}$-human RIG-I $CARD_2$ (RIG-$I_{1-245}$) was assessed in relation to copy number of the vector encoding $YopE_{1-138}$-human RIG-I $CARD_2$. To this end, in vitro secretion experiments were performed. Expression in bacteria or secretion to supernatant was assessed for *Y. enterocolitica* ΔyopHOPEMT, either a control strain not delivering a cargo, or encoding on a low, medium or high copy number vector $YopE_{1-138}$-human RIG-I $CARD_2$. The expression was found highest for the high-copy number plasmid (FIG. 14 I), which is according to expectations based on increased copy number of the vector encoding $YopE_{1-138}$-human RIG-I $CARD_2$. Surprisingly, in the secretion assay, secretion was found highest for the medium- and low-copy number plasmid, while the high-copy number plasmid-based encoding yielded clearly less secretion of $YopE_{1-138}$-human RIG-I $CARD_2$. (FIG. 14 II). Hence, high-copy number plasmid seems to lead to increased expression but decreased secretion capacity of $YopE_{1-138}$-human RIG-I $CARD_2$ (FIG. 14).

Furthermore, in cell-based assays using the B16F1 reporter cell line, activation potential was assessed in relation to copy number of the vector encoding only $YopE_{1-138}$-human RIG-I $CARD_2$ (RIG-$I_{1-245}$) additionally to pYV encoded $YopE_{1-138}$-human RIG-I $CARD_2$ and $YopE_{1-138}$-human $cGAS_{161-522}$ (FIG. 15). Surprisingly, for $YopE_{1-138}$-human RIG-I $CARD_2$ encoded on a vector in addition to pYV encoding of additionally to pYV encoded $YopE_{1-138}$-human RIG-I $CARD_2$ and $YopE_{1-138}$-human $cGAS_{161-522}$, type I IFN induction was weakest when encoding $YopE_{1-138}$-human RIG-I $CARD_2$ on a low copy number vector (FIG. 15). This is in contrast to the secretion analysis (FIG. 14), but may be explained by the interplay of vector and pYV encoding (as for FIG. 10) and the only vector-based encoding (as in FIG. 8). Highest type I IFN induction was observed when $YopE_{1-138}$-human RIG-I $CARD_2$ was encoded from a medium copy number plasmid (FIG. 15).

Delivery of the fusion protein $YopE_{1-138}$-human RIG-1 $CARD_2$ (RIG-$I_{1-245}$) combined with $YopE_{1-138}$-human $cGAS_{161-522}$ was assessed on the B16F1 melanoma, the RAW macrophage and the human THP-1 reporter cell line for type I IFN induction in relation to copy number of the vector encoding both $YopE_{1-138}$-human RIG-I $CARD_2$ and $YopE_{1-138}$-human $cGAS_{161-522}$ (FIG. 16). The B16F1 reporter cell line can be used to assess mainly RIG1-dependent signaling, the THP-1 cell line to mainly assess cGAS dependent signaling and the RAW cell line to assess joint activation potential of cGAS and RIG-1 (FIG. 18). Reporter cells were infected with various amounts (MOI) of bacterial strains expressing and translocating the $YopE_{1-138}$-human RIG-1 $CARD_2$, and $YopE_{1-138}$-human $cGAS_{161-522}$. $YopE_{1-138}$-human RIG-1 $CARD_2$ combined with $YopE_{1-138}$-human $cGAS_{161-522}$ showed to dose-dependently induce a type I IFN response in all reporter cell lines (FIG. 16), while the bacterial background strain (*Y. enterocolitica* ΔHOPEMT) was not capable of inducing such a response (FIG. 16).

In all cell lines tested, the combination of pYV-coding for $YopE_{1-138}$-human RIG-1 $CARD_2$ and $YopE_{1-138}$-human $cGAS_{161-522}$ with vector-based coding for $YopE_{1-138}$-human RIG-1 $CARD_2$ and $YopE_{1-138}$-human $cGAS_{161-522}$ was inducing highest type I IFN activation when the vector was a medium copy-number vector (FIG. 16), followed by the low copy-number and weakest by the high copy-number plasmid (FIG. 16). While results have show that a double encoding on the pYV and a vector is beneficial for increased type I IFN activation (see FIGS. 10 and 19) as well as genetic stability (see FIGS. 20 and 21), these data suggest a medium copy number vector to be optimal.

Summarising the results on the impact of the copy number of the vector encoding $YopE_{1-138}$-human RIG-I $CARD_2$ (RIG-$I_{1-245}$), $YopE_{1-138}$-human $cGAS_{161-522}$ or $YopE_{1-138}$-human RIG-I $CARD_2$ and $YopE_{1-138}$-human $cGAS_{161-522}$ (FIGS. 14-16), a medium copy number vector is most favorable.

The optimal combination for delivery of two proteins encoded on endogenous virulence and on a medium copy number vector, here shown for $YopE_{138}$-human RIG-1 $CARD_2$ (RIG-$I_{1-245}$) and $YopE_{1-138}$-human $cGAS_{161-522}$ is depicted in FIG. 17. Optimised delivery and genetic stability of human $cGAS_{161-522}$ and RIG-I $CARD_2$ is reached by encoding on the endogenous pYV plasmid and additionally on a medium copy number vector.

By studying the delivery of type I IFN inducing proteins $YopE_{1-138}$-human $cGAS_{161-522}$ and $YopE_{1-138}$-RIG-I $CARD_2$ and its effect on different cell types, the differential induction capacity of these two proteins was assessed. An optimized combination of fusion proteins should then allow activating a diverse set of cell types. Delivery of $YopE_{1-138}$-human $cGAS_{161-522}$ and $YopE_{1-138}$-RIG-I $CARD_2$ leads to differential induction of type I IFN signalling in B16F1 melanocytes (FIG. 18 A), human glioblastoma LN-229 (FIG. 18 B), murine RAW macrophage (FIG. 18 C) or human THP-1 macrophages (FIG. 18 D). $YopE_{1-138}$-RIG-I $CARD_2$ leads to stronger type I IFN induction than $YopE_{1-138}$-human $cGAS_{161-522}$ on murine B16F1 and human LN-229 glioblastoma cells. On murine RAW macrophages, type I IFN inducing potential of $YopE_{1-138}$-human $cGAS_{161-522}$ and $YopE_{1-138}$-RIG-I $CARD_2$ is comparable, while $YopE_{1-138}$-human $cGAS_{161-522}$ outperforms $YopE_{1-138}$-RIG-I $CARD_2$ on human THP-1 macrophages.

As an example, the A20 murine B-cell lymphoma cell line was infected with *Y. enterocolitica* ΔHOPEMT encoding on a medium copy number plasmid $YopE_{1-138}$-human RIG-I $CARD_2$, encoding on a medium copy number plasmid $YopE_{1-138}$-human RIG-I $CARD_2$ and $YopE_{1-138}$-human $cGAS_{161-522}$ or encoding on a medium copy number plasmid and on the pYV $YopE_{1-138}$-human RIG-I $CARD_2$ and $YopE_{1-138}$-human $cGAS_{161-522}$. The strain encoding on a medium copy number plasmid $YopE_{1-138}$-human RIG-I $CARD_2$ induces less type I IFN response in the A20 cells than the strain encoding on a medium copy number plasmid $YopE_{1-138}$-human RIG-I $CARD_2$ and $YopE_{1-138}$-human $cGAS_{161-522}$, which again is outperformed by a strain encoding on a medium copy number plasmid and on the pYV $YopE_{1-138}$-human RIG-I $CARD_2$ and $YopE_{1-138}$-human $cGAS_{161-522}$ (FIG. 19 A).

In another example, the Jurkat human T-cell line was infected with *Y. enterocolitica* ΔHOPEMT encoding on a medium copy number plasmid $YopE_{1-138}$-human RIG-I $CARD_2$ and $YopE_{1-138}$-human $cGAS_{161-522}$ or encoding on a medium copy number plasmid and on the pYV $YopE_{1-138}$-human RIG-I $CARD_2$ and $YopE_{1-138}$-human $cGAS_{161-522}$. The strain encoding on a medium copy number plasmid $YopE_{1-138}$-human RIG-I $CARD_2$ and $YopE_{1-138}$-human $cGAS_{161-522}$, is outperformed by a strain encoding on a medium copy number plasmid and on the pYV $YopE_{1-138}$-human RIG-I $CARD_2$ and $YopE_{1-138}$-human $cGAS_{161-522}$ (FIG. 19 B).

In order to assess genetic stability when bacterial strains are growing in vivo (growing in tumors), mice carrying syngeneic sub-cutaneous B16F10 melanoma tumours were colonised with a *Y. enterocolitica* subsp. *palearctica* MRS40 ΔyopH,O,P,E,M,T bacterial strain encoding both on the endogenous pYV plasmid $YopE_{1-138}$-human $cGAS_{161-522}$ and $YopE_{1-138}$-human RIG-I $CARD_2$ (RIG-$I_{1-245}$) by iv administration and bacteria isolated from the tumor for presence of respective selection marker were assessed. When s.c. tumors had reached a certain size (about 100-200 mm3), mice were i.v. infected with $1\times10^6$ cfu *Y. enterocolitica* subsp. *palearctica* MRS40 ΔyopH,O,P,E,M,T, encoding both on the endogenous pYV plasmid $YopE_{1-138}$-human $cGAS_{161-522}$ and $YopE_{1-138}$-human RIG-I $CARD_2$. In order to allow bacterial growth, mice were pretreated 24 h prior to infection with desfreoxamine. Mice infected with the virulence attenuated *Y. enterocolitica* subsp. *palearctica* MRS40 ΔyopH,O,P,E,M,T strain did not show significant weight loss and scored normally for physical appearance and behavior. Bacterial were isolated on day 2 and 4 post infection and replica picked on selective agar plates to assess presence of the endogenous pYV plasmid (FIG. 20). In almost all animals assessed the pYV plasmid was found highly stable and present at day 2 and day 4 after administration (FIG. 20). Similarly, mice carrying syngeneic sub-cutaneous EMT-6 breast tumours were colonised with a *Y. enterocolitica* subsp. *palearctica* MRS40 ΔyopH,O,P,E,M,T bacterial strain encoding both on the endogenous pYV plasmid $YopE_{1-138}$-human $cGAS_{161-522}$ and $YopE_{1-138}$-human RIG-I $CARD_2$ (RIG-$I_{1-245}$) by it administration and bacteria isolated from the tumor for presence of respective selection marker were assessed. When s.c. tumors had reached a certain size (about 100-200 mm3), mice were i.v. infected with $7.5\times10^7$ cfu *Y. enterocolitica* subsp. *palearctica* MRS40 ΔyopH,O,P,E,M,T, encoding both on the endogenous pYV plasmid $YopE_{1-138}$-human $cGAS_{161-522}$ and $YopE_{1-138}$-human RIG-I $CARD_2$. In order to allow bacterial growth, mice were pretreated prior to infection with deferoxamine. Mice infected with the virulence attenuated *Y. enterocolitica* subsp. *palearctica* MRS40 ΔyopH,O,P,E,M,T strain did not show significant weight loss and scored normally for physical appearance and behavior. Bacterial were isolated on day 1 and 2 post infection and replica picked on selective agar plates to assess presence of the endogenous pYV plasmid and the medium copy number vector (FIG. 21). In almost all animals assessed the pYV plasmid and the vector were found highly stable and present at day 1 and day 2 after administration (FIG. 21). Some bacterial colonies isolated were also found to only contain the pYV plasmid but not the medium copy number vector and vice versa. Overall, the pYV plasmid was found slightly more stable than the medium copy number vector up to day 2 after administration.

In order to assess the impact of $YopE_{1-138}$-human RIG1 $CARD_2$ (RIG-$I_{1-245}$) and $YopE_{1-138}$-human $cGAS_{161-522}$ delivered to tumor cells in vivo, we performed studies in wildtype C57BL/6 mice allografted s.c. with B16F10 melanoma cells. Mice were intratumorally (it) injected with PBS (FIG. 23) or $7.5*10^7$ *Y. enterocolitica* ΔHOPEMT (FIG. 24), *Y. enterocolitica* ΔHOPEMT+$YopE_{1-138}$ human RIG1 $CARD_2$ and $YopE_{1-138}$ human $cGAS_{161-522}$ encoded on the endogenous pYV plasmid (on the endogenous sites of yopH and yopE, respectively) (FIG. 25), and additionally on a medium copy number vector (whereon $YopE_{1-138}$-human $cGAS_{161-522}$ and $YopE_{1-138}$-RIG-I $CARD_2$ are encoded in one operon under control of the yopE promoter) once the tumor had reached a size of about 60-130 mm3. The day of the first it injection of bacteria was defined as day 0. Mice were it injected on d0, d1, d5, d6, d10 and d11. Tumor volume was measured over the following days with calipers. Treatment with *Y. enterocolitica* ΔHOPEMT alone showed an impact on tumor volume progression, with 2/15 mice exhibiting complete tumor regression (FIG. 24). *Y. enterocolitica* ΔHOPEMT delivering $YopE_{1-138}$-human $cGAS_{161-522}$ and $YopE_{1-138}$-RIG-I $CARD_2$ was found to lead to a more pronounced impact on tumor progression with 8/15 mice showing complete and durable tumor regression (FIG. 25). Also on average tumor volumes the impact of *Y. enterocolitica* ΔHOPEMT alone and additionally by delivery of $YopE_{1-138}$-human $cGAS_{161-522}$ and $YopE_{1-138}$-RIG-I $CARD_2$ can be seen (FIG. 22). These findings highlight that such bacteria and their T3SS can be employed for very significant interference with tumor progression and that delivery type I IFN inducing proteins is well-suited to induce regression of primary tumor.

In summary, vector encoded $YopE_{1-138}$-human $cGAS_{161-522}$ and to a lesser extent also vector encoded $YopE_{138}$-human RIG-I $CARD_2$ lead to increased activation of type I IFN response than pYV plasmid encoding (FIGS. 8 and 9). Double encoding of $YopE_{1-138}$-human RIG-I $CARD_2$ and $YopE_{1-138}$-human $cGAS_{161-522}$ on the vector does not impair activity of each single cargo (FIGS. 11 and 12). Coding for two different heterologous cargos has the upside of a broader activation potential on diverse cell types (FIGS. 18 and 19). Vector-based encoding seems thus required for high activation potential, while a double-encoding of two heterologous cargos was found to increase overall activity i.e. the combination of RIG-I $CARD_2$ with $cGAS_{161-522}$ led to interferon signaling in more diverse cell types compared to the delivery of $cGAS_{161-522}$ or RIG-I $CARD_2$ alone.

pYV encoding of the heterologous proteins has the advantage of increased genetic stability in vivo over vector-based encoding (FIGS. 20 and 21). pYV and vector-based encoding of $YopE_{1-138}$-human RIG-I $CARD_2$ and $YopE_{1-138}$-human $cGAS_{161-522}$ was found superior or comparable to only vector-based encoding in terms of IFN activation potential (FIGS. 10 and 19). Overall, these findings show that combined delivery of human cGAS and human RIG-I CARD increases the range cell types in which a type I IFN induction can be achieved (compared to delivery of cGAS alone or RIG-I CARD alone), and increases the potency of interferon induction in some cell types.

A double encoding, on the pYV and a vector, of $YopE_{1-138}$-human RIG-I $CARD_2$ and $YopE_{1-138}$-human $cGAS_{161-522}$ can thus be considered optimal for maximal activity of $YopE_{1-138}$-human RIG-I $CARD_2$ and $YopE_{1-138}$-human $cGAS_{161-522}$ (see FIG. 19 as an example) and best genetic stability (see FIGS. 20 and 21). Additionally, a medium copy number vector was found superior to low or high copy number vectors (FIGS. 13-16). A strain combining pYV- and a medium copy number vector-based encoding of $YopE_{1-138}$-human $cGAS_{161-522}$ and $YopE_{1-138}$-RIG-I $CARD_2$ (e.g. as depicted in FIG. 17), where on the medium copy number vector $YopE_{1-138}$-human $cGAS_{161-522}$ and $YopE_{1-138}$-RIG-I $CARD_2$ are encoded in one operon, is thus combining all of the beneficial features (wide range of cell type activation potential, increased potency, genetic stability). Such a strain (as depicted in FIG. 17) has finally also been verified for its impact on tumour progression in an animal model of solid tumor (FIG. 22-25), where it was found to cause durable and complete tumor regression in over 50% of animals treated.

LIST OF REFERENCES

1 Hayes, C. S., Aoki, S. K. & Low, D. A. Bacterial contact-dependent delivery systems. *Annu Rev Genet* 44, 71-90, doi:10.1146/annurev.genet.42.110807.091449 (2010).

2 Cornelis, G. R. The type III secretion injectisome. *Nat Rev Microbiol* 4, 811-825, doi:nrmicro1526 [pii]10.1038/nrmicro1526 (2006).

3 Blanco-Toribio, A., Muyldermans, S., Frankel, G. & Fernandez, L. A. Direct injection of functional single-domain antibodies from *E. coli* into human cells. 3 *PLoS One* 5, e15227, doi:10.1371/journal.pone.0015227 (2010).

4 Bichsel, C. et al. Direct reprogramming of fibroblasts to myocytes via bacterial injection of MyoD protein. *Cell Reprogram* 15, 117-125, doi:10.1089/cell.2012.0058 (2013).

5 Bichsel, C. et al. Bacterial delivery of nuclear proteins into pluripotent and differentiated cells. *PLoS One* 6, e16465, doi:10.1371/journal.pone.0016465 (2011).

6 Chamekh, M. et al. Delivery of biologically active anti-inflammatory cytokines IL-10 and IL-1ra in vivo by the *Shigella* type III secretion apparatus. *J Immunol* 180, 4292-4298 (2008).

7 Skurnik, M. & Wolf-Watz, H. Analysis of the yopA gene encoding the Yop1 virulence determinants of *Yersinia* spp. *Mol Microbiol* 3, 517-529 (1989).

8 Isberg, R. R., Voorhis, D. L. & Falkow, S. Identification of invasin: a protein that allows enteric bacteria to penetrate cultured mammalian cells. *Cell* 50, 769-778 (1987).

9 Mota, L. J. & Cornelis, G. R. The bacterial injection kit: type III secretion systems. *Ann Med* 37, 234-249, doi: R673752030212825 [pii]10.1080/07853890510037329 (2005).

10 Trosky, J. E., Liverman, A. D. & Orth, K. *Yersinia* outer proteins: Yops. *Cell Microbiol* 10, 557-565, doi:10.1111/j.1462-5822.2007.01109.x (2008).

11 Brenner, D. & Mak, T. W. Mitochondrial cell death effectors. *Curr Opin Cell Biol* 21, 871-877, doi:S0955-0674(09)00160-4 [pii]10.1016/j.ceb.2009.09.004 (2009).

12 Chalah, A. & Khosravi-Far, R. The mitochondrial death pathway. *Adv Exp Med Biol* 615, 25-45, doi:10.1007/978-1-4020-6554-5_3 (2008).

13 Fuchs, Y. & Steller, H. Programmed cell death in animal development and disease. *Cell* 147, 742-758, doi:S0092-8674(11)01283-9 [pii]10.1016/j.cell.2011.10.033 (2011).

14 Waugh, D. S. An overview of enzymatic reagents for the removal of affinity tags. *Protein Expr Purif* 80, 283-293, doi:S1046-5928(11)00203-8 [pii]10.1016/j.pep.2011.08.005 (2011).

15 Howard, S. L. et al. Application of comparative phylogenomics to study the evolution of *Yersinia enterocolitica* and to identify genetic differences relating to pathogenicity. *J Bacteriol* 188, 3645-3653, doi:10.1128/JB.188.10.3645-3653.2006 (2006).

16 Thomson, N. R. et al. The complete genome sequence and comparative genome analysis of the high pathogenicity *Yersinia enterocolitica* strain 8081. *PLoS Genet* 2, e206, doi:10.1371/journal.pgen.0020206 (2006).

17 Pelludat, C., Hogardt, M. & Heesemann, J. Transfer of the core region genes of the *Yersinia enterocolitica* WA-C serotype O:8 high-pathogenicity island to *Y. enterocolitica* MRS40, a strain with low levels of pathogenicity, confers a yersiniabactin biosynthesis phenotype and enhanced mouse virulence. *Infect Immun* 70, 1832-1841 (2002).

18 Mulder, B., Michiels, T., Simonet, M., Sory, M. P. & Cornelis, G. Identification of additional virulence determinants on the pYV plasmid of *Yersinia enterocolitica* W227. *Infect Immun* 57, 2534-2541 (1989).

19 Sory, M. P. & Cornelis, G. R. Translocation of a hybrid YopE-adenylate cyclase from *Yersinia enterocolitica* into HeLa cells. *Mol Microbiol* 14, 583-594 (1994).

20 Sarker, M. R., Neyt, C., Stainier, I. & Cornelis, G. R. The *Yersinia* Yop virulon: LcrV is required for extrusion of the translocators YopB and YopD. *J Bacteriol* 180, 1207-1214 (1998).

21 Neubauer, H., Aleksic, S., Hensel, A., Finke, E. J. & Meyer, H. *Yersinia enterocolitica* 16S rRNA gene types belong to the same genospecies but form three homology groups. *Int J Med Microbiol* 290, 61-64, doi:10.1016/S1438-4221(00)80107-1 (2000).

22 Feldman, M. F., Muller, S., Wuest, E. & Cornelis, G. R. SycE allows secretion of YopE-DHFR hybrids by the *Yersinia enterocolitica* type III Ysc system. *Mol Microbiol* 46, 1183-1197, doi:3241 [pii] (2002).

23 Ramamurthi, K. S. & Schneewind, O. A synonymous mutation in *Yersinia enterocolitica* yopE affects the function of the YopE type III secretion signal. *J Bacteriol* 187, 707-715, doi:10.1128/JB.187.2.707-715.2005 (2005).

24 Wolke, S., Ackermann, N. & Heesemann, J. The *Yersinia enterocolitica* type 3 secretion system (T3SS) as toolbox for studying the cell biological effects of bacterial Rho GTPase modulating T3SS effector proteins. *Cell Microbiol* 13, 1339-1357, doi:10.1111/j.1462-5822.2011.01623.x (2011).
25 Forsberg, A. & Wolf-Watz, H. Genetic analysis of the yopE region of *Yersinia* spp.: identification of a novel conserved locus, yerA, regulating yopE expression. *J Bacteriol* 172, 1547-1555 (1990).
26 Sambrook, J. (ed David W. Russell) (Cold Spring Harbor Laboratory Press, Cold Spring Harbor, N.Y., 2001).
27 Alto, N. M. & Dixon, J. E. Analysis of Rho-GTPase mimicry by a family of bacterial type III effector proteins. *Methods Enzymol* 439, 131-143, doi:S0076-6879(07)00410-7 [pii]10.1016/S0076-6879(07)00410-7 (2008).
28 Alto, N. M. et al. Identification of a bacterial type III effector family with G protein mimicry functions. *Cell* 124, 133-145, doi:S0092-8674(05)01229-8 [pii]10.1016/j.cell.2005.10.031 (2006).
29 Kaniga, K., Delor, I. & Cornelis, G. R. A wide-host-range suicide vector for improving reverse genetics in gram-negative bacteria: inactivation of the blaA gene of *Yersinia enterocolitica*. *Gene* 109, 137-141, doi:0378-1119(91)90599-7 [pii] (1991).
30 Yoneda, Y. et al. A long synthetic peptide containing a nuclear localization signal and its flanking sequences of SV40 T-antigen directs the transport of IgM into the nucleus efficiently. *Exp Cell Res* 201, 313-320 (1992).
31 Metcalf, W. W., Jiang, W. & Wanner, B. L. Use of the rep technique for allele replacement to construct new *Escherichia coli* hosts for maintenance of R6K gamma origin plasmids at different copy numbers. *Gene* 138, 1-7 (1994).
32 Diepold, A. et al. Deciphering the assembly of the *Yersinia* type III secretion injectisome. *Embo J* 29, 1928-1940, doi:emboj201084 50 [pii]10.1038/emboj.2010.84 (2010).
33 Iriarte, M., Stainier, I. & Cornelis, G. R. The rpoS gene from *Yersinia enterocolitica* and its influence on expression of virulence factors. *Infect Immun* 63, 1840-1847 (1995).
34 Cornelis, G., Vanootegem, J. C. & Sluiters, C. Transcription of the yop regulon from *Y. enterocolitica* requires trans acting pYV and chromosomal genes. *Microb Pathog* 2, 367-379, doi:0882-4010(87)90078-7 [pii] (1987).
35 Grosdent, N., Maridonneau-Parini, I., Sory, M. P. & Cornelis, G. R. Role of Yops and adhesins in resistance of *Yersinia enterocolitica* to phagocytosis. *Infect Immun* 70, 4165-4176 (2002).
36 Boyd, A. P., Lambermont, I. & Cornelis, G. R. Competition between the Yops of *Yersinia enterocolitica* for delivery into eukaryotic cells: role of the SycE chaperone binding domain of YopE. *J Bacteriol* 182, 4811-4821 (2000).
37 Iriarte, M. & Cornelis, G. R. YopT, a new *Yersinia* Yop effector protein, affects the cytoskeleton of host cells. *Mol Microbiol* 29, 915-929 (1998).
38 Kudryashev, M. et al. In situ structural analysis of the *Yersinia enterocolitica* injectisome. *Elife* 2, e00792, doi:10.7554/eLife.0079200792 [pii] (2013).
39 Schulte, R. et al. *Yersinia enterocolitica* invasin protein triggers IL-8 production in epithelial cells via activation of Rel p65-p65 homodimers. *FASEB J* 14, 1471-1484 (2000).
40 Mota, L. J., Journet, L., Sorg, I., Agrain, C. & Cornelis, G. R. Bacterial injectisomes: needle length does matter. *Science* 307, 1278, doi:307/5713/1278 [pii]10.1126/science.1107679 (2005).
41 Carrington, J. C. & Dougherty, W. G. A viral cleavage site cassette: identification of amino acid sequences required for tobacco etch virus polyprotein processing. *Proc Natl Acad Sci USA* 85, 3391-3395 (1988).
42 Kapust, R. B., Tozser, J., Copeland, T. D. & Waugh, D. S. The P1' specificity of tobacco etch virus protease. *Biochem Biophys Res Commun* 294, 949-955, doi:10.1016/50006-291X(02)00574-0S0006-291X(02)00574-0 [pii] (2002).
43 Liang, H., Gao, H., Maynard, C. A. & Powell, W. A. Expression of a self-processing, pathogen resistance-enhancing gene construct in *Arabidopsis*. *Biotechnol Lett* 27, 435-442, doi:10.1007/s10529-005-1884-9 (2005).
44 Weber, W. et al. Macrolide-based transgene control in mammalian cells and mice. *Nat Biotechnol* 20, 901-907, doi:10.1038/nbt731nbt731 [pii] (2002).
45 Kapust, R. B. et al. Tobacco etch virus protease: mechanism of autolysis and rational design of stable mutants with wild-type catalytic proficiency. *Protein Eng* 14, 993-1000 (2001).
46 Lee, V. T., Anderson, D. M. & Schneewind, O. Targeting of *Yersinia* Yop proteins into the cytosol of HeLa cells: one-step translocation of YopE across bacterial and eukaryotic membranes is dependent on SycE chaperone. *Mol Microbiol* 28, 593-601 (1998).
47 Gray, D. C., Mahrus, S. & Wells, J. A. Activation of specific apoptotic caspases with an engineered small-molecule-activated protease. *Cell* 142, 637-646, doi:S0092-8674(10)00783-X [pii]10.1016/j.cell.2010.07.014 (2010).
48 Henrichs, T. et al. Target-directed proteolysis at the ribosome. *Proc Natl Acad Sci USA* 102, 4246-4251, doi:102/12/4246 [pii]10.1073/pnas.0408520102 (2005).
49 Aepfelbacher, M., Trasak, C. & Ruckdeschel, K. Effector functions of pathogenic *Yersinia* species. *Thromb Haemost* 98, 521-529 (2007).
50 Trulzsch, K., Sporleder, T., Igwe, E. I., Russmann, H. & Heesemann, J. Contribution of the major secreted yops of *Yersinia enterocolitica* O:8 to pathogenicity in the mouse infection model. *Infect Immun* 72, 5227-5234, doi:10.1128/IAI.72.9.5227-5234.2004 (2004).
51 Bohme, K. et al. Concerted actions of a thermo-labile regulator and a unique intergenic RNA thermosensor control *Yersinia* virulence. *PLoS Pathog* 8, e1002518, doi:10.1371/journal.ppat.1002518 (2012).
52 Rohde, J. R., Luan, X. S., Rohde, H., Fox, J. M. & Minnich, S. A. The *Yersinia enterocolitica* pYV virulence plasmid contains multiple intrinsic DNA bends which melt at 37 degrees C. *J Bacteriol* 181, 4198-4204 (1999).
53 Curtiss, R., 3rd, Galan, J. E., Nakayama, K. & Kelly, S. M. Stabilization of recombinant avirulent vaccine strains in vivo. *Res Microbiol* 141, 797-805 (1990).
54 Spreng, S. & Viret, J. F. Plasmid maintenance systems suitable for GMO-based bacterial vaccines. *Vaccine* 23, 2060-2065, doi:10.1016/j.vaccine.2005.01.009 (2005).
55 Neyt, C., Iriarte, M., Thi, V. H. & Cornelis, G. R. Virulence and arsenic resistance in Yersiniae. *J Bacteriol* 179, 612-619 (1997).
56 Wu, J. & Chen, Z. J. Innate immune sensing and signaling of cytosolic nucleic acids. *Annu Rev Immunol* 32, 461-488, doi:10.1146/annurev-immunol-032713-120156 (2014).

57 Kranzusch, P. J. et al. Ancient Origin of cGAS-STING Reveals Mechanism of Universal 2',3' cGAMP Signaling. *Mol Cell* 59, 891-903, doi:10.1016/j.molcel.2015.07.022 (2015).
58 Commichau, F. M., Dickmanns, A., Gundlach, J., Ficner, R. & Stulke, J. A jack of all trades: the multiple roles of the unique essential second messenger cyclic di-AMP. *Mol Microbiol* 97, 189-204, doi:10.1111/mmi.13026 (2015).
59 Corrales, L. et al. Direct Activation of STING in the Tumor Microenvironment Leads to Potent and Systemic Tumor Regression and Immunity. *Cell Rep* 11, 1018-1030, doi:10.1016/j.celrep.2015.04.031 (2015).
60 De, N., Navarro, M. V., Raghavan, R. V. & Sondermann, H. Determinants for the activation and autoinhibition of the diguanylate cyclase response regulator WspR. *J Mol Biol*393, 619-633, doi:10.1016/j.jmb.2009.08.030 (2009).
61 Witte, G., Hartung, S., Buttner, K. & Hopfner, K. P. Structural biochemistry of a bacterial checkpoint protein reveals diadenylate cyclase activity regulated by DNA recombination intermediates. *Mol Cell* 30, 167-178, doi: 10.1016/j.molcel.2008.02.020 (2008).
62 Panne, D., McWhirter, S. M., Maniatis, T. & Harrison, S. C. Interferon regulatory factor 3 is regulated by a dual phosphorylation-dependent switch. *J Biol Chem* 282, 22816-22822, doi:10.1074/jbc.M703019200 (2007).
63 Engel, C., G. Brugmann, S. Lambing, L. H. Muhlenbeck, S. Marx, C. Hagen, D. Horvath, M. Goldeck, J. Ludwig, A. M. Herzner, J. W. Drijfhout, D. Wenzel, C. Coch, T. Tuting, M. Schlee, V. Hornung, G. Hartmann, and J. G. Van den Boom. 2017. RIG-I Resists Hypoxia-Induced Immunosuppression and Dedifferentiation. *Cancer Immunol Res.* 5:455-467.
64 Hou, F., L. Sun, H. Zheng, B. Skaug, Q. X. Jiang, and Z. J. Chen. 2011. MAVS forms functional prion-like aggregates to activate and propagate antiviral innate immune response. *Cell.* 146:448-461.
65 Kranzusch, P. J., A. S. Lee, J. M. Berger, and J. A. Doudna. 2013. Structure of human cGAS reveals a conserved family of second-messenger enzymes in innate immunity. *Cell Rep.* 3:1362-1368.
66 Seth, R. B., L. Sun, C. K. Ea, and Z. J. Chen. 2005. Identification and characterization of MAVS, a mitochondrial antiviral signaling protein that activates NF-kappaB and IRF 3. *Cell.* 122:669-682.
67 Alton, N., Vapnek, D. 1979. Nucleotide sequence analysis of the chloramphenicol resistance transposon Tn9. *Nature* 282, 864-869. https://doi.org/10.1038/282864a0.
68 Ittig, S. J., 2015. A bacterial type III secretion-based protein delivery tool for broad applications in cell biology. *J Cell Biol* 23 Nov. 2015; 211 (4): 913-931. doi: https.//doi.org/10.1083/jcb.201502074.
69 Eisenhauer, E. A., P. Therasse, J. Bogaerts, L. H. Schwartz, D. Sargent, R. Ford, J. Dancey, S. Arbuck, S. Gwyther, M. Mooney, L. Rubinstein, L. Shankar, L. Dodd, R. Kaplan, D. Lacombe, and J. Verweij. 2009. New response evaluation criteria in solid tumours: revised RECIST guideline (version 1.1). *Eur J Cancer.* 45:228-247.
70 Seymour, L., J. Bogaerts, A. Perrone, R. Ford, L. H. Schwartz, S. Mandrekar, N. U. Lin, S. Litiere, J. Dancey, A. Chen, F. S. Hodi, P. Therasse, O. S. Hoekstra, L. K. Shankar, J. D. Wolchok, M. Ballinger, C. Caramella, E. G. E. de Vries, and R. w. group. 2017. iRECIST: guidelines for response criteria for use in trials testing immunotherapeutics. *Lancet Oncol.* 18:e143-e152.

The invention claimed is:

1. A recombinant Gram-negative bacterial strain which comprises i) a first polynucleotide molecule comprising a nucleotide sequence encoding a heterologous protein or a fragment thereof fused in frame to the 3'end of a nucleotide sequence encoding a delivery signal from a bacterial effector protein, wherein the nucleotide sequence encoding the delivery signal from a bacterial effector protein is operably linked to a promoter;

ii) a second polynucleotide molecule comprising a nucleotide sequence encoding a heterologous protein or a fragment thereof fused in frame to the 3'end of a nucleotide sequence encoding a delivery signal from a bacterial effector protein, wherein the nucleotide sequence encoding the delivery signal from a bacterial effector protein is operably linked to a promoter;

iii) a third polynucleotide molecule comprising a nucleotide sequence encoding a heterologous protein or a fragment thereof fused in frame to the 3'end of a nucleotide sequence encoding a delivery signal from a bacterial effector protein, wherein the nucleotide sequence encoding the delivery signal from a bacterial effector protein is operably linked to a promoter; and iv) a fourth polynucleotide molecule comprising a nucleotide sequence encoding a heterologous protein or a fragment thereof fused in frame to the 3'end of a nucleotide sequence encoding a delivery signal from a bacterial effector protein, wherein the nucleotide sequence encoding the delivery signal from a bacterial effector protein is operably linked to a promoter, wherein said first and said second polynucleotide molecule are located on a vector comprised by said Gram-negative bacterial strain and said third and said fourth polynucleotide molecule are located on a chromosome of said Gram-negative bacterial strain or on an extra-chromosomal genetic element comprised by said Gram-negative bacterial strain, with the proviso that the extra-chromosomal genetic element is not the vector on which the said first and said second polynucleotide molecule are located.

2. The recombinant Gram-negative bacterial strain of claim 1, wherein the nucleotide sequence encoding a heterologous protein or a fragment thereof of the first polynucleotide molecule and the nucleotide sequence encoding a heterologous protein or a fragment thereof of the third polynucleotide molecule encode the same heterologous protein or a fragment thereof.

3. The recombinant attenuated Gram-negative bacterial strain of claim 2, wherein the nucleotide sequence encoding a heterologous protein or a fragment thereof of the second polynucleotide molecule and the nucleotide sequence encoding a heterologous protein or a fragment thereof of the fourth polynucleotide molecule encode the same heterologous protein or a fragment thereof.

4. The recombinant Gram-negative bacterial strain of claim 1, wherein the nucleotide sequence encoding a heterologous protein or a fragment thereof fused in frame to the 3' end of the nucleotide sequence encoding a delivery signal from a bacterial effector protein of the first polynucleotide molecule and the nucleotide sequence encoding a heterologous protein or a fragment thereof fused in frame to the 3' end of the nucleotide sequence encoding a delivery signal from a bacterial effector protein of the second polynucleotide molecule are operably linked to the same promoter.

5. The recombinant Gram-negative bacterial strain of claim 1, wherein the nucleotide sequence encoding a heterologous protein or a fragment thereof fused in frame to the 3' end of the nucleotide sequence encoding a delivery signal from a bacterial effector protein of the third polynucleotide molecule and the nucleotide sequence encoding a heterologous protein or a fragment thereof fused in frame to the 3' end of the nucleotide sequence encoding a delivery signal from a bacterial effector protein of the fourth polynucleotide molecule are operably linked to two different promoters.

6. The recombinant Gram-negative bacterial strain of claim 1, wherein a fragment of a heterologous protein contains between 100 and 800 amino acids and does have the same functional properties as the heterologous protein from which it is derived.

7. The recombinant Gram-negative bacterial strain of claim 1, wherein the delivery signal from a bacterial effector protein is a polypeptide sequence which can be recognized by the secretion and translocation system of the recombinant Gram-negative bacterial strain and directs the delivery of a protein from the recombinant Gram-negative bacterial strain to eukaryotic cells.

8. The recombinant Gram-negative bacterial strain of claim 1, wherein the delivery signal from a bacterial effector protein is selected from the group consisting of a bacterial T3SS effector protein or a N-terminal fragment thereof, a bacterial T4SS effector protein or a N-terminal fragment thereof and a bacterial T6SS effector protein or a N-terminal fragment thereof.

9. The recombinant Gram-negative bacterial strain of claim 1, wherein the delivery signal from a bacterial effector protein is a bacterial T3SS effector protein comprising a bacterial T3SS effector protein or a N-terminal fragment thereof.

10. The recombinant Gram-negative bacterial strain of claim 9, wherein the N-terminal fragment of a bacterial T3SS effector protein includes at least the first 10 amino acids of the bacterial T3SS effector protein.

11. The recombinant Gram-negative bacterial strain of claim 1, wherein the vector is a medium copy number plasmid.

12. The recombinant Gram-negative bacterial strain of claim 1, wherein the extra-chromosomal genetic element is an endogenous virulence plasmid.

13. The recombinant Gram-negative bacterial strain of claim 1, wherein the heterologous protein or a fragment thereof encoded by the nucleotide sequence of the first, second, third and fourth polynucleotide molecule is, independently of each other, selected from the group consisting of proteins involved in induction or regulation of an interferon (IFN) response, proteins involved in apoptosis or apoptosis regulation, cell cycle regulators, ankyrin repeat proteins, cell signalling proteins, reporter proteins, transcription factors, proteases, small GTPases, GPCR related proteins, bacterial T3SS effectors, bacterial T4SS effectors and viral proteins, or a fragment thereof.

14. The recombinant Gram-negative bacterial strain of claim 1, wherein the heterologous protein or a fragment thereof encoded by the nucleotide sequence of the first, second, third and fourth polynucleotide molecule is, independently of each other, selected from the group consisting of proteins involved in induction or regulation of a type I IFN response selected from the group consisting of cGAS, STING, TRIF, TBK1, IKKepsilon, IRF3, TREX1, VPS34, ATG9a, DDX3, LC3, DDX41, IFI16, MRE11, DNA-PK, RIG1, MDA5, LGP2, IPS-1/MAVS/Cardif/VISA, Trim25, Trim32, Trim56, Riplet, TRAF2, TRAF3, TRAF5, TANK, IRF3, IRF7, IRF9, STAT1, STAT2, PKR, TLR3, TLR7, TLR9, DAI, IFI16, IFIX, MRE11, DDX41, LSm14A, LRRFIP1, DHX9, DHX36, DHX29, DHX15, Ku70, cyclic dinucleotide generating enzymes, or a fragment thereof; proteins involved in apoptosis or apoptosis regulation selected from the group consisting of pro-apoptotic proteins, anti-apoptotic proteins, inhibitors of apoptosis-prevention pathways and inhibitors of pro-survival signalling or pathways; cell cycle regulators selected from the group consisting of cyclins, cyclin dependent kinases (CDKs), CDK activating kinases, Cdk inhibitors, CDK substrates, anaphase promoting complex/cyclosome and cell-cycle-checkpoint proteins; ankyrin repeat proteins; cell signalling proteins selected from the group consisting of cytokine signalling proteins, survival factor signaling proteins, death signalling proteins, growth factor signalling proteins, hormone signalling proteins, chemokine signalling proteins, and extracellular matrix/Wnt/Hedgehog signalling proteins; reporter proteins selected from the group consisting of fluorescent proteins, luciferases and enzymatic reporter proteins; transcription factors; proteases; small GTPases; GPCR related proteins selected from the group consisting of G-protein coupled receptors, G protein complexes, kinases, adaptor proteins, signal transducers/regulators and transcription factors; bacterial T3SS effectors; bacterial T4SS effectors and viral proteins; or a fragment thereof.

15. The recombinant Gram-negative bacterial strain of claim 1, wherein the heterologous protein or a fragment thereof encoded by the nucleotide sequence of the first, second, third and fourth polynucleotide molecule is, independently of each other, a protein involved in induction or regulation of an interferon (IFN) response, or a fragment thereof.

16. The recombinant Gram-negative bacterial strain of claim 15, wherein a protein involved in induction or regulation of an interferon (IFN) response, or a fragment thereof, is a protein involved in induction or regulation of a type I IFN response selected from the group consisting of cGAS, STING, TRIF, TBK1, IKKepsilon, IRF3, TREX1, VPS34, ATG9a, DDX3, LC3, DDX41, IFI16, MRE11, DNA-PK, RIG1, MDA5, LGP2, IPS-1/MAVS/Cardif/VISA, Trim25, Trim32, Trim56, Riplet, TRAF2, TRAF3, TRAF5, TANK, IRF3, IRF7, IRF9, STAT1, STAT2, PKR, TLR3, TLR7, TLR9, DAI, IFI16, IFIX, MRE11, DDX41, LSm14A, LRRFIP1, DHX9, DHX36, DHX29, DHX15, Ku70, or a fragment thereof, cyclic dinucleotide generating enzymes, or a fragment thereof.

17. The recombinant Gram-negative bacterial strain of claim 1, wherein the heterologous protein or a fragment thereof encoded by the nucleotide sequence of the first, second, third and fourth polynucleotide molecule is, independently of each other, selected from the group consisting of the RIG-I-like receptor (RLR) family, other CARD domain containing proteins involved in antiviral signaling and type I IFN induction, and cyclic dinucleotide generating enzymes, leading to stimulation of STING.

18. The recombinant Gram-negative bacterial strain of claim 1, wherein the heterologous protein or a fragment thereof encoded by the nucleotide sequence of the first, second, third and fourth polynucleotide molecule is, independently of each other, selected from the group consisting of the RIG-I-like receptor (RLR) family, other CARD domain containing proteins selected from the group consisting of MAVS, CRADD/RAIDD, RIPK2/RIP2, CARD6, NOD1 and NOD2, or a fragment thereof, and cyclic dinucleotide generating enzymes, leading to stimulation of STING.

19. The recombinant Gram-negative bacterial strain of any one of claims 14 or 16-18, wherein the cyclic dinucleotide generating enzymes are cyclic-di-AMP, cyclic-di-GMP and cyclic-di-GAMP cyclases selected from the group consisting of WspR, DncV, DisA and DisA-like, CdaA, CdaS and cGAS, or a fragment thereof.

20. The recombinant Gram-negative bacterial strain of claim 1, wherein the heterologous protein or a fragment thereof encoded by the nucleotide sequence of the first and the third polynucleotide molecule is cGAS or a fragment thereof.

21. The recombinant Gram-negative bacterial strain of claim 1, wherein the heterologous protein or a fragment thereof encoded by the nucleotide sequence of the first and the third polynucleotide molecule is a fragment of cGAS as shown in SEQ ID NO: 10.

22. The recombinant Gram-negative bacterial strain of claim 1, wherein the heterologous protein or a fragment thereof encoded by the nucleotide sequence of the second and the fourth polynucleotide molecule is RIG1 or a fragment thereof.

23. The recombinant Gram-negative bacterial strain of claim 1, wherein the heterologous protein or a fragment thereof encoded by the nucleotide sequence of the second and the fourth polynucleotide molecule is a fragment of RIG1 comprising a CARD domain as shown in SEQ ID NO: 1, SEQ ID NO: 2 or SEQ ID NO: 3.

24. The recombinant Gram-negative bacterial strain of claim 1, wherein the recombinant Gram-negative bacterial strain is a *Yersinia* strain.

25. A medicament comprising the recombinant Gram-negative bacterial strain of claim 1.

* * * * *